United States Patent

Chambers

[15] 3,643,221

[45] Feb. 15, 1972

[54] CHANNEL BUFFER FOR DATA PROCESSING SYSTEM

[72] Inventor: James B. Chambers, Endwell, N.Y.

[73] Assignee: International Business Machines Corporation, Armonk, N.Y.

[22] Filed: Apr. 16, 1970

[21] Appl. No.: 29,224

[52] U.S. Cl. ....340/172.5, 307/231, 328/37

[51] Int. Cl. ....G11c 19/00

[58] Field of Search ....340/172.5; 307/221; 328/37

[56] References Cited

UNITED STATES PATENTS

| | | | |
|---|---|---|---|
| 3,103,580 | 9/1963 | Foreman | 307/221 |
| 3,210,737 | 10/1965 | Perry et al. | 307/221 |
| 3,328,766 | 6/1967 | Burns et al. | 340/172.5 |
| 3,350,692 | 10/1967 | Cagle et al. | 328/37 |
| 3,496,475 | 2/1970 | Arnold | 307/221 |
| 3,540,004 | 11/1970 | Hansen | 340/172.5 |

*Primary Examiner*—Gareth D. Shaw
*Assistant Examiner*—Mark Edward Nusbaum
*Attorney*—Hanifin and Jancin and John C. Black

[57] ABSTRACT

An improved shift register, characterized by the ability of data in each stage to be alternatively not transferred, transferred one stage, or transferred two stages in response to each advance pulse depending upon the full or empty conditions of the two succeeding stages, provides efficient transfer of data between the CPU and high-speed peripheral devices of data processing system.

9 Claims, 74 Drawing Figures

PATENTED FEB 15 1972 3,643,221

SHEET 01 OF 56

INVENTOR.
JAMES B. CHAMBERS
BY John C Black
ATTORNEY

CLOCK CYCLE LENGTH CONTROLS 271

B REGISTER

B BYTE ASSEMBLY CONTROLS

A LOCAL STORE ADDRESS CIRCUITS 150

| | BYTE C1 OR C2 | | | | P3 | ADDRESS MODE | LOCAL STORAGE OR EXTERNAL WORD ADDRESS DECODE | | | | | | | | BYTE | |
|---|---|---|---|---|---|---|---|---|---|---|---|---|---|---|---|---|
| | 0 | 1 | 2 | 3 | | | | | 2 | 3 | 4 | 5 | 6 | 7 | 0 | 1 |
| 1 | 0 | X | X | X | X | DIRECT WORD | | | P5 | P6 | P7 | C1 OR C2<br>1 | 2 | 3 | C1 OR C2<br>4 | 5 |
| 2 | 1 | 0 | 0 | X | 0 | INDIRECT WORD | | | P1 | P2 | L0 | L1 | L2 | C1.3+L3<br>C2.3+L3 | C1 OR C2<br>4 | 5 |
| 3 | 1 | 0 | 1 | X | 0 | INDIRECT WORD-INDIRECT BYTE | | | P1 | P2 | L0 | L1 | L2 | C1.3+L3<br>C2.3+L3 | T4 / T6 OR | T5 / T7 |
| 4 | 1 | 1 | 0 | 0 | X | SPTL | | | | | | | | | C1 OR C2<br>4 | 5 |
| 5 | 1 | 1 | 0 | 1 | 0 | INDIRECT WORD | | | P1 | P2 | L4 | L5 | L6 | L7 | C1 OR C2<br>4 | 5 |
| 6 | 1 | 1 | 1 | 0 | 0 | DIRECT WORD INDIRECT BYTE | | | P5 | P6 | P7 | C1 OR C2<br>1 | 2 | 3 | T4 / T6 OR | T5 / T7 |
| 7 | 1 | 1 | 1 | 1 | 0 | DIRECT WORD INDIRECT BYTE | | | P5 | P6 | P7 | C1 OR C2<br>1 | 2 | 3 | T4 / T6 OR | T5 / T7 |
| 8 | 1 | X | X | X | 1 | EXTERNAL REGISTERS | | | P0 | P1 | P2 | C1 OR C2<br>1 | 2 | 3 | C1 OR C2<br>4 | 5 |

FIG. 12

| WORD NAME | LS LOCATION | BYTE 0 / BYTE 1 / BYTE 2 / BYTE 3 | X & Y LINES |
|---|---|---|---|
| | 00 | GENERAL PURPOSE REGISTER 0 | X0 Y0 |
| | 0F | GENERAL PURPOSE REGISTER F | X1 Y7 |
| I REGISTER | 10 | KEY \| 0000 \| INSTRUCTION COUNTER | X2 Y0 |
| X REGISTER | 11 | CPU WORKING AREA | X2 Y1 |
| W REGISTER | 12 | KEY \| 0000 \| FIRST OPERAND ADDRESS | X2 Y2 |
| U REGISTER | 13 | \| FIELD LENGTH | X2 Y3 |
| V REGISTER | 14 | KEY \| 0000 \| SECOND OPERAND ADDRESS | X2 Y4 |
| R REGISTER | 15 | CPU WORKING AREA | X2 Y5 |
| Y REGISTER | 16 | CPU WORKING AREA | X2 Y6 |
| Q REGISTER | 17 | CPU WORKING AREA | X2 Y7 |
| CX REGISTER | 1F | CPU LINK INFORMATION | X3 Y7 |
| G2D | 20 | PROTECT \| DATA ADDRESS | X4 Y0 |
| G2C | 21 | NOT USED \| COUNT | X4 Y1 |
| G2M | 22 | PROTECT \| CCW ADDRESS | X4 Y2 |
| G2W | 23 | UNIT ADDRESS \| NOT USED | X4 Y3 |
| | 30 | FLOATING POINT REGISTER 0 | X6 Y0 |
| | 31 | FLOATING POINT REGISTER 0 | X6 Y1 |
| GX | 3F | SX1 LINK | X7 Y7 |

DIRECT & INDIRECT ACCESS

| LS ADR | P LOW | P HIGH |
|---|---|---|
| 00-07 | 0 | 0 |
| 08-0F | 1 | 0 |
| 10-17 | 2 | 2 |
| 18-1F | 3 | 2 |
| 20-27 | 4 | 4 |
| 28-2F | 5 | 4 |
| 30-37 | 6 | 6 |
| 38-3F | 7 | 6 |

P LOW SETTINGS ARE FOR DIRECT ACCESS

P HIGH SETTINGS ARE FOR INDIRECT ACCESS

FIG. 36

ACB REGISTER AND CONTROLS 133

FIG. 14

C0 (0 1 2 3 4 5 6 7) | C1 (0 1 2 3 4 5 6 7) | C2 (0 1 2 3 4 5 6 7) | C3 (0 1 2 3 4 5 6 7)

| BRANCH AND MODULE SW | BRANCH HIGH | BRANCH SOURCE WORD | BRANCH SOURCE BYTE | BRANCH SOURCE DEST | MODULE | NEXT ADDRESS | BRANCH LOW |
|---|---|---|---|---|---|---|---|
| 0 0 0 0 | 0<br>1 | SEE LS/EXT<br>ADDR FORMS | 0<br>1 | S=B | | | 0<br>1 |
| | S1<br>S0 | | 2<br>3 | T=B<br>L=B | | | ZO<br>NZ |

FIG. 15

| BRANCH | BRANCH HIGH | BRANCH SOURCE WORD | BRANCH SOURCE BYTE | K HI-LO | SPARE | S/R | S/R SOURCE | K | NEXT ADDRESS | BRANCH LOW |
|---|---|---|---|---|---|---|---|---|---|---|
| 0 0 0 1 | 0<br>1 | SEE LS/EXT<br>ADDR FORMS | 0<br>1 | MS<br>L | | OR<br>A– | BRANCH SOURCE S | | | 0<br>1 |
| | S1<br>S0 | | 2<br>3 | H<br>ST | | | P<br>GA | | | ZO<br>NZ |

FIG. 16

| BRANCH AND LINK OR RETURN | | | LINK ADDRESS: LS OR EXT | LINK ADDRESS: Y | LINK ADDRESS: X | SPARE | K/MODULE | NEXT ADDRESS | | BRANCH LOW |
|---|---|---|---|---|---|---|---|---|---|---|
| | LINK<br>RTN | 0<br>1 | LS<br>EXT | | | | | BAL | P<br>MS | 0<br>1 |
| 0 0 1 0 | | S1<br>S0 | | | | | | RETURN | –<br>USE NA | ZO |

FIG. 19

| C0 0-1 STORE WORD | C0 2-4 SUBFORM | C0 5-7 BRANCH HIGH | C1 0-3 DATA REGISTER | C1 4-5 K ADDR | C1 6-7 K MODES | C2 0-3 ADDRESS SOURCE OR K | C2 4-7 K | C3 0-3 NEXT ADDRESS | C3 4 LINK | C3 5-7 BRANCH LOW |
|---|---|---|---|---|---|---|---|---|---|---|
| | READ WORD | 0 | SEE LS/EXT | 0 0 | MS 0000KK | SEE LS/EXT | | | | 0 |
| 0 1 | STORE WORD | 1 | ADDR FORMS | | CS CURRENT MOD KK | ADDR FORMS | | | BAL | 1 |
| | READ HALF WD | S1 | | | CS FFKK | | | | | Z0 |
| | STORE HALF WD | S0 | | | CS FK 8 BIT ADDR | | | | | |
| | READ BYTE | S2 | | | | | | | | S3 |
| | STORE BYTE | S4 | | | | | | | | S5 |
| | RTN REP N.A. | S6 | | | | | | | | S7 |
| | SWAP WORD | M6 | | | | | | | | M7 |

FIG. 20

| STORE WORD | SUBFORM | BRANCH HIGH | DATA REGISTER | K OR INC/DEC | STAT SET | ADDRESS SOURCE | MODES | SPECIAL STAT SET | NEXT ADDRESS | | BRANCH LOW |
|---|---|---|---|---|---|---|---|---|---|---|---|
| | READ WORD | 0 | SEE LS/EXT | NO ADDR UPDATE | | SEE LS/EXT | CS 16 BIT ADDR MS | — | | — | 0 |
| 0 1 | STORE WORD | 1 | ADDR FORMS | | S.2 | ADDR FORMS | | TA | | DEC CNT | 1 |
| | READ HALF WD | S1 | | + | S45 | | | TB | | | Z0 |
| | STORE HALF WD | S0 | | - | Z6 | | CPU PRO | FEAT LS | | | SDC (0) |
| | READ BYTE | S2 | | | | | | — | ALTERNATE FOR | | S3 |
| | STORE BYTE | S4 | | | | | | TH | STORE, THE | | S5 |
| | | S6 | | | | | | UPD ONLY | ABOVE ARE USED | | S7 |
| | SWAP WORD | M6 | | | | | | FEAT LS | WITH READ | | M7 |

| C0 | | | | | C1 | | | C2 | | | C3 | |
|---|---|---|---|---|---|---|---|---|---|---|---|---|
| 0 1 | 2 3 | 4 | 5 6 7 | 0 1 2 3 | 4 5 | 6 7 | 0 1 2 3 | 4 5 | 6 7 | 0 1 2 3 4 5 | 6 7 |
| ARITH OP FORM | FORM | OP | A GATING | A SOURCE WORD | A SOURCE BYTE | STAT SET | B SOURCE WORD | B SOURCE BYTE | B HI-LO | NEXT ADDRESS | BRANCH |
| | A=A/K | ∀ | 0 | SEE LS/EXT | 0 | | SEE LS/EXT | 0 | 0 | | |
| | L=A/B | TRUE ADD | L | ADDR FORMS | 1 | S1.2 | ADDR FORMS | 1 | L | | S2 S3 |
| | A=A/B | | H | | 2 | S45 | | 2 | H | | S4 S5 |
| 1 1 | B=A/B | | ST | | 3 | Z6 | | 3 | ST | | S6 S7 |
| | | | XO<br>XL<br>XH<br>X | | | | | | | | |

FIG. 21

| ARITH OP FORM | FORM | OPERATION | A SOURCE WORD | A SOURCE BYTE | STAT SET | B SOURCE WORD | B SOURCE BYTE | A HI-LO | NEXT ADDRESS | BRANCH |
|---|---|---|---|---|---|---|---|---|---|---|
| | A=A/K | | SEE LS/EXT | 0 | | SEE LS/EXT | 0 | 0 | | |
| | Z=A/B | | ADDR FORMS | 1 | S12 | ADDR FORMS | 1 | L | | S2 S3 |
| 1 0 | A=A/B | | | 2 | S45 | | 2 | H | | S4 S5 |
| | B=A/B | OE | | 3 | Z6 | | 3 | ST | | S6 S7 |

FIG. 22

| COUNT GCL 1 | COUNT GCL 2 | COUNT GCL 3 | ADDRESS GDL 0 | ADDRESS GDL 1 | OUTPUT & INPUT FWD FLAG LATCH 0 | 1 | 2 | 3 | INPUT BKWD FLAG LATCH 0 | 1 | 2 | 3 |
|---|---|---|---|---|---|---|---|---|---|---|---|---|
| 0 | 0 | 1 | 0 | 0 | 1 | 0 | 0 | 0 | 1 | 0 | 0 | 0 |
| 0 | 0 | 1 | 0 | 1 | 0 | 1 | 0 | 0 | 0 | 1 | 0 | 0 |
| 0 | 0 | 1 | 1 | 0 | 0 | 0 | 1 | 0 | 0 | 0 | 1 | 0 |
| 0 | 0 | 1 | 1 | 1 | 0 | 0 | 0 | 1 | 0 | 0 | 0 | 1 |
| 0 | 1 | 0 | 0 | 0 | 1 | 1 | 0 | 0 | 1 | 0 | 0 | 0 |
| 0 | 1 | 0 | 0 | 1 | 0 | 1 | 1 | 0 | 1 | 1 | 0 | 0 |
| 0 | 1 | 0 | 1 | 0 | 0 | 0 | 1 | 1 | 0 | 1 | 1 | 0 |
| 0 | 1 | 0 | 1 | 1 | 0 | 0 | 0 | 1 | 0 | 0 | 1 | 1 |
| 0 | 1 | 1 | 0 | 0 | 1 | 1 | 1 | 0 | 1 | 0 | 0 | 0 |
| 0 | 1 | 1 | 0 | 1 | 0 | 1 | 1 | 1 | 1 | 1 | 0 | 0 |
| 0 | 1 | 1 | 1 | 0 | 0 | 0 | 1 | 1 | 1 | 1 | 1 | 0 |
| 0 | 1 | 1 | 1 | 1 | 0 | 0 | 0 | 1 | 0 | 1 | 1 | 1 |
| 1 | X | X | 0 | 0 | 1 | 1 | 1 | 1 | 1 | 0 | 0 | 0 |
| 1 | X | X | 0 | 1 | 0 | 1 | 1 | 1 | 1 | 1 | 0 | 0 |
| 1 | X | X | 1 | 0 | 0 | 0 | 1 | 1 | 1 | 1 | 1 | 0 |
| 1 | X | X | 1 | 1 | 0 | 0 | 0 | 1 | 1 | 1 | 1 | 1 |
FIG. 42
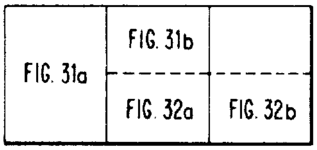
FIG. 33
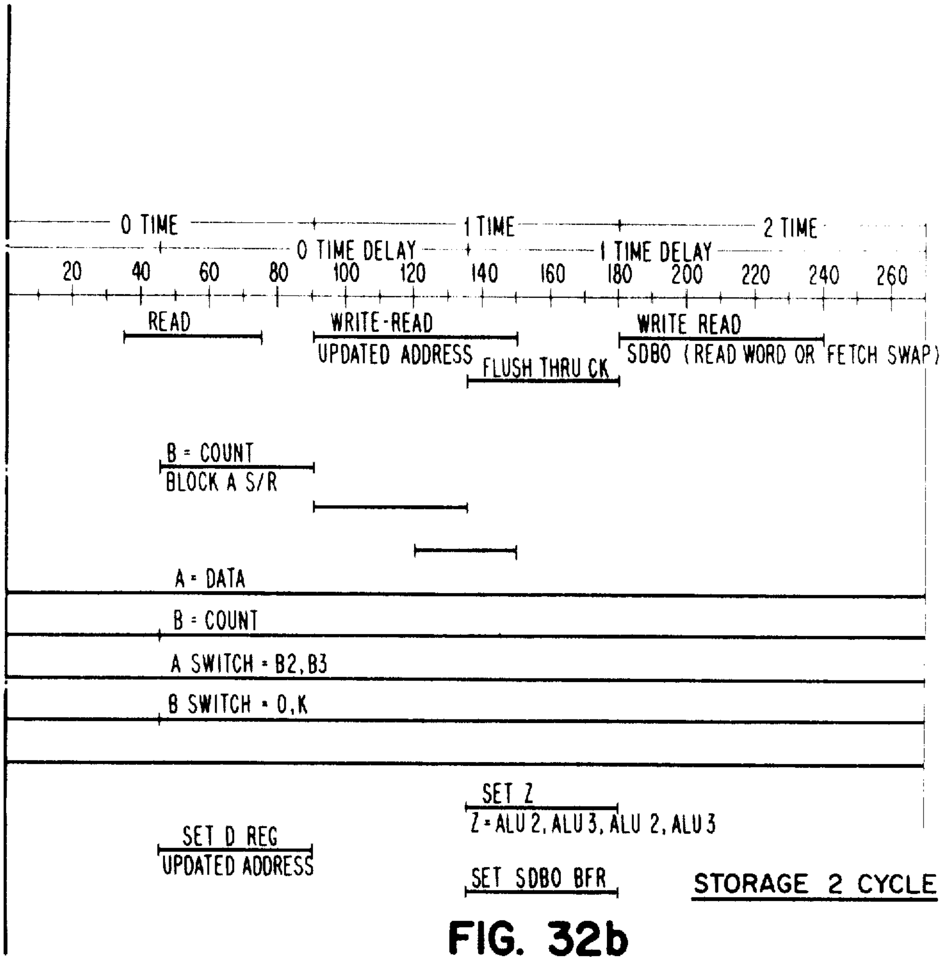
FIG. 32b

CHANNEL SHARE CYCLE

CHANNEL SHARE CYCLE - DATA INPUT FORWARD

DISK TO MAIN STORE DATA TRANSFER

| SHIFT PULSE | GR | 6 | 5 | 4 | 3 | 2 | 1 | 0 |
|---|---|---|---|---|---|---|---|---|
| 1 | A | | | | | | | FULL BIT ON |
| 2 | | | A | | | | | X |
| 3 | | | | | A | | | X |
| 4 | | | | | | | A | X |
| 5 | B | | | | | | A | X |
| 6 | | | B | | | | A | X |
| 7 | | | | | B | | A | X |
| 8 | | | | | | B | A | X |
| 9 | C | | | | | B | A | X |
| 10 | | | C | | | B | A | X |
| 11 | | | | | C | B | A | X |

MAIN STORE TO DISK DATA TRANSFER

| SHIFT PULSE | GR | 6 | 5 | 4 | 3 | 2 | 1 | 0 |
|---|---|---|---|---|---|---|---|---|
| 1 | D | C | B | A | – | – | – | – |
| 2 | D | C | B | – | – | A | – | – |
| 3 | D | C | – | – | B | – | – | A |
| 4 | D | – | – | C | – | – | B | A |
| 5 | – | – | D | – | – | C | B | – |
| 6 | – | – | – | – | D | C | – | B |
| 7 | H | G | F | E | D | – | C | B |
| 8 | H | G | F | E | – | D | C | B |
| 9 | H | G | F | – | E | D | C | – |
| 10 | H | G | – | F | E | D | – | C |

CHANNEL BUFFER FOR DATA PROCESSING SYSTEM

CROSS-REFERENCES TO RELATED APPLICATIONS

The present application illustrates subject matter which is claimed specifically in several copending applications filed Apr. 16, 1970 herewith as follows:

| Application Ser. No. | Inventor | Title |
|---|---|---|
| 29,226 | R.G. Dunbar, Jr. et al. | Address Modification by Main/Control Store Boundary Register in a Microprogrammed Processor |
| 29,225 | F. A. Zurla | Decimal Addition Employing Two Sequential Passes Through a Binary Adder in One Basic Machine Cycle |
| 29,223 | R.J. Carnevale et al. | Microprogrammed Processor with Variable Basic Machine Cycle Lengths |
| 29,227 | T. A. Metz et al. | Processor with Improved Controls for Selecting an Operand from a Local Storage Unit, an ALU Output Register or Both |
| 29,224 | J. B. Chambers | Improved Channel Buffer for Data Processing System |

The claims of Ser. No. 29,226 are directed specifically to the use of a register to define the boundary between a main and control storage and to effect addressing of the control storage.

The claims of Ser. No. 29,225 are directed specifically to a mechanism for executing decimal adds.

The claims of Ser. No. 29,223 are directed to a high-speed microprogrammed processor with a high-speed main storage unit faster than the microprogram hardware and with variable length microprogram cycle times.

The claims of Ser. No. 29,227 are directed specifically to a mechanism for effecting the transfer of data from the Z register and a local store to the ALU when the data source is a local store into which the results of a previous machine cycle have not been returned.

The claims of Ser. No. 29,224 are directed specifically to a channel buffer mechanism for transferring data between the processor and high-speed peripheral equipment such as a disk file.

SUMMARY OF THE INVENTION SER. NO. 29,226

In the preferred embodiment, the address check boundary (ACB) register is a 13-bit register (not counting parity bits) which specifies the upper boundary of main storage. It also provides information necessary to determine the four high-order address bits for control storage. This register eliminates versioning of hardware for all the various sizes of main storage and control storage for different customers and also allows a system with a fixed amount of storage to have varying amounts of control storage and main storage as may be desired. Also this register permits the determination of internal or external storage addresses, internal storage being the maximum amount of storage which can be located within the cabinet housing the central processor.

Each time that a control store or a main store access is initiated, the supplied address is compared with certain of the ACB register bits (the boundary address) to determine whether or not the supplied address is equal to or greater than the boundary address for a control store access or less than the boundary address for a main store access. An error signal is produced if the test is not met. In the preferred embodiment, nine boundary address bits specify the boundary in 2K increments up to a maximum storage of 1,048,576 bytes.

Three low-order bits of the ACB register are initialized to indicate whether the system has one or two processors sharing main store, the amount of main store external to the processor housing (if any), and to modify the ACB register supplied control word bits and/or the microprogram supplied control word bits before addressing control store.

FIELD OF THE INVENTION, PRIOR ART AND SUMMARY SER. NO. 29,225

A byte (eight bits plus parity) of binary data contains two decimal digits. Bits 0, 1, 2, 3 and 4, 5, 6, 7 each form a decimal digit. However, a binary adder in the ALU adds these in a hexadecimal form (0 through 9, A through F), and the hex digits A through F are invalid for decimal operations. Normally, decimal additions are executed by putting a plus 6 control (add 6 to each digit on one input) on the input to the adder and then correcting the answer (subtract 6) when required at the output. This has two disadvantages:

1. It adds an extra stage of delay to the adder input thereby causing normal binary addition to be one stage slower.
2. When six is added to the input data, the half-sum and parity predict checks for the ALU can no longer be used, and some other checking method is required.

In accordance with the present invention, decimal operations are executed during one machine cycle by employing two sequential passes through the binary adder of an improved variable cycle time processor. The second pass is used to correct the decimal number. To accomplish this, the decimal cycle time is extended slightly to permit two passes of the data through the binary adder and to allow full checking of the decimal operation. The savings in performance for normal binary additions more than compensate for the loss in performance for decimal additions.

The method used is to add (true add) or subtract (complement add) the decimal numbers in a binary fashion on the first pass through the adder. This answer is then sent back through the adder and a second binary addition corrects the answer if necessary. Correcting the answer during the second pass causes the answer to come out of the adder in a decimal format (a number from 0 to 9).

Since there are two decimal numbers being executed at one time (bits 0–3 and 4–7), the correction is done as follows in the preferred embodiment:

Bits 4 through 7 (low-order decimal number):

True add—If ALU bits 4–7 are greater than 9 or if there was a carry out of bits 4–7, add 6 to low decimal number.

Complement Add—If no carry out of bits 4–7, subtract 6 from low decimal number.

Bits 0 through 3 (high order decimal number):

True Add—If ALU 3 bits 0–3 are greater than 9 or if carry out of bits 0–3 or if bits 4–7 are greater than 9 and bits 0–3 equal 9, add 6 to high decimal number.

Complement Add—If no carry out of bits 0–3, subtract 6 from high decimal number.

The advantages for this method of decimal addition are as follows:

1. The ALU half-sum and parity predict checks can be used to check the ALU operation.
2. By duplicating the relatively few circuits used for the decimal correct controls, the decimal operation can now be completely checked by using the checking circuits employed for normal logical operations.
3. Normal binary operations can run one stage faster.
4. If greater decimal speed were needed, a look-ahead could be performed, so that the second pass would only be made when a correction was necessary.

This would save time on operations where no correction was needed by using a shorter cycle time.

FIELD OF THE INVENTION, PRIOR ART AND SUMMARY SER. NO. 29,223

This application is directed to a microprogrammed processor with an optimum cost/performance characteristic. This processor is an improvement over that described in U.S. Pat. No. 3,400,371, and is adapted to be operated in accordance with program instructions of the type set forth in said patent. By having three basic machine cycles available, for example, 180 nsec. (nanoseconds), 225 nsec., and 270 nsec.; and by examining certain bits in each control word to determine the minimum cycle time that can be used to execute the control word, it is possible to substantially reduce the overall time required to execute a series of microinstructions. Specific examples of the improved performance will be explained in detail below with respect to control words which perform branch operations, arithmetic and logic operations, and storage operations.

In hardware oriented data processors, it has been known to control the operation of the hardware such that the time required to execute a program instruction is maintained at a minimum for each and every instruction. However, in microprogrammed machines it has been common to provide alternatively one basic cycle time for the execution of all control words or a multiple of said basic cycle to execute those control words which cannot be executed in the time permitted for one cycle.

To the best of applicants' knowledge, no microprogrammed processor has been provided with (1) a control word storage and/or a main storage device which has an access time which is substantially less than the time required by the hardware to execute a control word, and (2) means to analyze certain bits in each control word during the execution of that control word for determining during said execution the length of time which will be allotted to the execution.

Accordingly, it is a primary object of the present invention to provide in a microprogrammed processor a control storage unit which is faster than the control word execution hardware together with means for analyzing certain of the control word bits to control the basic processor clock to produce a selected one of several available clock cycle lengths.

In order to achieve the above object, the preferred embodiment of the present invention employs a versatile data flow which operates at machine cycles of 180, 225 and 270 nanoseconds, depending upon the type of microprogram control word being executed. By designing the data flow to operate at these cycle speeds, it is possible to utilize the hardware most efficiently and thereby obtain the best possible performance by executing each microcontrol word as fast as possible.

Each time that a control work is transferred from the control storage to the control register, a control register decode mechanism examines certain bits of the control word to determine which operations are to be performed. As a result of this decode, a clock cycle length control circuit applies selective signals to the processor clock mechanism to cause it to operate at one of the three available cycles (or at two of the three cycles). During the time that the decode mechanism and cycle length control circuits are determining the cycle time, the clock mechanism will have already started the cycle and, in fact, the execution of the microprogram control word will have been initiated.

In the preferred embodiment, each time an access is made to control storage, two words are read from the control storage and applied to a data path which terminates in the control register. Since only one of the two microprogram control words read from the control storage is to be utilized, this data path may be utilized for late branching; that is, the particular control word to be read into the control register need not be determined until both words are immediately available to the input of the control register, which is a significant amount of time subsequent to accessing and reading of the double word from the control storage unit. Thus, the decision to select one of two words for execution can, in many instances, be delayed until later in the cycle whereby the processing time can be shortened by using a slightly longer cycle (225 nsec.) instead of two shorter cycles (180 nsec.). Branches determined by fixed control word bits or status register bits can be executed in the shorter cycle (180 nsec.).

Another example of improving cost/performance lies in the operation of the ALU (arithmetic and logic unit). A half word ALU is provided which permits execution of a half word binary arithmetic or logical operation in the shortest cycle time (180 nsec.). A minor amount of hardware associated with the ALU causes the second half word to be processed by the ALU during full word operations by extending the cycle time from 180 nanoseconds required for the half word arithmetic operation to 225 nanoseconds for a full word operation. This permits a very slight degradation in performance with a very significant reduction in the hardware cost of the ALU.

Similarly, this ability to use the ALU twice during one machine cycle is used to execute decimal adds in a 225 nsec. cycle. Two decimal bytes are added in the ALU and the results of the addition are entered into the ALU to provide decimal correction in the event it is required. By providing decimal correction during a second pass through the ALU and eliminating the correction circuits from the ALU input, a stage of delay is eliminated shortening the execution time for all operations other than decimal add.

A third example which will be described in greater detail below, wherein improved performance is achieved by the use of variable cycle times, is related to the storage words which provide for the transfer of data to and from the main storage unit for processing of the data. In the preferred embodiment, the data is transferred during one control word execution from the main storage unit to a local storage unit for processing during a subsequent control word execution. After processing of the data, it is returned to the local storage unit prior to transfer to the main storage unit. The storage cycles which are utilized for transferring data between the local store and the main store require time periods which are longer than any of the available basic machine cycle times. As a result, a 225 nsec. cycle and a 270 nsec. cycle, or two 270 nsec. cycles, are joined together to execute the storage words.

Certain advantages resulting from the use of multiple basic cycle lengths will become apparent upon a perusal of the detailed description. Some of these advantages are listed below. Approaching the advantages first from a negative point of view:

a. If the basic machine cycle time of the preferred embodiment were 180 nsec., all full-word, decimal and late branch words would require 360 nsec. as opposed to 225 nsec. The storage read word would require three 180 cycles (540 nsec.).
b. If the basic machine cycle time were 225 nsec., all fast branches would require 225 nsec. as opposed to 180 nsec. The storage words would require 775 nsec. as opposed to 495 or 540 nsec.
c. If the basic machine cycle time were 270 nsec., only the storage word would operate efficiently. All other words would lose 45 to 90 nsec. of performance.

Only by having the capability of operating at any of the three cycle speeds can optimum efficiency be realized.

Positively, the advantages gained by implementing a multiple cycle system are:

1. Maximum efficiency in time utilization gained with minimum cost above a single cycle length machine.
2. Ability to execute full-word arithmetic efficiently without adding costly hardware.
3. Ability to save a stage of delay in the basic ALU path by performing decimal correction during the second ALU pass.
4. Making the "late branch" a feasible and advantageous scheme.
5. Ability to execute all necessary operations of the storage word with common timings used in other control word types thus minimizing the necessity to create special timings.
6. Ability to meet improved performance objectives without a significant increase in cost.

FIELD AND SUMMARY OF THE INVENTION SER. NO. 29,227

In the preferred embodiment, the processor utilizes a versatile data flow to achieve control cycle times of 180, 225 or 270 nsec. depending on the type of microcontrol word being executed. In order to achieve these cycle times, it is necessary to execute the function of certain control words in one cycle, and destine the result of the operation in the following cycle. A typical example is the arithmetic word operation.

It is often advantageous to use the result of the operation of one cycle as a source of information for the next cycle. However, accessing of the sources in any given cycle occurs prior in time to destining of the result of the previous cycle. Thus, it would be necessary to wait for one cycle before accessing the data of interest. The result is an inefficient control program which leads to performance degradation.

This improvement relates to a mechanism which allows the local store destination address of one cycle to be specified as the source address in the next cycle.

Normally operands are read simultaneously from a pair of local store units. The local store outputs are then set into A and B registers which are coupled to the ALU inputs. This data is available at approximately 70 nsec. into the cycle.

At the beginning of each cycle, the ALU output register (Z register) contains the result from the previous cycle that is to be destined in the current cycle. Controls are provided to block the normal local store entries, and gate the Z register into the A or B registers. A portion of these controls compare the destination address from the preceding cycle to the source addresses of the current cycle and control gating accordingly.

Operand or source addresses are generated by the local store decode circuits from a predefined address structure called out in the control word being executed. The addresses along with the appropriate control lines initiate a "read" cycle, and a 36-bit word is read from each local store and placed at the inputs of the A and B registers respectively. The time lapse from the beginning of cycle is approximately 70 nanoseconds.

In order to determine whether the Z register should be gated into the A or B registers instead of one of the local store outputs, it is necessary to compare the destination address for the previous cycle with source addresses generated in this cycle. The destination address of the previous control word is held in two destination address registers. If the destination address and one of the source addresses do compare, it will be necessary to block the local store entries into the A or B register, for those bytes which were to be destined and replace them with the corresponding bytes from the Z register. These controls must be available by the time that data is normally available from local store, 70 nsec. after the cycle begins.

SUMMARY OF THE INVENTION SER. NO. 29,224

A novel shift register and controls provide a highly efficient channel buffer. Each stage has means for indicating the full or empty condition of that stage. Each of the stages comprises a latching device of the polarity hold type. That is, the latch is of the type which includes a data input line and a set/reset means which, when it is in the set condition, causes data to be passed through the stage as if the stage were an amplifier or logic circuit and which, when in the reset condition, causes the latch to be set at the binary value which exists at the data input line at the instant that the reset or hold condition arises. Thus, if a plurality of latches are connected as a shift register and data is stored in the first stage (and therefore appears at its output), this data will flow through all succeeding latch stages if all of them are in the set state. To transfer data from the first stage to any selected one of the succeeding stages, it is merely necessary to apply to the selected stage a reset pulse since the data already exists at its input and in fact has caused it to assume a logical state corresponding to the input state of the data. However, it is not possible to transfer data from one stage to a succeeding stage if a next succeeding stage is full, that is, it has data stored therein. Data cannot be transferred into a stage from a preceding stage until the advance cycle subsequent to its becoming empty.

With this improved shift register used as a data buffer and with the application of suitable controls, maximum input/output data rates can be achieved between high speed I/O devices (e.g., disk files) and the main storage of the processor. Data being received from an I/O device for transfer to main memory can be accepted in the first stage of the buffer prior to the processor having determined the address into which that data is to be stored. This is particularly useful in improving the efficiency in data chaining operations. During data chaining operations, the improved buffer can be partitioned, i.e., divided in half, so that the last part of the data being transferred to memory can be held in the final stages of the buffer while the first part of data which is to be sent to a completely different address, the value of which is unknown, can be received into the earlier stages of the buffer and held there until the processor is ready to transfer the new data from the buffer to the main memory.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIGS. *2a–2i* inclusive are a more detailed diagrammatic illustration of the improved processor and its basic data flow

Figure 8:
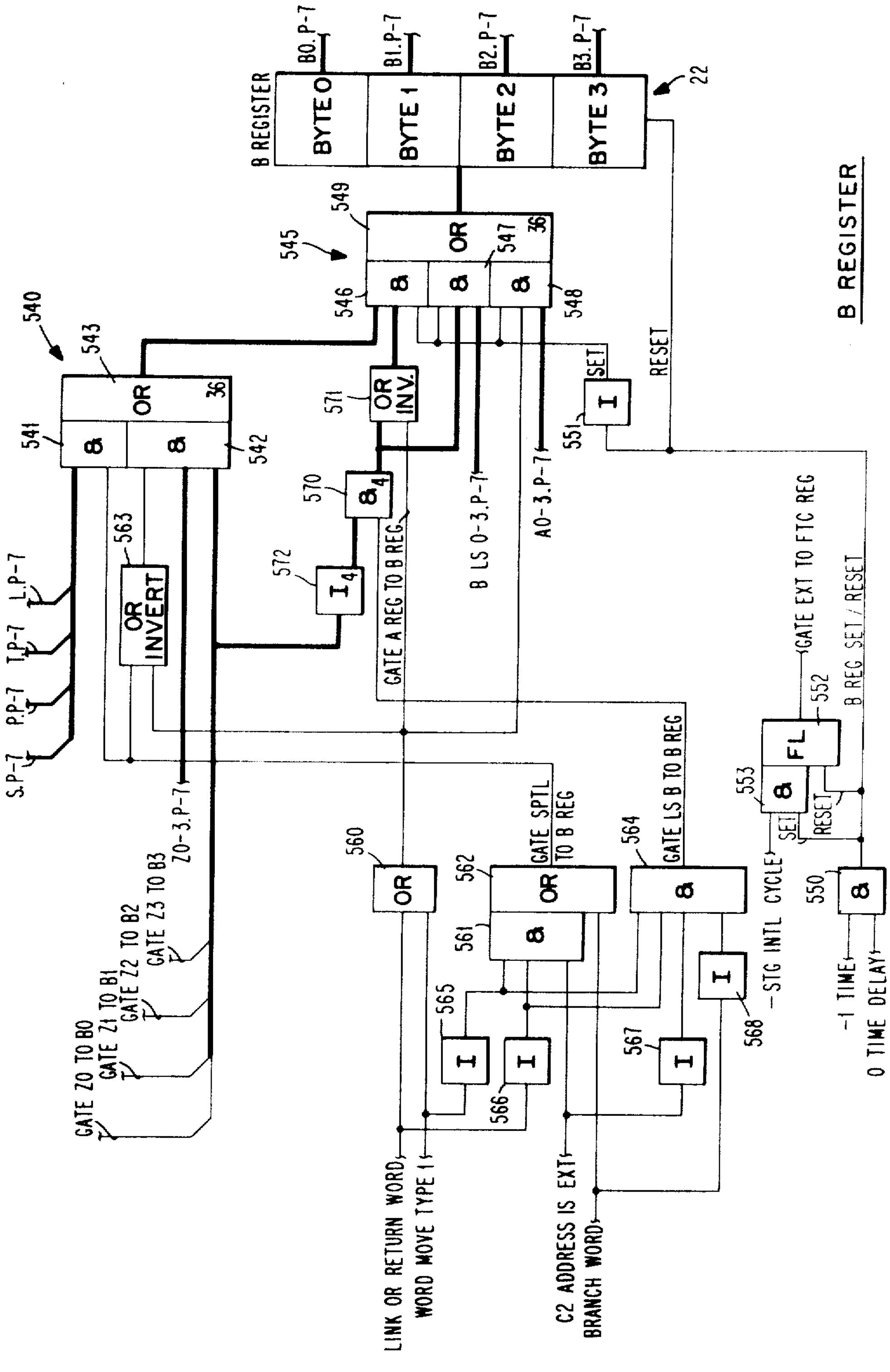
Figures 10, 10B:
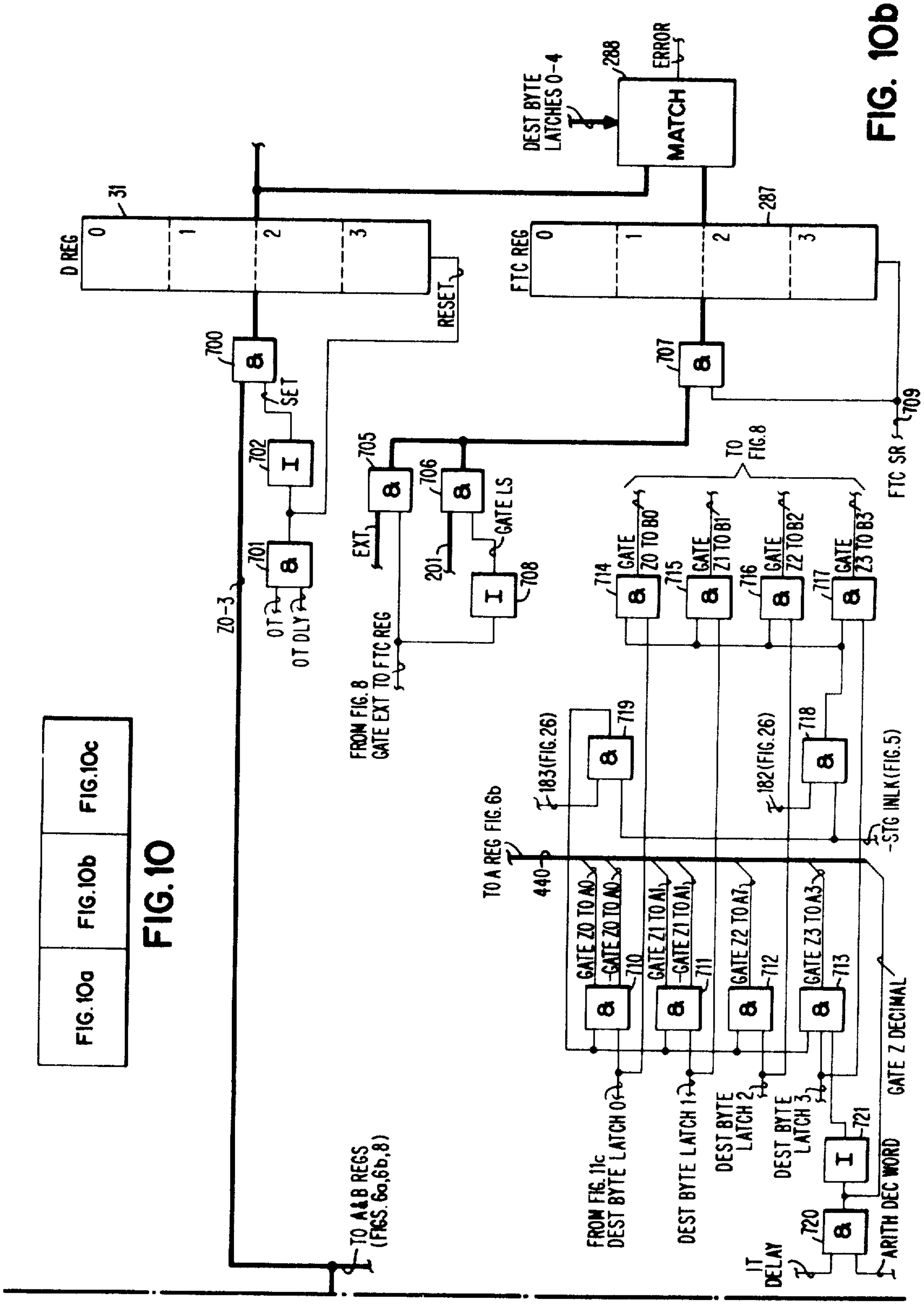
Figure 37:
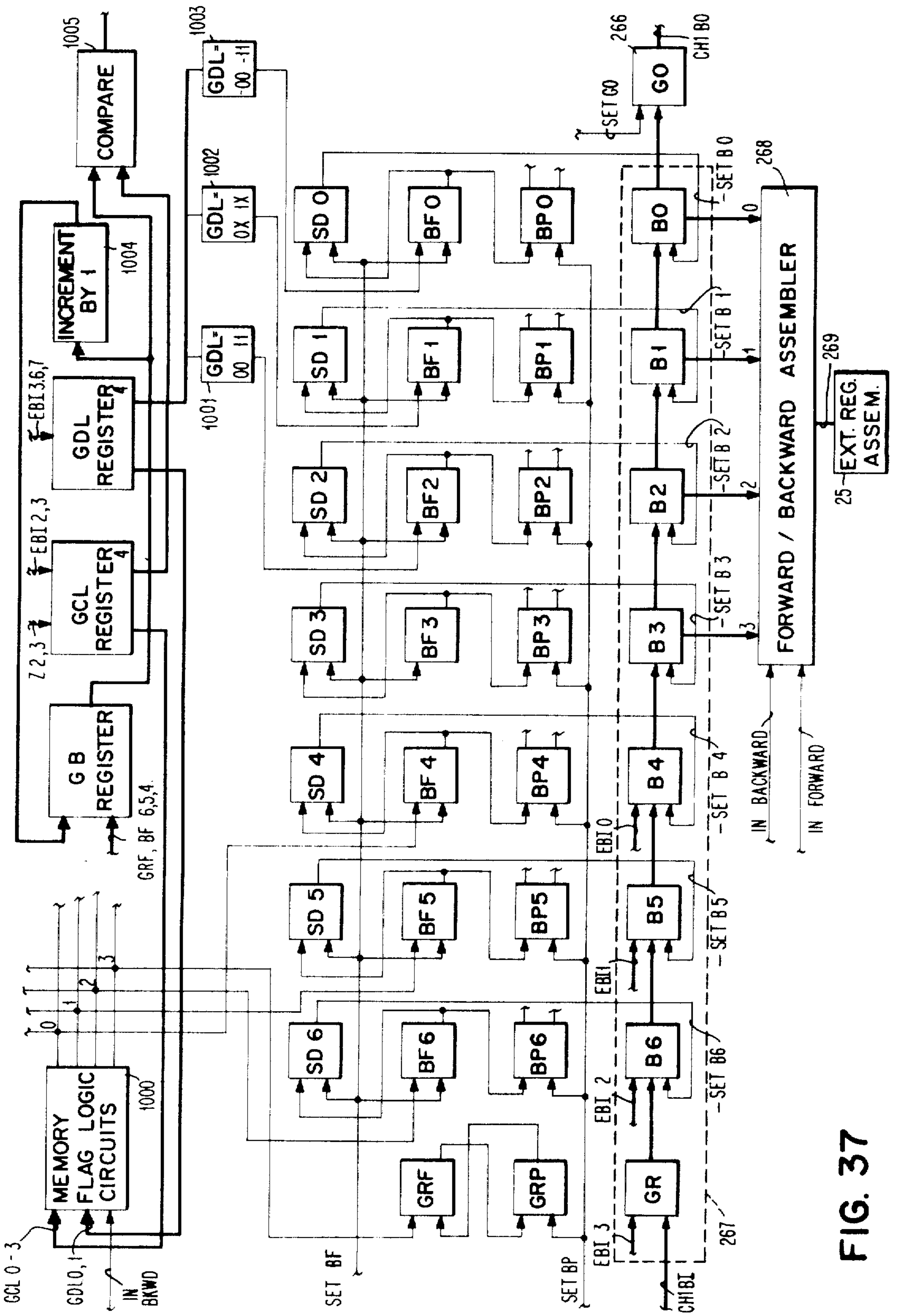
Figures 38, 38J:
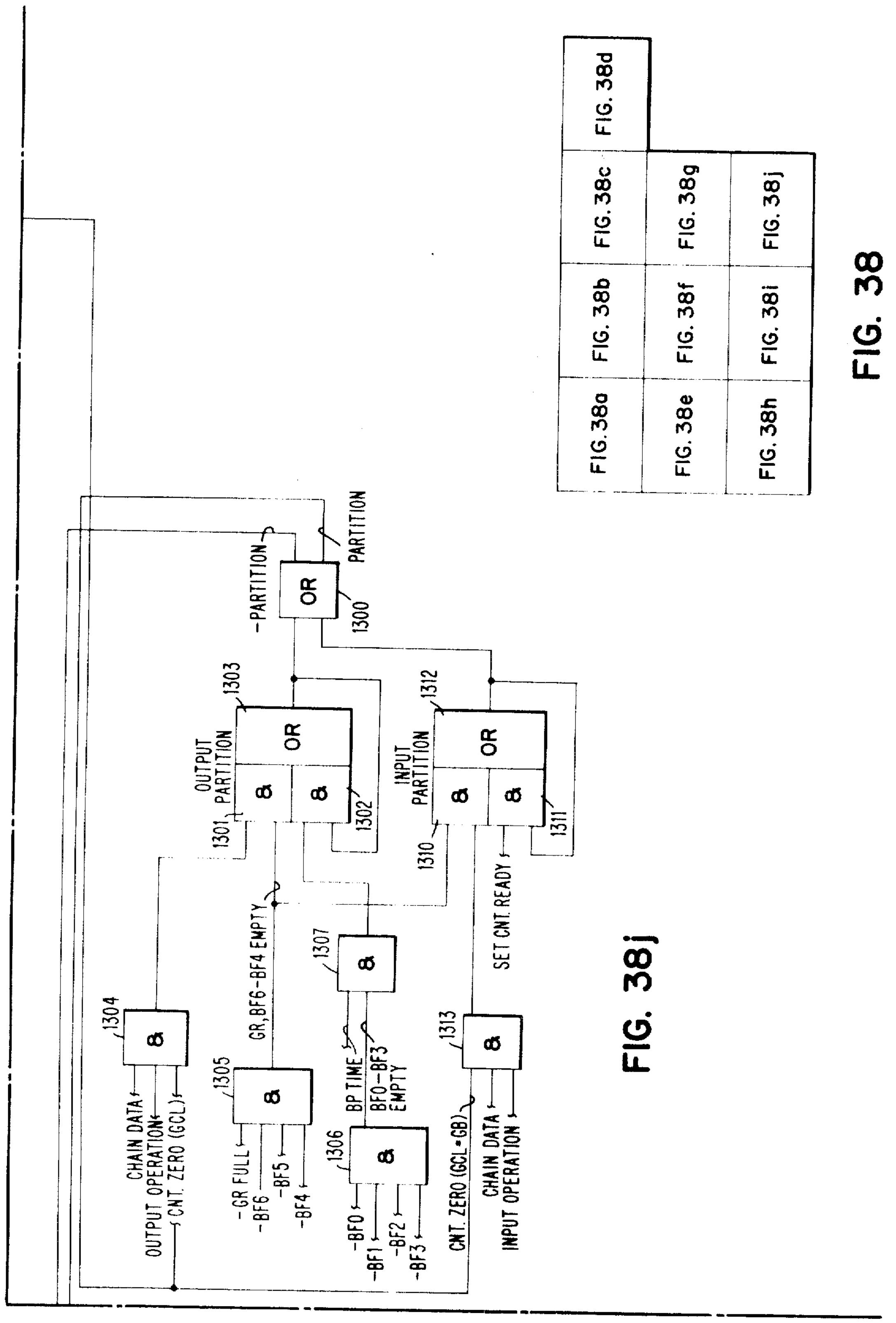
Figure 38A:
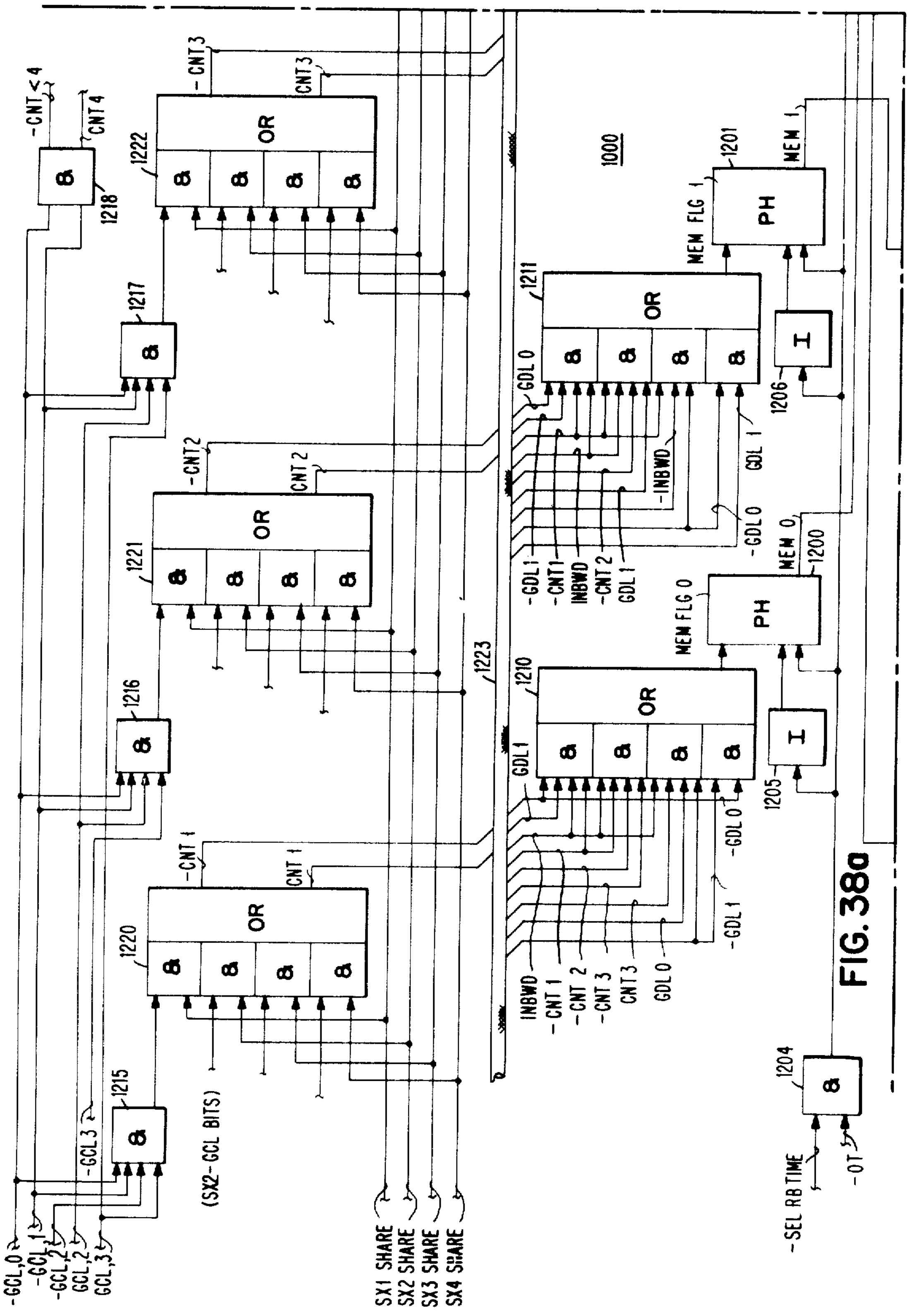
Figure 38B:
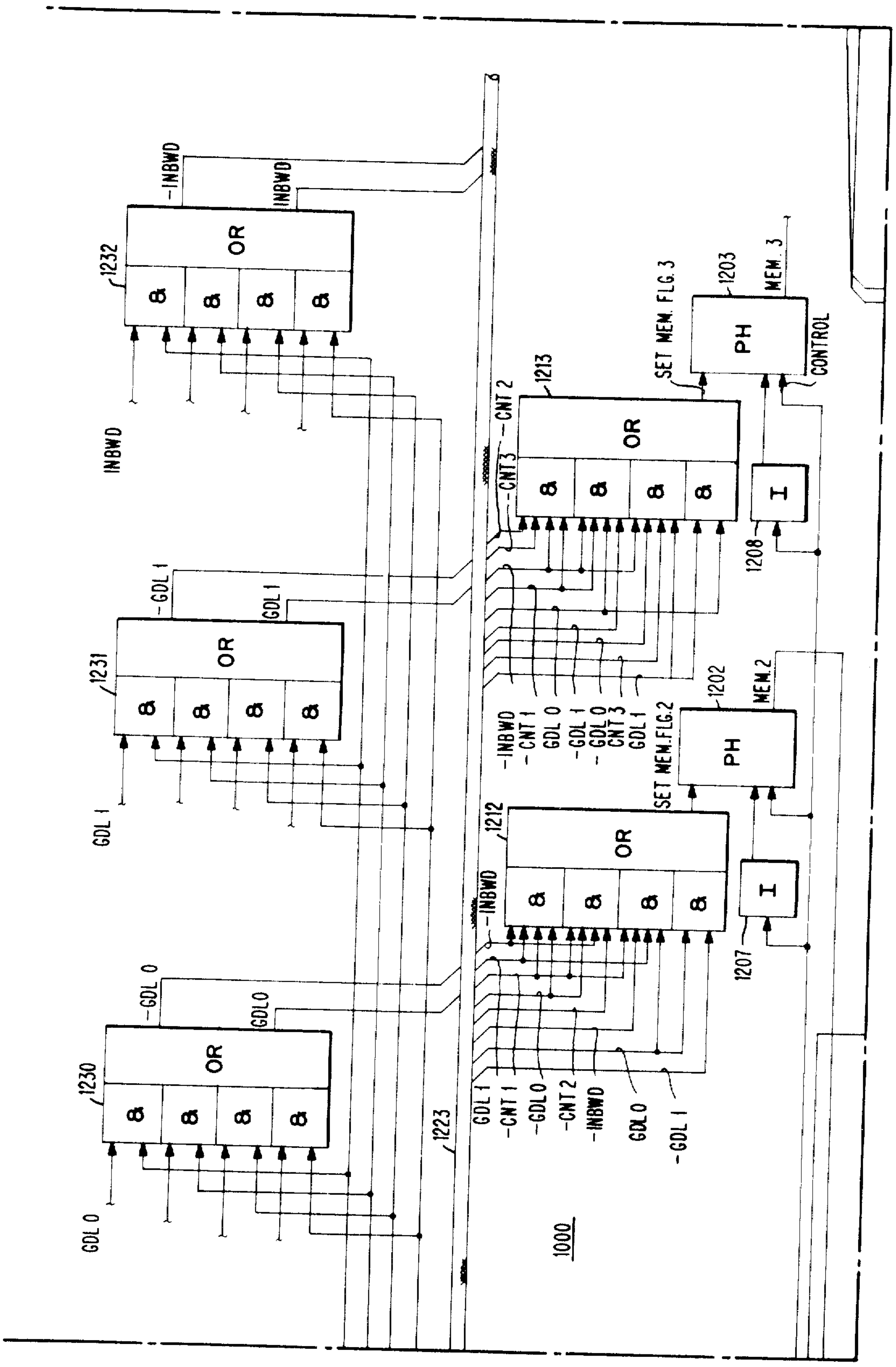
Figures 39, 40, 41:
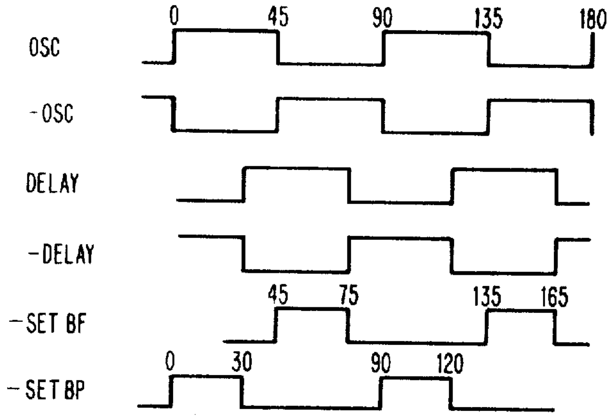

FIGS. *6a* and *6b* illustrate the control circuit which gates data from various sources into bytes 0–3 inclusive of the A register;

FIGS. *7a* and *7b* illustrate the A byte assembler and its controls;

FIG. 8 is a schematic diagram of the control circuit for gating data from various sources into bytes 0–3 of the B register;

FIGS. *9a* and *9b* are a schematic diagram illustrating the B byte assembler and its controls;

FIGS. *10a*, *10b* and *10c* are schematic diagrams illustrating the Z register and controls, the D register and controls, the flush through check register and controls and the decimal add/subtract controls; FIG. 10 shows the layout for FIGS. *10a*, *10b* and *10c*;

FIGS. *11a*, *11b* and *11c* are a fragmentary schematic diagram illustrating a local storage unit and its addressing circuits;

FIG. 12 is a table explaining the various modes of addressing the local storage units and the external registers;

FIGS. *13a* and *13b* are schematic diagrams of the address check boundary register and its controls;

FIGS. 14–22 are fragmentary illustrations of the formats of the bit structures of various control word types;

FIGS. 23–35 inclusive illustrate diagrammatically the execution of various control word examples and set forth corresponding timing diagrams for the operations;

FIG. 36 is a fragmentary illustration of certain local storage unit registers, their addresses and names and P register settings for accessing the local store registers;

FIG. 37 is a block diagram of the improved channel buffer and its controls;

FIGS. *38a–38j* are a schematic diagram of the improved channel buffer and its controls, and FIG. 38 shows the manner in which FIGS. *38a–38j* are interconnected;

FIG. 39 is a timing diagram for certain of the buffer signals; and

FIGS. 40 and 41 are timing charts illustrating data moved through the buffer during input and output operations;

FIG. 42 is a table illustrating flag latch settings for various values of the GCL and GDL registers.

DESCRIPTION OF THE PREFERRED EMBODIMENT

The preferred system illustrated in the drawings is an improvement over that shown in U.S. Pat. No. 3,400,371, issued Sept. 3, 1968, to G. M. Amdahl et al., and includes microprogram routines to control hardware for executing macroinstructions generally of the type described in the Amdahl patent.

Before describing the preferred embodiment, a definition of certain terms to be used hereinafter will be made. Data is arranged primarily on a word basis, each word comprising four bytes. Each byte is comprised of eight binary data bits and a parity check bit. In some instances data is accessed and transferred in double-word widths, referred to sometimes as odd and even words of a double word. In the main and control storage unit, data and control words are arranged in groups of 64 words referred to as modules.

Figure 1:
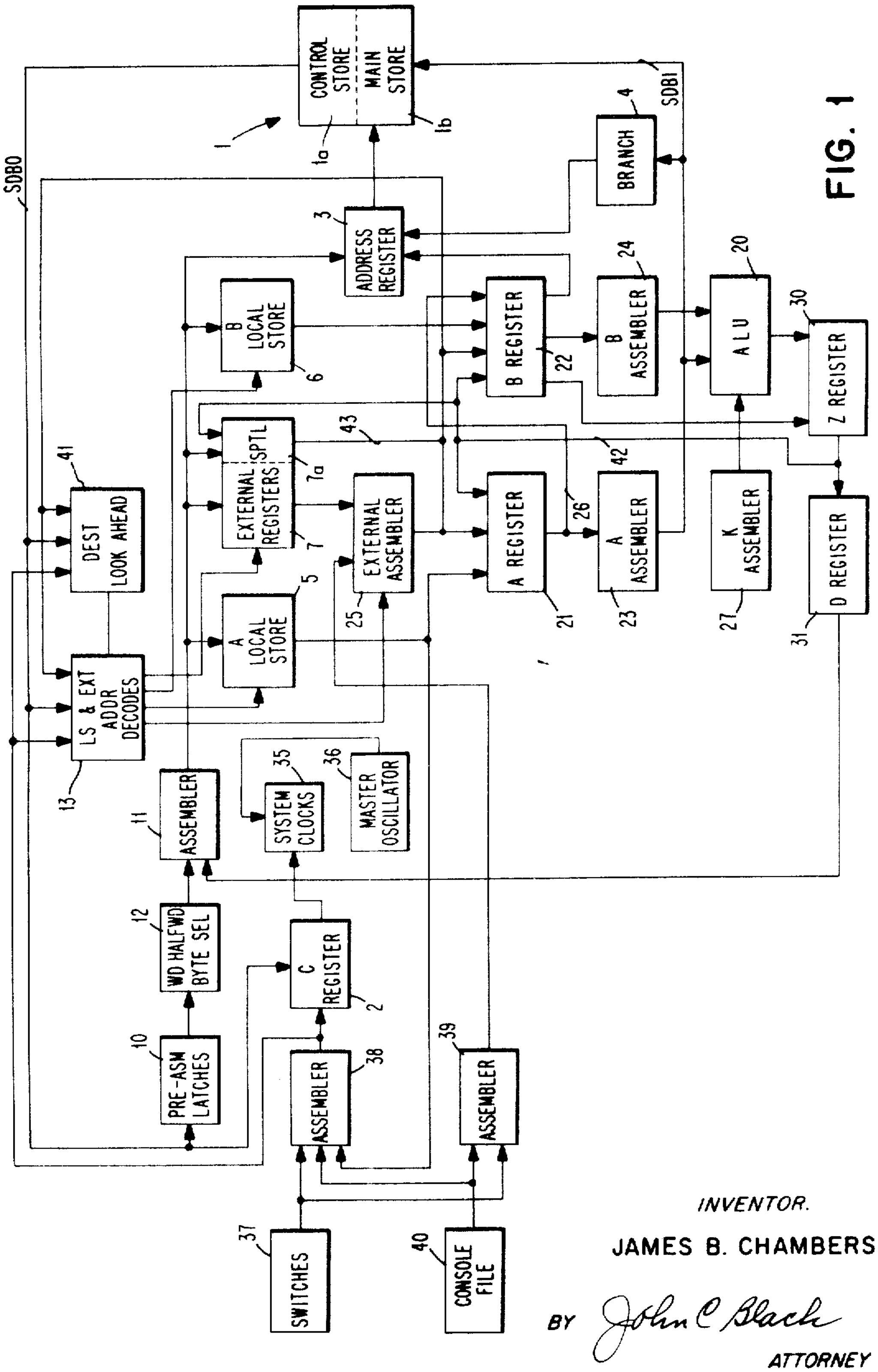
FIG. 1 is a diagrammatic illustration of the improved high speed processor and its basic data flow.

FIG. 1 is a diagrammatic illustration of a preferred system within which the improvement of the present application may be used. The system comprises a high-speed storage unit 1 which includes a control store **1*a* and a main store 1*b*. Microprogram control words are stored in the control store 1*a*, while data and program instructions are stored in the main store 1*b***.

Microprogram control words are transferred in sequential order from the unit 1 to a C (control) register 2 by way of a "-Storage Data Bus Out" SDBO (two words wide). Access to the control words, data and program instructions in the unit 1 is achieved by means of an address register 3. Branch circuits 4 are effective, when desired, to change the normal sequence in which the microprogram control words are executed.

In order to operate upon data stored within the main storage portion of the unit 1, it is necessary to transfer that data to A and B local storage units 5 and 6 or to external registers 7. The transfer of data from the unit 1 to the local storage units or the external registers is effected by way of the SDBO bus, SDBO preassembler latches 10, and assembler 11, and word, half word and byte selection circuits 12. The particular position in the local storage units or the external registers into which data is to be transferred is determined by local store and external register address decode circuits 13 which decode selected bits in each control word on the SDBO bus and certain bits in the P and L bytes of a special external register (SPTL) **7*a***.

Data is processed in an ALU (arithmetic and logic unit) 20 which receives data from the local storage units 5 and 6 by way of A and B registers 21 and 22, and A and B assemblers 23 and 24. Data to be processed by the ALU 20 and residing in the external registers 7 is transferred to the ALU 20 by way of an external assembler 25, the A register 21, and either the A assembler 23 or the B register 22 and the B assembler 24. In order to achieve the transfer of data over the last-mentioned path, it is necessary to provide a bus 26 coupling the output of the A register to the input of the B register 22. Selected binary constant values are entered into the ALU 20 via a K assembler 27.

Data which has been processed by the ALU 20 is returned to selected corresponding positions in the local storage units 5 and 6 or alternatively to a selected external register 7 by way of a Z register 30, a D register 31, and the assembler 11. Selection of the particular location for destining processed data is achieved by means of the same local store and external address decode circuits 13. Processed data is then returned to the main store portion of the control unit 1 by way of the A register 21, the A assembler 23 and a "Storage Data Bus In" SDBI. During the transfer of data between the storage unit 1 and either the local storage units 5 and 6 or the external registers 7, the storage position in the unit 1 is selected by means of a forced address or an address derived from the local store unit 5 or 6 and transferred to the address register 3 by way of the B register 22.

In the preferred system illustrated in FIG. 1, the A and B local storage units 5 and 6 are mirror images of each other. That is, each time that data is stored into a selected position in the A local storage unit 5, the same data is stored in a corresponding position in the B local storage unit 6. Therefore, at any time the data existing in each of the storage units 5 and 6 will be identical. However, when data is read from either the A or B local storage unit 5 or 6, the data positions are addressed individually. That is, a position in the A local storage unit 5 is accessed as an A data source during an early portion of a control word cycle and at the same time a completely different position in the B local storage 6 is accessed as a B data source. In this manner, two local storage locations (or a local storage location and an external register) are accessed simultaneously as data sources to speed up the operation of the system.

The timing of the system operation is controlled by means of a plurality of substantially identical system clocks 35 (i.e., **35–*l* to 35–*n*) and a master oscillator 36. The output pulses of the master oscillator 36 are applied continuously to the inputs of the system clocks 35. However, means including a cycle length control decode circuit associated with the C register 2 selectively gates the oscillator output pulses into the various system clocks 35** in accordance with the particular microprogram control word being executed. Depending upon the type of word being executed, the cycle length of the system clocks will be set during the execution of that particular control word. In the preferred embodiment, a clock is provided for each circuit board and includes an adjustable delay means between its input and the oscillator output for synchronizing all clock periods.

Manual sequencing of the processor is achieved by console switches 37, the outputs of which are coupled to the control register 2 and to the address decode circuits 13 by way of an assembler 38. Data can be entered into the processor from the switches 37 by way of an assembler 39 and the external assembler 25.

In the preferred embodiment of the present application, the storage unit 1 is of the type in which the storage positions are comprised of monolithically fabricated transistor storage cells wherein one binary data bit is stored in each cell. Transistor storage unit is of the nondestructive readout type which permits the control storage portion of the storage unit to be of the writeable control storage type. That is, the microprogram control words may be selectively entered into the control storage portion of the unit 1 and may be changed at any time by loading into the control storage portion a new set of microprogram control words.

In the preferred embodiment, loading of the writeable control storage is achieved by means of a console file 40 having a magnetic disk unit and appropriate controls. Depending upon the particular customer's requirements, a selected optimum control storage microprogram set will be transferred from the console file 40 to the control portion of the storage unit 1 by way of the assembler 39, the external assembler 25 and the normal data paths of the processor. The console file unit 40 also stores suitable commands which, when decoded in the unit 40, are applied to the control register 2 and the address decode circuitry 13 by way of the assembler 38 to control both the loading of the control storage portion of the storage unit 1 and to permit diagnostic exercising of the processor.

The preferred embodiment illustrated in FIG. 1 also includes destination look-ahead circuits 41. The function provided by the look-ahead circuits 41 is to cause the direct transfer of data from the Z register 30 to the A and B registers 21 and 22 via path 42 in those instances in which a data source in the local storage units 5 or 6 is also the destination for data in the preceding cycle. In this regard, attention is directed to the fact that in the preferred embodiment of the present invention, data which is processed during the execution of one control word is not destined to its selected position in the local storage units 5 and 6 or the external registers 7 until late in the execution of the next succeeding control word. Since the data in the local storage units 5 and 6 and the external registers 7 is not updated until the next succeeding control word in the cycle, that portion of a location being updated cannot be accessed as a source during the next succeeding control word execution. Therefore, with respect to positions in the A and B local storage units 5 and 6, the direct transfer of the updated data is effected by means of the data path 42 connecting the output of the Z register 30 to the A and B registers 21 and 22. In the preferred embodiment, this destination look-ahead feature is not provided with respect to the external registers 7 with the exception of the SPTL register 7*a* which also has its output connected directly to the A and B registers 21, 22 via path 43. Therefore, any external register other than 7*a* which is being updated during the execution of a control word can never be a data source for the next succeeding control word.

Figures 2, 2A:
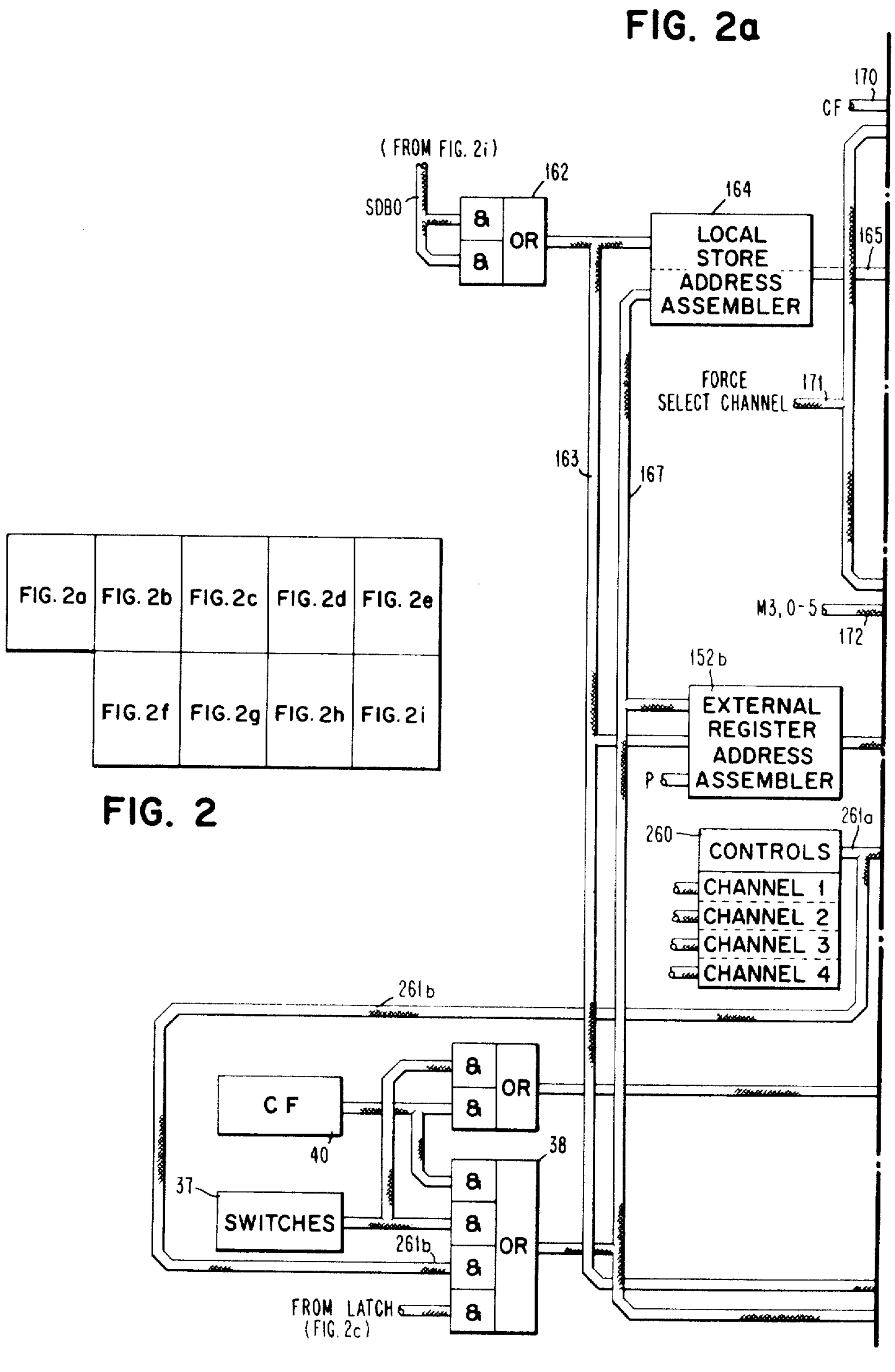
FIG. 2 illustrates the manner in which FIGS. *2a–2i* are interconnected.

A description of the more detailed block diagram of FIGS. 2*a*–2*i*, inclusive, will now be described. FIG. 2 illustrates the manner in which FIGS. 2*a*–2*i* are interconnected.

Figure 2B:
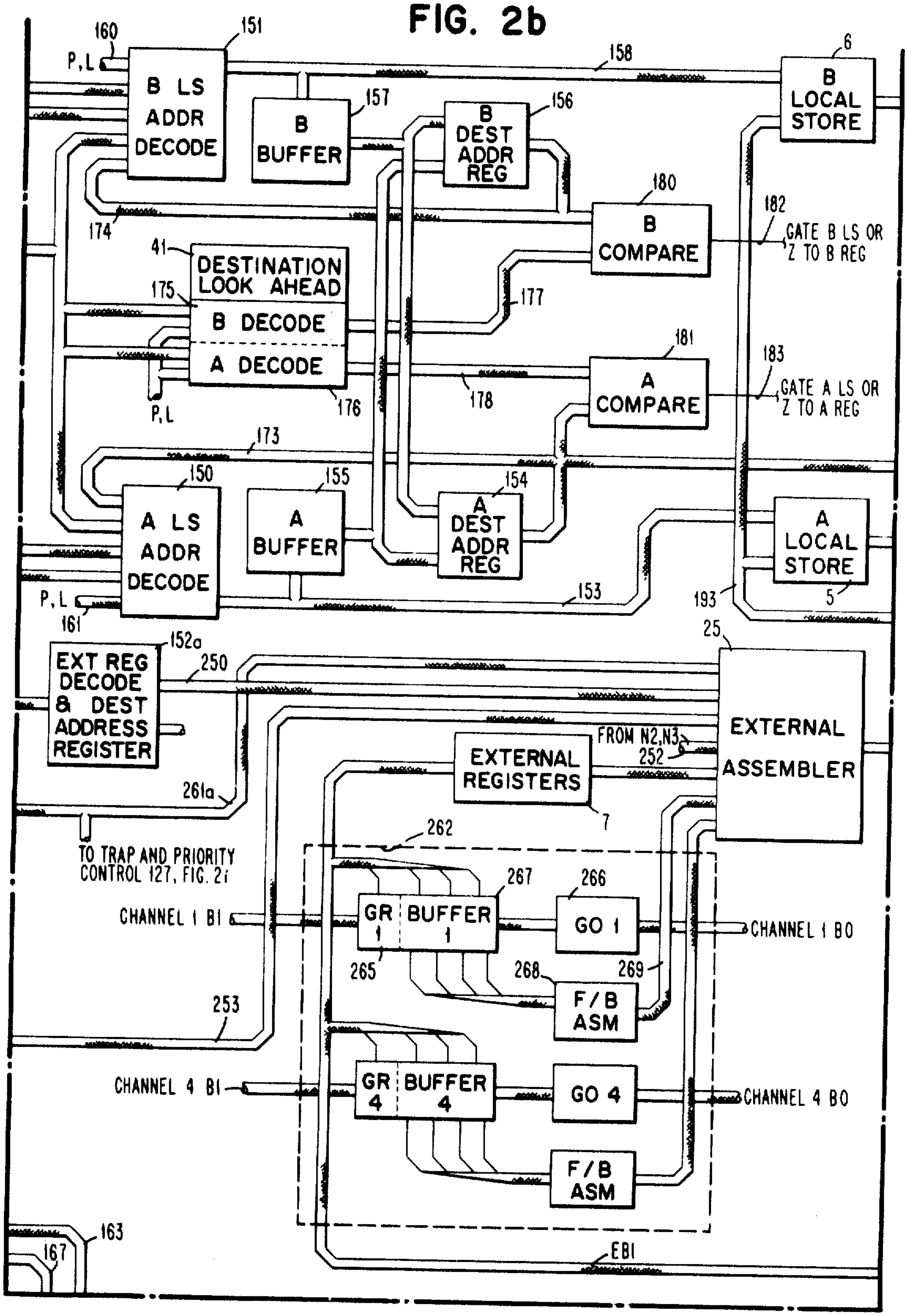
Figure 2C:
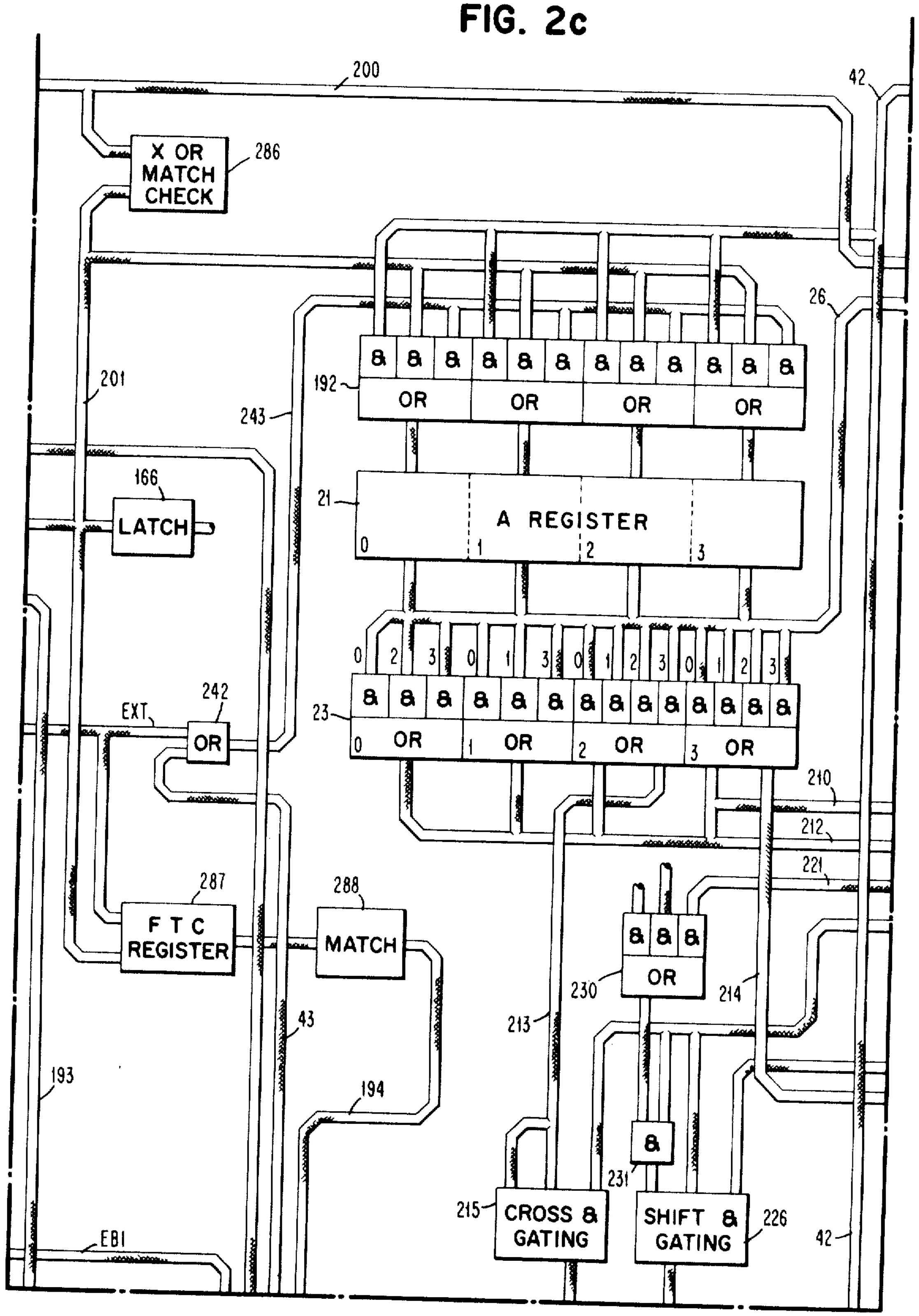
Figure 2D:
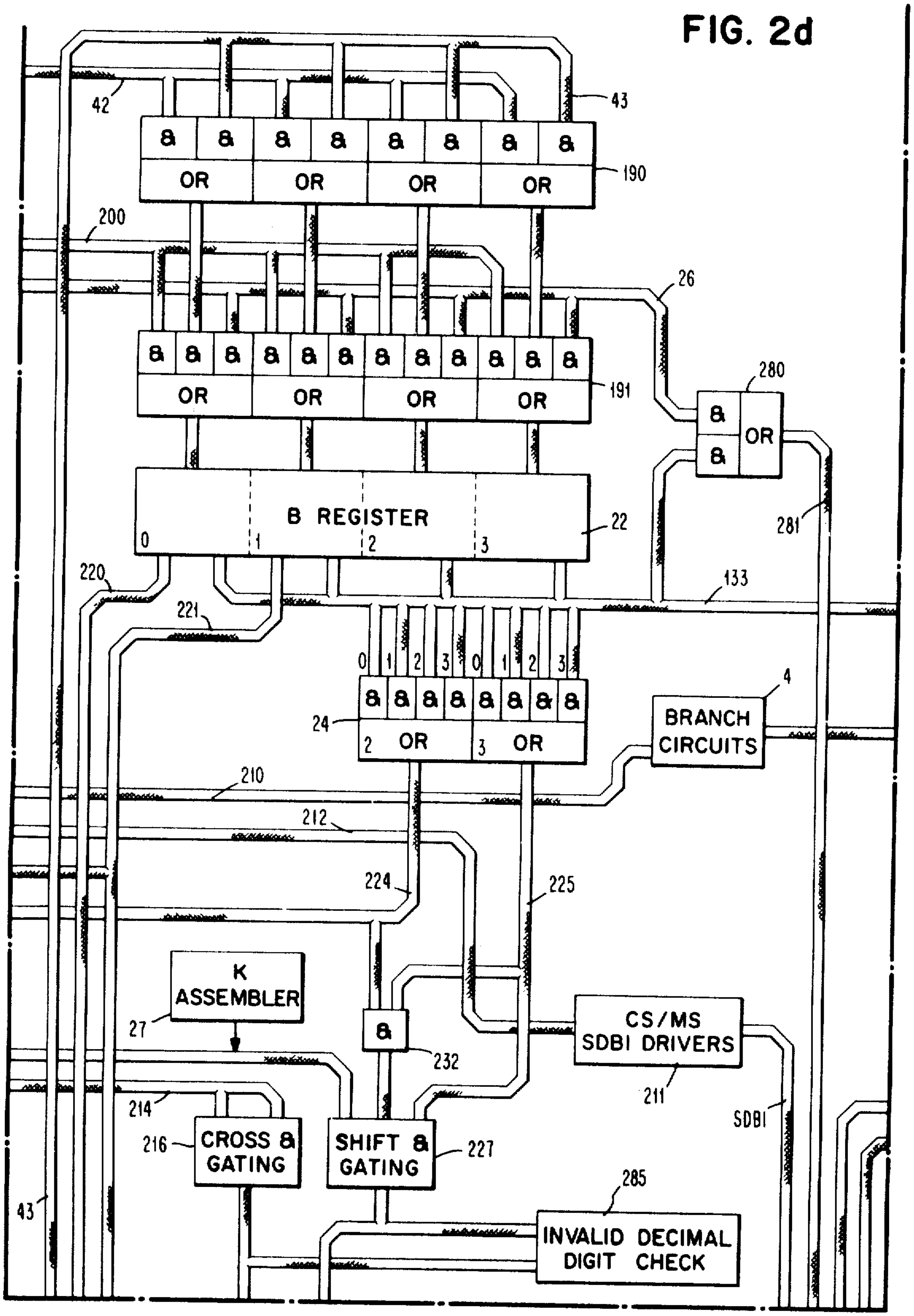
Figure 2E:
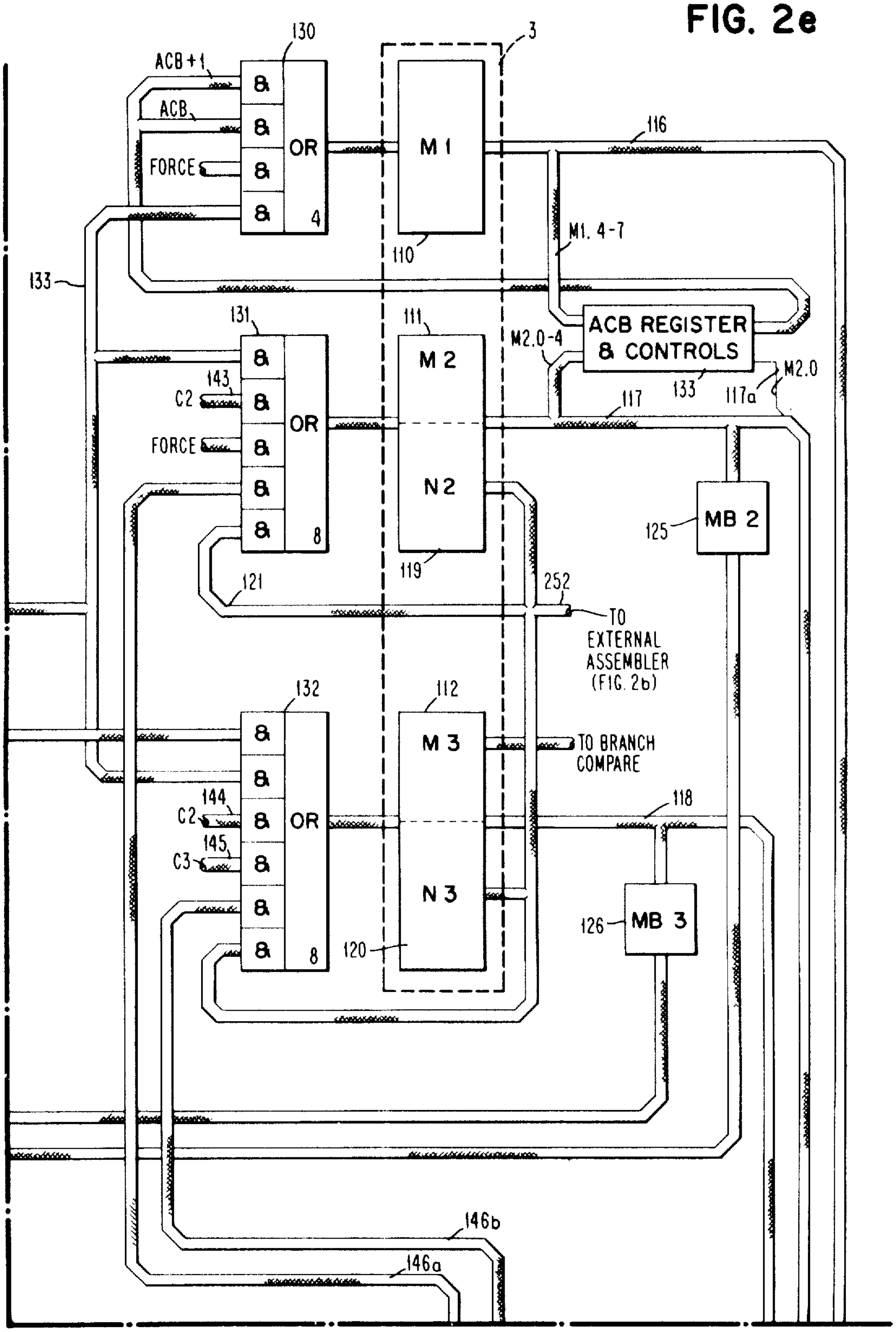
Figure 2F:
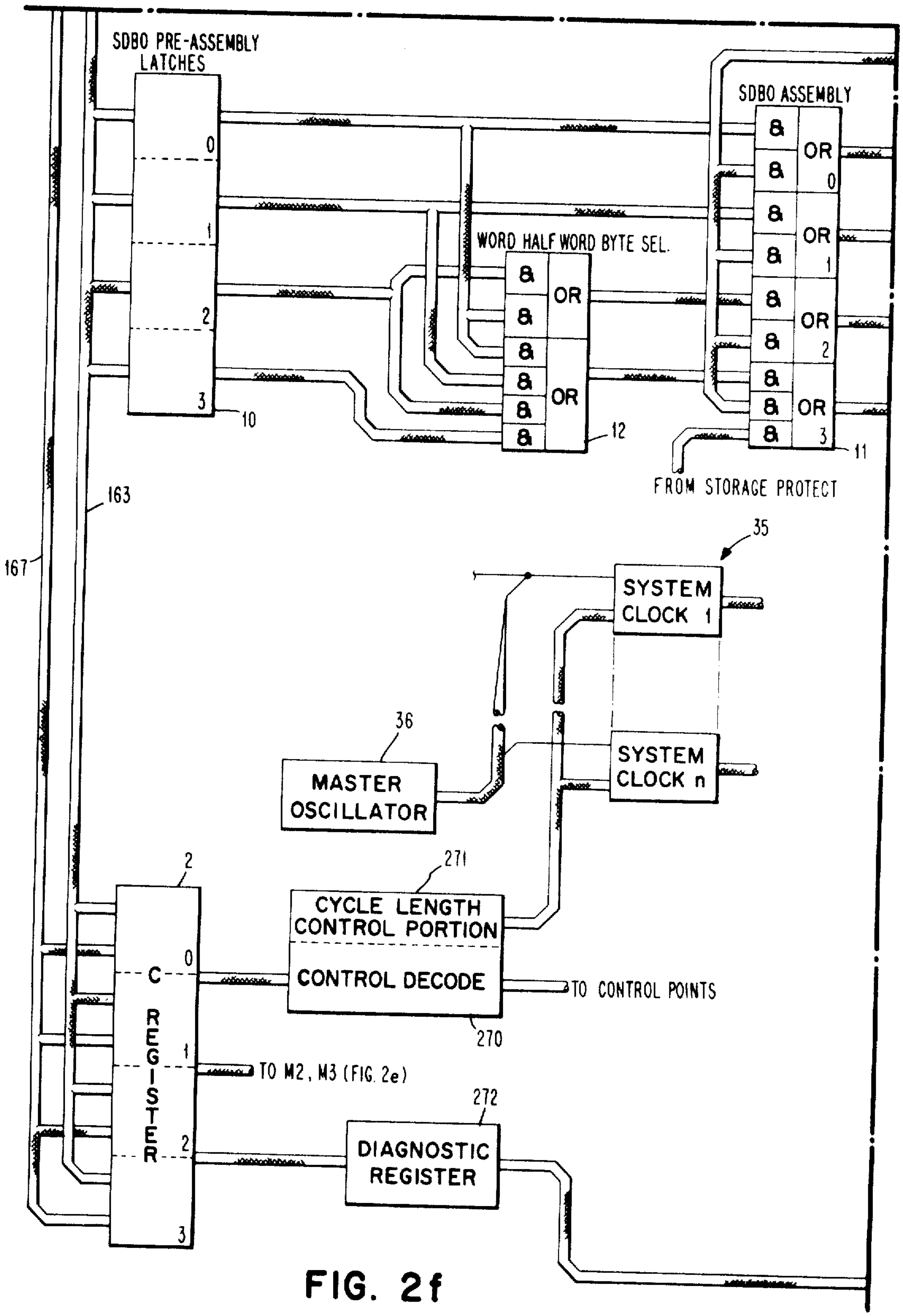
Figure 2G:
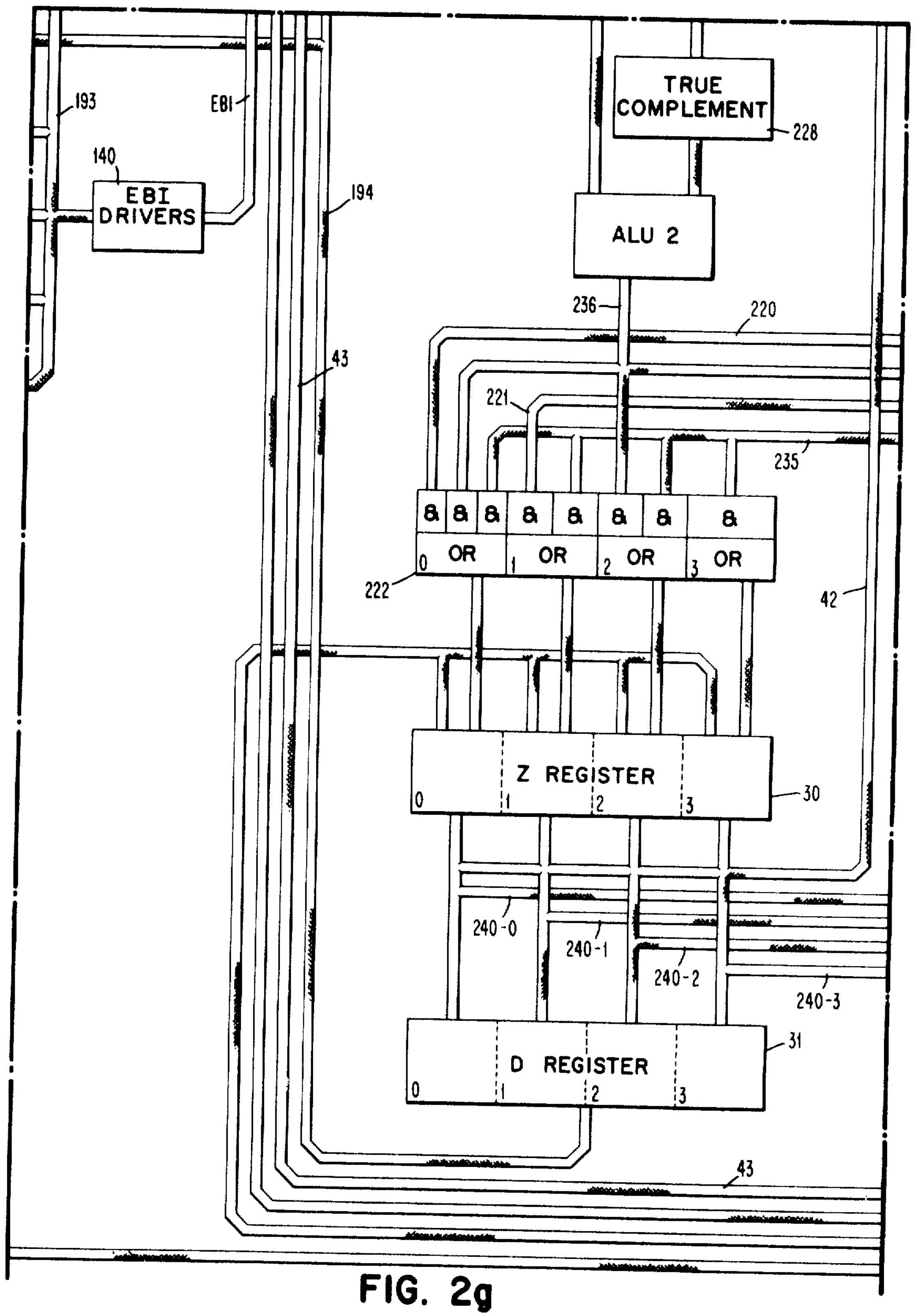
Figure 2H:
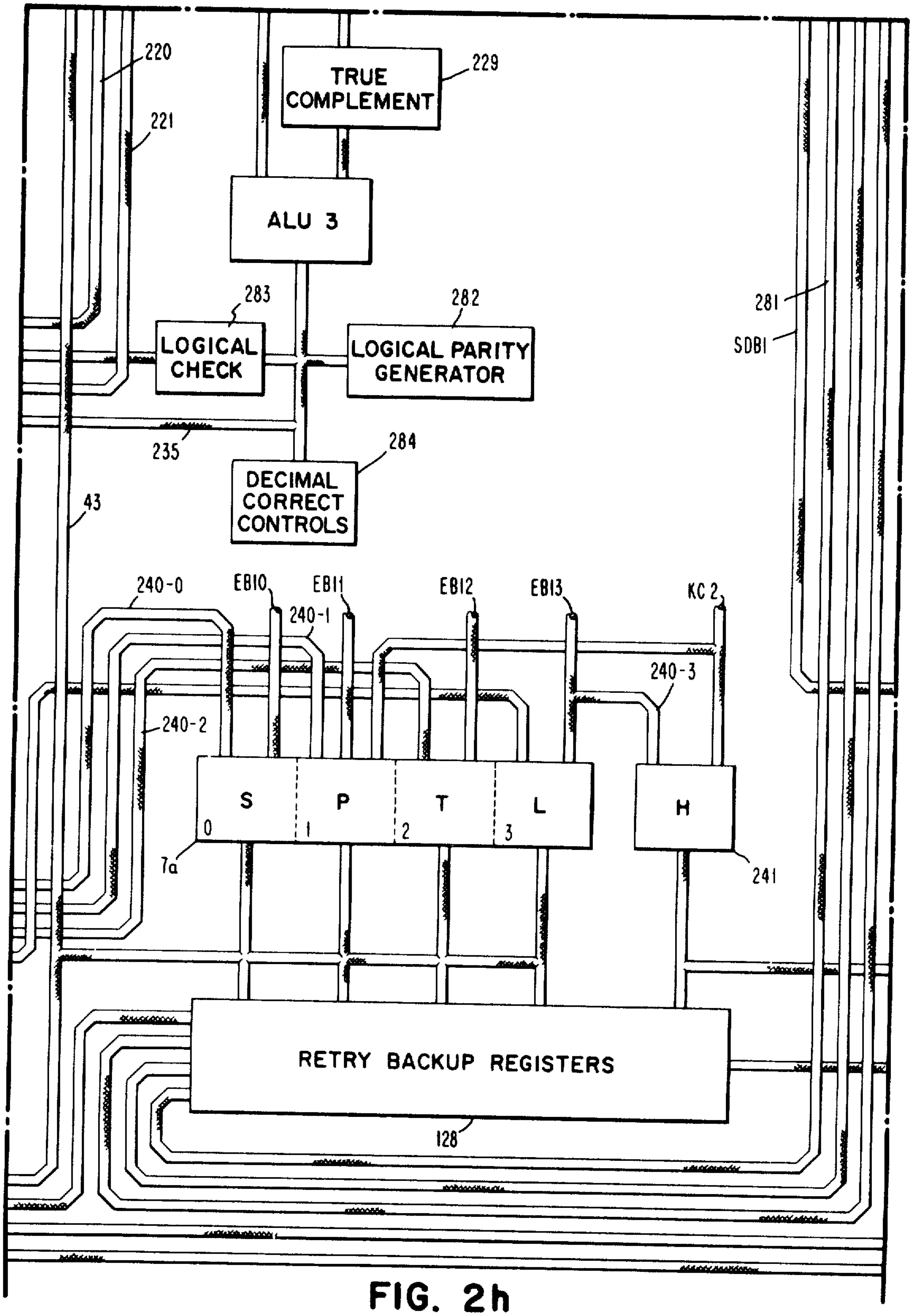
Figure 2I:
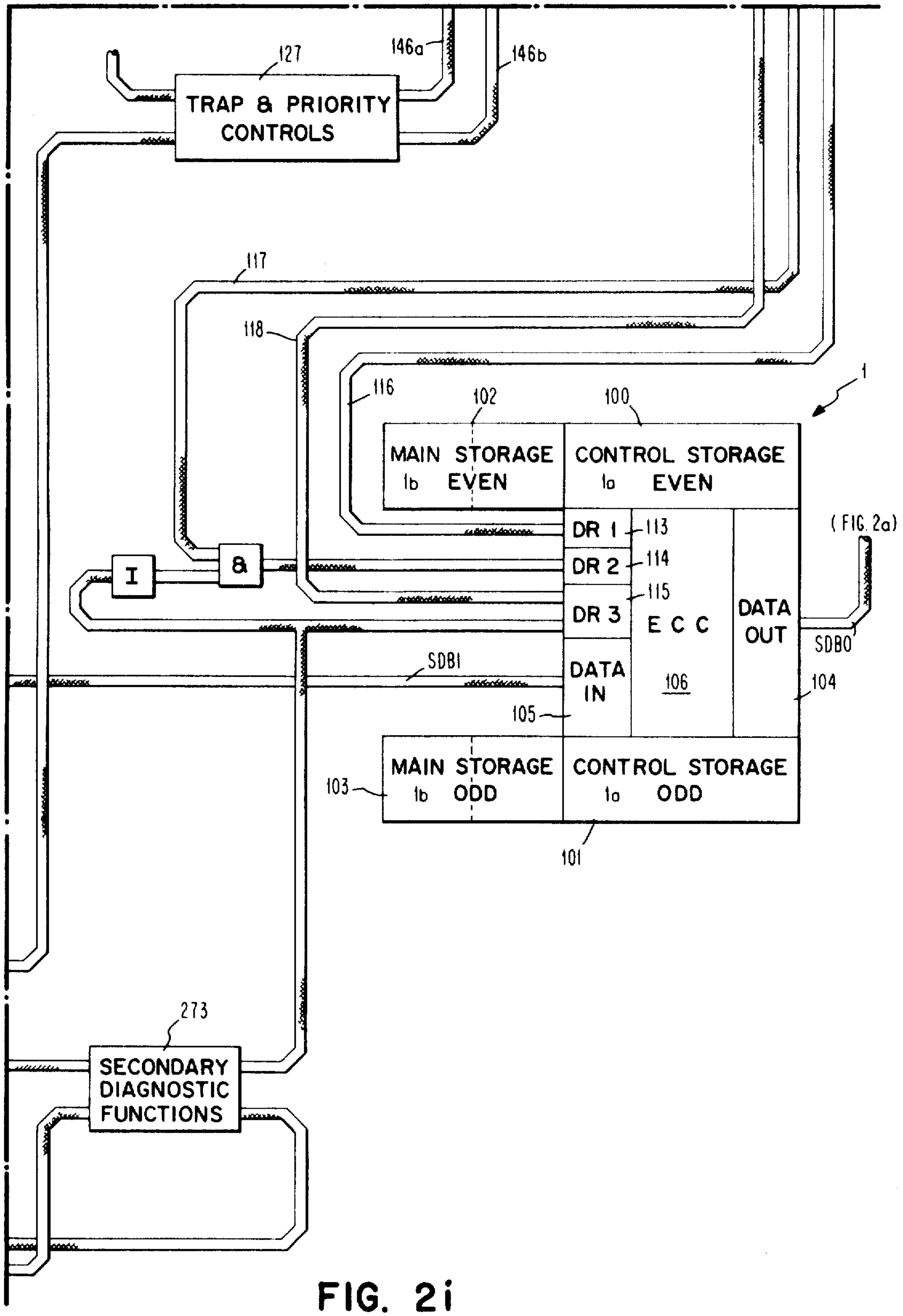

The storage unit 1 is shown in more detail in FIG. 2*i* and includes even and odd control storage sections 100 and 101, and data or main storage sections 102 and 103. As indicated earlier, both the control storage and main storage are accessed during read cycles in double-word widths and these double words are applied to the bus SDBO. As a result of the attempt to prevent skewing between the even and odd words of the double word, the physical locations of pairs of even and odd words are on the opposite sides and equidistant from the data output circuits 104. The control store is shown closely adjacent the data output circuits 104 and the main store 102 and 103 being located more remote from the circuits 104. This assures a minimum delay in transfer of control words from the storage unit sections 100 and 101 to the control register 2 of FIG. 2*f* and the address decode circuits of FIGS. 2*a* and 2*b*. Data transferred to the unit 1 during store cycles by way of the input bus SDBI is entered on a word basis. Therefore, there is no critical positioning of the data input circuits 105 to which the SDBI bus is connected and the locations of the main and control store positions. The storage unit 1 also includes a single-bit error-correcting and asymmetric double-bit error-checking circuit 106 of a known type. Since this particular circuit is not pertinent to the subject matter claimed herein and is of a type known in the art, it will not be further described.

The address register 3 is shown in great detail in FIG. 2*e* and includes M1, M2 and M3 registers 110, 111 and 112. The outputs of these registers are coupled to input driver circuits 113, 114 and 115 of the storage unit 1 by way of buses 116, 117 and 118. Associated with the registers 111 and 112 are N2 and N3 backup registers 119 and 120. Addresses for accessing data from the main storage sections 102 and 103 or microprogram control words from the control storage sections 100 and 101 are set up in the M1, M2 and M3 registers. In the preferred embodiment, the M3 register is the low-order portion of the address register circuits 3 and comprises eight bits (one byte) for access one of 64 words in each module. The M2 register is a one-byte register and the M1 register includes four bits for accessing different modules. The low-order bit 7 of M3 determines byte selection. Bit 6 of M3 determines half word selection, and bit 5 of M3 determines word selection. Bits 0–5, inclusive of M3 permit the selection of any one of 64 words, i.e., a module. The eight bits of M2 provide selection between 256 modules or approximately 16K (thousand) words. The four bits of M1 provide 16 combinations whereby a total of 256K words may be accessed by the registers M1, M2 and M3.

In the preferred embodiment, control store 1*a* can have a maximum of 16K words whereby microprogram supplied control word addresses require a maximum of only sixteen bits be supplied, i.e., to M2.

Accesses to main and control storage are always on a double word basis. However, data can be stored in main store on a byte, half word or full word basis. The particular operation which is specified by the control word being executed determines whether a word, half word, or byte is to be stored.

Most microprogram control word operations cause only the M3 register to be changed. As much as possible, succeeding microprogram control words in a routine are maintained within the same module whereby the M1 and M2 registers may be maintained at the same value for a series of microprogram control operations. Four-way branch operations are specified by the settings of bits four and five of the M3 register. As indicated above, bit five of M3 determines the selection of an odd or even word in a double-word read or in a store operation which is particularly useful for control word accesses as will be seen later. Bit four of M3 for branch operations determines which one of two consecutive double words is accessed in the main and control storage units.

The N2 and N3 registers are provided on backup registers for control word accessing. The address in N2, as well as in M2, will be a module address. As indicated earlier, a series of microprogram control word operations can be performed by accessing the words from the same module in control store. The address stored in N2 is altered only when a change in the module address is specified by the current control word being executed. The M2, N2 registers are loaded with this new module address. The address then remains in the N2 register until a next change in the module address is specified. As each succeeding control word in the same module is executed, the address in N2 is transferred into M2 for accessing the next succeeding control word until a new module is requested.

If a trap occurs during the execution of a control word, the M registers are set to the trap address value. However, the N registers are not changed when the trap occurs so that the current next control address can be saved. The trap routine stores the N register contents so that the correct control word sequence can be resumed by reloading both M and N with the saved address when the microprogram routine initiated by the trap is completed.

MB2 and MB3 registers 125 and 126 are provided as additional backup registers for the M2 and M3 registers. The MB2 and MB3 registers are set to the control word address which is in M2 and M3. When the CPU clock is stopped, the MB2 and MB3 registers contain address bits of the previously executed control word whereas the M2 and M3 registers contain the address of the control word to be executed next. This data existing in the MB2 and MB3 registers is utilized during error check routines.

Trap and priority control circuits are illustrated at 127 and are of a type known in the art. Retry backup registers 128 in FIG. 2*i* are registers used in conjunction with the circuits 127 in certain trap routines. The circuits 127 in the registers 128 are not pertinent to the subject matter claimed specifically herein and therefore will not be described further.

The entry of address data into the M1, M2 and M3 registers, as well as the N2 and N3 registers, is by way of assembler circuits 130, 131, and 132. For each address bit, assemblers 130–132 comprise a plurality of AND circuits, the outputs of which are applied to an OR circuit. Thus the numerals 4, 8, 8 are shown in the OR circuits of assemblers 130–132 to indicate that there are four circuits 130, and eight circuits 131, 132. The output of the OR circuits are coupled to the respective registers M1, M2, M3, N2 and N3. The inputs to the assembler 130 are a first bus ACB+1 and an ACB bus which are derived from address check boundary circuits 133 which provide means for further implementing accesses to control store 1 and for setting the boundary between control store 1*a* and main store 1*b*. A Force bus provides a third input to the assembler 130 and is utilized in those instances where the address bits to be transferred to M1 are selected numeric constants derived by the control word being executed.

It will be recalled that a maximum of twenty bits are transferred to the M1, M2 and M3 registers to address any portion of main store 1*b*. Thus, during the execution of many storage words wherein data is transferred between the main storage unit 1*b* and either the local storage units 5, 6 or an external register 7, the 20-bit address to be inserted into the M1, M2 and M3 registers are derived from the low-order 20 bits in the output bus 133 of the B register 22 in FIG. 2*d*. This 20-bit bus 133 is applied to respective inputs of the assemblers 130, 131 and 132.

Selected bits of byte 2 from the C register 2 of FIG. 2g are utilized as inputs 143 and 144 to the assemblers 131 and 132. An input bus 145 to the assembler 132 couples the assembler to selected output bits of the C register byte 3. Trap addresses are entered into the assemblers 131 and 132 from the trap circuits 127 by way of buses 146a, 146b.

The A and B local storage units 5 and 6 are illustrated in FIG. 2b and are accessed by means of addressing circuits including A and B local store address decode circuits 150 and 151. The circuits 150 and 151 together with an external register decode and destination address register 152 comprise the local store and external address decode circuits 13 of FIG. 1.

An output address bus 153 from the decode circuit 150 is utilized to select desired words in a local storage unit 5. It is also coupled to an A destination address register 154 by way of an A buffer register 155.

Each time that the A local store 5 is accessed as a source by decoding of the selected bits in the decode circuit 150, the address decode is transferred into the buffer 155. In the event that this same address is the destination address for the data being operated upon by the ALU 20, this address is then transferred from the buffer 155 into both the A destination register 154 and a B destination register 156.

Similarly, a B destination buffer 157 is coupled to the address bus output 158 of the B decode circuit 151. When the B source is also intended to be the destination, the address stored in the buffer 157 is transferred to both the registers 154 and 156. This is the manner in which data is destined to both local storage units simultaneously whereby one local storage unit is the mirror image of the other with respect to data stored therein.

Addresses for accessing the A and B local storage units 5 and 6 are derived partially from the P and L registers by way of buses 160 and 161 from the SDBO bus by way of an odd/even word selecting gate circuit 162 of FIG. 2a, a four-byte bus 163, a local storage address assembler 164 and a two-byte bus 165 which transfers bytes 1 and 2 (referred to herein as C1 and C2) of the control word selected by the circuit 162. Similar C1 and C2 bytes for addressing of the local storage unit are also derived from the console file 40 of FIG. 2a, a selector channel control circuit (not shown), the operator console switches 37 and diagnostic latches 166 of FIG. 2c, each by way of the assembler 38 of FIG. 2g and a cable 167 which is coupled to another input of the assembler 164. An additional address bit input to the B local store decode circuit 151 is derived from the console file 40 by way of a bus 170. A bus 171 called a force selector channel bus derived from the priority control circuits 127 of FIG. 2e is applied to the input of the A and B decode circuits 150 and 151. Bits 0–5 inclusive of the M3 address register are applied to the input of the A decode circuit 150 by way of a bus 172.

When the A and B local storage units 5 and 6 are accessed to destine information thereto, the addresses in the A and B destination address registers 154 and 156 are gated into the inputs of the decode circuits 150 and 151 by way of buses 173 and 174, respectively.

The destination look-ahead circuits 41 are illustrated in FIG. 2b and include a B decode section 175 and an A decode section 176. The output cables 177 and 178 from the B and A decode circuits 175 and 176 are applied to inputs of B and A compare circuits 180 and 181. The output cables 174 and 173 of the B and A destination registers 156 and 154 are also applied to the compare circuits 180 and 181. In the event that one of the circuits 180 or 181 makes an equal compare between its respective inputs when the respective B or A local store is being accessed as a source in the early part of a control word execution, the equal compare indicates that the source has not been updated since it is the destination address from the previously executed microcontrol word. An equal compare in the circuit 180 applies a pulse to the output line 182 to cause the portion of the control word which has not been updated and is still in the Z register (FIG. 2g) to be gated directly to the B register 22 (FIG. 2d) by way of the cable 42 which directly connects the output of the Z register to the input of the B register 22 by way of gating circuits or assemblers 190 and 191 (FIG. 2d).

An equal compare in the circuit 181 applies a pulse to the line 183 which causes the portion of the desired word which has not been updated and which still exists in the Z register to be transferred to the A register 21 of FIG. 2c by way of the cable 42 and the assembler 192 of FIG. 2c.

As indicated earlier with respect to FIG. 1, data is entered into the A and B local storage units 5 and 6 of FIG. 2b by way of the SDBO assembler 11 of FIG. 2f and a four-byte bus 193. The SDBO assembler 11 derives its input alternatively from the D register 31 of FIG. 2g by way of cable 194 or from the SDBO preassembler latches 10 by way of the word, half word, and byte select circuits 12 of FIG. 2f.

Output data from the B local store unit 6 of FIG. 2b is applied to the B register 22 by way of the cable 200 and the assembler 191. The output data from the A local storage unit 5 is applied to the A register 21 of FIG. 2c by way of a cable 201 and the assembler 192.

The output of the A register 21 (FIG. 2c) is coupled as indicated earlier by way of cable 26 to the gating circuits 191 (FIG. 2d) into the B register 22. The cable 26 also couples bytes 0, 2 and 3 of the A register 21 to byte 0 of the assembler 23, couples bytes 0, 1 and 3 of the A register 21 to byte 1 of the assembler 23 and couples all four bytes of the A register 21 to bytes 2 and 3 of the assembler 23.

The ALU 20 is two bytes wide and is divided therefore into byte 2 and byte 3 sections ALU2 and ALU3 (FIGS. 2g, 2h).

Byte 3 of the assembler 23 is coupled to the branch circuits 4 (FIG. 2d) by way of a cable 210. Bytes 0–4 of the assembler 23 are coupled to the bus SDBI by way of a plurality of driver circuits 211 and a four-byte cable 212. Bytes 2 and 3 of the assembler 23 are coupled to ALU2 and ALU3 by way of cables 213, 214 and cross and gating circuits 215, 216.

Bytes 0 and 1 of the B register 22 are coupled respectively to bytes 0 and 1 of the Z register 30 (FIG. 2g) by way of cables 220 and 221 and bytes 0 and 1 of a four-byte gating circuit 222 of FIG. 2h.

Bytes 2 and 3 and bits 4–7 of byte 1 of the B register 22 are coupled by way of the cable 133 to the M register input gating circuits as described above. Bytes 0–3 of the B register 22 are also coupled to ALU3 of FIG. 2i by way of the 2 byte of the assembler 24, cables 224 and 225, shift and gating circuits 226 and 227, true and complementing circuits 228 and 229. Byte 1 of the B register 22 is also coupled to ALU2 by way of the cable 221, a gating circuit 230 and an AND-circuit 231 and the shift and gating circuit 226, and the true complement circuit 228.

During shifting operations an AND-circuit 232 of FIG. 2d can be employed to couple the high-order 4 bits 0–3 of the byte 3 circuit of the assembler 24 and the low order bits 4–7 of byte 2 of the assembler 24 to ALU3 by way of the shifting gating circuits 227 and the true complementing circuit 229. Similarly, the AND-circuit 231 (FIG. 2c) can be used during shifting operations to couple the four low-order bits 4–7 of byte 1 of the B register 22 and the four high-order bits 0–3 of byte 2 of the B register to ALU2.

The output of the ALU3 of FIG. 2h is coupled to each of the four bytes of the z register 30 by way of each of the four bytes of the gating circuit 222 and a cable 235. The output of ALU2 is coupled to bytes 0 and 2 of the Z register 30 by way of bytes 0 and 2 of the gating circuits 222 and a cable 236.

As indicated earlier, the output of the Z register is coupled directly to the input of the D register 31 as seen in FIG. 2g and is coupled by way of cable 42 to the inputs of the A and B register gating circuits 190 of FIG. 2d and 192 of FIG. 2c. Bytes 0–3 of the Z register are also coupled respectively to the S, P, T and L bytes of the SPTL register 7a of FIG. 2h by way of one byte wide cables 240-0 to 240-3, respectively.

The output of the SPTL register 7a is coupled to the B register 22 of FIG. 2d by way of the four byte cable 43 and the gating circuits 190 and 191. The cable 43 is also coupled to the A register 21 by way of an OR-circuit 242 of FIG. 2c and a cable 243 and gating circuits 192.

The OR-circuit 242, the cable 243 and the gating circuit 192 also couple the output of the external assembler 25 of FIG. 2b to the A register 21 of FIG. 2c. Control of the external assembler 25 is effected by the external register decode and destination address register circuit 152a (and its assembler 152b) which is coupled to an input of the external assembler 25 by way of a cable 250. External registers 7 have their outputs coupled to an input of the external assembler 25 by way of a cable 251. Another input to the external assembler 25 is a cable 252 which originates in the N2, N3 registers 119 and 120 of FIG. 2e.

The console file 40 and the switches 37 (FIG. 2a) are coupled to another input of the external assembler 25 by way of the gating circuit 39 and a cable 253.

Channel control circuits 260 of FIG. 2b are coupled to another input of the external register 25 and to the Trap and Priority Controls 127 (FIG. 2i) by way of a cable 261a. The circuits 260 are also coupled to an input of the assembler 38 by way of a cable section 261b. The channel control circuits 260 together with input/output data path circuits 262 of FIG. 2b are utilized to control the transmission of data between the processor illustrated in FIGS. 2a to 2i and high-speed peripheral equipment such as magnetic disc storage devices (not shown).

The circuits 262 include an input GR1 register 265 the input of which is connected to a channel 1 data bus in BI. An output GO1 register 266 has its output connected to a channel 1 data bus out BO. A shift register buffer 267, including the input register 265, is utilized to store data being transferred from the channel 1 bus in the main storage unit 1 or being transferred from the main storage unit 1 to the channel 1 bus out.

Data is received over the channel 1 bus in on a byte basis and is transferred through succeeding stages of the buffer 267. The data is then transferred on a four-byte word basis from the buffer 267 to the storage unit 1 by way of a forward-backward assembler 268, a cable 269, the external assembler 25, the OR-circuit 242, the cable 243, gating circuits 192, the A register 21, the A assembler 23, cable 212, drivers 211, and the bus SDBI.

Data is transferred from the storage device 1 on a word basis to the buffer 267 by way of the bus SDBO, the gating circuit 162 of FIG. 2a, cable 163, the latches 10 of FIG. 2f, the selection circuits 12, the SDBO assembler 11, drivers 140, and the external bus in EBI. It can be seen from the data paths described immediately above that the buffer 267 with its associated registers 265 and 266 are in fact a part of the external registers 7. However, they have been illustrated separately as have been other registers such as the SPTL to more clearly illustrate certain features of the improved system.

It has been assumed for the purposes of the present application that the processor has four channels for the transmission of data between processor and peripheral equipment. Thus, the circuit 260 has four sections, one for each of the channels. Similarly, the circuit 262 includes four buffers and assemblers, only two of which are shown.

A decode circuit 270 (FIG. 2f) is coupled to the output of the C register 2. Each time that a control word is entered into the C register for execution, the decode circuit 270 responds to the bit combinations of the control word to operate the various gates required to execute the word.

The decode circuit 270 includes therein a cycle length control portion 271 which responds to selected control word bits to cause the clocks 35 to produce a selected cycle length of 180 nsec. (nanoseconds), 225 nsec., or 270 nsec.; and, for certain types of words, two cycles of 225 nsec. + 270 nsec. or 270 nsec. + 270 nsec. are effected.

Diagnostic functions, not related to the present improvement are achieved by means including a diagnostic register 272 (FIG. 2f) and a circuit 273 (FIG. 2i).

For certain types of retry functions, the contents of the A and B registers 21, 22 can be transferred to the retry registers 128 (FIG. 2h) by way of a gating circuit 280 (FIG. 2d) and cable 281.

When arithmetic operations are executed in ALU2 and ALU3, the parity bits are stripped from the operands before they are gated into the ALU. A parity generator 282 adds the proper parity bit value to the arithmetic result. For binary and decimal operations, a parity predict circuit (not shown) in the ALU checks the generated parity bit with a predicted parity bit for error detection. Errors in the results from a logical operation (which is duplicated in ALU2 and ALU3) are detected by a logical check circuit 283 which compares the results from ALU2 with that from ALU3.

A decimal correct controls circuit 284 assures correct decimal addition by using a binary adder in ALU2 and ALU3. This will be described in greater detail below.

A circuit 285 (FIG. 2d) monitors the ALU3 inputs for invalid decimal digits during decimal operations. Decimal operations are only single byte operations in the preferred embodiment.

When data is destined from the D register 31 (FIG. 2g) to the A and B local stores 5, 6 (FIG. 2b), the data is entered into both local stores and immediately read out (nondestructive) on bus lines 201, 200. An exclusive OR-circuit 256 (FIG. 2c) determines if the data in both local stores is the same; and a flush through check register 287 and match circuit 288 determines whether or not the new data (one to four bytes) destined from the D register 31 equal the new data set into the A local store 5.

Microprogram Control Word Types—FIGS. 14–22

Before describing the control word types of FIGS. 14–22 inclusive, a few clarifying statements are in order:

1. Although all control word bits are illustrated as being in the C register 2, it will be appreciated that this is for ease of explanation; and, in fact, local storage and external register addressing is achieved by corresponding bits in the decode circuits of FIG. 2b rather than by the actual C register output bits.

2. Arbitrary values have been selected for data in various registers for control word execution examples.

3. Legends such as A3.0–2 are used for simplicity, this symbol representing bits 0–2 of byte 3 of the A register output.

4. Preferably most of the registers and latches are of the polarity hold type. Polarity hold latches are of a known type typically having a pair of logical AND circuits, the outputs of which are connected to the inputs of a logical OR circuit. A data line is connected to one input of one AND circuit and the in phase output of the OR circuit is connected to one input of the other AND circuit. A single set/reset line is connected directly to a second input of the other AND circuit and is connected to the second input of the one AND circuit by way of a logical invert circuit with a slight amount of delay from input to output.

With the set/reset line at its logical zero level, the latch acts as a noninverting amplifier producing at its output a logical level corresponding to that on the input data line. When the set/reset line goes to the logical one level, it latches up in the logical state of the data line at that moment; and it holds that latched state until the set/reset line again goes to the logical zero level.

Branch and Module Switch Word—FIG. 14

The first word type, Branch and Module Switch, is illustrated partially in FIG. 14 and is specified by bits CO.0–3 = 0000. The primary function of this control word is to change the address in both the M2 and M3 address registers so as to access a control word in a different module of storage. This capability allows for branching to any word in the control storage area. The word may perform up to four-way branching and provides the function of setting the S, T or L registers with the contents of any addressable local storage or external byte source.

The branch high bits CO.4–7 specify the branch test or fixed value that will determine the setting of bit M3.4 of the address register for selecting the next control word. The CO.4–7 values 0000 or 0001 designate direct setting of M3.4 to 0 or 1 respectively as shown in FIG. 14. If the values of the branch high bits CO.4–7 are from 0010 to 1111 inclusive, various tests of the S register bits or branch source bits will be made to determine the logical 1 or 0 value to be entered into bit M3.4. Only two of these are shown in FIG. 14, i.e., if CO.4–7 = 0010, a test is made of bit 1 of the S register and M3.4 is set to the same value as the S1 bit. Similarly, if CO.4–7 = 0011, M3.4 is set to the value equal to that in bit 0 of the S register.

Bits C1.0–5 inclusive specify the local store or external byte to be accessed for branch testing in accordance with the rules illustrated by the chart of FIG. 12.

Bits C1.6,7 specify the destination (if any) of the branch source value if designated in the control word. Thus, the S, T or L registers can be set with the value of the branch source byte if C1.6,7 = 01, 10 or 11 respectively.

Bits C2.0–7 specify the module address that is placed in the M2 register when the next address formation operations takes place.

Bits C3.0–3 specify the part of the word address which is gated to bits M3.0–3 of the address register.

Bits C3.4–7 specify the branch test or fixed value that determines the setting of bit M3.5 of the address register. If bits C3.4–7 = 0000 or 0001, then the corresponding value 0 or 1 is forced into bit M3.5. If C3.4–7 = 0010, then bits 4 and 5 of the S register are tested (ZO function). If S4,5 equals 11, then M3.5 is set to 1. If either S4 or S5 equal 0, the bit M3.5 is set to 0. In the event that C3.4–7 = 0011, then the branch source is tested to determine whether or not it is a value other than 0 (NZ function). If the branch source is 0, then bit M3.5 is set to 0, but if it is a value other than 0, then M3.5 is set to the logical 1 state. Similarly if the value of the branch low bits is one of the values between 0100 and 1111, then selected tests on S register bits or individual bits of the branch source are made and the bit M3.5 is set accordingly.

Branch Word—Fig. 15

The branch word which is illustrated in FIG. 15 is specified by a decode C0.1-3 = 0001. The primary function of the branch word is to branch to another control word in control store. The control word branch address may be selected by testing the status of certain S register or branch source bits and forming the branch address accordingly or, alternatively, by specifying the branch address directly. In most instances, the branch word addresses a control word in the same storage module. However, in one instance (C1.6,7 = 00), a module switching form of the branch word is executed allowing branching to any word in the control store unit 1*a*. In addition, the branch word permits setting or resetting of bits in a specified local storage or external byte location.

With specific reference to FIG. 15, it will be seen that bits C0.4–7 specify the branch high function and are similar to those described with respect to FIG. 14.

The branch source bits C1.0–5 specify the local storage or external byte to be accessed for branch testing. Bits C1.03 specify the word address. Bits C1.4,5 specify the byte to be tested. Bits C1.6,7 specify the gating of a constant (or K value) to the ALU for a set or reset function. The symbol L (C1.6,7 = 01) specifies that only the low-order 4 bits of the ALU are to receive the K value in bits C2.4–7. The symbol H (C1.6,7 = 10) specifies that only the high 4 bits of the ALU are to receive the K value. The symbol ST (C1.6,7 = 11) specifies the gating of the K value into both the high and low 4 bits of the ALU.

If C1.6,7 = 00, then the special module switch function is specified which results in preventing of the set/reset function. Instead, bits C2.0–7 are gated to the M2 register to access a new module, the T register bits 0 and 1 are gated to bits M3.2,3 and normal branch high and branch low functions are executed.

Bit C2.0 is not required except for module switching.

Bit C2.1 indicates the set or reset function. When C2.1 = 0, it specifies the OR function for the ALU operation to be performed on the source that is designated by bits C2.2,3. The OR function effectively sets to a logical 1 value the bits of the source that correspond to the gated K field bits which are equal to a logical 1. In the event that bit C2.1 is equal to a logical 1, it specifies the complement AND function for the ALU operation. This complement AND function resets each bit of the source specified by bits C2.2,3 that corresponds to a 1 bit in the gated K field bits.

Bits C2.2,3 specify the source that is to be set or reset by the K field bits C2.4–7. When C2.2,3 = 00, the branch source addressed by bits C1.0–5 is the source to be set or reset. When bits C2.2,3 = 01, they specify that the S register is to be the set/reset source. If the bits C2.2,3 = 10, the P register is specified as the set/reset source. If the bits C2.2,3 are equal to 11, then a special function having to do with I/O operations is specified. Since it is not pertinent to the present improvement it will not be further described.

Bits C2.4–7 specify the K value to be used for the set/reset functions. Bits C2.0–7 are used to set the M2 register when the special module switch function is specified by bits C1.6,7 = 00.

Bits C3.0–3 when not in the module switching mode are the bit values which are to be set into bits 0–3 of the M3 register for addressing the next control word. When the module switching mode is called for, bits C3.0,1 are gated to bits M3.0,1 and bits 0 and 1 of the T register are gated to bits 2 and 3 of M3.

The branch low bits C3.4–7 specify branch tests or fixed values as described above with respect to the branch and module switch word of FIG. 14. They will, therefore, not be repeated.

Branch and Link (BAL) or Return Word—FIG. 16

The branch and link or return word is specified by bits C0.0–3 = 0010. The branch and link function of this word is generally used as the first word of a trap routine to store status and address information related to the routine trapped from. The S, P, N2 and N3 registers are stored respectively in bytes 0–3 of a link register; for example, the CPU link information register at address 1F of the local storage assignment map shown in FIG. 36. When the branch and link is the first word of a trap routine, the address which is stored away is the address of the control word which would have been executed next if the trap had not occurred.

The main objective of the return function is to restore the S and P registers from bytes 0 and 1 of the link register and to gate the link address from bytes 2 and 3 of the link register to M2 (N2) and M3 (N3).

Referring specifically to FIG. 16, it will be seen that bit C0.4 specifies either the link or return function depending upon whether this bit is respectively a logical 0 or logical 1. Bits C0.5–7 are the branch high field and have eight possible combinations. When the branch high field is equal to 0 or 1, a corresponding logical bit will be set into bits 4 of the M3 register. Other branch high values specify testing of various bits of the S register and setting bit M3.4 accordingly.

Bits C1.0–6 specify direct addressing of the link register that receives the link information. Bit C1.0 specifies whether local storage or an external register is to be accessed. Bits C1.1–6 inclusive specify directly the X and Y address lines which access the link register.

Bits C2.0–7 specify for the branch and link function that this K/module value is to be set alternatively into the P register or is a module address to be gated to M2 (N2) when the next address is formed. If bit C3.4 = 0, this K field is set into the P register. If bit C3.4 = 1, this field is the module address and is gated into M2 (N2) for the next address formation. For the return function, this field provides the bit pattern for resetting one or more selected bits in the H register, a priority register for trap routines. Any bit in this field C2.0–7 that is at its logical 1 state for the return function causes the corresponding bit in the H register to be reset.

The next address bits C3.0–3 contain part of the address for the next control word. When performing the branch and link function this field is gated 2 bits M3.0–3 for the next control word address. For the return function this field is used to form the next control word address only when bit C3.4 = 1. When C3.4 equals 0, the next address bits are gated from the link register.

The branch low bits C3.5–7 specify the branch test or fixed value that determines the setting of bit 5 of the M3 address register. Depending upon the value of the branch low bits various S register bits or combinations of S register bits may be tested and bit M3.5 set accordingly.

Figure 17:
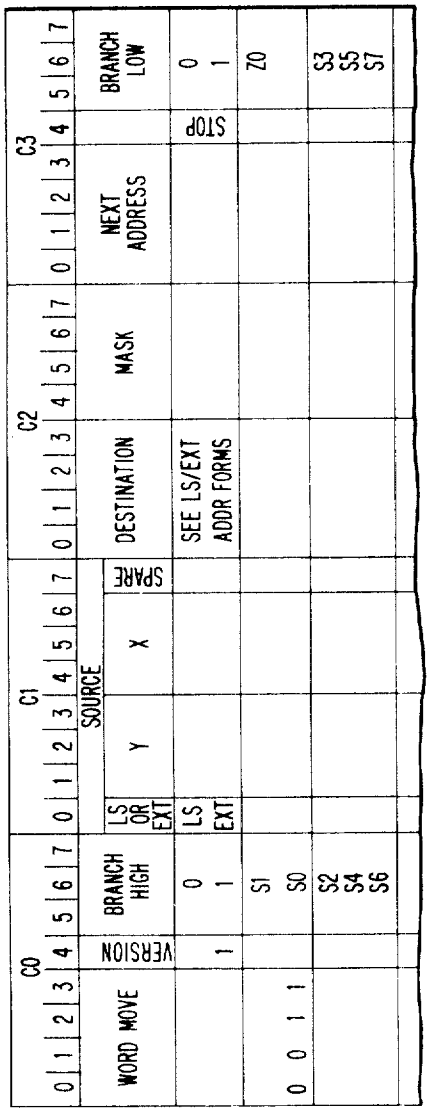
Figure 18:
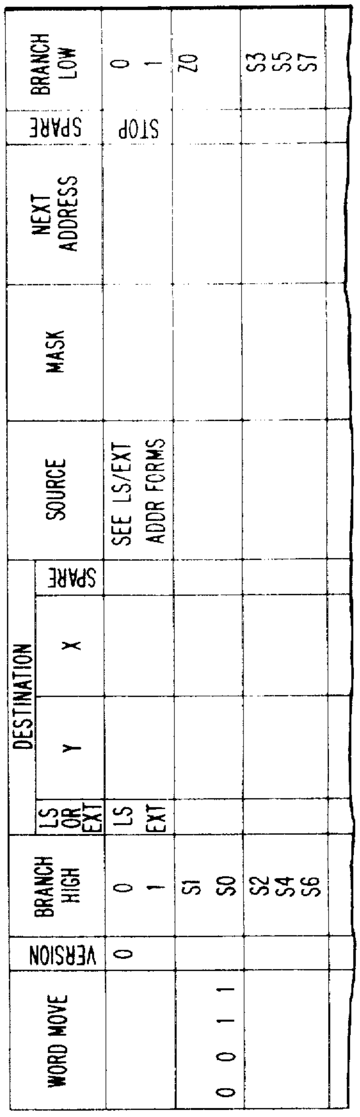

Word Move Control Word Versions 0 and 1—FIGS. 17 and 18

The primary function of the word move control word type is to move data from one local storage or external word location to another. A full word or any combination of selected bytes of the word source can be moved to the designated destination. The selection of bytes is done through the use of a mask, the value of which is specified in the statement field by a hexadecimal digit. The word move control word has the facility to branch to any control word in the same storage module. Branch testing is limited to bits of the S register. The word move control word also has a special stop function which causes the M and N registers to be blocked whereby the same move word function is executed over and over again during each succeeding CPU clock cycle. A start key on the operator's console is provided for returning to normal processing.

Particular reference is directed to FIG. 17 which illustrates the version 1 word move type which is specified by bit C0.4 = 1. The branch high bits C0.5–7 specify branch testing or the fixed value that will determine the setting of bit M3.4 for the next control word address. The source address field bits C1.0–6 specify whether the source is a local store register (C1.0 = 0) or an external register (C1.0 = 1). Bits C1.1–6 specify the Y and X lines for addressing the desired local store or external register.

Bits C2.0–3 specify a selected local store or external register destination making use of the address forms chart of FIG. 12. Bits C2.4–7 specify the mask field. Bits in the mask field correspond to bytes of the source word to be moved. A mask bit in the logical 1 state specifies the corresponding byte of the source is moved. Bits 4 to 7 inclusive of byte C2 specify bytes 0–3 respectively of the word source.

The next address bits C3.0–3 are used to select the next control word address and are gated to bits M3.0–3.

When bit C3.4 = 1, the special stop function described above is specified.

The branch low bits C3.5–7 specify the branch test or fixed value that determines the setting of bit M3.5 for the next control word address. Branch testing is limited to testing of the S register bits.

The word move version 0 of FIG. 18 (C0.4 = 0) is the same as version 1 of FIG. 17 except that the bits C1.0–6 specify the destination address and bits C2.0–3 specify the source addressing making use of the ad;ress forms chart.

Storage Word—K-Addressable and Non-K-Addressable Types—FIGS. 19 and 20

The storage word type is specified by bits C0.0,1 = 01. The K-addressable type is specified by bits C1.4,5 = 00. All other combinations of bits C1.4,5 specify the non-K-addressable type of storage control word.

The storage word can read data from or store data into main storage 1*b*, control storage 1*a*, local storage 5, 6 and external registers 7. It can also perform a branch and link or return function. It is capable of up to four-way branching.

The main function of the storage control word is to move data between a main storage location in storage unit 1 and some working area in the processor.

In the non-K-addressable type, the data address is located in a local storage register. No external register may be used as an address source except the SPTL register. The address contained in the address source register may be a control storage address or a main storage address. In the case of a control storage address, only the low-order 16 bits of the address source register are used in setting the M2, M3 registers. For main storage addressing, the low order 24 bits are used to set the M1, M2, M3 registers.

The facility for updating the address in the address source register is available for the non-K-addressable version only. The address update may be an increment or a decrement operation. The value of the update is normally implied by the subform of the word. For example, a full word operation (4 bytes) requires an update by four, a half-word operation (2 bytes) an update by two, and a byte operation an update by one. There is a special case where the update value is not implied. This occurs when a special status setting is given which indicates an update value determined by the setting of the T register bits 0–3. The update function applies to the address source register. After the contents of the address source register are used to set the M register, an update of the address source contents is made.

In the K-addressable type, the data address is formed by forcing part of the M register to a specified value. The K-addressable type can designate a branch and link or return function.

Reference is directed particularly to FIG. 19 which shows the bit structure for the K-addressable type of storage word, which type is specified by bits C0.4,5 = 00. Bits C0.2–4 specify the subform of the storage word, i.e., the designation for reading or storing and the size of the data to be handled. If the bits C0.2–4 = 000, a full word read from main or control storage is made and the full word is set into the specified data register. In the event that bits C0.2–4 = 001, a store full word is specified and the contents of a specified data register are stored at a location specified by the K mode and K values specified in the control word.

When bits C0.2–4 = 010, they specify a read half-word which calls for setting of bytes 2 and 3 from a specified main or control storage word into bytes 2 and 3 of a specified data register.

When bits C0.2–4 = 011, they specify a store half-word wherein bytes 2 and 3 of a word accessed from a specified data register are transferred to a specified half-word location in main storage. When bits C0.2–4 have a value of 100 they specify the transfer of a byte of data from a specified main or control storage location into byte 3 of a specified data register.

When bits C0.2–4 = 101, they specify the transfer of byte 3 of a specified data register to a specified main storage location. When bits C0.2–4 = 110, a special return function is specified, whereby the contents of a particular control storage word location (e.g., FF58) are used to set the S, P and M2 (N2) registers; and the next address bits C3.0–3 and branch high (C0.5–7) and branch low (C3.5–7) bits are used to set the M3 (N3) register. When bits C0.2–4 = 111, they specify a swap function wherein data in a specified main storage location and data in a specified data register are interchanged with each other.

The branch high bits C0.5–7 specify the branch test or fixed value that determines the setting of bit M3.4 of the next control word address. Branch tests are made on selected bits of the S register as seen in FIG. 19. When the branch high bits C0.5–7 are equal to 111 (M6 function), they call for testing of bit 6 of the Z register for setting bit M3.4 accordingly. This value in the Z register is the result of an updating of the K value in the ALU.

Bits C1.0–3 specify use of address forms of FIG. 12 to determine the local storage or external register that is to be the source or destination of data. On read operations, this field specifies the destination, and, during store operations, this field specifies the source of the data to be stored.

Bits C1.4,5 = 00 indicates the K-addressable version of the storage word. C1.6,7 specifies the K-addressable modes and the M register settings. When C1.6,7 = 00, the MS0000KK mode is specified for accessing the low order 256 bytes of main storage. The M register is set with hexadecimal values in the following manner: M1=0 (since M1 has only four bit positions), M2=00, and M3=KK (where KK = C2.0–7).

When bits C1.6,7 = 01, the CS Current Mod KK mode is specified whereby any control word in the current module can be accessed. M2 is set from N2 and M3 is set equal to KK (C2.0–7).

when bits C1.6,7 = 10, they specify the CSFFKK mode which calls for accessing of the high order 256 bytes of control storage. The M2 register is set equal to the hexadecimal value FF and the M3 register is set equal to KK (C2.0–7).

When bits C1.6,7 = 11, they call for the CSFK+8 bit address mode wherein access to control storage is made setting M2=FK where K is equal to the value in bits C2.4–7 and setting M3 equal to the low byte of the address source register specified by C2.0–3.

Bits C2.0–3 normally contain the high order hexadecimal digit of the KK value. However, when the CSFK+8 address mode is specified, this field designates the local storage register that contains the byte of address that is used to set M3 for a control storage access.

Bits C2.4–7 specify the low hexadecimal digits of the KK value.

Bits C3.0–3 specify part of the next control word address and these bits are gated to bits M3.0–3 when the next control word address is formed.

If bit C3.4 = 1, a branch and link or return operation is specified. In the event that a store operation is being performed, then the branch and link function is called for. In the event that a read operation is being performed, then the return function is specified. Storing and restoring link information is done in the same manner as that set forth with respect to the branch and link word of FIG. 16. However, if the subform bits C0.2–4 are equal to 110 (RTN REP N.A.) then the low byte of the link location is not used to set M3; rather, M3 is set by the next address field (C3.0–3) and the results of any branch testing.

Bits C3.5–7 specify the branch test or fixed value which determines the setting of bit M3.5 when the next address is formed. Fixed branch low values of 000 and 001 designate direct setting of bit M.5. When bits C3.5–7 are equal to 010 (Z0) a test of bits S4 and S5 are made. If S4, S5 = 11, M3.5 is set equal to one. If either S4 or S5 =0–bit M3.5 is set equal to 0. When bits C3.5–7 are equal to 011, 100, or 101, then tests are on bits 3, 5 4–7 of the S register.

Although no address update can be made in the K-addressable version, an update of the K value does occur in the ALU. Thus when the branch low bits C3.5–7 = 111, a test is made of bit 7 of byte 3 of the Z register and bit M3.5 is set equal to this value.

The non-K-addressable storage word type of FIG. 20 is similar in many respects to that described above with respect to the K-addressable type. Thus bits C0.0,1 = 01 to identify the storage word. The subforms specified in bit C0.2–4 are the same as those described above with respect to FIG. 19 except with respect to the special return subform of FIG. 19. The branch high and branch low fields and the data register fields are the same in both forms of the word. The address source field bits C2.0–3 are the same as that described above with respect to FIG. 19 where the local storage/external address forms of FIG. 12 are used.

Bits C1.4,5 for the non-K-addressable storage word type can have a value of 01, 10 or 11. These three values respectively call for no address updating or address updating by incrementing or address updating by decrementing. The update constant is implied by the subform of the word. That is, word operations require updating by four; half word operations by two; and byte operations by one.

Bits C1.6,7 specify the status set field. The status set facility applies to storage words using the decrement count facility. When bits C1.6,7 = 01, S2 is set to a logical one if the count is not zero after updating. S2 is set to zero if the count is 0 after updating. When bits C1.6,7 = 10 (S4,5) bit S4 is set equal to 1 if byte 3, bits 0–3 of the count are 0 after updating; otherwise, set S4 equal to 0. In addition, status register bit S5 is set equal to 1 if byte 3, bits 4–7 of the count are zero after updating; otherwise, set S5 equal to 0. If bits C1.6,7 = 11 (Z6), then the bit S4 is set equal to 1 if byte 3, bits 0–5 of the count are 0 after updating; otherwise, S4 is set to 0. Also bit S5 is set equal to one if byte 3, bits 4–7 of the count are 0 after updating; otherwise, S5 is set equal to 0.

Bits C2.4,5 specify the type of addressing that is to be performed by the address from the address source register. When bits C2.4,5 = 00, they specify that the control storage area is the address. Only 16-bit addresses are provided for addressing control store. Therefore these 16 bits are set into the M2 (N2), M3 (N3) registers.

When bits C2.4,5 = 01, they specify accessing of the main storage area with no storage protection in effect. Twenty-bit addresses are provided for addressing main storage and these 20 bits (byte 1, bits 4–7, bytes 2, 3 of the address register) are set into the register M1 and into registers M2 (N2), and M3 (N3).

When bits C2.4,5 = 10, they specify accessing of main storage with storage protection. Bits 0–5 of byte 0 of the address source register contain the protect key. Twenty bits from byte 1, bits 4–7 and bytes 2 and 3 of the address source register are used to set the M1 and the M2 (N2), M3 (N3) registers.

Bits C2.6,7 contain the special status set information. Depending upon whether a read or write operation is specified, the special status set functions will be different.

For read operations:

1. A setting of bits C2.6,7 = 00 specifies no special status setting.
2. Setting bits C2.6,7 = 01 sets bits 4 and 5 of the P register with the value of bits 6 and 7 of byte 3 of the address source before the address is updated. The T register bits 0–3 are reset.
3. Setting bits C2.6,7 = 10 sets bits 6 and 7 of the T register with the value of bits 6 and 7 of byte 3 of the address source before the address is updated. The T register bits o–3 are reset.
4. Setting bits C2.6,7 = 11 allows the subform field (C0.2–4) to specify a read key operation.

For store operations:

1. Setting bits C2.6,7 = 00 results in no special status setting.
2. Setting bits C2.6,7 = 01 causes the bytes of data that are to be stored into the main storage unit to depend upon the setting of bits o–3 of the T register. Each bit of the T register corresponds to a byte of the source data. Any bit (o–3 of T) that is set to a logical one results in the corresponding byte of the data source to be stored.
3. Setting bits C2.6,7 = 01 results in updating of the address or count but no storing of data takes place.
4. Setting bits C2.6,7 = 11 causes the subform field bits C0.2–4 to specify a store key operation.

Bits C3.0–3 are the normal next control word address bits and these bits are gated into bits M3.0–3 (N3.0–3) when the address bits of the next control word are formed.

When bit C3.4 = 1, the decrement count facility is in effect. The count is always decremented by the value that the address is updated. The addressing count must be in the odd register an even/odd pair of local storage registers. The address is in the even-numbered register location and the count is in the odd register next higher numbered location. The count is in bytes 2 and 3 of the odd register. When decrement count only is specified, the count must still be in the odd register.

Arithmetic Words—FIG. 21 and FIG. 22

There are two types of arithmetic words:

Type 10 which can specify a variety of arithmetic and logical functions including full word binary arithmetic and full word shifting; and Type 11 which can perform Exclusive-OR and true add functions on a byte basis only. One of the primary functions of this type arithmetic word is for crossing portions of the A register inputs to the ALU.

The arithmetic word operates on data from local storage units 5 and 6 or from certain external registers 7. When an external register is used it is always the A-source of the operation. The B-source is either local storage data or a hexadecimal value that is specified by the K-field of the word. Both arithmetic word types can utilize indirect byte addressing and each has a branching facility.

There are four format arrangements for the arithmetic word, two of which are illustrated in the FIGS. 21 and 22. FIG. 21 illustrates a type 11 arithmetic word in which only a byte can be operated upon. FIG. 22 illustrates a type 10 arithmetic word in which only one byte can be operated upon. Both of the word types illustrated in the charts of FIGS. 21 and 22 are of the type in which no indirect byte addressing function can be designated. With particular reference to FIG. 12 it will be seen that indirect byte addressing is achieved in addressing local storage units on lines 3, 6 and 7 inclusive of the chart of FIG. 12. Therefore addressing of local store or external registers in the examples of FIGS. 21 and 22 can be utilized in those cases where addressing is of the type illustrated in the remaining direct byte addressing formats. The indirect byte addressing formats can be utilized with formats which are the same as those illustrated in FIGS. 21 and 22 except that byte addressing is specified by bits 4–7 of the T register. This will be described in greater detail below.

Figure 25:
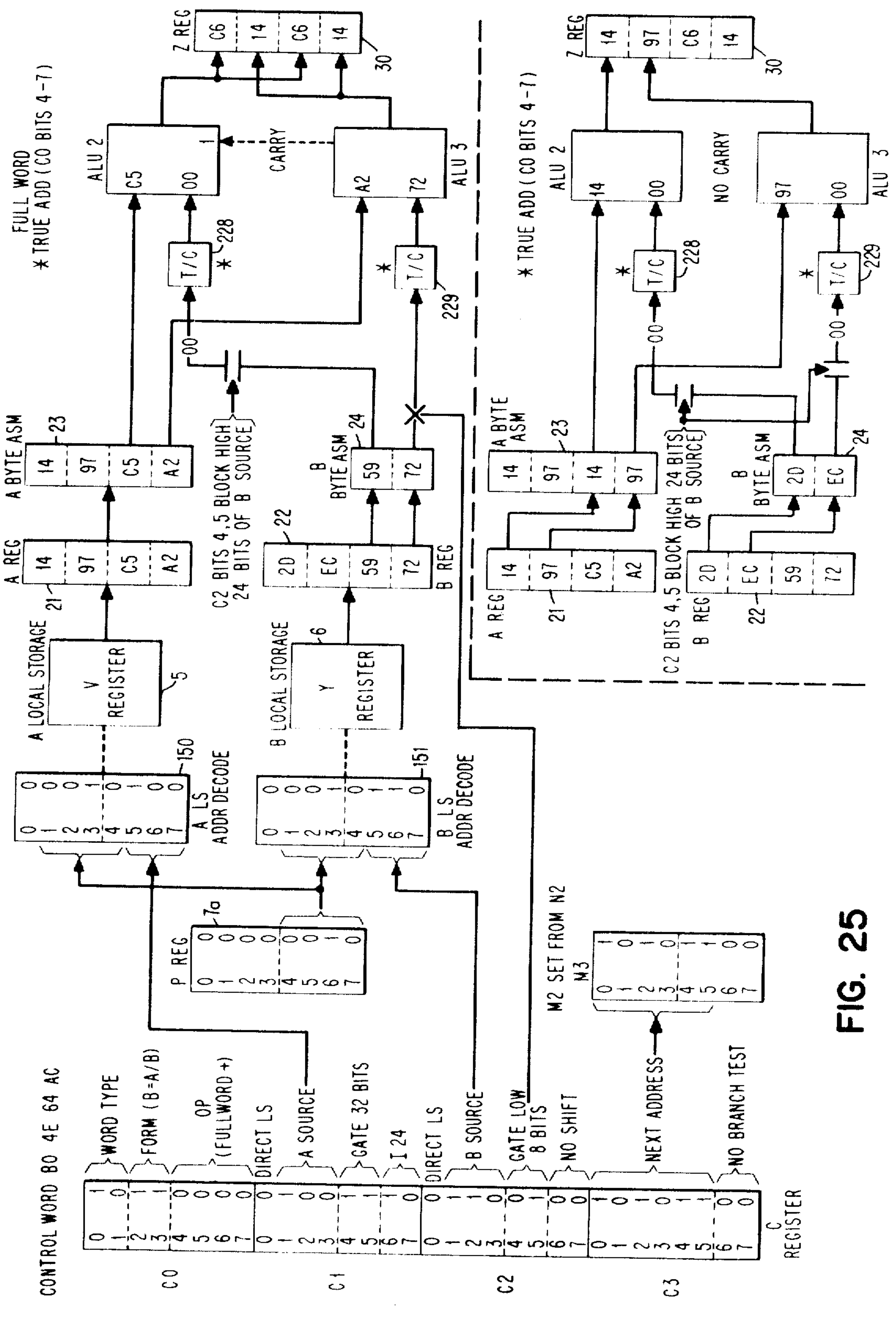
Figure 26:
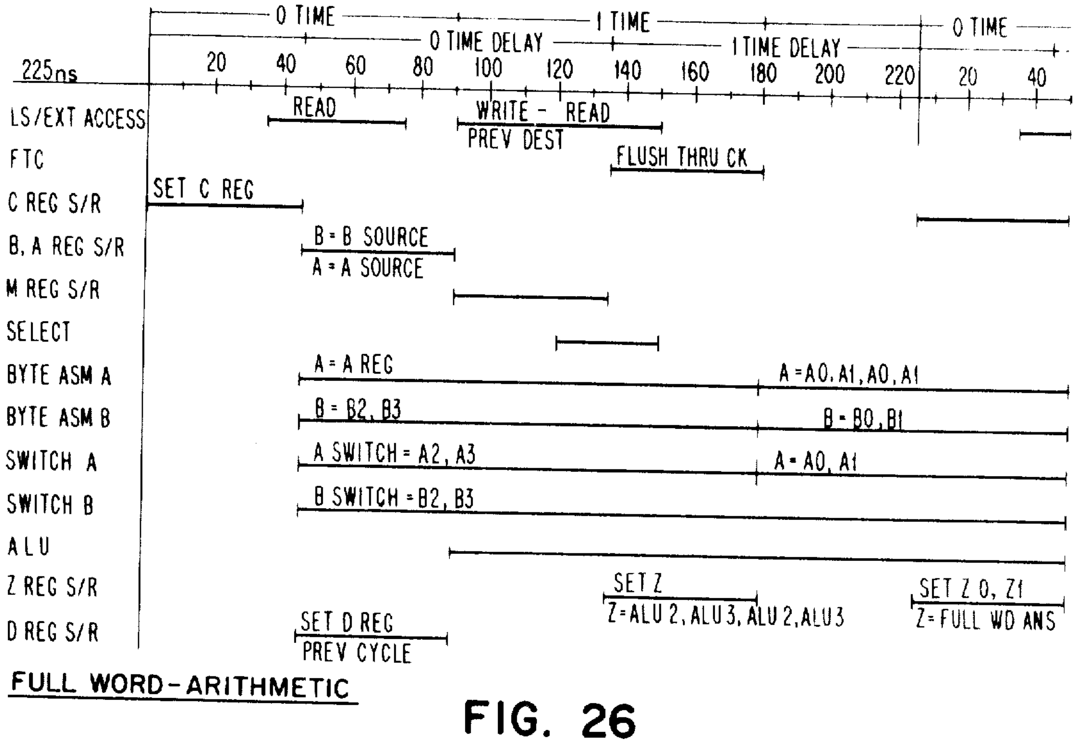

The remaining arithmetic word format which has not been illustrated in the format charts of FIGS. 14–22 inclusive is described fully in the full word execution example explained in the diagrammatic illustration of FIG. 25 and its corresponding timing chart, FIG. 26.

In FIG. 21 bits C0.0,1 = 11 call for an arithmetic word. C0.2,3 specifies the form of the word. When C0.2,3 = 00 the result of an arithmetic operation is destined to the A source after the A source and a constant K have been operated upon. When C0.2,3 = 01, A and B sources are operated upon and the result is stored in the L register. When bits C0.2,3 = 10, A and B sources are operated upon and the result is stored in the A source. When bits C0.2,3 = 11, A and B sources are operated upon and the result is stored in the B source.

Bits C0.4 specifies the operation. When C0.4 = 1, an Exclusive-OR function is performed on the source inputs. When C0.4 = 1, a true binary add is performed on the source inputs, the S register bit 0 is set to zero and no carry-in is provided. The S register bit 3 is set to the value of the carry out.

Bits C0.5–7 specify the gating of the A input to ALU2 and ALU3. When C0.5–7 = 000, gate all zeros as A inputs to ALU2 and ALU3. When C0.5–7 = 001, bits 4–7 of the A source byte are gated to ALU2 and ALU3, and zeros are gated as the high order four bits of the A source inputs to ALU2 and ALU3. When bits C0.5–7 = 010, bits o–3 of the A source byte are gated to both the ALU2 and the ALU3, and zeros are gated as the low order four bits of the A source input to ALU2 and ALU3. When bits C0.5–7 = 011, the eight bits of the A source byte are gated directly to ALU2 and ALU3. When bits C0.5–7 = 100, all zeros are gated as A inputs to ALU2 and ALU3. When bits C0.5–7 = 101, the high and low order four bits of the A source byte are crossed before gating and the A input bits o–3 which are now in the low order positions are gated into the four low-order positions of ALU2 and ALU3; and zeros are gated into the high four order bits of the ALU2 and ALU3. When bits C0.5–7 = 110, the A source is crossed before gating and then the A bits 4–7 which are now the high-order four bits are gated into the high order bits of ALU2 and ALU3 while zeros are gated into the four low order bits of ALU2 and ALU3. When bits C0.5–7 = 111, the four high and four low order bits of the A source byte are crossed then gated into ALU2 and ALU3. The original 0–3 bits are now gated as low order bits 4–7 and the original low order bits 4–7 are gated as high order bits 0–3.

Bits C1.0–3 specify the local storage or external register word which is to be the A input to the ALU using the forms chart of FIG. 12. Bits C1.4,5 specify the byte of the A source word which is to be operated upon in the ALU. Bits C1.6,7 specify the status set functions. When bits C1.6,7 = 00 no status is set. When bits Cl.6,7 = 01 in binary operations, bit 1 of the S register is set to the value of the carry out of byte 1 of the result. Bit 2 of the S register is set to a logical one if the ALU result is not zero. Bit 2 of the S register is unchanged if the result is zero. In decimal operations bit 1 of the S register is set to a logical one if an invalid decimal digit is detected on either the A or B inputs. S1 is not changed if the inputs are valid. Bit 2 of the S register is set to a logical one if the ALU result is not zero. Bit 2 of the S register is not changed if the ALU result is zero.

When bits C1.6,7 = 10, bit 4 of the S register is set to a logical one if bits 0–3 of the ALU result are all zeros. Bit 4 of the S register is set to a logical zero if bits 0–3 of the ALU result are not all zero. Bit 5 of the S register is set to a logical one if bits 4–7 of the ALU result are all zero, and it is set to a logical zero if bits 4–7 of the ALU result are not all zero.

When bits C1.6,7 = 11, bit 4 of the S register is set to a logical one if bits 0–5 of the ALU result are all zero and is set to a logical zero if bits 0–5 of the ALU result are not all zero. Bit 5 of the S register is set to a logical one if bits 4–7 of the ALU result are all zero and it is set to a logical zero if bits 4–7 of the ALU result are not all zero. In the event that the S register bit branching is specified by the control word, the branch testing is done before the S bits are modified by the operation.

Bits C2.0–5 specify the local storage byte that is to be used as the B input to ALU2 and ALU3 using the address formation charts of FIG. 12.

Bits C2.6,7 specify the type of gating for the A source inputs to ALU2 and ALU3. When bits C2.6,7 = 00, all zeros are applied as the B input. When bits C2.6,7 = 01, the low order four bits of the B source only are gated to ALU2 and ALU3, and zeros are gated as the high-order four-bit inputs to the ALU2 and ALU3. When bits C2.6,7 = 01, the four high-order bits of the B source are gated to the high-order positions of ALU2 and ALU3, and zeros are gated as the low-order four-bit inputs to ALU2 and ALU3. When bits C2.6,7 = 11, all 8 bits of the B source are gated to ALU2 and ALU3.

In the event that forms *A=A/K* or *Z=A/K*, bits C2.0–7 represent the *K* value to be used as the B input to the ALU2 and ALU3.

Bits C3.0–5 are the next address field and these bits are gated to the M3 register to form a part of the next control word address. Bits C3.0–5 are gated to bits 0–5 of the M3 register when the next address formation takes place. If branching is specified by bits C3.6,7 the status of the bits tested is OR'ed with bits C3.4,5 as the next address is set up.

The branch test bits C3.6,7 specify the type of branch testing to be done to set up part of the next control word address. When bits C3.6,7 = 00, there is no branch testing. When bits C3.6,7 = 01, the status of bits 2 and 3 of the S register is tested. These values are OR'ed with bits C3.4,5 and the result is set into bits M3.4,5. When bits C3.6,7 = 10, the status of bits 4 and 5 of the S register is tested. These values are OR'ed with bits C3.4,5 and the result is set into bits M3.4,5. When bits C3.6,7 = 11, bits 6 and 7 of the S register are tested; these values are OR'ed with the values of bits C3.4,5; and the result is set into bits M3.4,5.

In FIG. 22, bits C0.0–1 specify the arithmetic word type 10.

Bits C0.2,3 specify the form field identifying which inputs are to be used and where the ALU result is to be destined. There are five forms provided. When bits C0.2,3 = 00, on *A* source is specified; a *K* value for a B source is specified; and the result is destined alternatively to the *A* source or to the *Z* register depending upon bits in the operation field C0.4–7. The form *A=A/K* is used when the operation field has a value from 0000 to 1100. The form *Z=A/K* is used when the operation field has a value from 1100 to 1111.

When bits C0.2,3 = 01, *A* and B sources are operated upon, the result is set into the *Z* register. When bits C0.2,3 = 10, *A* and B sources are operated upon and the result is set into the *A* source register. When bits C0.2,3 = 11, *A* and B sources are operated upon and the result is stored in the B source register.

In the forms $Z=A/B$ and $Z=A/K$, the ALU result is not actually destined. The result is gated into the Z register in the normal manner where the data can be tested to set certain S register positions and is thereafter not required.

Bits C0.4–7 form the operation field. Control of certain ALU inputs and ALU functions is determined by the value of this field. Setting or resetting of certain S register bits is also controlled by this field. When bits C0.4–7 = 0011, an Exclusive-OR function is performed on the A and B sources. When bits C0.4–7 = 0100, a true binary add with no carry-in is performed on the sources. When C0.4–7 = 0101, a true binary add with a carry-in of one is performed. When C0.4—7 =0110, a true binary add function is performed on the sources, the S register bit 0 is set to a logical zero; there is no carry-in; and bit 3 of the S register is set to the value of the carryout. When C0.4–7 = 0111, an AND function is performed on the A and B sources. When bits C0.4–7 = 1000, the A and B sources are OR'ed. When bits C0.4–7 = 1001, a binary add operation is performed. If bit 0 of the S register equals 0, a true add is performed; and, if bit S0 equals 1, a complement add is performed. Bit 3 of the S register is set with the value of the carryout. When bits C0.4–7 = 1011, an Exclusive-OR function is performed. If a parity error is detected on the A input to ALU2 and ALU3, bit 4 of the S register is set to a logical one. When bits C0.4–7 = 1100, a complement binary add function is performed with no carry-in. When bits C0.4–7 = 1101, a complement binary add function is performed with a carry-in of one. When bits C0.4–7 = 1110, a complement binary add function is performed; bit 0 of the S register is set to a logical one; a carry-in of one is provided; and bit 3 of the S register is set to the value of the carryout. When bits C0.4–7 = 1111, a complement AND function is performed, with the B input to ALU2 and ALU3 being complemented before the AND function is performed.

The bit definitions for bits C1.0–7, bits C2.0–7 and bits C3.0–7 are similar to those described above with respect to FIG. 21 except that bits C2.6,7 control the A source rather than the B source.

As indicated above, indirect byte addressing may be used with both types of word formats described with respect to FIGS. 21 and 22. With particular reference to FIG. 12, it can be seen that indirect byte addressing is utilized when bits C1.0–2 and bits C2.0–2 are equal to 101, or 111 and when bit 3 of the P register is equal to zero. Indirect byte-addressing means that the byte source A or the byte source B or both are addressed by T register bits rather than by bits in the control word itself. The A source byte is addressed by bits 4 and 5 of the T register whereas the B source byte is addressed by bits 6 and 7 of the T register. For example, when bits T4,5 equal 00, byte 0 of the A source is used; when bits T4,5 equals 01, byte 1 of the A source is used; when bits T4,5 equals 10, byte 2 of the A source is addressed; and when bits T4,5 equal 11, byte 3 of the A source is addressed. Selection of the B source byte to be utilized is accomplished in the same way by bits 6 and 7 of the T register.

Bits 4 and 5 of the T register and bits 6 and 7 of the T register can be incremented or decremented during the operation, depending upon the setting of bits C1.4,5 to 10 or 11 and bits C2.4,5 being set to 10 or 11. The byte destination for indirect byte addressing operations is the same as the source byte.

The indirect byte operation is particularly useful in the preferred embodiment of the improved system since it can improve performance of the system by repeated execution until some branch test condition is met. This operation will not be further described since it is fully described in a copending application, Ser. No. 670,919, filed Sept. 27, 1967, in the name of K. A. Bell et al. and assigned to the same assignee as is the present application. Said copending application is incroporated herein by reference as if it were set forth fully herein.

Figure 4:
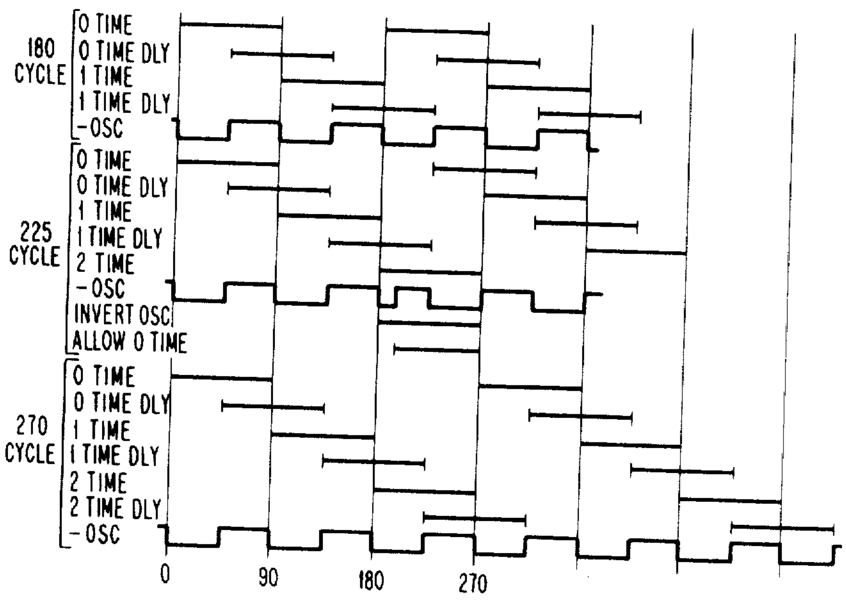
FIG. 4 is a timing diagram of the basic clock cycles.
Figure 3:
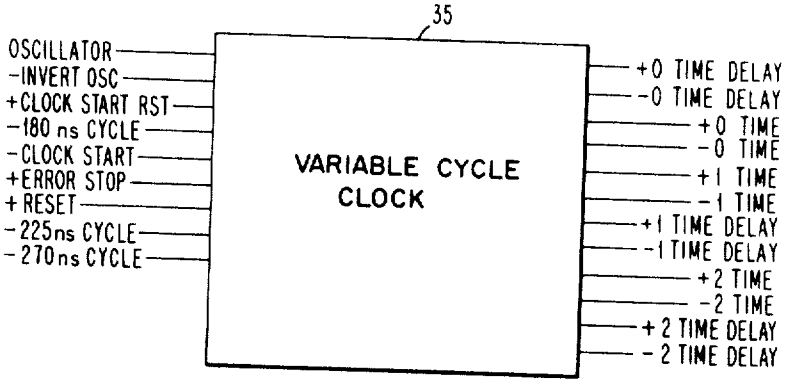
FIG. 3 diagrammatically illustrates a preferred form of the variable cycle clock with its input and output connections.
Figure 5:
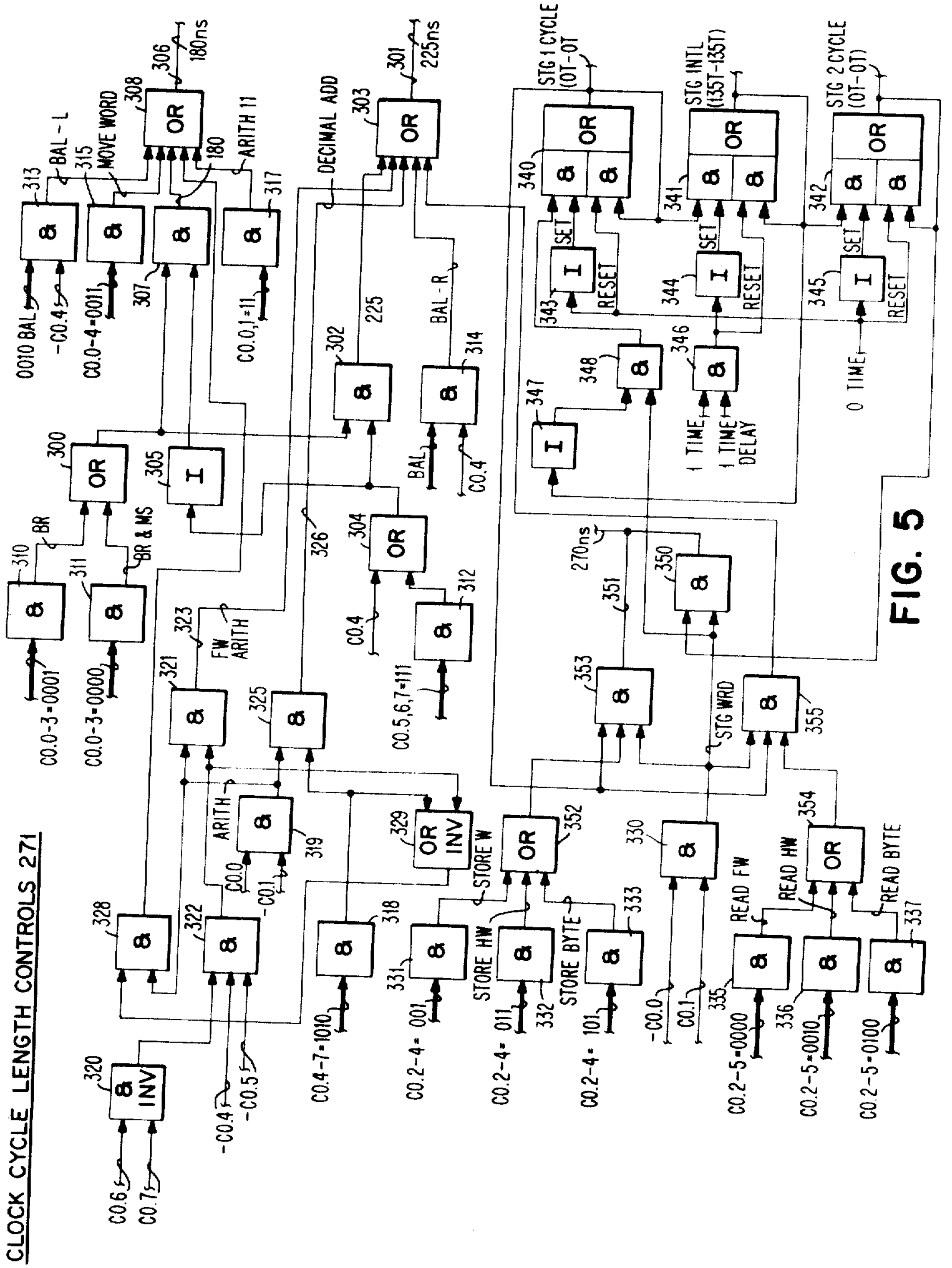
FIG. 5 is a schematic diagram of the control circuits which cause the various machine cycles to have a preselected clock interval time.

System Clock and Controls—FIGS. 3–5

Each system clock 35 as illustrated in FIG. 3 comprises a plurality of inputs and in turn produces a plurality of outputs, each of which has a time duration of 90 nanoseconds and is displaced in time from the preceding signal by approximately 45 nanoseconds in the preferred embodiment.

The details of a preferred form of each clock 35 are set forth fully in a publication named the IBM Technical Disclosure Bulletin, Vol. 12, No. 1, pages 71–73, inclusive, published June 1969. The true (−), complement (+) symbols of the publication have been used in FIG. 3; however, in all other portions of the drawings and specification the symbol for complement is "−" and no symbol indicates true.

Briefly, the clock includes a plurality of direct current latches (not shown) each of which produces a corresponding true and complement output for the zero time, zero time delay, one time, one time delay, two time and two time delay. These latches respond to the rising and falling edges of the input signal from the oscillator 36 (FIG. 1) under the control of input signals −180 nanosecond cycle, −225 nanosecond cycle and −270 nanosecond cycle which determine the length of the cycles of be executed.

Starting of the clock for each cycle is determined by the + Clock Start Reset line and the − Clock Start line. The clock can be reset to its initial condition by the application of a signal to the + Reset input. A + Error Stop input is provided for forcing the clock to keep taking zero time cycles until the error signal is eliminated.

As seen in FIG. 4, each of the signals such as zero time, zero time delay, one time, etc. has a duration of 90 nanoseconds and each has a displacement or time delay of 45 nanoseconds with respect to the preceding one. Thus, zero time delay is delayed 45 nanoseconds from zero time; one time is delayed 45 nanoseconds from zero time; and one time delay is delayed another 45 nanoseconds, etc. The oscillator input signal levels are also illustrated in FIG. 4.

The clock cycle length control circuit 271 is decode lines FIG. 5 and includes the logical circuits which produce the 180 cycle, 225-nanosecond cycle, and 270-nanosecond cycle inputs to the clock 35 (corresponding to −180 nsec. cycle, −225 nsec. cycle, −270 nsec. cycle lines of FIG. 3).

The branch and branch and module switch Y decode lines BR and BR&MS are OR'ed together in OR-circuit 300 and the output of the OR-circuit 300 is applied to the 225-nanosecond control line 301 by way of an AND-circuit 302 and OR-circuit 303 when the branch high bits (C0.4–7 > 0111, i.e., when the branch high bits require testing of the branch source to set M3.4 for selecting the next control word, a 225 nsec. cycle is required. Thus, the bit C0.4 line (i.e., C0.4 has a value of 1000) is OR'ed with the output of AND-circuit 312 which decodes bits C0.5–7 = 111, and the output of the OR-circuit 304 is applied as one input to the AND-circuit 302.

When bits C0.4–7 < 0111, i.e., a fixed branch or testing of an S register bit, the output of the OR-circuit 304 is inverted by circuit 305 and applied to the 180-nanosecond cycle control line 306 by way of an AND-circuit 307 and an OR-circuit 308 to initiate a 180 nsec. cycle.

When a branch and link word (C0.0–3 = 0010) is decoded, the decode line BAL (Branch and Link) is applied alternatively to the OR-circuit 308 by way of an AND-circuit 313 or to the OR-circuit 303 by way of an AND-circuit 314 depending upon whether bit C0.4 is equal to zero (a link word) or one (a return word), respectively.

An AND-circuit 315 decodes the move word (C0.0–3 = 0011) and its output is applied to the OR-circuit 308 to produce a 180-nanosecond cycle.

The arithmetic full word is specified by C0.1,2 = 10 and C0.4–7 being equal to 0000, 0001 or 0010. Decode of the arithmetic full word is achieved in part by decoding bits C0.0,1 = 10 in AND-circuit 319 to obtain the 10 form of the arithmetic word. Bits C0.6,7 are decoded in an AND-INVERT circuit 320, and the output of the circuit 320 is applied to an AND-circuit 322. Bits −C0.4 and −C0.5 also form inputs to the circuit 322. The outputs of circuits 319 and 322 are applied as inputs to an AND-circuit 321, the output of which is the full word arithmetic decode line 323. A signal on line 323 produces a 225-nanosecond cycle since it is applied as one input to the OR-circuit 303.

The 10 form of the arithmetic word applies a signal to the OR-circuit 308 by way of AND-circuit 328 to produce 180 nsec. machine cycles in all instances except for the full word and decimal operations. To achieve this, the output of AND-circuit 319 is applied to the AND-circuit 328. A decode circuit 318 applies a signal to an OR invert circuit 329 when it decodes bits C0.4–7 = 1010 which indicates a decimal operation. The AND-circuit 322 used to decode full word arithmetic operations is also coupled to an input of circuit 329. Circuit 329 produces an output only when both inputs are not present (e.g., neither a decimal or full word operation) to cause AND-circuit 328 to apply a signal to the OR-circuit 308 for a 180 nsec. cycle.

The decode of the 10 arithmetic word by AND-circuit 319 together with the decode of bits C0.4–7 = 1010 (e.g., decimal operation) produces at the output of an AND-circuit 325, decimal add decode line 326, a signal which is applied to the 225-nanosecond cycle control line 301 by way of the OR-circuit 303.

An AND-circuit 317 decodes bits C0.0,1 = 11 for each 11 form of arithmetic word and applies a signal to one input of the OR-circuit 308 to cause 180-nanosecond cycle to be executed.

Decode of the storage word form bits C0.01 = 01 in AND-circuit 330 initiates the cycling of three polarity hold latches 340, 341 and 342 which are set to their logical one conditions in sequence to produce at their outputs storage 1 cycle time, a storage interlock time and a storage 2 cycle time. The first polarity hold latch 340 is set by the OT signal at zero time during the first cycle; the polarity hold latch 341 is set by the 1T signal at one time during the first cycle, and the polarity hold latch 342 is set by the OT signal at zero time of the second cycle as will be described below.

The storage 1 and storage 2 cycle times are used together with the decode of the storage word bits and its subform bits to select a 225-nanosecond cycle or a 270-nanosecond cycle during the storage 1 cycle of a storage word and to select a 270-nanosecond cycle during the storage 2 cycle.

Thus, the storage word decode output line from AND-circuit 330 and the storage 2 cycle line are applied to an AND-circuit 350 to cause the 270-nanosecond cycle control line 351 to be energized during all storage 2 cycles.

During a storage 1 cycle, AND-circuits 331, 332 and 333 decode a store word, store half word, and store byte respectively; and their outputs are applied to an OR-circuit 352, the output of which is applied to an AND-circuit 353. The storage 1 cycle line is also applied as one input of the AND-circuit 353 and the storage word decode line from AND-circuit 330 forms the third input to the AND-circuit 353. Thus, during a storage 1 cycle if the subform of the word is a store word, store half word or store byte, the OR-circuit 352 and the AND-circuit 330 will cause the AND-circuit 353 to produce an output signal on the 270-nanosecond cycle control line 351.

When the subform of the storage word is a read full word, read half word, or read byte, AND-circuits 335, 336 or 337 respectively decode the subform. Their outputs are connected to an OR-circuit 354 which together with storage 1 cycle line and the storage word decode line cause an AND-circuit 355 to produce an output signal which is applied to the 225-nanosecond cycle control line 301 by way of the OR-circuit 303.

The setting of the latches 340–342 will now be described in more detail. The set/reset for latches 340 and 342 are provided by inverters 343 and 345 and the input clock signal 0 Time. An inverter 344, an AND-circuit 346 and input clock lines 1 Time and 1 Time Delay provide the set/reset function for latch 341.

An inverter 347 and an AND-circuit 348 cause setting of latch 340 during the first cycle of a storage word and inhibit the setting of latch 340 during the second cycle.

Figure 6A:
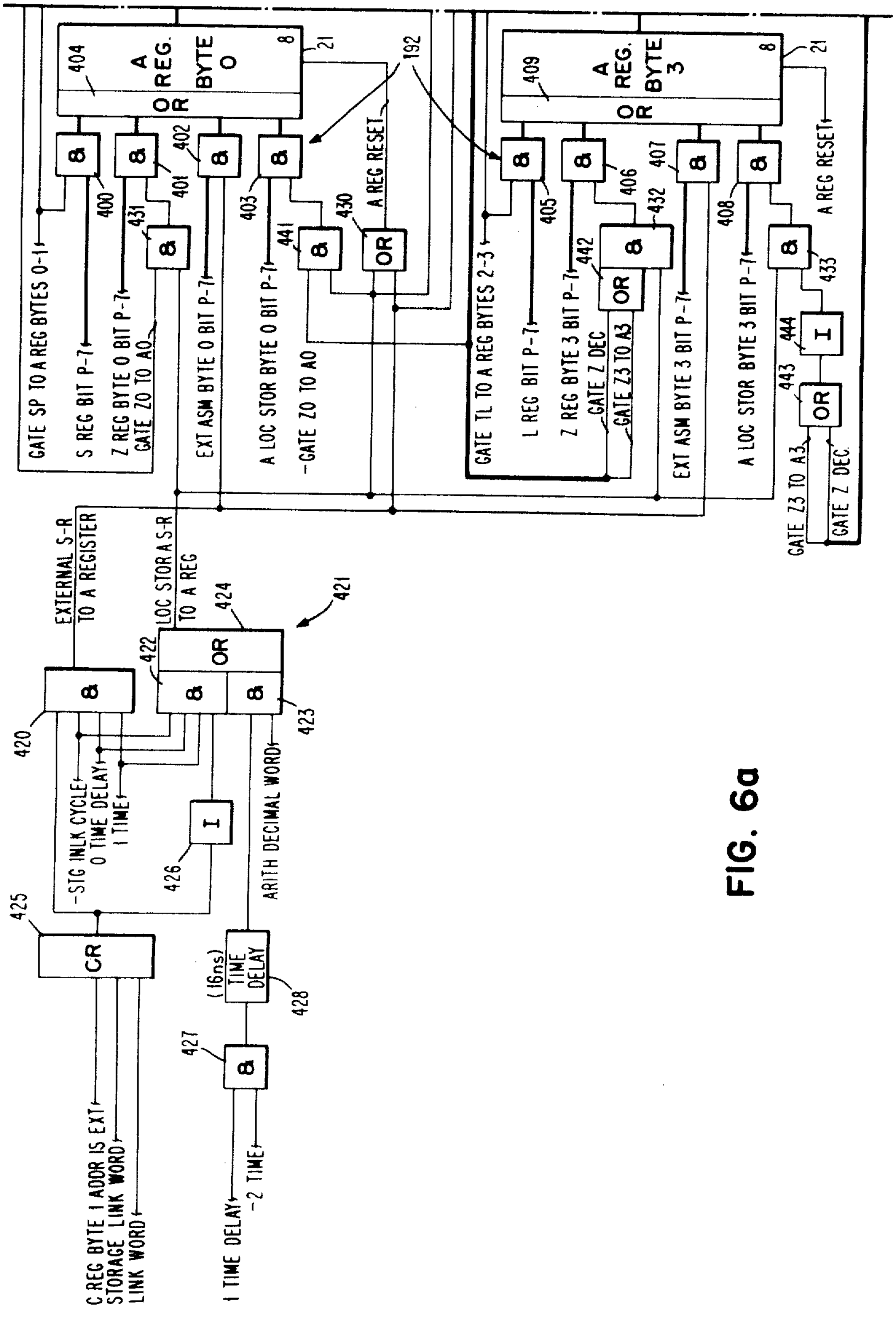
Figure 6B:
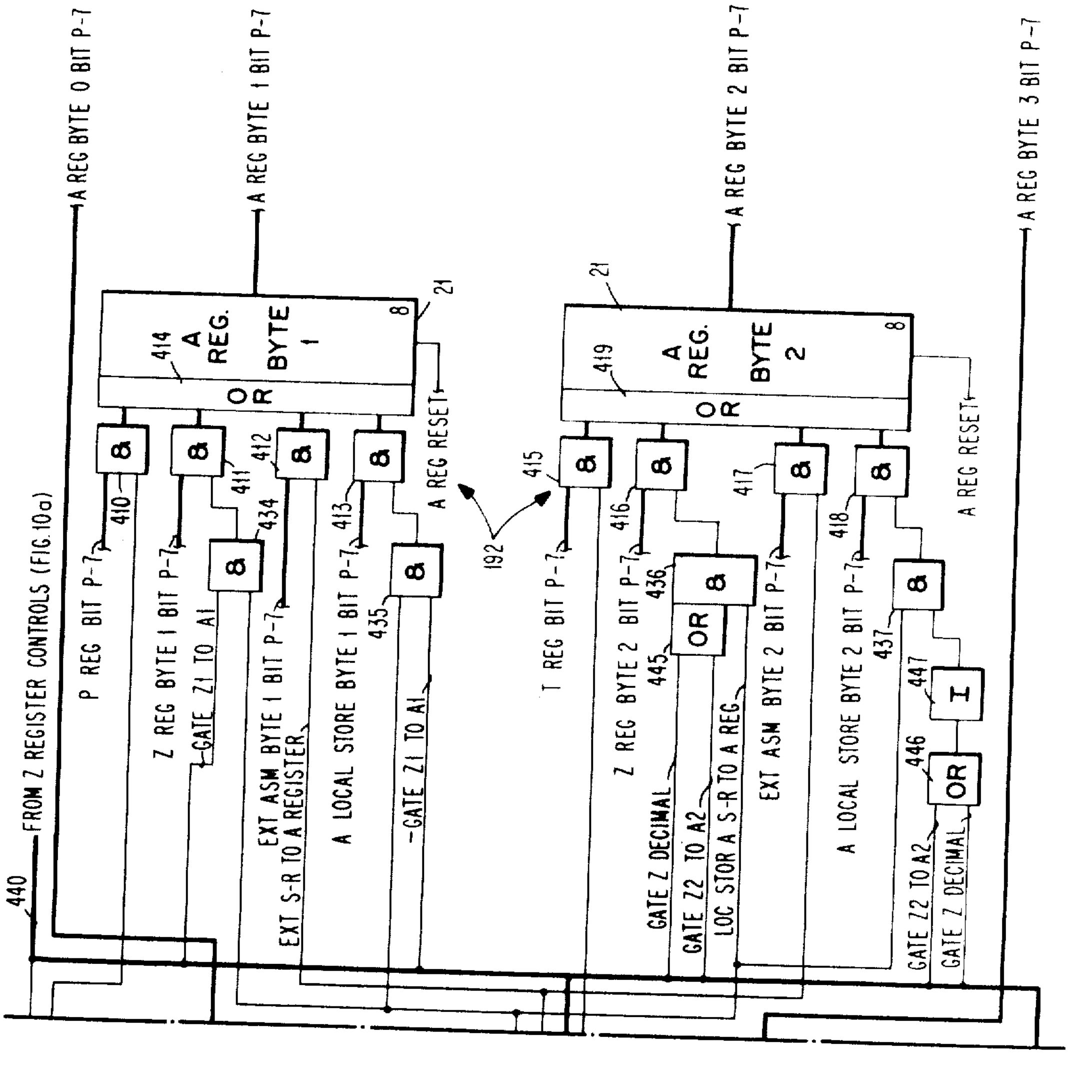

A Register 21–FIGS. 6a and 6b

Bytes 0 and 3 of the A register 21 are shown in FIG. 6a and bytes 1 and 2 are shown in FIG. 6b. The input gating circuits 192 for the A register comprise AND-circuits 400–403 and an OR-circuit 404 for byte 0, AND-circuits 405–408 and OR circuit 409 for byte 3, AND-circuits 410–413 and OR-circuit 414 for byte 1, AND-circuits 415–418 and OR-circuit 419 for the byte 2 portion.

Two set/reset lines are provided for the A register. The first line External Set/Reset To A Register and the second Line Local Store A Set/Reset To A register are shown as outputs of a pair of logic circuits 420 and 421. The logic circuit 420 is an AND circuit and the logic circuit 421 comprises a pair of AND-circuits 422 and 423 and an OR-circuit 424.

One input to the AND-circuit 420 is provided by the output of an OR-circuit 425. The inputs to the OR-circuit 425 originate in the control decode circuits 270 which are coupled to the output of the C register 2 shown in FIG. 2f. The first of these lines C Register Byte 1 Address Is External. The second input to the OR-circuit 425 is the line Storage Link Word and the third input to the OR circuit 425 is the line Link Word.

A second input to the AND-circuit 420 is the line –Storage Interlock Cycle which originates in the cycle length control portion 271 of the control decode circuits 270. Third and fourth inputs to the AND-circuit 420 are the clock outputs 0 Time Delay and 1 Time. The –Storage Interlock Cycle line, 0 Time Delay and 1 Time Delay lines are also coupled to the inputs of AND-circuit 422. The output of the OR-circuit 425 is inverted in the invert circuit 426 and applied as a fourth input to the AND-circuit 422.

The clock outputs 1 Time Delay and –2 time are applied as inputs to an AND-circuit 427, the output of which is coupled to the input of the AND-circuit 423 by way of a delay circuit 428. The other input to the AND-circuit 423 is the line Arithmetic Decimal Word which originates in the control decode circuits 270.

The line External Set/Reset To A Register is applied to the AND-circuit 402 for gating the External Assembler Byte 0 bits P–7 into the A register byte 0. This same set/reset line is also applied to the A register bytes 0, 1, 2 and 3 by way of an OR-circuit 430 and its output line A Register Reset. The External Set/Reset To A Register line is also applied to the AND-circuit 407 to gate the External Assembler Byte 3 bits P–7 to the A register byte 3, to AND-circuit 412 to gate External Assembler Byte 1 bits P–7 to the A register byte 1 and to AND-circuit 417 to gate External Assembler Byte 2 bits P–7 to the A register byte 2.

The line Local Store A Set/Reset To A Register is also applied to the A register byte 0 by way of the OR-circuit 430 and the line A Register Reset line. As indicated above, this line A Register Reset is also applied to bytes 1, 2 and 3 of the A register. The line Local Store A Set/Reset To A Register is also applied to an AND-circuit 431 for gating the Z Register Byte 0 bits P–7 to the A Register Byte 0 by way of the AND-circuit 401, is applied to an AND-circuit 432 for gating the Z Register Byte 3 bits P–7 to the A register byte 3 by way of AND-circuit 406, is applied to an AND-circuit 433 for gating the A Local Store Byte 3 bits P–7 to the A register byte 3 by way of AND-circuit 408, is applied to an AND-circuit 434 for gating the Z Register Byte 1 bits P–7 to the A register byte 1 by way of AND-circuit 411, is applied to an AND-circuit 435 for gating A Local Store Byte 1 bits P–7 to the A register byte 1 by way of AND-circuit 413, is applied to an AND-circuit 436 for gating the Z Register Byte 2 bits 2–7 to the A register byte 2 by way of AND-circuit 416 and is applied to To AND-circuit 437 for gating the A Local Store Byte 2 bits 2–7 to the A register byte 2 by way of AND-circuit 418.

Gating of the Z register bytes to the A register alternative to gating the A local store bytes to the A register for destination look-ahead function is dependent upon the Z register controls illustrated more fully in FIGS. 10a and 10b which will be described in detail later. However, an output cable 440 (FIG. 6b) from the Z register controls of FIG. 10b is applied to the various input gating circuits for the A register. The cable 440 includes a first gate control line Gate Z0 To A0 which is applied as a second input to the AND-circuit 431. The complementary line, –Gate Z0 To A0, is applied to an AND-circuit 441 which is utilized to gate the A Local Store Byte 0 bits P–7 to the A register byte 0 by way of AND-circuit 403. The other input to the AND-circuit 441 is the line Local Store A Set/Reset To A Register. Thus, in control words where A local storage is accessed as an A source, either the AND-circuit 431 or the AND-circuit 441 is effective depending upon the destination look-ahead mechanism 41 (FIG. 1) to gate the Z register byte 0 bits or the A local store byte 0 bits to the A register byte 0.

In those control word executions which require gating of the SPTL register 7*a* to the A register, the AND-gates 400, 405, 410 and 415 are utilized. The input line Gate SP To A Register Byte 0–1 is applied as an input to the AND-circuits 400 and 410. The line Gate TL To A Register Bytes 2–3 is applied as an input to AND-circuits 405 and 415. The other inputs to the AND-circuits 400, 405, 410 and 415 are the S register, L register, P register and T register bits, respectively.

Attention is directed to the fact that, for ease of description, only one circuit such as AND-circuit 400 is shown although nine of such circuits are required, one for each bit P–7 of the S register data bits to be gated to the respective A register bit position. Each of the AND circuits represented by AND-circuit 400 has applied thereto the gate line Gate SP To A Register Bytes 0–1 and a respective S register bit. This same representation is true for each of the AND-circuits 400–418, inclusive, to each of the OR-circuits 404, 409, 414 and 419.

The control lines Gate Z Decimal and Gate Z3 To A3 (FIG. 6*a*) of the cable 440 are applied to an OR-circuit 442 which forms a second input to the AND-circuit 432. These same control lines are also applied to an OR-circuit 443 which is applied as one input to the AND-circuit 433 by way of an inverter 444. When the A local storage unit 5 is accessed as an A source, either the AND-circuit 432 or the AND-circuit 433 will cause gating of the Z Register Byte 3 or the A Local Store Byte 3 bits to the A register byte 3 by way of AND-circuits 406 or 408, depending upon the destination look-ahead mechanism 41 of FIG. 1.

The control line Gate Z1 To A1 (FIG. 6*b*) of the cable 440 is applied as a second input to the AND-circuit 434. Its complementary line –Gate Z1 to A1 is applied as a second input to the AND-circuit 435. Thus, either the AND-circuit 434 or the AND-circuit 435 will be effective when the A local store unit 5 is accessed as an A source to couple the Z Register Byte 1 bits or the A Local Store Byte 1 bits to the A register byte 1 by way of AND-circuits 411 or 413, depending upon the destination look-ahead mechanism 41.

The control lines Gate Z Decimal and Gate Z2 To A2 are applied as inputs to an OR-circuit 445 which forms a second input to the AND-circuit 436. These same control lines are applied as a second input to the AND-circuit 437 by way of an OR-circuit 446 and an inverter 447. Thus, when the local storage unit 5 is accessed as an A source, either the AND-circuit 436 or the AND-circuit 437 will be effective to gate the Z Register Byte 2 bits or the A Local Store Byte 2 bits to the A register byte 2 by way of AND-circuits 416 or 418, depending upon the destination look-ahead mechanism 41.

Figure 7A:
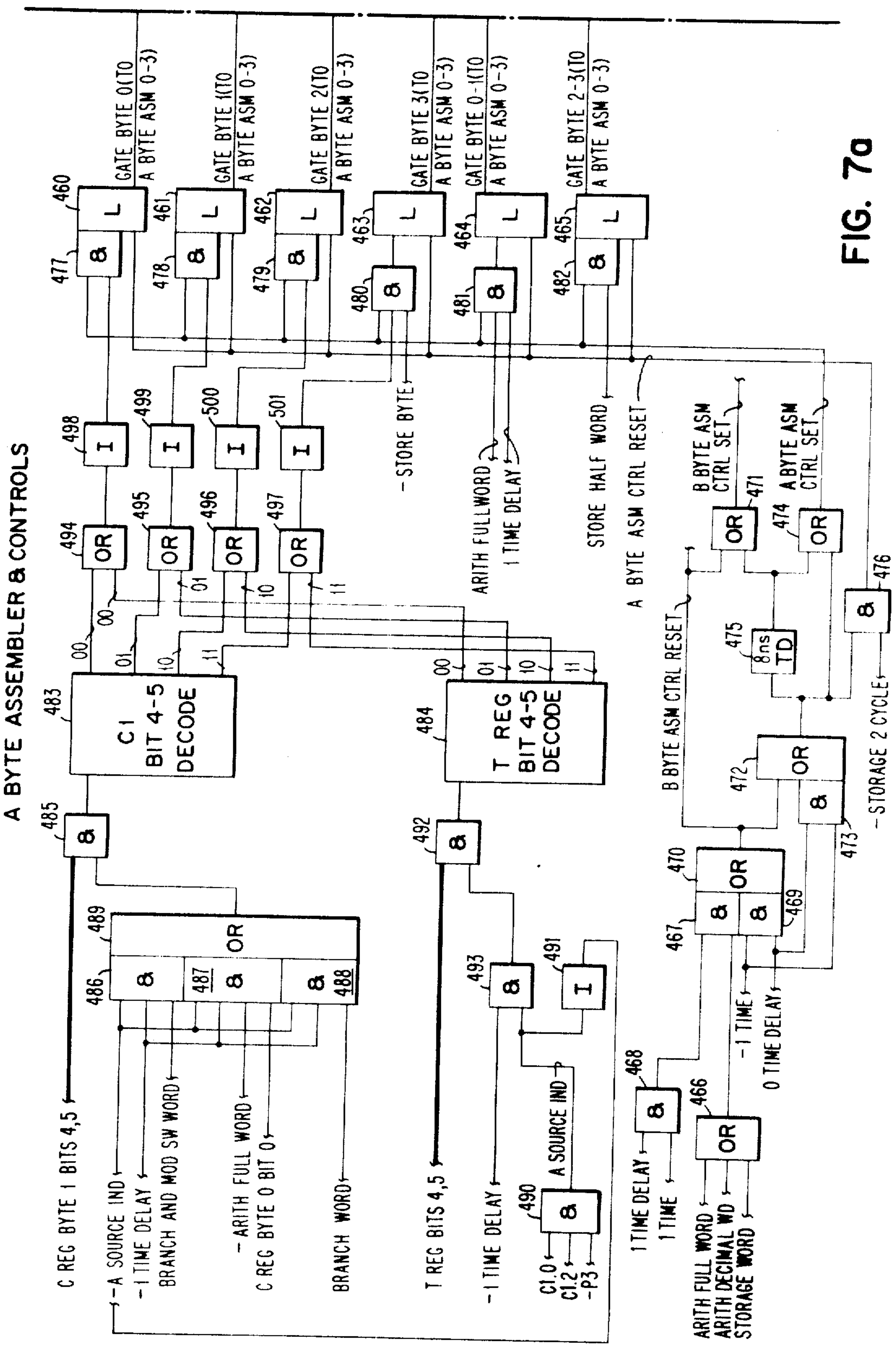
Figure 7B:
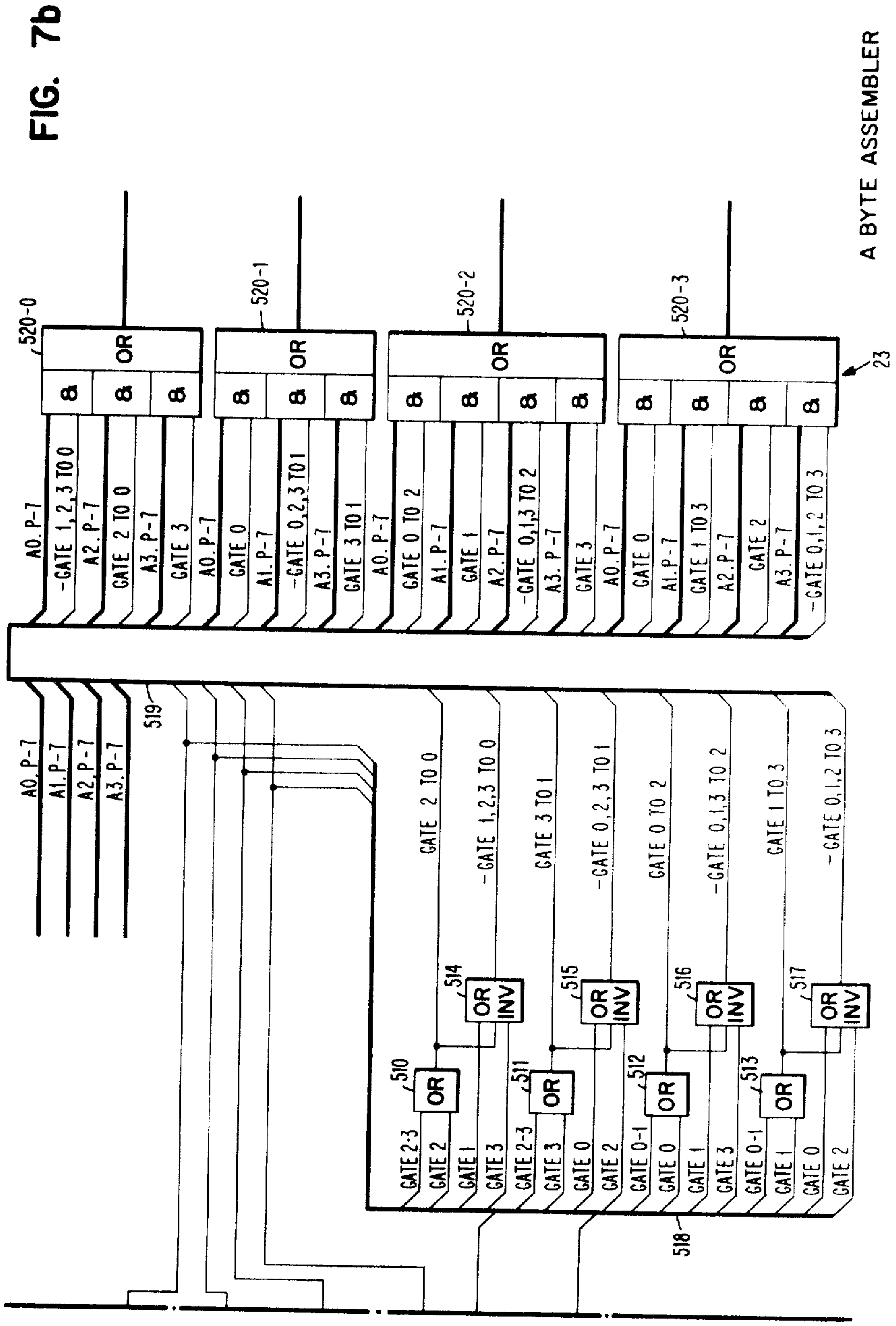

A Byte Assembler and Controls–FIGS. 7*a*, 7*b*

The A byte assembler 23 is illustrated in FIG. 7*b* and its controls are illustrated primarily in FIG. 7*a*. The controls include a plurality of latches 460–465, the outputs of which are used to selectively gate various output bytes from the A register to selected bytes in the A byte assembler 23.

The set/reset signals for the latches 460–465 are provided by means including an OR-circuit 466, the inputs to which are the decode lines Arithmetic Full Word, Arithmetic Decimal Word and Storage Word. The output of the OR-circuit 466 is applied to an AND-circuit 467, the other input to which is the output of an AND-circuit 468. The and-circuit 468 includes two inputs from the clock circuits 35, the 1 Time Delay and 1 Time. The clock timing lines –1 Time and 0 Time Delay are applied to an AND-circuit 469, and the outputs of the AND-circuits 467 and 469 form inputs to an OR-circuit 470.

One output of the OR-circuit 470 provides the B Byte Assembler Controls Reset line. The output of the OR-circuit 470 is also applied to an OR-circuit 471, the output of which is the line B Byte Assembler Control Set.

The output of the OR-circuit 470 is also applied to an OR-circuit 472. An AND-circuit 473 forms a second input to the OR-circuit 472 and has as its inputs the lines –1 Time and 0 Time Delay. The output of the OR-circuit 472 is applied to the inputs of the OR-circuit 471 and an additional OR-circuit 474 by way of a time delay circuit 475. The output of the OR-circuit 472 is also applied directly as another input to the OR-circuit 474. The output of the OR-circuit 474 is the line A Byte Assembler Control Set. The OR-circuit 472 also has its output applied to an AND-circuit 476, the output of which is the line A Byte Assembler Control Reset. The line –Storage 2 Cycle forms a second input to the AND-circuit 476.

The output lines A Byte Assembler Control Set and A Byte Assembler Control Reset are applied to each of the latch circuits 460–465 to control the setting and resetting thereof. The reset line is applied directly to each of the latches 460–465 whereas the set line is applied to the latches by way of AND-circuits 477–482.

Before describing the circuits which set the latches 460–465 in accordance with selected control word bit decodes, it will be recalled that byte selection as shown in FIG. 12 is determined by the values of bits C1.4,5; or, in the event of indirect byte addressing, bits T4,5. Thus, as seen in FIG. 7*a*, a C1 bit 4,5 decode circuit 483 and a T register bit 4,5 decode circuit 484 are provided.

Bits C1.4,5 are applied to the decode circuit 483 by way of an AND-circuit 485. Gating of these bits to the circuit 483 is controlled by means comprising AND-circuits 486, 487 and 488 and an OR-circuit 489. With particular reference to FIG. 12, it will be seen that indirect byte addressing is effected when bits C1.0,2 = 11 and bit P3=0. Thus, an AND-circuit 490 has as inputs thereto the bits C1.0,2 and –P3 to produce an output referred to as A Source Indirect. This line is applied to an inverter 491, and the output of the inverter is applied to each of the AND-circuits 486, 487 and 488. The line –1 Time Delay from the clock 35 is applied as a second input to the AND-circuits 486, 487 and 488. The third input to the AND-circuit 486 is the decode line Branch And Module Switch Word. The bit C0.0 forms a third input to the AND-circuit 487, and the decode line –Arithmetic Full Word forms a fourth input to the AND-circuit 487. The decode line Branch Word provides a third input to the AND-circuit 488.

If the input conditions to one of the AND-circuits 486–488 is satisfied, it causes AND-circuit 485 to gate bits C1.4,5 to the decode circuit 483.

For indirect byte addressing, T register bits 4,5 are applied to the decode circuit 484 by way of an AND-circuit 492. The output of an AND-circuit 493 forms an input to the AND-circuit 492. The inputs to the AND-circuit 493 are the lines –1 Time Delay and A Source Indirect.

It can be seen from the above description that bits C1.4,5 or, alternatively, bits T4,5 will be gated to their respective decode circuits 483 or 484 depending upon whether the AND function for circuit 490 is satisfied or not when the A local storage unit 5 is accessed as an A source.

Each of the output lines from the decode circuits 483 and 484 are coupled to a respective one of the AND-circuits 477–480 inclusive by way of OR-circuits 494–497 and inverters 498–501. Thus, the setting of latches 460–463 are utilized for byte operations.

When store half-word operations are to be performed, the latch 465 is utilized. Its input AND-circuit 482 has as one of the inputs thereto the decode line Store Half Word.

The AND-circuit 481 has as additional inputs thereto the lines Arithmetic Full Word and 1 Time Delay, and is used for full word arithmetic operations.

The outputs of latches 460–463 are coupled to respective ones of OR-circuits 510–513 and OR Invert circuits 514–517 by way of a cable 518. The outputs of latches 464 and 465 are coupled to the OR-circuits 510–513 by way of the cable 518.

The outputs of the OR-circuits 510–513 and the OR Invert circuits 514–517 are applied to various inputs of the A byte assembler 23 by way of a cable 519. The outputs of the latches 460–463 are also coupled to various inputs of the A byte assembler 23 by way of the cable 519. The A register contents A0.P–7, A1.P–7, A2.P–7 and A3.P–7 are also coupled to various inputs of the A byte assembler 23 by way of the cable 519.

The byte assembler 23 comprises an AND-OR block 520–0, 520–1, 520–2 and 520–3 for each of the bytes 0–3 thereof. The bits A0.P–7 are gated through the logic block 520–0 when the output –Gate 1, 2, 3 to 0 from the circuit 514 is in its logical one state. The bits A2.P–7 are gated through the logic block 520–0 when the output Gate 2 to 0 of the OR-circuit 510 is in its logical one state. The bits A3.P–7 are gated through the logic block 520–0 by the output Gate 3 from the latch 463 (FIG. 7*a*).

The bits A0.P–7 are gated through the logic block 520–1 by the output Gate 0 from the latch 460. The bits A1.P–7 are gated through the logic block 520–1 by the output –Gate 0,2,3 to 1 from the circuit 515. The bits A3.P–7 are gated through the logic block 520–1 by the output Gate 3 to 1 from the OR-circuit 511.

The bits A0.P–7 are gated through the logic block 520–2 by the output line Gate 0 to 2 from the OR-circuit 512. The bits A1.P–7 are gated through the logic block 520–2 by the output line Gate 1 of the latch 461. The bits A2.P–7 are gated through the logic block 520–2 by the output line –Gate 0, 1, 3 to 2 of the circuit 516. The bits A3.P–7 are gated through the logic block 520–2 by the output line Gate 3 of the latch 463.

The bits A0.P–7 are gated through the logic block 520–3 by the output line Gate 0 of the latch 460. The bits A1.P–7 are gated through the logic block 520–3 by the output line Gate 1 to 3 of the OR-circuit 513. The bits A2.P–7 are gated through the logic block 520–3 by the output line Gate 2 of the latch 462. The bits A3.P–7 are gated through the logic block 520–3 by the output line –Gate 0,1, 2 to 3 of the circuit 517.

The B Register and Controls—FIG. 8

The B register 22 is shown in FIG. 8 and includes inputs from the SPTL register, from the Z register bytes 0–3, from the B local storage unit bytes 0–3 and from the A register bytes 0–3. A first logic block 540 includes AND-circuits 541 and 542 and an OR-circuit 543. The AND-circuit 541 is utilized to gate the SPTL register bits P–7 to the B register 22 by way of a second logic block 545. The logic block 545 includes AND-circuits 546, 547 and 548, the outputs of which form inputs to an OR-circuit 549.

It will be appreciated that the logic blocks such as 540 and 545 are each duplicated 36 times for 36 data bits (and four additional times for the parity bits).

The AND-circuit 542 is utilized to gate one or more of the Z register bytes 0–3 to the respective B register byte positions. The B local storage bytes 0–3 are gated to the B register 22 by way of the AND-circuit 547.

The gating circuits for the B register will now be described in greater detail. The B register set/reset circuits comprise a first AND-circuit 550 which includes a pair of input lines –1 Time and 0 Time Delay. The output of the AND-circuit 550 forms the B Register Set/Reset line which is applied directly to the B register latches (not shown) and to the AND circuits 546, 547 and 548 by way of an inverter 551. The B register 22 is comprised of a polarity hold latch for each bit of storage. The output of the AND-circuit 550 is in effect the reset line and the output of the inverter 551 is the set line.

The output of the AND-circuit 550 is the reset line for a latch 552 the output of which is the line Gate External Registers To Flush Through Check Register (FIG. 10*b*). The output of the AND-circuit 550 also forms the set line input to an AND-circuit 553. The other input to the AND-circuit 553 is the decode line –Storage Interlock Cycle.

The gating of the various input buses to the B register will now be described in greater detail. When the control word being executed calls for gating of the A register to the B register, a signal is applied to one of the input decode lines Link Or Return Word, Word Move Type 1 of an OR-circuit 560, the output of which is a line Gate A Register To B Register which is applied to the input of the AND-circuit 548. During the B register set time, the output of the invert circuit 551 causes A register byte 0–3 bits P–7 to be gated to the B register bytes 0–3 via circuits 548, 549; and a short time thereafter, the reset line is effective to latch the data in the B register.

When the control word being executed calls for gating of the SPTL register to the B register, a logic block comprising an AND-circuit 561 and an OR-circuit 562 produce a signal on the output line Gate SPTL To B Register, which line is applied to the AND-circuit 541 for gating the SPTL register contents to the input of the AND-circuit 546 by way of the AND-circuit 541 and the OR-circuit 543. The output line Gate SPTL To B Register is also applied to an OR invert circuit 563 to inhibit gating of the Z register contents when the control word calls for gating of the SPTL register. The output of the OR-circuit 560, the line Gate A Register To B Register, is also applied to the OR-invert circuit 563 to inhibit gating of the Z register when the control word being executed calls for gating of the A register to the B register.

The decode lines Link Or Return Word and Word Move Type 1 are applied as inputs to the AND-circuit 561 and to inputs to an AND-circuit 564 by way of inverters 565 and 566. The decode line C2 Address Is External forms a third input to the AND-circuit 561 and is applied as a third input to the AND-circuit 564 by way of an invert circuit 567. The decode line Branch Word forms a second input to the OR-circuit 562 and it is also applied as a fourth input to the AND-circuit 564 by way of an inverter 568.

A brief examination of the OR-circuits 560 and 562, the AND-circuits 561 and 564 and their input lines shows that the A register contents are transferred to the B register when the word being executed is a link or return word or, alternatively, a word move type 1. Further, the contents of the SPTL register are gated to the B register if the word being executed is a branch word or, alternatively, if the control word is not a link or return or a move word type 1 but the C2 address calls for an external register. In all other instances, the B local storage unit 6 is accessed as a B source for transfer to the B register.

However, it will be recalled that when the B local storage unit 6 is accessed as a B source, the destination look-ahead mechanism 41 determines whether or not the B source address corresponds to the destination address of the preceding control word. In the event that the current B source address and the preceding destination address are the same, then one or more bytes of the Z register will be transferred to the B register instead of the corresponding bytes of the B local storage source, depending upon how many bytes have been destined in the preceding cycle. The output of the AND-circuit 564, the line Gate Local Store B To B Register, is applied to one input of an AND-circuit 570. The output of the AND-circuit 570 is applied directly to an input of the AND-circuit 547 for gating the B local storage bytes to the B register and is applied to an input to the AND-circuit 546 by way of an OR invert circuit 571 for inhibiting gating of Z register bytes to the B register. Gating lines Gate Z0 To B0, Gate Z1 To B1, Gate Z2 To B2 and Gate Z3 To B3, derived from the Z register controls of FIG. 10*b*, are applied as inputs to the AND-circuit 542 for selectively gating bytes 0–3 of the Z register to the AND-circuit 546. These gating lines are also applied to a second input of the AND-circuit 570 by way of an inverter 572.

Attention is directed to the fact that the invert circuit 572, the AND-circuit 570 and the OR invert circuit 571 represent four independent similar circuits. That is, there are four invert circuits 572, each of which is connected to a respective one of the four Z register gating lines. The four invert circuits 572 each have a separate input connected to a respective one of four AND-circuits 570. The other input line Gate Local Store B To B Register is applied to all four of the AND-circuits 570. The four AND-circuits 570 each have a respective output line which is connected to a respective one of four OR invert circuits 571. The four outputs of the AND-circuit 570 are also connected to a respective set of AND-circuits 547 used for gating one of the B local store bytes (bits P–7). The line Gate A Register To B Register is applied to all four OR invert circuits 571. Thus it can be seen that any one or more of the Z register bytes can be gated to a corresponding byte position of the B register 22 by way of AND-circuit 542, OR-circuit 543, AND-circuit 546 and OR-circuit 549. The remaining byte positions of the B register 22 are filled by the corresponding bytes from the B local storage unit 6 gated thereto by way of the AND-circuit 547 and the OR-circuit 549.

Figure 9A:
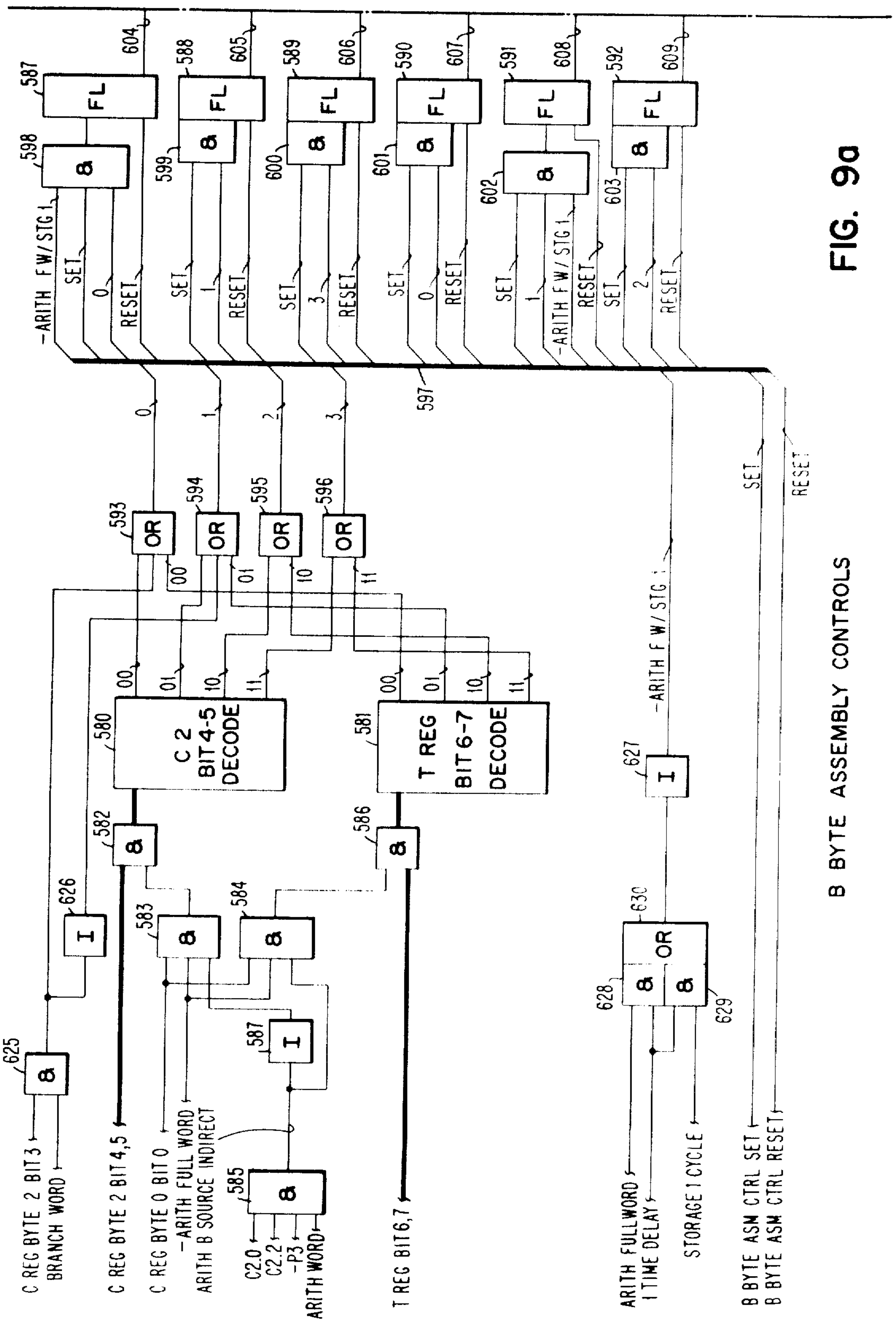
Figure 9B:
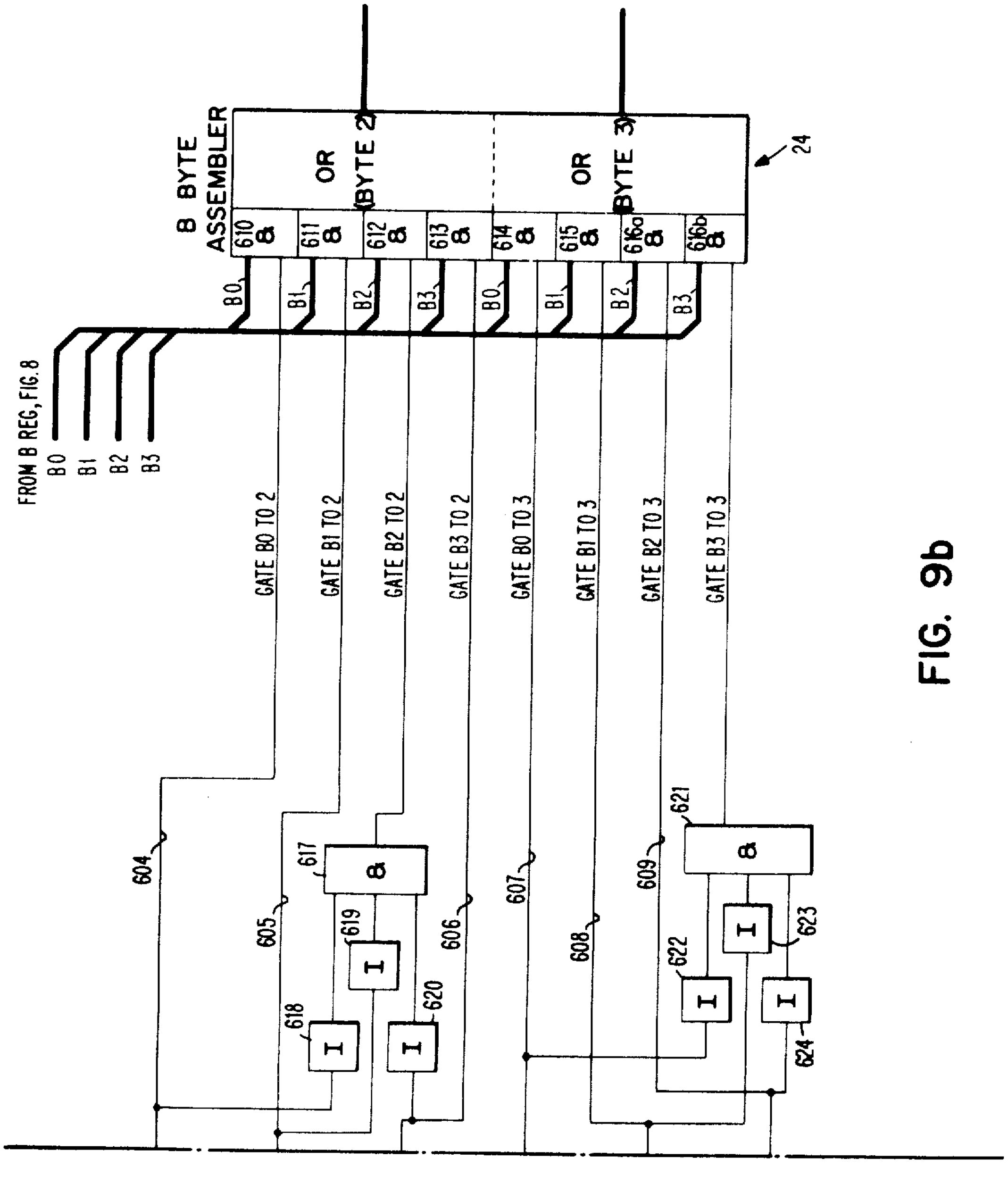

B Byte Assembler and Controls—FIGS. 9*a*, 9*b*

The B byte assembler controls include a decode circuit 580 for bits C2.4,5 for byte selection when indirect byte addressing is not utilized in the execution of a control word. The controls also include a second decode circuit 581 for decoding T register bits 6,7 for indirect byte addressing. Bits C2.4,5 are coupled to the decode circuit 580 by way of an AND-circuit 582. An AND-circuit 583, which forms a second input to the AND-circuit 582, has first and second input lines C Register Byte O Bit O and –Arithmetic Full Word. These same lines also form inputs to an AND-circuit 584. An AND-circuit 585 has input bits C2.0, C2.2, –P3 and the decode line Arithmetic Word.

When the input conditions to the AND 585 are satisfied, it indicates indirect byte addressing of the B source. Hence the output of the AND-circuit 585 is applied directly as a third input to the AND-circuit 584 for gating the T register bits 6 and 7 to the decode circuit 581 by way of an AND-circuit 585.

The output of the AND-circuit 585 is also coupled to the AND-circuit 583 by way of an inverter 587 for coupling bits C2.4,5 to the decode circuit 580 by way of the AND-circuit 582. Thus when the input conditions of the AND-circuit 585 are satisfied, the decode register 581 is utilized and when the input conditions of the AND-circuit 585 are not satisfied, the decode circuit 580 is utilized.

In the control word charts of FIGS. 14–22 it will be seen that direct or indirect byte addressing making use of the decode circuits 580 and 581 is used only for arithmetic byte operations.

The outputs of the decode circuits 580 and 581 are applied to inputs of latches 587–592 inclusive by way of OR-circuits 593–596, a cable 597 and AND-circuits 598–603. More particularly, the 00 outputs of the decode circuits 580 and 581 are applied to the latches 587 and 590 by way of OR-circuit 593 and AND-circuits 598 and 601 for gating byte 0 of the B register through bytes 2 and 3 of the B byte assembler. More specifically, the latches 587 and 590, when set to their logical one states, produce output signals on their output lines 604 and 607 which output lines are connected respectively to the input AND-circuits 610 and 614 of the B byte assembler 24.

The 01 outputs of decode circuits 580 and 581 set the latches 588 and 591 respectively; and, with these latches set, their output lines 605 and 608 gate byte 1 of the B register through bytes 2 and 3 of the B byte assembler 24 by way of AND-circuits 611 and 615.

The 10 outputs of the decode circuits 580 and 581 are applied only to AND-circuit 603 to set the latch 592. The output line 609 of the latch 592 causes AND-circuit 616*a* to gate byte 2 of the B register through the B byte assembler 24.

Byte 2 of the B register is gated through byte 2 of the B byte assembler 24 by means of an AND-circuit 617 and the output lines 604, 605 and 606 of latches 587, 588 and 589 which are coupled to the AND-circuit 617 by way of respective invert circuits 618, 619 and 620. With the 10 output of either decode circuit 580 or 581 in its logical one state, the remaining outputs will be in their logical 0 states whereby the latches 587, 588 and 589 will be in their logical 0 states causing logical one inputs to the AND-circuit 617.

The 11 outputs of the decode circuits 580 and 581 are applied only to the AND-circuit 600 for setting the corresponding latch 589. With the latch 589 set, its output line 606 causes the AND-circuit 613 to gate byte 3 of the B register through byte 2 of the B byte assembler 24. The latches 590, 591 and 592, invert circuits 622, 623 and 624, and AND-circuit 621 cause byte 3 of the B register to be gated through byte 3 of the B byte assembler 24 via AND-circuit 616*b*.

The B Byte Assembler Control Set and B Byte Assembler Control Reset lines, originating in FIG. 7*a*, provide the set/reset function for the latches 587–592.

Figure 23:
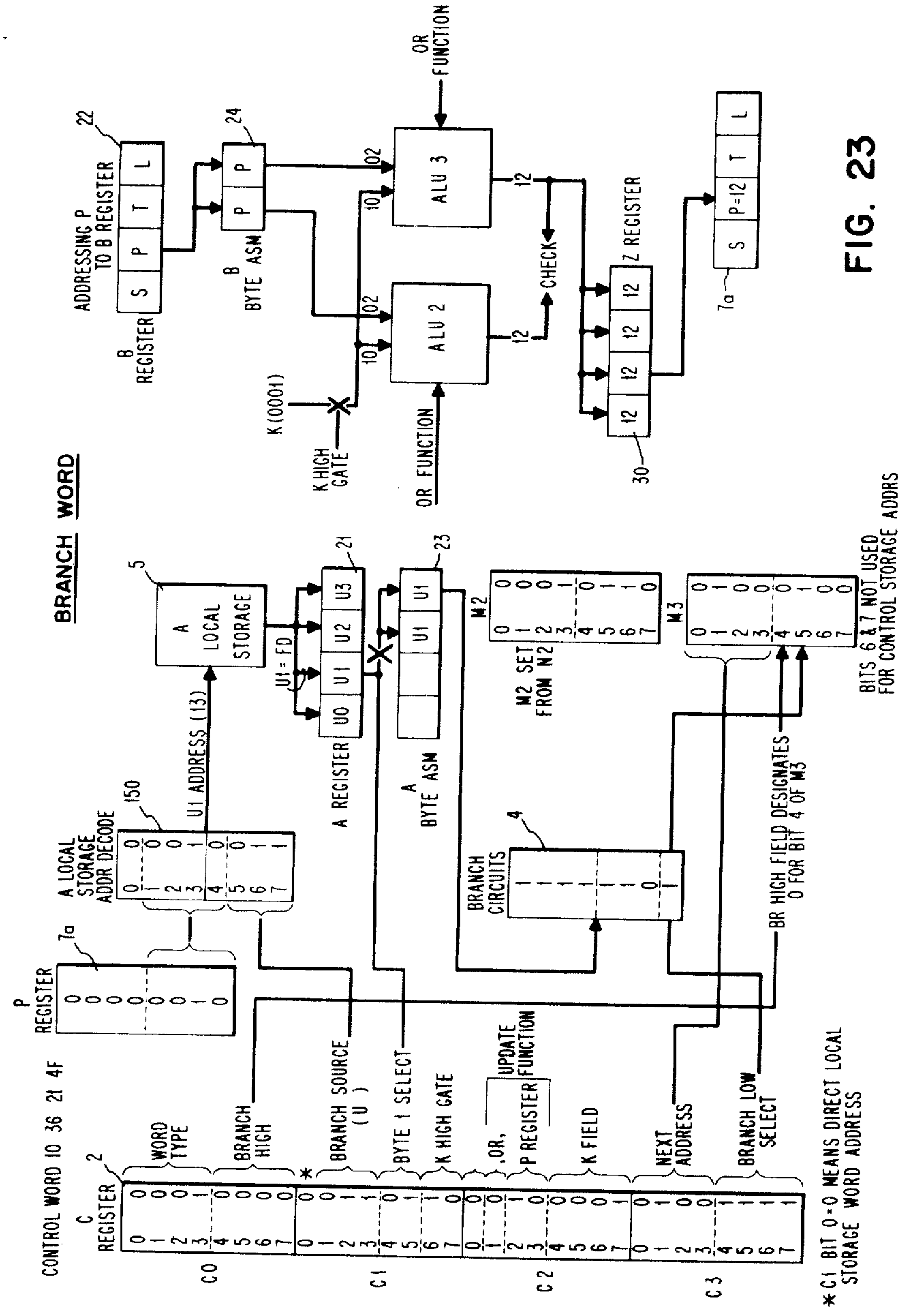

Additional inputs to the OR-circuits 593 and 594 for selectively setting the latches 587, 590 and 588, 591 are provided by an AND-circuit 625 and an invert circuit 626. The AND-circuit 625 has a pair of input lines C Reg Byte 2 Bit 3, Branch Word. The output of the AND-circuit 625 is applied as an input to the OR-circuit 593 and is applied as an input to the OR-circuit 594 by way of the inverter 626. The circuit including AND-circuit 625 and its inverter 626 is utilized for branch word executions where either the S or P registers are to be updated. An example of this is illustrated in FIG. 23.

Additional inputs to the AND-circuits 598 and 602 for setting their respective latches 587 and 591 are provided by the output of an inverter 627. A logic block comprising a pair of AND-circuits 628 and 629 and an OR-circuit 630 forms the input to the inverter 627. Inputs to the AND-circuit 628 are provided by lines Arithmetic Full Word and 1 Time Delay. The line 1 Time Delay is also applied as an input to the AND-circuit 629 and the other input to the AND-circuit 629 is provided by the line Storage 1 Cycle. With either of the inputs in their logical one state, i.e., Arithmetic Full Word or Storage One Cycle, setting of the latches 587 and 591 is inhibited.

Figure 10A:
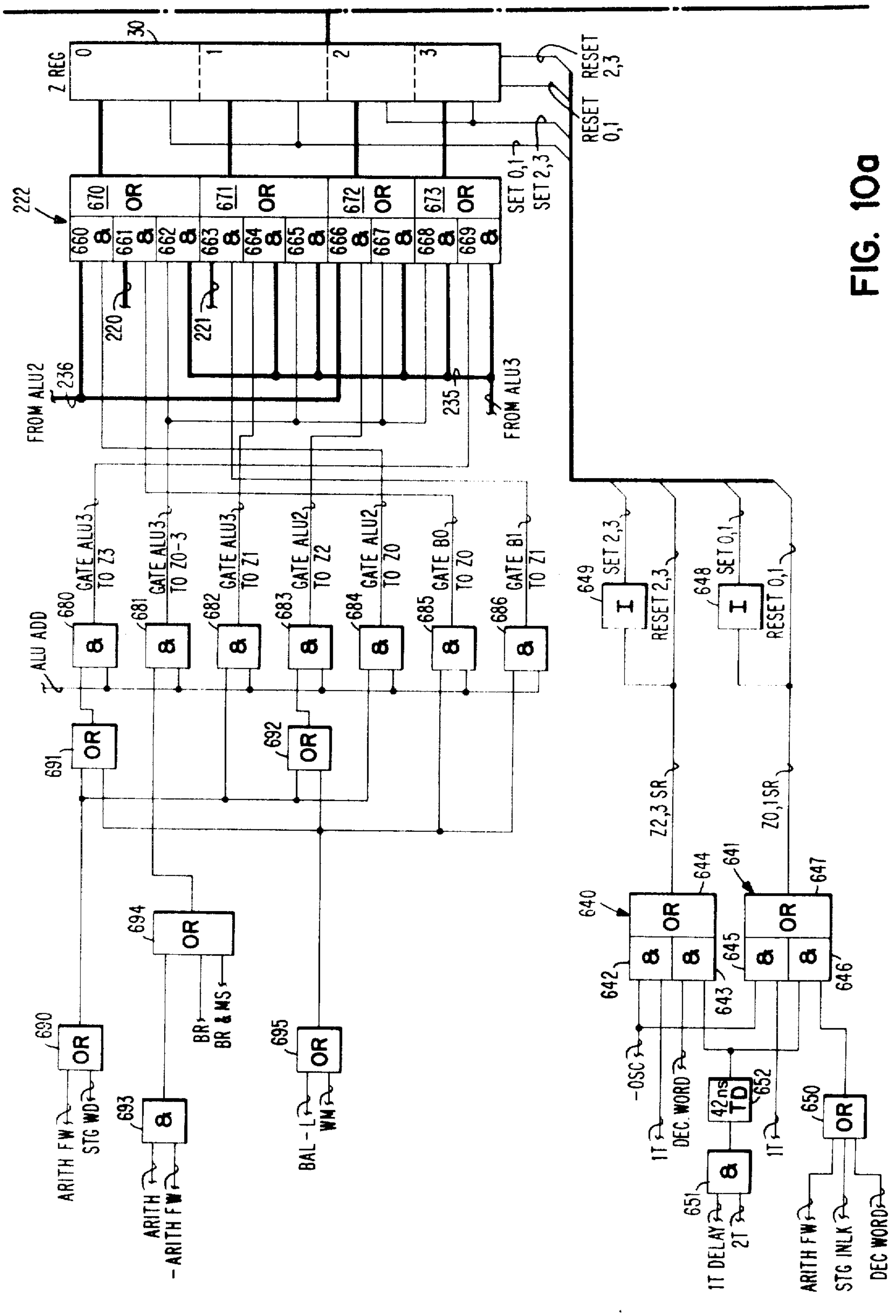
Figure 10C:
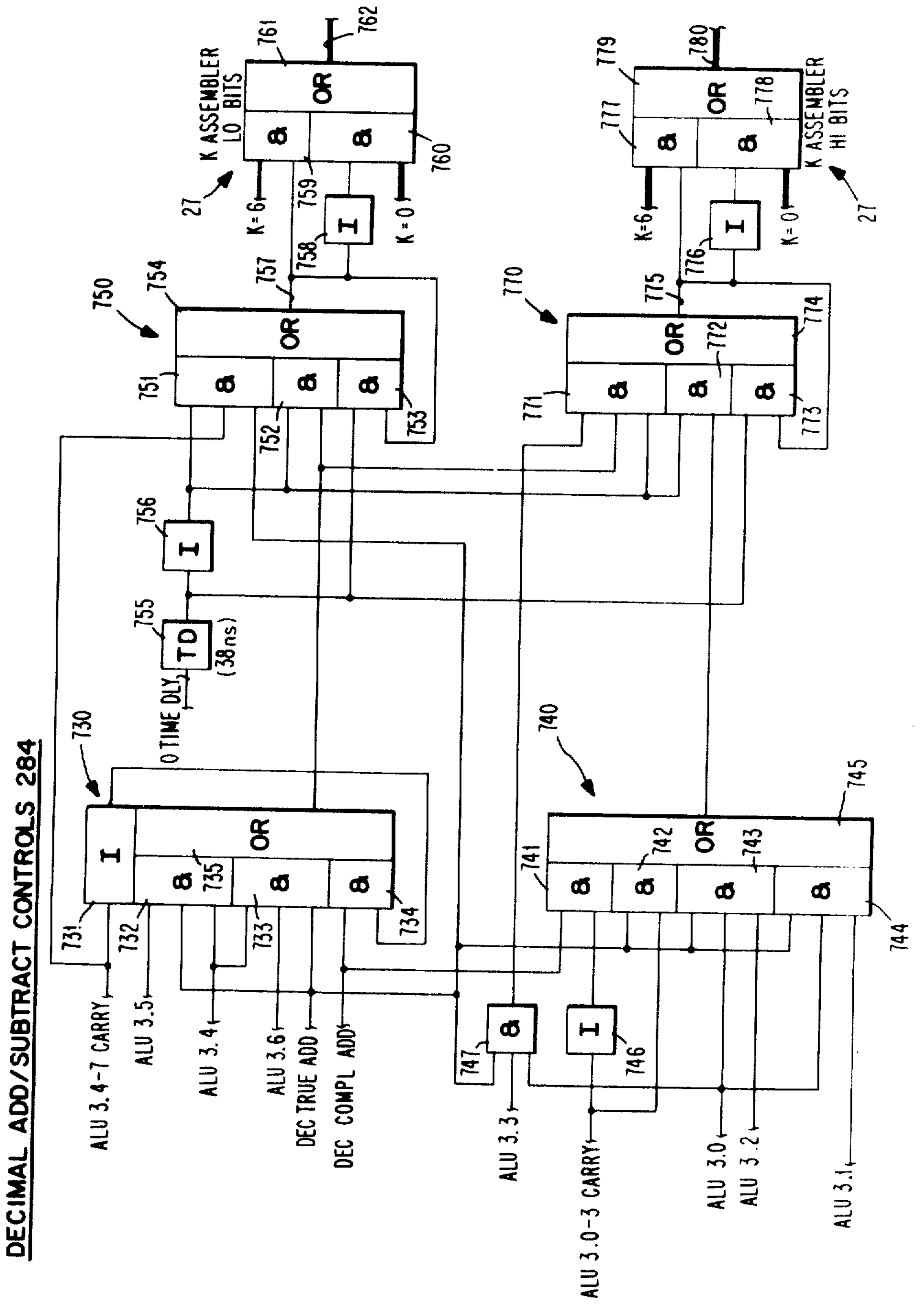

Z, D, FTC Register Controls and Decimal Controls—FIGS. 10*a*, 10*b* and 10*c*

The Z register 30 is illustrated in FIG. 10*a*. The set/reset circuits for the four byte positions of the Z register include logic circuits 640 and 641. The logic circuit 640 includes a pair of AND-circuits 642 and 643 and an OR-circuit 644. The inputs to the AND-circuit 642 are provided by the –Oscillator input and the 1 Time input. These same inputs are also applied to an AND-circuit 645 in the logic block 641. The Oscillator and 1 Time pulses control the Z0,1 and Z2,3 Set/Reset lines.

The Z register 30 is comprised of a plurality of polarity hold latches one for each bit position. The Z0,1 Set/Reset line provides the reset input to each of the polarity hold latches for bytes 0 and 1 and is applied to each of the set inputs of the polarity hold latches for bytes 0 and 1 by way of an invert circuit 648. Similarly, the Z2,3 Set/Reset line provides a direct reset input to the polarity hold latches of bytes 2 and 3 of the Z register, and it is applied to the set inputs to the polarity hold latches of bytes 2 and 3 of the Z register by way of an inverter 649. The 1 Time and –Oscillator pulses produce the set/reset signal from 135 time to 180 time.

During a storage word it is necessary to provide the set/reset function a second time during the storage 1 cycle. For arithmetic decimal and arithmetic full word operations, it is necessary to provide the Z set/reset function a second time.

Thus, the Decimal Word decode line forms an input to the AND-circuit 643 and an input to the AND-circuit 646 by way of an OR-circuit 650. The other inputs to the AND-circuits 643 and 646 are provided by a timing circuit including an AND-circuit 651 and a time delay circuit 652. Lines 1 Time delay and 2 Time form inputs to the AND-circuit 651. As a result, signals are applied to the AND-circuits 643 and 646 by the output of the time delay circuit 652 from approximately 255 time for a duration of 45 nanoseconds. As a result, each decimal word operation will cause a signal to be applied to the Z0,1 Set/Reset line and the Z2,3 Set/Reset line starting at 225 nanoseconds.

Similarly, the arithmetic full word and the storage word operations will cause a signal to be applied only to the Z0,1 Set/Reset line at about 225 nanoseconds. This is achieved by means of the input lines Arithmetic Full Word and Storage Interlock of the OR-circuit 650, the output of which is connected to an input of the AND-circuit 646.

The cables 235 and 236 from ALU3 and ALU2 and cables 220, 221 from the B register are coupled to the Z register 30 by way of the circuits 222.

Gating of the ALU Bytes 0–3 and bytes 0 and 1 of the B register to the input gating circuits 222 of the Z register is achieved by means including a first OR-circuit 690, the inputs to which are formed by the lines Arithmetic Full Word and Storage Word. The output of the OR-circuit 690 is applied to AND-circuits 680 and 683 by way of OR-circuits 691 and 692. The output of OR-circuit 690 is also applied directly to inputs of the AND-circuits 682 and 684.

An AND-circuit 693 having input lines Arithmetic Word and –Arithmetic Full Word is coupled to one input of an OR-circuit 694. The decode lines Branch and Branch And Module Switch form additional inputs to the OR-circuit 694. The output of the OR-circuit 694 is applied as one input to an AND-circuit 681.

An OR-circuit 695 has a pair of input decode lines Branch And Link-Link Type Word and Word Move Word. The output of the OR-circuit 695 is applied directly to inputs of the AND-circuits 685 and 686 and is applied to inputs of the AND-circuits 680 and 683 by way of the OR-circuits 691 and 692.

It can be seen from these gating circuits to the Z register that during arithmetic byte and half word operations, branch operation and branch and module switch operation, the AND-circuit 681 causes byte 3 of the ALU to be gated into the inputs of the Z register bytes 0–3 by way of AND-circuits 662, 665, 667 and 668 and OR-circuits 670–673. The data on these inputs is then entered into the Z register when the set/reset line Z0,1 and Z2,3 are in their logical zero states whereby their inverted outputs cause new data to be entered into the Z register. When the set/reset lines Z0,1 and Z2,3 return to their logical one stage shortly thereafter, the new data entered into the Z register bytes is latched up.

During storage words and arithmetic full words, a first pass through the ALU causes ALU2 to be stored in bytes Z0 and Z2 and ALU3 to be stored in bytes Z1 and Z3; whereas, during the second pass, ALU2 and ALU3 are stored only in bytes Z0 and Z1 and the inputs to bytes Z2 and Z3 are blocked. Thus during storage words and arithmetic full words, the AND-circuits 680 and 683 may be effective to gate data through the circuits 222 yet this data will not be entered into the Z register bytes 2 and 3 during a second pass through the ALU. Since only the Z0,1 Set/Reset line is operative during the second pass for decimal operations, Z0,1 Set/Reset and Z2,3 Set/Reset are operative during the second pass.

The AND-circuit 680 is effective to gate the data from ALU3 into Z3. The AND-circuit 682 is effective to gate the contents of the ALU3 to the Z register byte 1 by way of an AND-circuit 664 and the OR-circuit 671. The AND-circuit 683 is effective to gate the contents of ALU2 into Z2 by way of an AND-circuit 666 and an OR-circuit 672. The AND-circuit 684 is effective to gate the contents of ALU2 into Z0 by way of AND-circuit 660 and OR-circuit 670. The AND-circuit 685 is effective to gate the contents of B register byte 0 to the Z register byte 0 by way of AND-circuit 661 and OR-circuit 670. The AND-circuit 686 is effective to gate the contents of the B register byte 1 into the Z register byte 1 by way of AND-circuit 663 and OR-circuit 671.

The output of the Z register 30 is connected to the input of the D register 31 by way of an AND-circuit 700. The set/reset of the D register is controlled by means including an AND-circuit 701, the inputs to which are the clock outputs 0 Time and 0 Time Delay. The output of the AND-circuit 701 is applied as a Set input to the AND-circuit 700 by way of invert circuit 702 for gating bytes Z0–3 to the D register. The output of the AND-circuit 701 also forms the Reset input to the D register polarity hold latches.

The FTC (flush through check) register 287, the match circuit 288 and their associated control gates are illustrated in FIG. 10*b*. The circuits include first and second AND-gates 705 and 706 for respectively coupling bytes 0–3 of the external register to which data has just been destined or the A local storage register to which data has just been destined into the FTC register 287 by way of an additional AND-gate 707. The input cable External to the AND-gate 705 is the output of the external assembler 25 of FIG. 2*b*. The cable 201 which forms an input to the AND-gate 706 is the output of the A local storage unit 5. The input gating lines to the AND-gates 705 and 706 are provided by the control line, Gate External To FTC Register, which originates in FIG. 8. This control line is coupled directly to the AND-gate 705 and is coupled to the AND-gate 706 by way of an inverter 708. The FTC Set/Reset line 709 is coupled as an input of the AND-gate 707 and is effective during the latter part of the local store/external write/read cycle to gate into the FTC register 287 either an A local store register or an external register depending upon which register was specified as the destination register by the preceding control word operation.

Figure 11C:
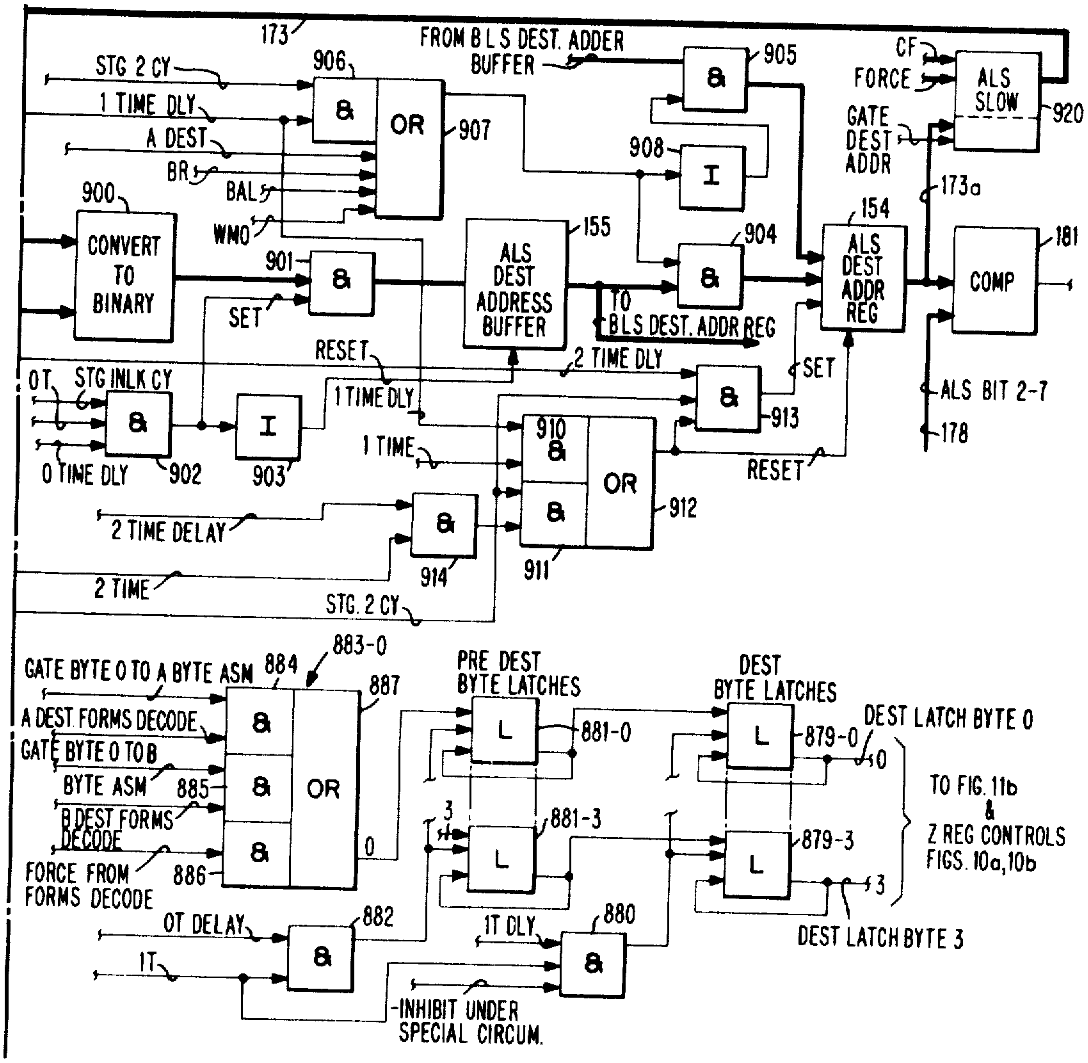
Figure 11:
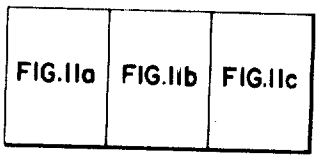

The circuits which gate one or more of the Z register bytes to corresponding byte positions of either the A or B register when the destination look-ahead mechanism 41 (FIG. 1) is effective are illustrated in FIG. 10*b*. These circuits include a first group of AND-circuits 710–713 for gating the Z register contents to the A register and a second set of AND-circuits 714–717 for gating the Z register contents to the B register. The outputs of the destination byte latches for bytes 0, 1, 2 and 3 (which are illustrated in FIG. 11*c*) are coupled to the AND-gates 710 and 714, 711 and 715, 712 and 716, 713 and 717, respectively.

It will be recalled from the earlier description of the destination look-ahead feature that the A and B compare circuits 180, 181 of FIG. 2*b* produce signals on their output lines 183 and 182, respectively, in the event that the A source or B source specified by the current control word being executed has the same address as the destination specified by the preceding control word. These lines 182 and 183 form inputs of AND-circuits 718 and 719, respectively. The other input to the AND-circuits 718 and 719 is provided by the line –Storage Interlock which originates in FIG. 5.

The –Storage Interlock input to the AND-circuits 718 and 719 renders the destination look-ahead circuits ineffective during the early part of the storage 2 cycle of each storage control word execution. This is required because the storage word remains in the C register for two complete machine cycles. The destination data from the cycle preceding the storage word is destined during the early part of the storage 1 cycle. The early part of the storage 2 cycle is utilized for destining the updated data address. The word count which is updated during the storage 2 cycle is destined during the next machine cycle following the storage 2 cycle.

When, during the early portion of any control word cycle other than a storage 2 cycle, a signal is applied to the line 183, the AND-circuit 719 will apply an input pulse to each of the AND-circuits 710–713, inclusive. Outputs will be produced for each of the AND-circuits 710–713 for which the corresponding destination byte latch is in its logical 1 state indicating that the respective byte is intended to be destined. The true output lines, Gate Z0 To A0, Gate Z1 to A1, Gate Z2 to A2 and Gate Z3 to A3 together with complement output lines –Gate Z0 To A0 and –Gate Z1 To A1 form a cable 440 which is connected to various gating inputs to the A register byte 0–3 as described earlier with respect to FIGS. 6*a* and 6*b*.

The cable 440 also includes an additional line, Gate Z Decimal which is the output of an AND-circuit 720, the inputs of which are the clock signal 1 Time Delay and the decode line Arithmetic Decimal Word. The output of the AND-circuit 720 is inverted by the inverter 721 and applied as one input to the AND-circuit 713 for inhibiting an output from the AND-circuit 713 at one time delay during decimal operations.

In a similar manner an input pulse appearing on line 182 causes the AND-circuit 718 to apply input signals to the AND-circuit 714–717, inclusive, to produce output pulses in each of the AND-circuits 714–717 for which the respective destination byte latch is in its logical one state. The outputs of the AND-circuits 714–717 are the lines Gate Zo To B0, Gate Z1 To B1, Gate Z2 To B2 and Gate Z3 To B3 which are applied to the input gating circuits of the B register (FIG. 8).

The decimal add/subtract controls 284 of FIG. 10c include a first logic block 730 including an invert circuit 731, AND-circuits 732, 733 and 734 and an OR-circuit 735 which has as its inputs the outputs of the AND-circuits 731–734. The input line to the invert circuit 731 is provided by the ALU3.4–7 Carry bit and the output of the invert circuit 731 is connected as an input to the AND-circuit 734. The decode line Decimal Complement Add forms the other input to the AND-circuit 734. The decode line Decimal True Add forms inputs to the AND-circuits 732 and 733. The ALU output bit ALU3.4 is applied as an input to the AND-circuits 732 and 733. The ALU output bit ALU3.5 forms an input to the AND-circuit 732 and the ALU output bit ALU3.6 forms an input to the AND-circuit 733.

The decimal add/subtract controls 284 include a second logic block 740 which includes AND-circuits 741–744, the outputs of which are coupled as inputs to an OR circuit 745. The decode line Decimal Complement Add forms one input to the AND-circuit 741. The other input to the AND-circuit 741 is provided by the line ALU3.0–3 Carry which is coupled to the AND-circuit 741 by way of an invert circuit 746. The line ALU3.0–3 Carry also forms an input to the AND-circuit 742. The decode line Decimal True Add also forms an input to the AND-circuit 742 and also to the AND-circuits 743 and 744. The Decimal True Add decode line is also applied to an AND-circuit 747. The ALU bit line ALU3.3 forms a second input to the AND-circuit 747 and bit ALU3.0 forms a third input to the AND-circuit 747. The line ALU3.0 is also applied to the AND-circuit 744. The output line ALU3.1 forms a second input to the AND-circuit 744. The line ALU3.2 forms a third input to the AND-circuit 743.

The decimal add/subtract controls 284 also include a latch 750 having AND-circuits 751, 752 and 753, the outputs of which form inputs to an OR-circuit 754. The decode line Decimal True Add forms a first input to the AND-circuit 751 and the line ALU3.4–7 Carry forms a second input to the AND-circuit 751. The third input to the AND-circuit 751 is provided by the clock output 0 Time Delay by way of a time delay circuit 755 and an inverter 756.

The output of the inverter 756 is also applied to one input of the AND-circuit 752. The other input of the AND-circuit 752 is derived from the output of the OR-circuit 735. The output of the time delay circuit 755 forms one input of the AND-circuit 753 and the output 757 of the OR-circuit 754 forms a latchback input to the AND-circuit 753.

The output 757 of the latch 750 forms one input to a portion of the K assembler 27 and it is applied as a second input to the K assembler 27 by way of an inverter 758. The portion of the K assembler 27 illustrated includes a pair of AND-circuits 759 and 760, the outputs of which form inputs to an OR-circuit 761. The other input of the AND-CIRCUIT 759 is a cable which provides four binary bits set to a value of 6. The other input to the AND-circuit 760 is a cable having logical signals applied thereto to cause it to have a value equal to 0. Thus depending upon the logical zero or one condition of the output line 757, either the AND-circuit 759 or the AND-circuit 760 is rendered effective to produce on an output cable 762 from the OR-circuit 761 a set of binary signals equal to 6 or 0.

Figure 29:
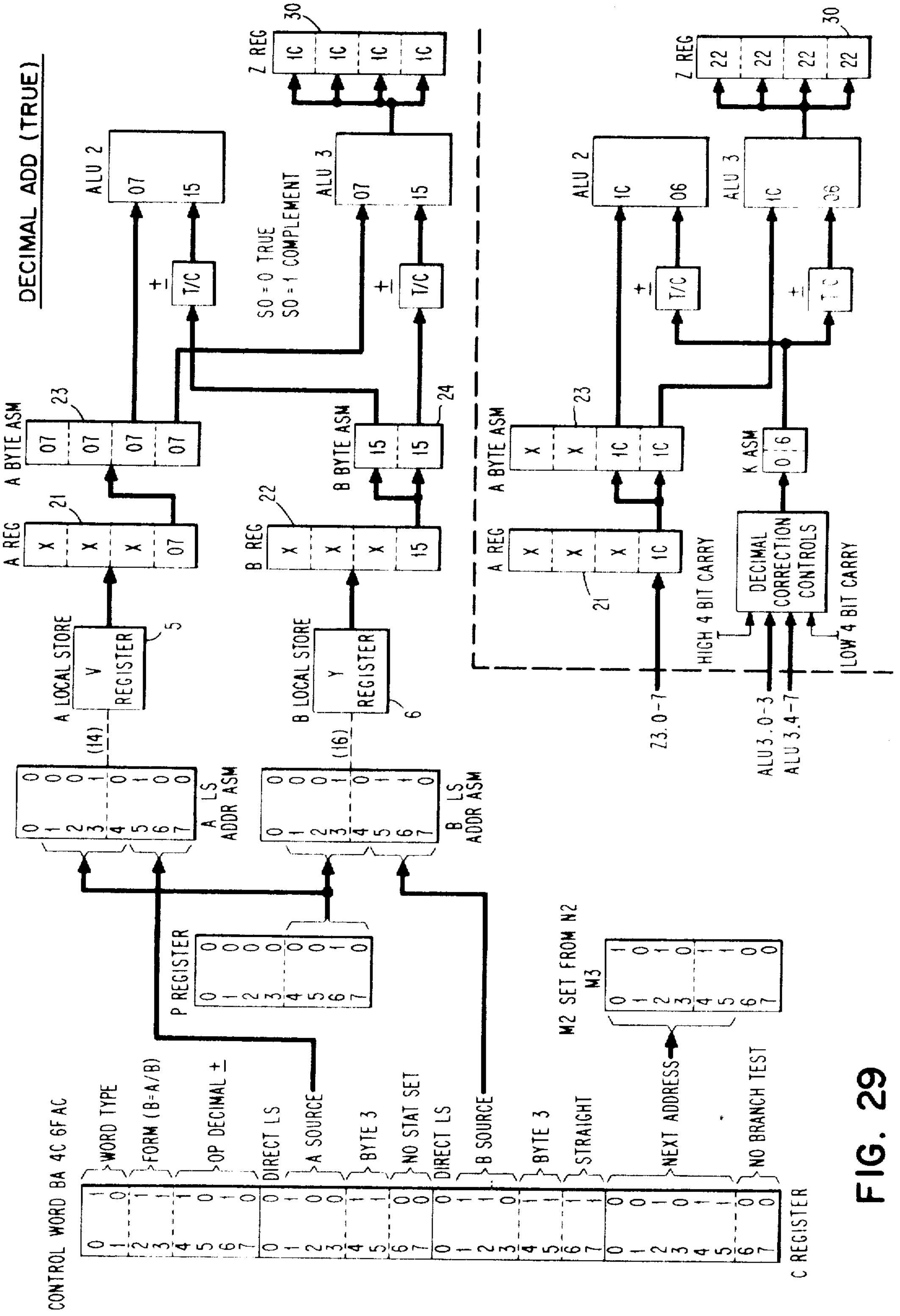

As illustrated more fully in FIG. 29, one of these two values 0 or 6 is gated during the latter portion of each decimal operation to the ALU2 and ALU3 by way of the true/complement circuits.

The decimal add/subtract controls 284 also includes a latch 770 having AND-circuits 771, 772 and 773 and an OR-circuit 774. The output of the AND-circuit 747 forms a first input to the AND-circuit 771. The output of the OR-circuit 735 forms a second input to the AND-circuit 771 and the output of the inverter 756 provides a third input to the AND-circuit 771 as well as a first input to the AND circuit 772. The output of the OR-circuit 745 forms a second input to the AND-circuit 772. The output of the time delay circuit 755 forms a first input to the AND-circuit 773 and the output 775 of the OR-circuit 774 forms a latchback input to the AND-circuit 773. The latch output 775 forms one input to another portion of the K assembler 27 and a second input to the K assembler 27 by way of an inverter 776. This portion of the K assembler includes AND-circuits 777 and 778, the outputs of which form an input to an OR-circuit 779. This portion of the K assembler 27 provides the four high-order bits of the decimal correction value during decimal operations. If the latch output 775 is in its logical one state, the correction value of 6 is applied to the output cable 780 of the OR-circuit 779 and if the output line 775 is in its logical zero state, a decimal correction value of 0 is applied to the output cable 780.

The rules for making decimal corrections have been described earlier. It will be recalled that, for the low-order decimal digit, the value of 6 is added to the first pass result in the event that the first pass result had a carry out or if it was greater than 9. The circuits of FIG. 10c provide this correction in the following manner. In the event that the first pass result is greater than 9, then the inputs to AND-circuits 732 or 733 will produce at the output of the OR-circuit 735 a signal which will cause the AND-circuit 752 to produce a logical one signal at the output 757 at the proper time determined by the zero time delay input to the delay circuit 755. This will cause the AND-circuit 759 to gate a K value equal to 6 to the output cable 762. In the event that the first pass result had a carry out, input ALU3.4–7 Carry causes AND-circuit 751 to produce a logical 1 signal on line 757 to gate a K value of 6.

For a complement add operation, the value of 6 is subtracted from the low-order decimal digit of the first pass result in the event that no carry out results from bits 4–7. To achieve this result the line ALU3.4–7 Carry is inverted and applied to the AND-circuit 734 causing the output of the OR-circuit 735 to be applied to the AND-circuit 752 for causing a logical one condition on the output line 757. This will again cause the K value equal to 6 to be coupled through the AND-circuit 759 and the OR-circuit 761 to the output cable 762. If a carry from bits 4–7 does result, the output line 757 will be in its logical zero state whereby the AND-circuit 760 will be effective to apply a K value of zero to the output cable 762. For the high-order digit of the decimal result, a similar correction is made using circuits 731, 734, 735, 771, 774 and the K assembler 27.

During decimal true add operations a K value of 6 is added to the high order digit the first pass result if the ALU bits 0–3 are greater than nine, or a carry out occurs from bits 0–3 or if bits 4–7 of the result are greater than nine and bits 0–3 equal nine. The case where the first pass result occurs in bits 0–3 being equal to nine and bits 4–7 being greater than nine is taken care of by means including AND-circuit 747 which has as inputs thereto Decimal True Add, ALU3.3 and ALU3.0 (therefore equal to nine). The output from AND-circuit 747 into AND-circuit 771 indicates a value of ALU3.0–3 equal to nine and the second input to the AND-circuit 771 is the output of the OR-circuit 735 which indicates a value of bits 4–7 being greater than nine. Therefore, the AND-circuit 771 will cause a logical 1 condition to be applied to the output line 775 to gate the value of 6 through the K assembler.

If there is a carry out from bits ALU3 bits 0–3 then the AND-circuit 742 produces a signal at the output of the OR-circuit 745 which is applied to the AND-circuit 772 for producing a logical one signal on the output line 775. This will cause a K value of 6 to be applied through the AND-circuit 777 and the OR-circuit 779 to the output cable 780.

In the event that the ALU3.0–3 bits are greater than nine, then either one of the AND-circuits 743 or 744 will cause the AND-circuit 772 to apply a logical one signal to the output line 775. This in turn causes a K value of 6 to be applied to the output cable 780.

For decimal complement adds, 6 is subtracted from the high-order decimal digit of the first pass result if no carry out occurs from bits 0–3. To handle this condition, the AND-circuit 741 produces an output from the OR-circuit 745 for causing the AND-circuit 772 to apply a logical 1 signal to the output 775. This in turn causes a K value of 6 to be applied to the output cable 780.

It will be appreciated that the value of 6 will be added to or subtracted from the first pass results by normal operation of the true/complement circuits 228 and 229 through which these values pass before entry to the ALU2 and ALU3.

Figure 11A:
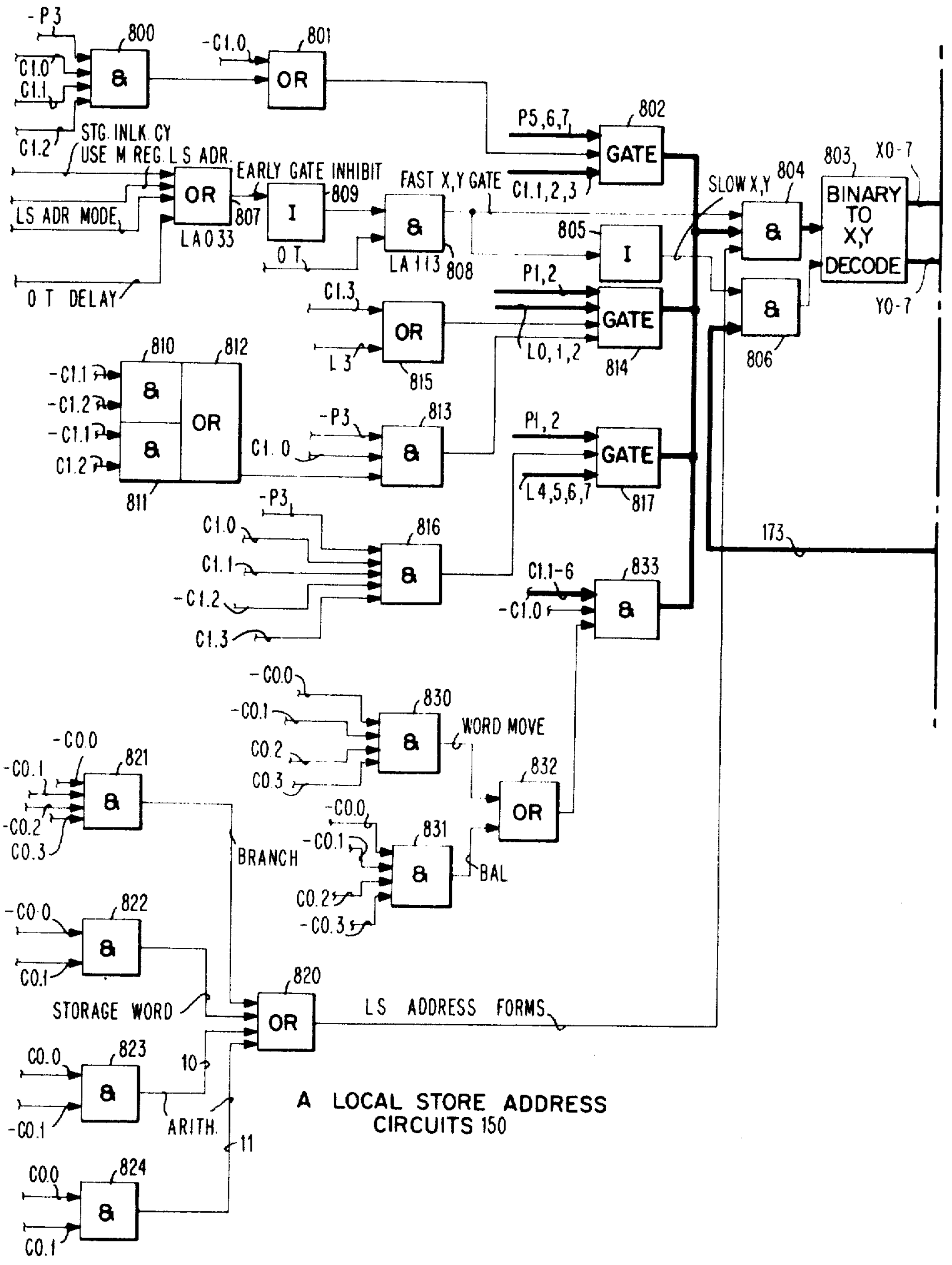

A Local Store Address Circuits—FIGS. 11*a*, *b* and *c*

Before discussing the details of the A local store address circuits of FIGS. 11*a*, *b* and *c*, attention is first directed to FIG. 36 which illustrates a portion of the A local storage unit and FIG. 12 which illustrates the local storage and external addressing forms.

In the preferred embodiment, each local storage unit 5 and 6 is comprised of a monolithically fabricated transistor storage unit for high speed. Although the addressing forms for the local storage units permit addressing of up to 128 local storage registers in each unit in the preferred embodiment, only 64 word registers are provided. Each local storage unit is addressed through use of the local storage address assembler 164, the P, L and T registers and the decode circuits 151 and 152. The local storage address values are assembled into two 3-bit binary numbers which must be then decoded to select one of 8 X drive lines and one out of 8 Y drive lines to access the desired register. As seen in FIG. 36 each of the local store locations is identified by two hexadecimal values from 00 to 3F (for 64 register positions) and it is assumed that the two high-order bits of the high-order hex value are not used. The corresponding X and Y lines for each of the local storage locations are also shown in FIG. 36. Thus local store location 00 utilizes the X0 and Y0 lines to access its general purpose register 0.

The low-order bits of the P register settings are used for direct local storage accessing and the high-order bits of the P register settings are used for indirect local store accessing. As seen in the chart of FIG. 36, the P low value 0 accesses local storage addresses 00 to 07. The P low value of 1 accesses local storage addresses 08 to OF inclusive, and so on. The P high value of 0 accesses local storage address positions 00 to oF inclusive and so on. For certain of the address modes the low-order bits L4–L7 and the high-order bits L0–L3 of the L register are used for addressing.

It was seen in the description above with respect to FIGS. 14, 15 and 18–22 that certain of the control word types called for use of the local store forms of FIG. 12 for accessing local store and external registers. The C1 and C2 bit decodes which call for the various types of address forms are illustrated in the left-hand columns of FIG. 12. For example, a decode of bit C1.0=0 calls for direct addressing of the A local store and bit C2.0=0 calls for direct accessing of the B local store. Similarly, a decode of C1.0=1 or C2.0=1 calls for addressing of the external registers as long as bit P3=1. Other address modes are specified by various bit decodes of bits C1.–3 or bits C2.0–3 together with the P3 bit setting.

Assuming that the direct word mode of addressing of line 1 of FIG. 12 is called for, it will be seen that bits P5, P6 and P7 together with bits C1.1–3 or C2.1–3 will be used for selecting the desired register in the A or B local storage units 5 or 6. Byte selection is determined by a decode of bits C1.4,5 or bits C2.4,5. For example, if bits C1.4,5 are equal to 11, byte 3 of the selected register is the byte which will be gated into the ALU.

Similar use of other address modes of FIG. 12 will access the desired byte of the desired register in the A or B local store or an external register as illustrated by the bits specified for each mode. One of the decode combinations is somewhat unusual and will therefore be described. In line 2 of FIG. 12, the indirect word accessing mode, column 7, calls for bits C1.3 being OR'd with bit L3 to determine the particular register to be selected in the A local storage unit 5. Bits C2.3 and L3 are OR'd to select a desired register in the B local storage unit.

It can also be seen in FIG. 12 that byte selection for indirect byte types of addressing modes make use of the T register bits for byte selection. Thus T4, T5 are used for addressing a desired byte from the A local storage unit and T6, T7 are used for addressing a selected byte in the B local storage unit.

The bits of byte C1 can be used to address A local store sources or external register sources whereas byte C2 can be used only to access B local storage sources. However, either bytes C1 or C2 can specify A and B local store destinations or external register destinations. Exceptions are the SPTL registers which can be addressed as a source by either byte C1 or C2.

The move word types of control words FIGS. 17 and 18 and the branch and link word of FIG. 16 directly access the X, Y lines of the local storage unit without use of the address forms of FIG. 12.

Figure 11B:
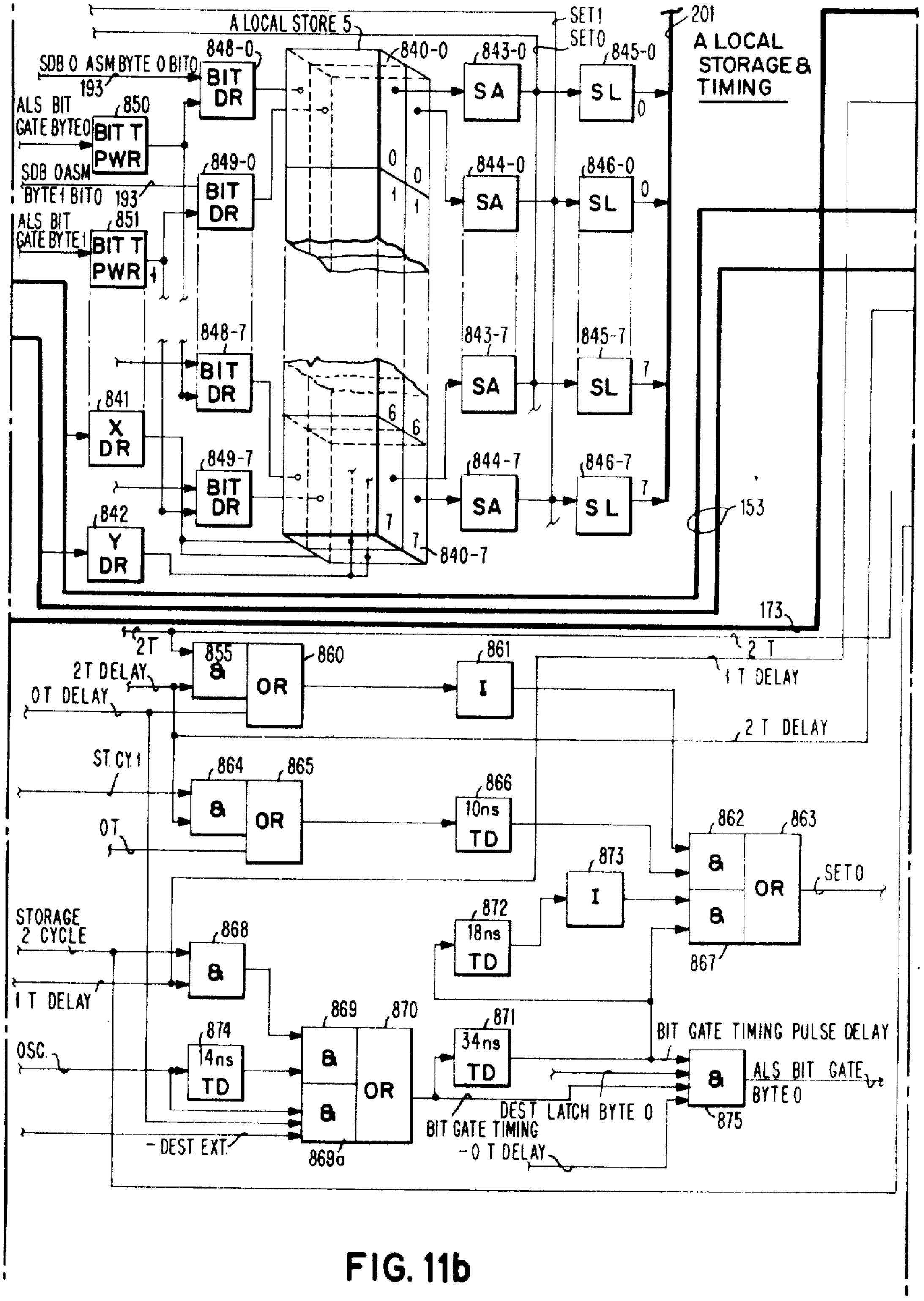

FIGS. 11*a*, 11*b* and 11*c* illustrate A local store 5 addressing. Since the addressing circuits for the B local store 6, the external registers 7 and the destination look-ahead decode circuits 175 and 176 are generally similar, they are not illustrated in detail.

It will be seen in FIG. 12 that the direct word address mode of line 1 and the direct word access modes of lines 6 and 7 will result in the same P register bits and C1 bits being gated to the word decode circuits. An AND-circuit 800 decodes the bits for lines 6 and 7, that is −P3 and C1.0–2; and the output of the AND circuit is applied to an OR-circuit 801, the other input of which is −C1.0 for the decode of line 1. The output of the OR-circuit 801 is applied to a gate circuit 802, the other inputs of which are the bits P5, 6, 7 and C1.1, 2, 3 address bits for lines 1, 6, 7 of FIG. 12. The output of the gate 802 is applied to the binary to X, Y decode circuit 803 by way of an AND-circuit 804.

A second input to the AND-circuit 804 is the line Fast X,Y Gate which is utilized for gating bits into the decode circuit 803 when a source is being addressed. This line is coupled to an inverter 805, the output of which is the Slow XY used for gating address bits into the decode circuit 803 by way of AND-circuit 806 when data is being destined to the A local store.

The signal to the line Fast X,Y Gate is derived from means including an OR-circuit 807, the inputs to which are the lines Storage Interlock Cycle, Use M Register Local Store Address, Local Store Address Mode, and 0 Time Delay. The output of the OR-circuit 807 is applied to an AND-circuit 808 by way of an invert circuit 809. The AND-circuit 808 has a second input 0 Time.

The address modes of lines 2 and 3 of FIG. 12 are produced by means including a first AND-circuit 810, the inputs to which are the bits −C1.1 and −C1.2. A second AND-circuit 811 has inputs −C1.1 and C1.2. The outputs of the AND circuits 81 and 811 are applied as inputs to an OR-circuit 812, the output of which forms an input to an AND-circuit 813. The AND-circuit 813 includes additional inputs −P3 and C1.0. Thus the AND-circuits 810, 811 and 813 and the OR-circuit 812 produce a decode for lines 2 and 3 of FIG. 12.

The output of the AND-circuit 813 is applied to the decode circuit 803 by way of a gate circuit 814 and the AND-circuit 804. Bits C1.3 and L3 are OR'd in a circuit 815 the output of which is applied as one input to the gate 814. The other inputs to the gate 814 are bit lines P1, 2 and L0, 1, 2. Thus the gate 814 is effective to gate the address bits for lines 2 and 3 of FIG. 12 into the decode circuit 803.

Selection of the indirect word address mode of line 5, FIG. 12, is effected by means of an AND-circuit 816 and a gate circuit 817. The inputs to the AND-circuit 816 are the bit lines −P3, C1.0, C1.1, −C1.2 and C1.3. The output of the AND-circuit 816 forms one input to the gate circuit 817, the other inputs to which are the address bit lines P1,2 and L4, 5, 6, 7. The output of the gate circuit 817 is applied to the decode circuit 803 by way of the AND-circuit 804.

The decode circuits described immediately above are those which are effective for A local store addressing when the control word being executed calls for the use of the local store address forms for selecting the address bits.

The AND-circuit 804 therefore includes another input, LS Address Forms. This line is the output of an OR-circuit 820, the inputs to which are the decode lines Branch, Storage Word and Arithmetic Words 10 and 11. These decode lines are the outputs respectively of AND-circuits 821, 822, 823 and 824. The inputs to the AND-circuit 821 are the C register bits –C0.0, –C0.1, –C0.2 and C0.3. The inputs to the AND-circuit 822 are the bit lines –C0.0 and C0.1. The inputs to the AND-circuit 823 are the bit lines C0.0 and –C0.1. The inputs to the AND-circuit 824 are the bit lines C0.0 and C0.1. When any one of the input functions to the AND-circuits 821–824 is satisfied, then the OR-circuit 820 is effected to partially prepare the AND-circuit 804. When a signal is applied to the line Fast X,Y Gate, the AND-circuit 804 is effective to gate the selected address bits to the decode circuit 803 for addressing the A local store.

Attention is directed for the moment to FIGS. 16, 17 and 18 which use a direct accessing method not requiring the use of local storage/external address forms of FIG. 12. It will be recalled from the description above that in each of the three control words bits C1.1–6 are utilized to directly energize the X and Y decode lines of the local store or external address registers. In FIG. 16 these bits which are identified as the link address will be a destination in the event that the word is a link type word and they will be addressing a source when the control word is a return type word. Even though these bits are used only to address a destination in the A or B local store, nevertheless they must be entered into the local store addressing circuits during the source read time (e.g., 35–75 time). This is because access to the A local store destination register 154 is by way of the X,Y lines. If the bits are addressing a destination only, then readout of the selected register during the source read time is effected. However, the data is blocked from entry to the ALU alternatively in the A register or the A byte assembler.

This part of the address decode circuit for the A local store is illustrated in FIG. 11*a*. The circuits include first and second AND-circuits 830 and 831. The inputs to the AND-circuit 830 are the control word bits –C0.0, –C0.1 C0.2 and C0.3. When these input lines to the AND-circuit 830 are all in their logical one states, the AND-circuit 830 produces an output signal on its output line Word Move which is applied to an OR-circuit 832, the output of which causes an AND-circuit 833 to gate bits C1.1–6 to the decode circuits 803 by way of the AND-circuit 804. The AND-circuit 833 includes an additional input bit line –C1.0 which indicates that the A local storage unit rather than an external is to be selected.

The Branch And Link output line from the AND-circuit 831 is energized when the input conditions on lines –C0.0, –C0.1, C0.2 and –C0.3 are satisfied. A signal on the Branch And Link line output from the AND-circuit 831 is applied to the AND-circuit 833 by way of the OR-circuit 832 and in the event that the bit line –C1.0 is energized, the bit lines C1.1–6 are gated to the decode circuit 803 by way of the AND-circuit 804.

A fragmentary illustration of the A local storage unit 5 is illustrated in FIG. 11*b*. Only the byte 0 and byte 1 positions of the local storage unit are shown. As indicated earlier, the A and B local storage units 5 and 6 comprise monolithic transistor storage means; and, in the preferred embodiment, each monolithic chip comprises transistor means for storing 64 bits of data. Since the local storage unit 5 comprises 64 words of storage, then each of the 64 bits on one monolithic chip can provide the bit storage for one bit position of each local storage register.

Thus as seen in FIG. 11*b*, the byte one position of the A local storage unit 5 includes a plurality of monolithically fabricated chips 840–0 to 840–7 (plus one chip for parity), one for each bit position of byte 1. On each of the chips 840–0 to 840–7 are 64-bit storage positions. Each of the 64 bit positions on each transistor or semiconductor chip can be accessed by a respective one of the 8 X lines X0–X7 and a respective one of the Y drive lines Y0–Y7 by way of driver circuits 841 and 842. The pair of X and Y drive lines out of a respective pair of driver circuits 841 and 842 selects a corresponding bit position in each of the chips such as 840–0 in the entire array of the A local storage unit 5. Since the local storage unit 5 comprises words having 32 bit positions plus four parity bit positions, there are 36 chips such as 840–0 in the A local storage unit 5.

In order to read data out of the A local storage unit 5, a set line such as the lines Set 0 and Set 1 are provided for each byte position of the local storage unit. When these set lines are energized, they gate the output of respective sense amplifiers 843–0 to 843–7 and 844–0 to 844–7 to sense latches such as 845–0 to 845–7 and 846–0 to 846–7. (The parity bits and some of the bit positions of the local storage unit have not been illustrated in FIG. 11*b*.) The outputs of the sense latches 845–0 to 845–7 and 846–0 to 846–7 together with the outputs of the sense latches (not shown) for bytes 2 and 3 of the A local storage unit 5 comprise the output cable 201 which has been illustrated earlier in FIGS. 2*b* and 2*c*.

With particular reference to FIGS. 2*f*, 2*g*, 2*c* and 2*b* it will be seen that the data inputs to the A local store are derived from the SDBO assembler 11 and its output cable 193. Two data lines of this cable 193, i.e., the SDBO Assembler Byte 0 Bit 0 and the SDBO Assembler Byte 1 Bit 0 are shown coupled to corresponding byte and bit position chips such as 840–0. These data inputs are coupled to the inputs of all 64 bits in a semiconductor chip such as 840–0 and the particular one of the 64 bits intended to be stored into is selected by the particular X and Y drive lines which have been selected by the decode circuits 803. The data input lines are coupled to the semiconductor chips by way of bit drive circuits 848–0 to 848–7 and 849–0 to 849–7. These bit drive circuits 848–0 to 848–7 are gated drivers and therefore require a second input thereto to be energized to produce an output. The other input to the driver circuits 848–0 to 848–7 is formed by the output of a timing gate circuit Bit Timing Power 850, the input to which is the line A Local Store Bit Gate Byte 0. Similarly, the driver circuits 840–0 to 849–7 are gated by the output of the timing circuit Bit Timing Power 851, the input to which is the line A Local Store Bit Gate Byte 1.

The timing lines A Local Store Bit Gate Byte 0 and 1 are derived from similar local storage timing circuits one of which is illustrated in the lower half of FIG. 11*b*. Note in the lower right-hand corner of FIG. 11*b* the output line A Local Store Bit Gate Byte 0 and the output line Set 0 both of which correspond to the input lines to the A local storage unit 5 described above with respect to writing data into and reading data from the byte 0 positions of the local storage unit 5.

The output line Set 0 is formed by means including an AND-circuit 855, the output of which is coupled to an OR-circuit 863 by way of an OR-circuit 860, an inverter 861 and an AND-circuit 862. The inputs to the AND-circuit 855 are the clock output pulses 2 Time and 2 Time Delay. The OR-circuit 860 includes another input from the clock circuit, i.e., 0 Time Delay. The AND-circuit 862 includes a second input which is derived from means including an AND-circuit 864, the output of which forms an input to the OR-circuit 865, the output of which is applied to the AND-circuit 862 by way of a time delay circuit 866. The AND-circuit 864 comprises a pair of inputs, the clock input line 2 Time Delay and the line Storage Cycle One. The OR-circuit 865 includes a second clock input 0 Time.

An AND-circuit 867 has an output which forms a second input to the OR-circuit 863 for energizing the output line Set 0. The inputs to the AND-circuit 867 are derived from means including an AND-circuit 868, the output of which is coupled to both inputs of an AND-circuit 867 by way of an AND-circuit 869, an OR-circuit 870, a time delay circuit 871 which has its output connected directly to one input of the AND-circuit 867 and its output coupled to the other input of the AND-circuit by way of the time delay 872 and an inverter 873.

An AND-circuit 869*a* has an output which forms an input to OR-circuit 870. The circuit 869 has input lines Oscillator, –Destination External and 0 Time Delay. The line Oscillator is applied to AND-circuit 869 via time delay circuit 874.

The output of the AND-circuit 870, Bit Gate Timing, is also applied directly to one input of an AND-circuit 875, the output of which forms the line A Local Store Bit Gate Byte 0. The output line Bit Gate Timing Pulse Delay of the time delay circuit 871 forms a second input to the AND-circuit 875. A third input to the AND-circuit 875 is provided by a line Destination Latch Byte 0 which will be described below with respect to FIG. 11*c*. The fourth input to the AND-circuit 875 is the clock output –0 Time Delay.

In the preferred embodiment, similar circuits such as those formed by the logical circuits 855–875 inclusive are provided for each of the bytes of the A local storage unit 5. However, in each of these similar circuits a different destination byte line is provided.

The destination byte latches 879–0 to 879–3 (FIG. 11*c*) have output lines Destination Latch Byte 0 to Destination Latch Byte 3. One input to each of the destination byte latches is provided by the output of an AND-circuit 880 which has input 1 Time Delay, 1 Time and –Inhibit Under Special Circumstances.

Each of the destination byte latches 879–1 to 879–3 has a second input derived respectively from a predestination byte latch 881–0 to 881–3. The predestination byte latches 881–0 to 881–3 include timing inputs from an AND-circuit 882, the inputs to which are the clock outputs 0 Time Delay and 1 Time. Each of the predestination byte latches 881–0 to 881–3 includes a respective logic circuit such as circuit 883–0 which provides an input to the predestination byte latch 881–0.

The logic circuit 883–0 includes three AND-circuits 884, 885 and 886, the outputs of which form inputs to an OR-circuit 887. The AND-circuit 884 has inputs Gate Byte 0 to A Byte Assembler derived from the A byte assembler and controls of FIGS. 7*a*, 7*b* and the decode line A Destination Forms Decode. The AND-circuit 885 includes a pair of input lines, Gate Byte 0 to B, which is derived from the B byte assembler controls of FIGS. 9*a*, 9*b*, and B Destination Forms Decode. The AND-circuit 886 includes an input line Force From Forms Decode.

Circuits (not shown) similar to 883–0 are provided for each of the remaining predestination byte latches 881–1, 2 and 3. Thus, depending upon which control word is being executed, which local store or external register is being selected as a data destination and which bytes are to be destined, then the AND-circuit at 882 will apply a pulse from 90 time to 135 time for setting the predestination latches 881–0 to 881–3 if their corresponding byte positions of the register have been selected for destining data and corresponding latches 879–1 to 879–3 are set by the AND-circuit 880 during the time period 135 to 180 time.

Note that the destination byte latches 879–1 to 879–3 are used for both the A and B local storage units 5 and 6. A separate and similar set of destination byte latches (not shown) are provided for the external registers 7.

The X and Y local storage drive lines of the cable 153 are coupled to an A local store destination address buffer 155 of FIG. 11*c* which was shown and briefly described in the description with respect to FIG. 2*b*. The coupling of the X and Y lines to the buffer 155 is by way of an XY to binary convert circuit 900 and an AND-circuit 901.

The circuit 900 changes the bit structure of the XY lines into a six-bit binary value structure of the type similar to the inputs to the decode circuit 803. These binary values are then gated to the buffer 155 by the AND-circuit 901 which includes as one input, the output of the circuit 900 and as another input, the output of an AND-circuit 902. The AND-circuit 902 has as inputs the clock pulses 0 Time Delay, 0 Time and the line Storage Interlock Cycle. The output of the AND-circuit 902 forms the set/reset inputs to the buffer 155, the set being coupled by way of the AND-circuit 901 and the reset input being coupled by way of an invert circuit 903. In the preferred embodiment, the buffer 155 comprises a polarity hold latch (not shown) for each bit position of the binary address.

The output of the buffer 155 is coupled to the A local store destination address register 154 (which is also shown in FIG. 2*b*) by way of an AND-circuit 904. It will be recalled that, depending upon which of the sources, the A or B source, is to be used as a destination as described in FIG. 2*b*, either the contents of the A buffer 155 or the contents of the B buffer 157 are gated to the A destination address register 154. Thus in FIG. 11*c* it can be seen that the contents of the B local storage buffer are gated to the register 154 by way of an AND-circuit 905.

Selection of either AND-circuit 904 or the AND-circuit 905 for gating either the A source or the B source to the register 154 is determined by logic circuits including an AND-circuit 906, the inputs to which are the lines Storage 2 Cycle and 1 Time Delay. The output of the AND-circuit 906 forms an input to an OR-circuit 907, the output of which forms a second input to the AND-circuit 905 via inverter 908. The OR-circuit 907 includes an additional input line A Destination which indicates that the A source is also the destination. The OR-circuit 907 has additional input lines Branch, Branch And Link and Move Word 0 Version.

The output of the OR-circuit 907 is supplied directly to the AND-circuit 904 for gating the contents of the buffer 155 to the registers 154 when one of the inputs to the OR-circuit 907, Branch, Branch And Link, Word Mark 0, A Destination, or Storage Cycle 2 plus 1 Time Delay conditions are present. In all other instances the output of the OR-circuit 907 is in its logical 0 state which causes the AND-circuit 905 to gate the contents of the B local store buffer 157 to the register 154. It will be recalled that when data is destined to the A local store unit 5, it is also stored in the same position of the B local store 6 and vice versa. The circuits 904–908, inclusive, together with similar circuits (not shown) associated with the B local storage unit, achieve this destination function.

In the preferred embodiment, the register 154 is comprised of a polarity hold latch for each bit position thereof. The set/reset functions for the register 154 are provided by means including a pair of AND-circuits 910 and 911, the outputs of which form inputs to an OR-circuit 912. The output of the OR-circuit 912 forms one input of an AND-circuit 913. The other inputs of the AND circuit are provided by the clock timings 2 Time Delay and Storage 2 Cycle. The output of the AND-circuit 913 provides the set pulse and the output of the OR-circuit 912 provides the reset pulse. The AND-circuit 910 includes clock inputs 1 Time Delay and 1 Time. The AND-circuit 911 includes the clock controls input Storage 2 Cycle. The other input to the AND-circuit 911 is provided by the output of an AND-circuit 914, the inputs to which are the clock times 2 Time Delay and 2 Time.

The output cable 173*a* from the register 174 is coupled as described earlier to a compare circuit 181 for the destination look-ahead mechanism 41 of FIG. 1. The output cable 173*a* is also coupled to the slow X-Y input gate circuit 806 of FIG. 11*a* by way of an assembler 920 and its output cable 173. Other inputs to the assembler 920 include address bits from the console file 40 of FIG. 1 and from a force hardware mechanism (not shown) neither of which inputs are required for an understanding of the present improvement and will therefore not be described further.

Figure 13A:
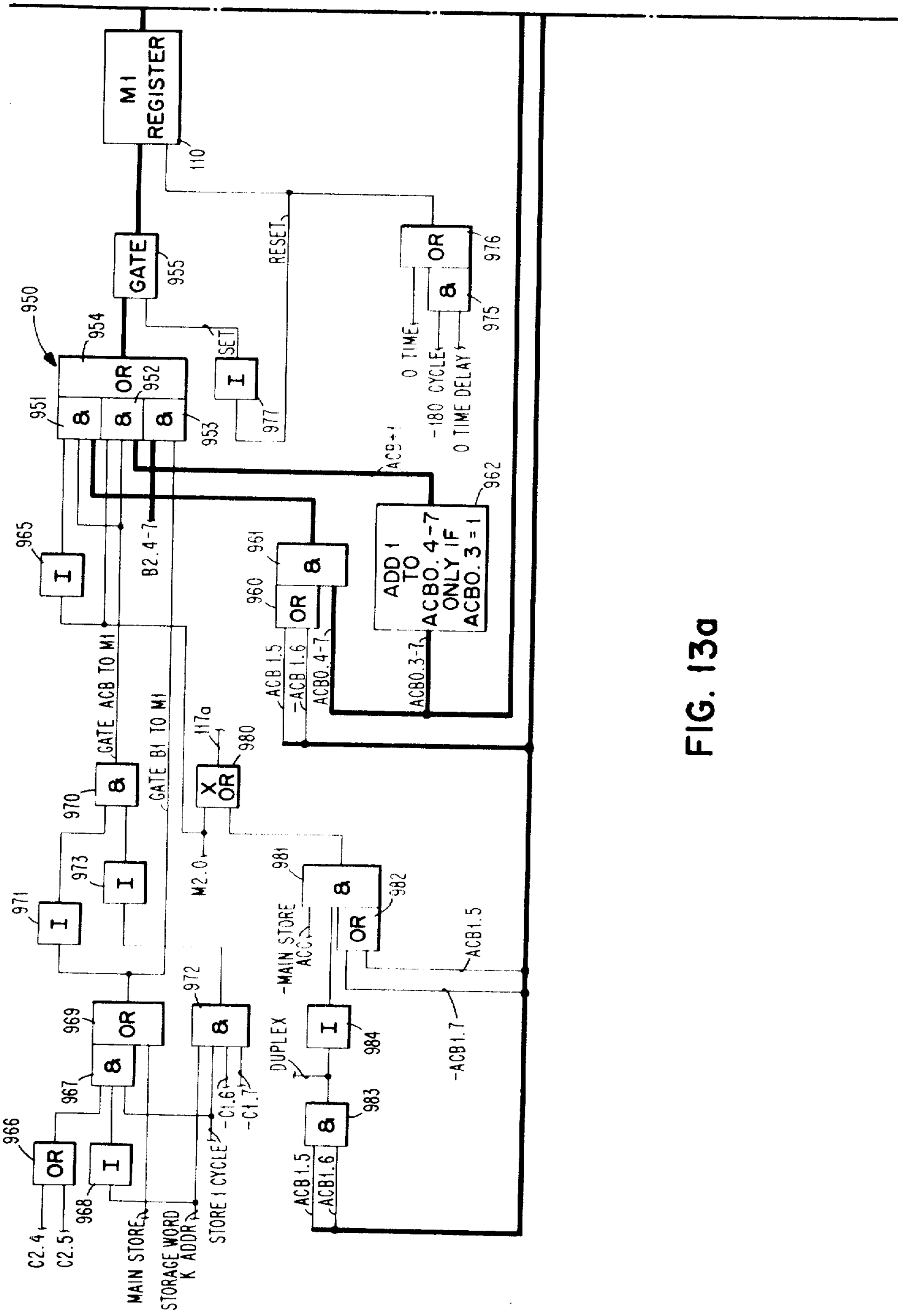
Figure 13B:
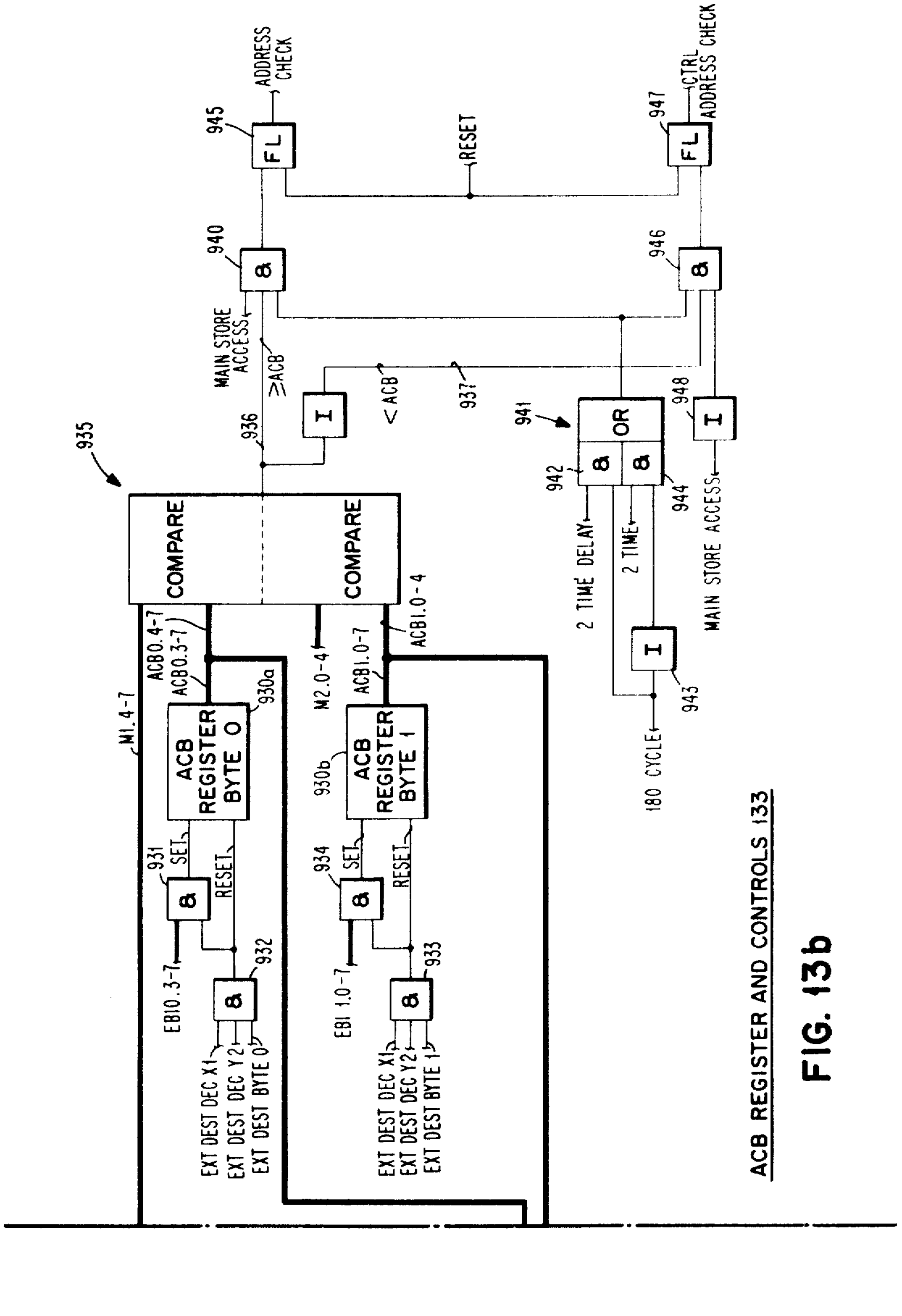

ACB Register and Controls—FIGS. 13*a*, 13*b*

The ACB register is shown as being divided in two portions 930*a* and 930*b* of FIG. 13*b*. In the section 930*a*, byte 0 bits 3–7 are stored, bits 0–2 not being required for the preferred embodiment. The section 930*b* has bit storage positions for byte 1 bits 0–7, inclusive. The register sections 930*a* and 930*b* are initialized during an initial microprogram load time to establish the particular customer's storage configuration information.

To initialize the register, the bus EBI0.3–7 is coupled to the input of the register section 930*a* by way of an AND-circuit 931. A register byte and word select line External Destination Decode X1, External Destination Decode Y2, and External Destination Byte 0 input lines are applied to an AND-circuit 932, the output of which is applied to the input of the AND-circuit 931 and which is applied as a reset pulse to the ACB register section 930*a*.

The ACB register sections are made up of a polarity hold latch for each bit position. Therefore, the output of the AND-circuit 932 provides the set and reset inputs to the register positions. In a similar manner an AND-circuit 933 and an AND-circuit 934 couple the cable EBI1.0–7 to the ACB register section 930*b* and provide the set and reset inputs to the register section.

The outputs of the ACB register sections 930*a* and 930*b* are applied as inputs to a compare circuit 935. Additional inputs to the compare circuit 935 are provided by bits M1.4–7 and bits M2.0–4. During each access to the common storage unit 1 for control and main store, the bits M1.4–7 and M2.0–4 are compared with the settings of the ACB register bits ACB0.4–7 and ACB1.0–4 to determine whether or not the M register address is equal to or greater than the ACB register value or whether the address is less than the ACB register value. The output lines 936 and 937 indicate the results of this comparison, the line 937 being coupled to the output line 936 by way of an inverter 938.

If the output of the compare circuit 935 indicates that the M register address value was equal to or greater than the ACB register value, then the access should be equal to the control store portion 1*a* of the storage unit 1. If the output line 936 is in its logical 1 state, it partially prepares an AND-circuit 940 of FIG. 13*b*. A second input to the AND-circuit 940 is the decode line Main Store Access. A third input to the AND-circuit 940 is the output of a logic circuit 941.

The logic circuit 941 includes a first AND-circuit 942 the inputs to which are the clock lines 1 Time Delay and 180 Cycle. The line 180 Cycle is also applied to an inverter 943 the output of which forms one input to an AND-circuit 944 of the logic block 941. The other input to the AND-circuit 944 is the clock output 2 Time. If when the input conditions to the logic block 941 are satisfied, the line 936 and Main Store Access are in their logical 1 states, the output of the AND-circuit 940 causes a latch 945 to be set indicating an address check or error.

If the M register address value is less than the ACB register value resulting in a logical 1 condition being applied to the line 937, then the AND-circuit 946 and a latch 947 will result in a control address check or error condition being given in the event that control storage is being accessed at the time. The AND-circuit 946 includes the line 937 as one input, and the output of the logic block 941 as a second input. The third input to the AND-circuit 946 comprises an inverter 948 the input to which is the line Main Store Access.

An assembler 950 (FIG. 13*a*) is utilized for setting the bits 4–7 of the M1 register 110 from alternatively the B register bits B1.4–7 which forms one input thereto, an ACB input thereto or an ACB+1 input thereto. The inputs ACB, ACB+1 and B1.4–7 are applied as inputs to AND-circuits, 951, 952 and 953, respectively, of the assembler 950. The outputs of the AND-circuits form inputs to an OR-circuit 954 the output of which is applied to the register 110 by way of a gate 955.

The ACB input to the assembler 950 is derived from means comprising an OR-circuit 960, the output of which is applied as an input to the AND-circuit 961. The output of the AND-circuit 961 is the cable ACB. The inputs to the OR-circuit 960 are the ACB register output lines ACB1.5 and –ACB1.6. The other inputs to the AND-circuit 961 are the ACB register output lines ACB0.4–7. If either condition is present at the input of the OR-circuit 960, that is either the line ACB1.5 or the line –ACB1.6 is in its logical 1 state, then the output of the OR-circuit 960 will cause the bits ACB0.4–7 to be gated through the AND-circuit 961 to the input of the AND-circuit 951.

In the event that the bit ACB0.3 is equal to a logical 1, then an add circuit 962 causes a value of 1 to be added to the value of the bits ACB0.4–7; and the resultant value is applied as an input to the AND-circuit 952 by way of the line ACB+1. In the event that the bits ACB0.3 is equal to a logical 0, then the line ACB+1 will have applied thereto the same value as the value of ACB0.4–7 without the 1 added.

In the event that bit M2.0 is in its logical 1 state, then the value on line ACB+1 (either the value of ACB0.4–7 or 1 greater than that value) is gated into the M1 register 110 by way of the AND-circuit 952, the OR-circuit 954 and the gate 955. However, if the M register bit M2.0 is equal to a logical 0, then it causes an inverter 965 to cause the value on the input cable ACB to be gated through the AND-circuit 951, the OR-circuit 954 and the gate 955 to the M1 register 110. The reasons for this unusual gating of the ACB register bits into the M1 register 110 for addressing control storage will be described in greater detail below.

The circuits for determining whether the ACB register bits, modification of the ACB register bits or alternatively the address bits from the B register are to be gated into the M register 110 by way of the assembler 950 include a first OR-circuit 966, the inputs to which are the bit lines C2.4 and C2.5. The output of the OR-circuit 966 forms one input of an AND-circuit 967. The AND-circuit 967 includes a second input which is the output of an invert circuit 968. The input to the invert circuit 968 is the decode line Storage Word K Address. The AND-circuit 967 includes a third input Store 1 Cycle. The output of the AND-circuit 967 forms an input to the OR-circuit 969. The output of the OR-circuit 969 is applied to an AND-circuit 970 by way of an invert circuit 971. The output of the AND-circuit 970 is the line Gate ACB To M1 which forms a third input to the AND-circuits 951 and 952 of the assembler 950. When the Gate ACB To M1 line is in its logical 1 state, either the cable ACB or the cable ACB1 forms the address bits for the M1 register.

The OR-circuit 969 includes another input Main Store. The output of the OR-circuit also forms the line Gate B1 To M1 which is applied to the AND-circuit 953 for gating the bits B1.4–7 into the M1 register 110. Thus during any access to main storage or control storage either the line Gate ACB To M1 or alternatively Gate B1 To M1 is in its logical 1 state.

The AND-circuit 970 includes a second input which is derived from an AND-circuit 972 by way of an invert circuit 973. The AND-circuit 972 includes the input lines Storage Word K Address and Store 1 Cycle. Additional inputs to the AND-circuit 972 are provided by the bit lines –C1.6 and –C1.7.

The set and reset inputs to the M1 register 110 are provided by an AND-circuit 975 and an OR-circuit 976. The inputs to the AND-circuit 975 are provided by the clock lines –180 Cycle and 0 Time Delay. The output of the AND-circuit 975 provides one input to the OR-circuit 976. The other input to the OR-circuit 976 is provided by the clock line 0 Time. The output of the OR-circuit 976 provides the reset to the register 110 and the set input is provided by way of an inverter 977.

In certain instances, as will be seen below, bit M2.0 is inverted by an Exclusive-OR circuit 980 before it is applied to the driver circuits 114 (FIG. 2*i*) of the storage unit 1. Thus, bit line M2.0 forms one input to the circuit 980 and the output of an AND-circuit 981 forms the other input.

An OR-circuit 982 has input bit lines –ACB1.7 and ACB1.5, and its output forms an input to the AND-circuit 981.

An AND-circuit 983 has input bit lines –ACB1.5 and ACB1.6 and an output line Duplex which is inverted by inverter 984 to form an input to the AND-circuit 981. The AND-circuit 981 includes another input Main Storage Access.

In the description that follows, it should be kept in mind that in the microprogram listings for all systems, the assigned address of the high order byte of control storage is always address FFFF (64K decimal) even though the actual address in the storage unit 1 will differ from system to system, even though there may be fewer than 64K bytes of control storage in a system. Control store is in the high-order address positions of the storage unit 1. The assignment of actual addresses in storage unit 1 starts with the hexadecimal value 00000.

The two-byte ACB register is initialized at initial microprogram load time to establish storage configuration information. Bit significance of the preferred embodiment is:

| | |
|---|---|
| ACB0.3 = 0 | The address check boundary is within the upper 32K of available internal storage (i.e., storage physically packaged in the same housing as and close to the CPU). |
| ACB0.3 = 1 | The address check boundary is below the upper 32K of available internal storage. (Maximum available internal storage of 256K bytes can be provided.) |
| ACB0.4–7 and ACB1.0–4 | These nine bits specify a particular 2,048 byte boundary. If a main storage access is attempted at or above the boundary, an address check occurs. If a control storage access is attempted below the boundary, a machine check occurs. In duplex (two processors) systems, the boundary is at the upper limit of available shared main storage and does not depend upon the configured sub system. |
| ACB1.5 = 0 | a. The system is simplex (one processor) with no external storage (i.e., storage packaged in a different housing than the CPU), or b. The system is duplex. |
| ACB1.5 = 1 | The system is simplex with external storage. |
| ACB1.6,7 | If ACB1.5 = 1, then ACB1.6,7 specify the number of bytes in external main storage for the simplex system as follows: 00 = 131,072 bytes, 01 = 262,144 bytes, 10 = 524,288 bytes. |
| ACB1.6 = 1 | If ACB1.5 = 0, then ACB1.6 is one if the system is duplex. |
| ACB1.6 = 0 | If ACB1.5 = 0, then ACB1.6 is zero if the system is simplex. |
| ACB1.7 = 0 | If ACB1.5 = 0, then M2.0 is inverted during control storage accesses. |
| ACB1.7 = 1 | If ACB1.5 = 0, then M2.0 is not inverted during control storage accesses. If ACB1.5 = 1, then M2.0 is always inverted, in simplex systems, during control storage accesses regardless of the value of ACB1.7. In duplex systems, if ACB1.7 = 1, then ACB0.4–7 and ACB1.0–4 are not used to compare to main storage addresses. In full-duplex systems, ACB1.7 should be set to 1 only for the 1,024K storage size. |

The value in ACB0.4–7 and ACB1.0–4 register bit positions establishes the boundary at and above which an address check occurs for a main storage access. This situation is the same for either simplex or duplex configurations. In duplex systems, however, control storage is assigned a separate address range, rather than the highest address range (as in simplex configurations). The four high-order bits of the address set into M1 are always 0000 for duplex system control storage accesses. The microprogram supplied addresses are then used without modification to access the addressed control storage location. The reason for this arrangement is that only 20 address bits are available in M1, M2, M3, and in the 1,024K byte full duplex system, all address bits are at a value of 1 when an access to the highest ordered main storage location occurs. No higher address can be generated. Therefore, the control storage address range in a full-duplex system is either (depending upon whether 32K or 64K of control storage is installed):

1. 080000 to 0FFFF (32K control), or
2. 00000 to 0FFFF (64K control).

For case 1, ACB0.3 = 0; for case 2, ACB0.3 = 1. If ACB0.3 = 0, a machine check is produced by latch 947 (FIG. **13*b***) when a control storage access in the range 00000 to 07FFF is attempted. All control storage addresses are valid when ACB0.3 = 1.

Two select signals are used for storage accesses in full duplex systems. Hence, even if a control storage location and a main storage location have the same address value, the select signal specifies whether the access is to control or main storage.

EXAMPLE 1

Assume:

1. A simplex system with a total available storage capacity of 65,536 bytes, i.e., all internal storage.
2. The upper 32,768 bytes are assigned to control storage.
3. The lower 32,768 bytes are assigned to main storage.

The ACB register is then set to:

| | ACB0 | | | | | | | | ACB1 | | | | | | | |
|---|---|---|---|---|---|---|---|---|---|---|---|---|---|---|---|---|
| Bit | 0 | 1 | 2 | 3 | 4 | 5 | 6 | 7 | 0 | 1 | 2 | 3 | 4 | 5 | 6 | 7 |
| Value | 0 | 0 | 0 | 0 | 0 | 0 | 0 | 0 | 1 | 0 | 0 | 0 | 0 | 0 | 0 | 1 |

1. ACB0.3 = 0 specifies that the address check boundary is in the upper 32,768 bytes and the bits ACB0.4–7 are not incremented by 1 to obtain the actual control word address.
2. ACB0.4–7 and ACB1.0–4 = 0000 10000 locate the boundary at location 32,768. Any main storage access at or above binary address 0000 1000 0000 0000 0000 (08000 in hexadecimal) results in an address check. Any control storage access below the same address results in a machine check.
3. ACB1.5,6 = 00 specify that the system is simplex with no external storage.
4. ACB1.7 = 1 specifies that bit M2.0 is not inverted by the Exclusive-OR circuit 980 during control storage accesses to obtain the actual control word address.

The bits set into M1 register (via circuit 951 or 952) during any control word access are from ACB0.4–7, which, for this example, are 0000. Also, modification of bit M2.0 is not done during control word accesses. The reason for this is that the microprogram supplied two-byte addresses for control storage (i.e., 8000 to FFFF) are in the actual range of unit 1 used (i.e., 08000 to 0FFFF); OR-circuit 982 is not satisfied whereby the input to circuit 980 from circuit 981 is logical 0. Any microprogram supplied control word address below 8000 causes a machine check.

EXAMPLE 2

Assume:

1. A simplex system with a total available storage capacity of 98,303 bytes.
2. The highest 32,768 bytes are assigned to control storage.
3. The low 65,536 bytes are assigned to main storage.

The ACB register is then set to:

| | ACB0 | | | | | | | | ACB1 | | | | | | | |
|---|---|---|---|---|---|---|---|---|---|---|---|---|---|---|---|---|
| Bit | 0 | 1 | 2 | 3 | 4 | 5 | 6 | 7 | 0 | 1 | 2 | 3 | 4 | 5 | 6 | 7 |
| Value | 0 | 0 | 0 | 0 | 0 | 0 | 0 | 1 | 0 | 0 | 0 | 0 | 0 | 0 | 0 | 0 |

1. ACB0.3 = 0 specifies that the address check boundary is in the highest 32,768 bytes of the unit 1, and ACB0.4–7 is not incremented.
2. ACB0.4–7 and ACB1.0–4 = 0001 00000 locate the boundary at storage unit 1 location 65,536.
3. ACB1.5,6 = 00 specify that the system is simplex with no external storage.
4. ACB1.7 = 0 (and ACB1.5,6 = 00) specifies that M2.0 is inverted by circuit 980 during control storage accesses to obtain the actual (unit 1) address, i.e., circuits 981-984 apply a logical 1 to circuit 980.

The actual storage address ranges are the following in this system (in hexadecimal):

| Main Storage Address | Location |
|---|---|
| 00000 | 0 |

| | |
|---|---|
| to | to |
| 0FFFF | 65,535 |
| Control Storage Address | Location |
| 10000 | 65,536 |
| to | to |
| 17FFF | 98,303 |

The control storage address (supplied by the microprogram) corresponding to the actual storage address 10000 is 8000. During such a control storage access, M1.4–7 are set to the same value as ACB0.4–7 via circuit 952, which for this example are equal to 0001 (1 in hexadecimal). Because ACB1.5,6 = 00 and ACB1.7 = 0, the high order bit of the microprogram supplied address (M2.0) is inverted before the address is sent the storage address unit 114. Inverting the high-order bit of 8000 yields 0000. Hence, the actual address sent to the storage address unit 114 is 10000.

EXAMPLE 3

Assume:
1. A simplex system with a total available storage capacity of 98,303 bytes.
2. The highest 65,536 bytes are assigned to control storage.
3. The lowest 32,768 bytes are assigned to main storage.

The ACB register is then set to:

| | ACB0 | | | | | | | | ACB1 | | | | | | | |
|---|---|---|---|---|---|---|---|---|---|---|---|---|---|---|---|---|
| Bit | 0 | 1 | 2 | 3 | 4 | 5 | 6 | 7 | 0 | 1 | 2 | 3 | 4 | 5 | 6 | 7 |
| Value | 0 | 0 | 0 | 1 | 0 | 0 | 0 | 0 | 1 | 0 | 0 | 0 | 0 | 0 | 0 | 0 |

The only differences between this arrangement and that in example 2 are:
1. ACB0.3 = 1 now specifies that the boundary does not lie in the uppermost 32,768 byte address range of unit 1.
2. The boundary, established by ACB0.4–7 and ACB1.0–4 (equal to 000010000), is at location 32,768. The address ranges (in hexadecimal) for this system are then:

| Main Storage Address | Location |
|---|---|
| 00000 | 0 |
| to | to |
| 07FFF | 32,767 |
| Control Storage Address | Location |
| 08000 | 32,768 |
| to | to |
| 17FFF | 98,303 |

The microprogram supplied address 0000 (hexadecimal) should address the lowest order word (at location 08000) in the control storage area. This is accomplished by:
1. Setting 0000 (hex) into the M2M3 registers.
2. Inverting the output of M2.0 in circuit 980 (because ACB1.7 = 0 and ACB1.5 = 0) using circuits 981–984.
3. Using ACB.4–7 (=0000) to set M1.4–7 via circuit 951 since M2.0 = 0.

A control-storage access within the address range 8000 to FFFF (microprogram supplied) for this example configuration is slightly different. Microprogram supplied addresses in the range 8000 to FFFF correspond to storage unit addresses in the range 10000 to 17FFF. For example, if a microprogram supplied address of 8000 is used, the following modification occurs:
1. 8000 is set into M2M3.
2. The output of M2.0 is inverted by circuit 980.
3. Because ACB0.3 = 1 and bit M2.0 = 1 before the inversion, bits M1.4–7 are set to ACB0.4–7 + 1 (i.e., 0000 + 1 = 0001) by way of circuit 952.

The actual location addressed, then, is 10000 as a result of manipulation of the microprogram supplied address 80000.

The following tables specify typical ACB settings:

Simplex:

| Total Storage (Bytes) | Control Storage | Main Storage | ACB Setting (Hexadecimal) |
|---|---|---|---|
| 65,536 | 32,768 | 32,768 | 0081 |
| 98,304 | 32,768 | 65,536 | 0100 |
| 131,072 | 32,768 | 98,304 | 0181 |
| 131,072 | 65,536 | 65,536 | 1101 |
| 294,912 | 32,768 | 262,144 | 0400 |
| 294,912 | 65,536 | 229,376 | 1380 |
| 425,984 | 32,768 | 393,216 | 0604 |
| 425,984 | 65,536 | 360,448 | 1584 |
| 557,056 | 32,768 | 524,288 | 0805 |
| 557,056 | 65,536 | 491,520 | 1785 |

In duplex configurations an attempt to move the address check boundary to other than the specified control storage capacity of the system cannot be done. CPU internal storage cannot be used as main storage because a separate select signal is used for control storage.

Duplex:

| Total Bytes Shared Main Storage | Control Storage | ACB Setting (Hexadecimal) |
|---|---|---|
| 262,144 | 32,768 | 0402 |
| 262,144 | 65,536 | 1402 |
| 524,288 | 32,768 | 0802 |
| 524,288 | 65,536 | 1802 |
| 786,432 | 32,768 | 0C02 |
| 786,432 | 65,536 | 1C02 |
| 1,048,576 | 32,768 | 0FFB |
| 1,048,576 | 65,536 | 1FFB |

Branch Word

Figure 24:
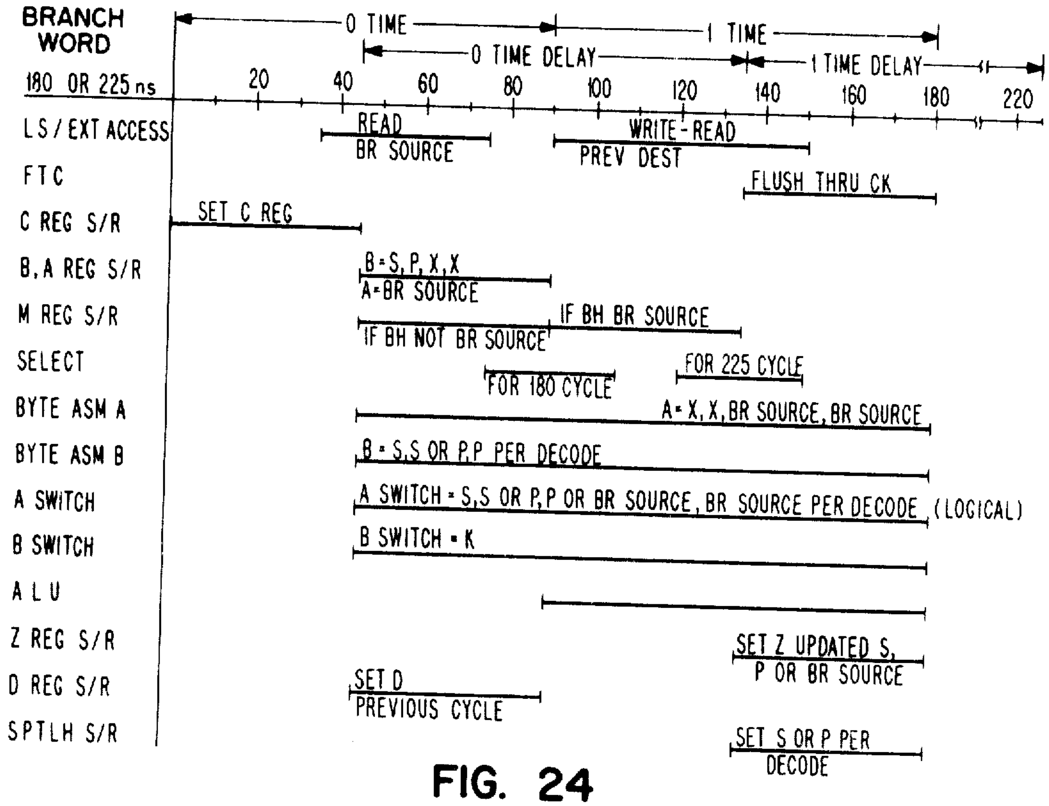

FIG. 23 is a diagrammatic illustration of the execution of a typical branch word of the type requiring a 180-nanosecond cycle time. FIG. 24 shows the timing for various operations during the execution of the branch word. The C register 2 is illustrated at the right-hand side of FIG. 23 with byte positions CO, C1, C2 and C3. The hexadecimal values of the four bytes of the control word 1036204F are illustrated above the register 2. The data bit positions in each of the bytes is illustrated in the left-hand column within the C register and the bit values of the control word are illustrated in the right-hand column within the C register. Arbitrarily selected values have been assigned to the P register and to byte 1 of the V register at address 13 in the local store units 5 and 6.

The four high order bits CO.0–3 have a value 0001 which indicates a branch word type. The objective of the execution of this branch word is to branch to a control word within the same module of control storage. M2 is set from N2 and therefore remains the same; only M3 is changed. The specific word address within the module (the change in M3) is determined by (1) the branch high field CO.4–7, (2) the next address bits C3.0–3 and (3) the branch low field C3.4–7. Since we are accessing a control word, which is always aligned on a word boundary, bits 6 and 7 of M3 are disregarded because they are byte selection bits of the address register.

The branch high bits C0.4–7 are equal to 0000 and therefore force bit 4 of M3 to zero. A decode of the branch low field (1111) causes transfer of branch source data to the branch circuits 4 to force bit 5 of the M3 register according to a test. The four high-order bits C1.0–3 cause direct local storage addressing whereby the four low-order bits of the P register together with bits C1.1–3 are decoded by circuit 150 to address the U register in the A local storage unit 5. The data in the U register is transferred to the A register 21. Bits C1.4–5 cause the hexadecimal value FB (byte 1 of the U register) to be transferred from A1 to the byte 2 and 3 positions of the A byte assembler 23. Byte 3 of the A byte assembler 23 is gated to the branch circuits 4, and the branch low select bits C3.4–7 gate bit 7 of the branch circuits, i.e., a logical 1, to bit 5 of the M3 register. Transfer of the branch source data from the A local storage unit 5 to the branch circuits 4 occurs approximately from 35 time to 75 time (FIG. 24). Setting of the M3 register occurs approximately from 45 time to 90 time in this particular instance because the branch word is of the type in which the branch source sets bit 5 of the M3 register which selects either the odd or even word of a double word and is not required until later in the cycle. The double word is read from the control store from approximately 75 time and 105 time as indicated by the select line.

The branch to a new control word is also accompanied by updating of the P register to accommodate local storage addressing. Thus, approximately 45–90 time, C2.2,3 cause the P register to be addressed and transferred to the B register 22, then the assembler 24 and ALU2 and ALU3. Bits C1.6,7 gate the K value (C2.4–7) to ALU2 and ALU3. At approximately 45 time, bits C2.2,3 gate the P register value (00000010) via the B register 22 and the byte assembler 24 to ALU2 and ALU3. The B switch is effective with a decode of bits 6 and 7 of byte C1 of the control word being equal to 10 to gate the K field value 0001 into the high order input of ALU2 and ALU3 and the value 0000 in the low order input. When the P and K values are OR'ed together (i.e., bit C2.1 calls for an OR function), in the ALU, the result which is equal to the hexadecimal value 12 is stored in the Z register 30. At approximately 135 time the result is set into the P register.

Arithmetic Word—Full Word True Add

FIG. 25 is a diagrammatic illustration of the execution of a full word true add requiring a 225-nanosecond cycle as illustrated by the timing diagram of FIG. 26. The lower right portion of FIG. 25 illustrates the operations which occur after 180 time in the cycle. In this regard, attention is directed to the timing diagram, Z register set-reset line, wherein it can be seen that the 0 and 1 bytes of the arithmetic result are stored in the Z register only after the beginning of the next succeeding control word cycle. This does not interfere in any way with the execution of the control word because the setting of the result into the D register does not occur until approximately 45 time of the next succeeding cycle.

The control word B04E64AC of the example is a full word true add with special gating. The main objective of the control word is to add the full word stored in the V register with the low eight bits (e.g., byte 3) of the Y register. The low 24 bits (e.g., bytes 1–3) of the result are to be gated to the low 24 bits of the Y register.

Decode of bits C0.1,2 dictate an arithmetic word type. Decode of bits CO.2,3 determines the form of the arithmetic operation; that is, operands are found at the B source and the A source addresses and the result is stored at the B source address. Decode of bits C0.4–7 dictates a full word true add.

Decode of bits C1.0–3 calls for direct local storage accessing of the A source wherein bits 1, 2 and 3 of byte C1, together with bits 4–7 of the P register, are utilized to select the V register location (i.e., 14) in the A local storage unit 5. The contents of the V register, the hexadecimal values 1497C5A2, are transferred to the A register 21, and then to the A byte assembler 23 in response to decode of C1.4,5 which requires that all 32 bits or four bytes of the V register be transferred. Bits 6 and 7 of byte C1 are status setting bits which cause only the low-order 24 bits (low order bytes 1, 2 and 3) of the result obtained from the arithmetic operation, to be stored or destined to the Y register at local store address 16.

Decode of bits C2.0–3 cause direct addressing of the B source operand with bits 1, 2 and 3 of the C2 byte and bits 4–7 of the P register being utilized to address the Y register in the B local storage unit 6. The contents of the Y register, the hexadecimal value 2DEC5972, are transferred to the B register 22; and bytes 2 and 3 of this word are then transferred to the B byte assembler 24. The decode of bits C2.4,5 cause gating of only the low order eight bits, that is byte 3, of the data in the B byte assembler to ALU3 and blocking of the 24 high order bits (bytes 0–2) of the B source. This inhibits byte 2 in the B byte assembler 24 from being transferred to ALU2. The values in ALU2 are added and entered into bytes 0 and 2 of the Z register 30, and the values in ALU3 are added and entered into bytes 1 and 3 of the Z register 30.

Bits C3.0–5 are set into the M3 register for addressing of the next control word. The next control word is in the same module; therefore the M2 register is set from the N2 register.

The operations which have been described immediately above all occur within the first 180 nanoseconds of the machine cycle as seen in the timing diagram. Beginning at 180 time, the operations illustrated diagrammatically within the broken lines in the lower right-hand portion of FIG. 25 are executed. At 180 time, bytes 0 and 1 of the A register are transferred into bytes 2 and 3 at the A byte assembler 23. At the same time, bytes 0 and 1 of the B register are transferred to the B byte assembler 24. The contents of bytes 2 and 3 of the A byte assembler are transferred to ALU2 and ALU3. However, as indicated earlier, the decode of bits C2.4,5 inhibits the gating of the three high-order bytes of the B source into the ALU. Consequently, the contents of the B byte assembler are blocked from transfer to the ALU. The results of the true add are transferred to bytes 0 and 1 of the Z register 30. This setting of bytes Z0, Z1 occurs as indicated above from 0 time to approximately 45 time of the next succeeding machine cycle. The contents of the Z register are transferred to the D register during the next succeeding cycle between 45 time and 90 time. During the write-read portion of the next machine cycle, only bytes 1, 2 and 3 of the D register will be transferred to register Y in both the A and B local storage units 5 and 6 since the decode of bits C1.6,7 directs only the low 24 bits of the result to be destined.

Arithmetic Word Example—Byte Add

Figure 28:
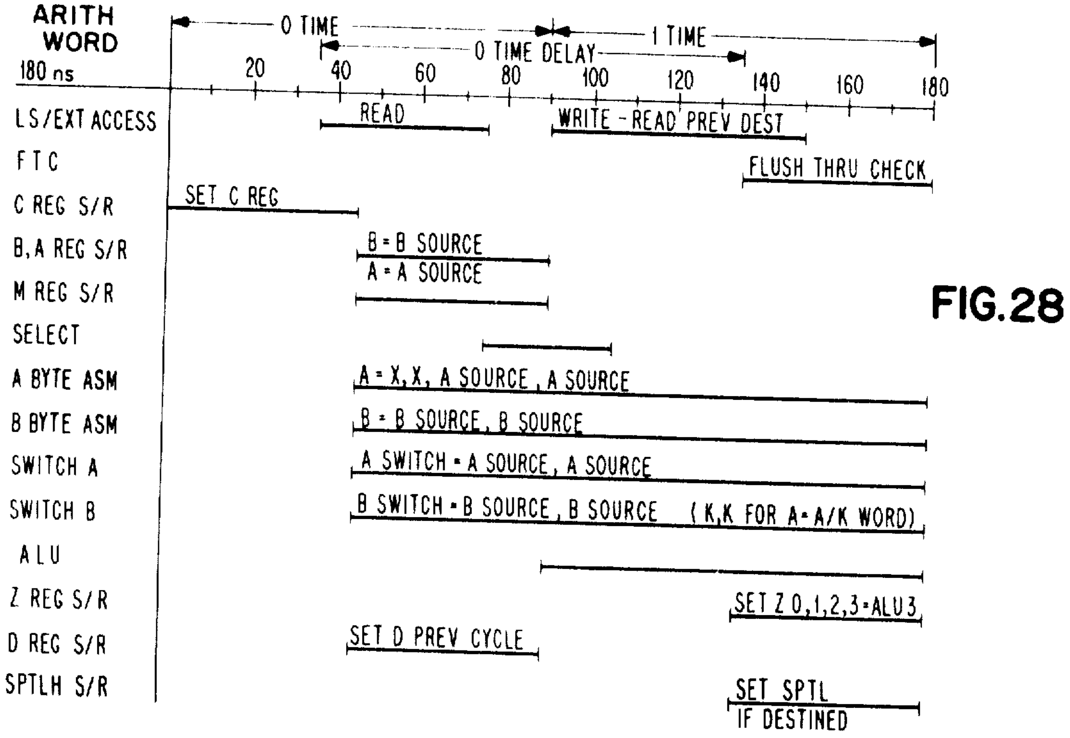
Figure 27:
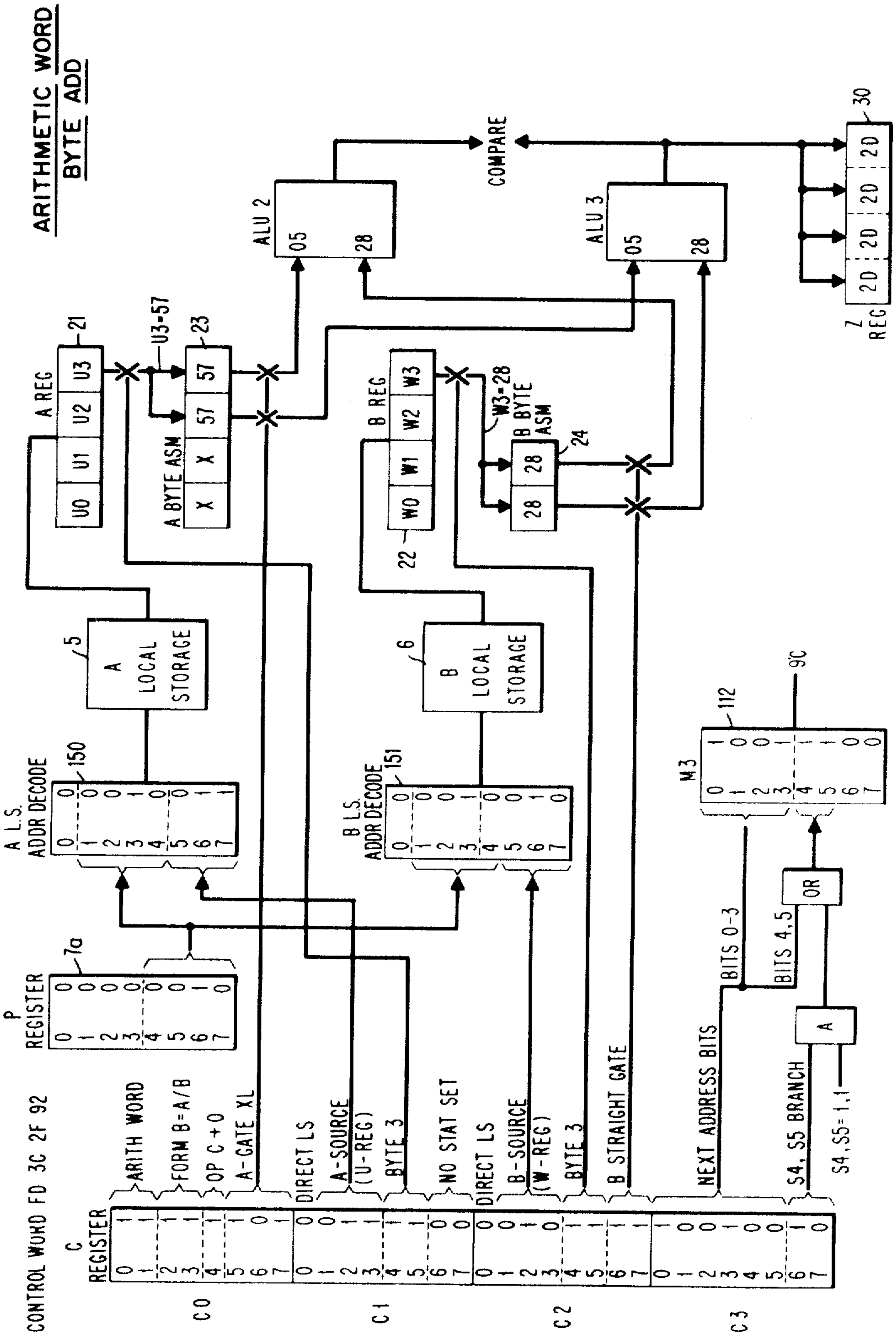

FIG. 27 is a diagrammatic illustration of the execution of control word "FD3C2F92." The related timing diagram is illustrated in FIG. 28. Bits 0 and 1 of byte C0 of the control word, when decoded, indicate an arithmetic word. The specific operation or form is obtained by decode of bits 2 and 3 of byte C0; in this instance the bits are each equal to 1 indicating that the result of an operation utilizing an A source and a B source will be stored away at the B source address. Bit 4 of byte C0 being a 1 indicates that the operation is a true add. A switch gating control is effected by bits 5, 6 and 7 of byte C0. In the example given, these bits are equal to 101 and cause crossing of the high and low-order hexadecimal values (5 and 7) applied to the A switch and then blocking of the high-order value (7) after crossing. Bit 0 of byte C1 being equal to 0 indicates direct addressing of local store whereby bits 1, 2 and 3 of C1 are utilized directly, together with the low-order bits of the P register, to address a selected location (U register) in the A local storage unit 5. Bits 4 and 5 of byte C1 of the control word being equal to 11 cause selection of byte 3 of the A source register (U3) selected from the local storage unit 5. Bits 6 and 7 of byte C1 being equal to 00 results in no setting of the status register S. Bits 0–3 of byte C2 are used to directly address, as a B source, the W register in the B local storage unit 6. The low-order bits of the P register are again utilized for part of the address decode in selecting the W register. The entire contents of the W register are transferred to the B register 22, and the value (28) in byte 3 of the W register is selected for transfer to both byte positions of the B byte assembler 24 by bits 4 and 5 of byte C2 of the control word. Bits 6 and 7 of byte C2 of the control word cause straight gating of the bytes in the B assembler 24 to ALU2 and ALU3. The hexadecimal digits 05 and 28 are added to each other in each of the ALU sections and a comparison is made of the results to determine whether or not any error was made within the ALU sections. Assuming that no error was made, the result which in this instance is the hexadecimal value 2D is transferred to each byte of the Z register 30.

The control word being executed must also effect addressing of the next control word which is to be executed. Thus, bits 0–5 of byte C4 of the control word are used to at least partially form the next control word address. Thus, bits 0–3 of byte C3 are transferred directly to the 0–3 bits of the M3 register. Bits 6 and 7 of byte C3 call for branching in accordance with the status of bits 4 and 5 of the S register. It is assumed that bits 4 and 5 of the S register are each at the logical 1 level; these bits are OR'ed respectively with bits 4 and 5 of byte C3; and the result, which is equal to a logical 11, is gated into bits 4 and 5 of the M3 register. The timing of the above operation is readily apparent from the timing chart of FIG. 28, wherein it can be seen that the C register is set from zero to 45 time whereby forming of the next control word address can be completed between 45 time and 90 time. The next control word can be read out as indicated by the select line starting at about 75 time. The A and B sources are read from the A and B local storage units 5 and 6 between 35 time and 70 time. The A and B sources are available in the A and B registers between 45 time and 90 time. The paths between the A and B registers 21, 22 and their byte assemblers 23, 24 are gated starting at about 45 time and the switching circuits between the byte assemblers and the ALU are also gated at approximately 45 time. The ALU is rendered effective to initiate the selected arithmetic operation at approximately 90 time, and the Z register 30 input gating becomes effective at approximately 135 time. Data, which may have existed in the Z register from a previously executed control word, will have been transferred from the Z register to the D register starting at approximately 45 time and this data is transferred from the D register to the selected locations in the A and B local storage units 5 and 6 starting at about 90 time. The flush-through check of the destined information is effected between 135 time and 180 time.

Decimal Add (True)

Figure 30:
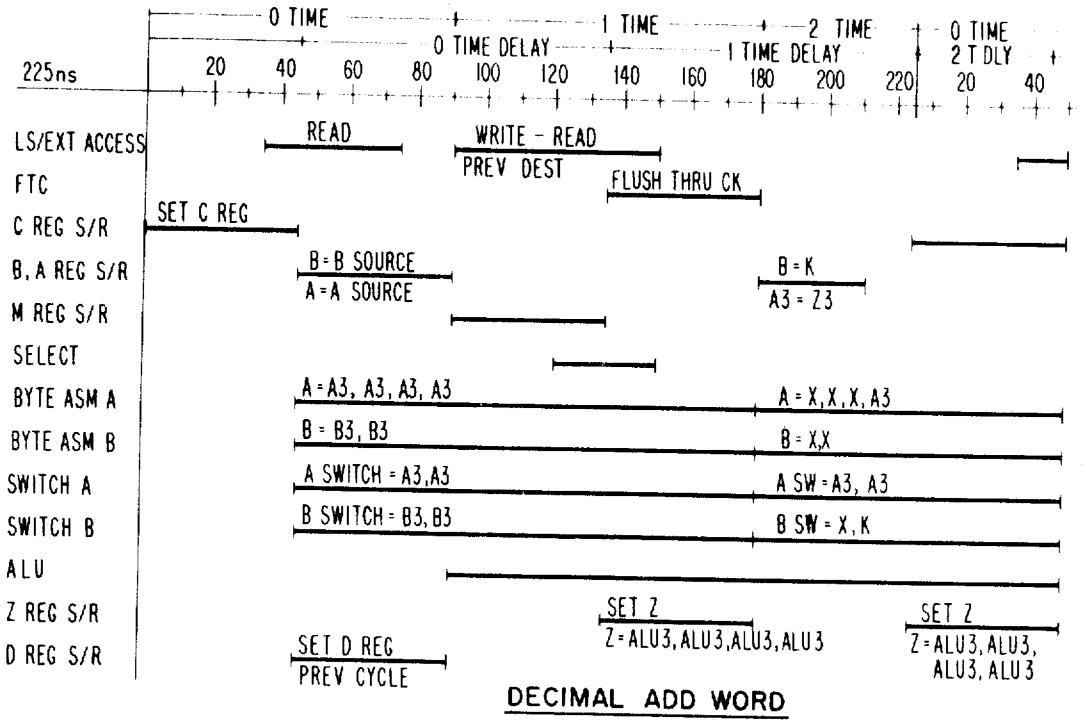

FIG. 29 is a diagrammatic illustration of a typical decimal add control word BA4C6FAC; and FIG. 30 illustrates the timing of the various machine operations. Decode of bits C0.0,1 calls for an arithmetic word. Decode of bits C0.2,3 indicates that the operation involves an A source and a B source and that the results are to be destined at the address of the B source. Bits C0.4–7 call for a decimal add. It is assumed that the status register bit SO=0 to provide a "true" add function. Bits C1.0–3 call for direct local store addressing to obtain the A source making use of bits 4–7 of the P register and bits C1.1,2 and 3 to access the V register in the A local store 5 at address 14. Bits C1.4,5 indicate that the operation is to be made on byte 3 of the V register contents. Bits C1.6,7 call for no status register setting. Bits C2.0–3 call for direct local store accessing of the B source making use of bits 4–7 of the P register and bits C2.1–3 to access the Y register at location 16 in the B local store 6. Bits C2.4,5 indicate that byte 3 of the Y register contents is to be operated upon. Bits C2.6,7 indicate that gating of the B source is to be normal or straight, that is the high- and low-order hexadecimal values of byte 3 will be gated respectively to the high- and low-order positions of ALU2 and ALU3. Bits C3.0–5 inclusive are transferred to the M3 register and the M2 register is set from the N2 register to access the next control word from the same memory module.

Thus, it can be seen from the diagrammatic illustration of FIG. 29 that the direct local store accessing of the A and B sources cause the contents of the V register to be transferred from the local storage unit 5 to the A register 21 and the contents of the Y register of the B local storage unit 6 to be transferred to the B register 22. X's are shown in byte positions 0, 1 and 2 of the A and B registers since the contents thereof will not be used during the operation. As indicated above, the byte selection bits selected bytes 3 of the contents of the V and Y registers. Thus, byte 3 in the A register 21 which has a hexadecimal value of 07 is transferred to all four byte positions of the A byte assembler 23. This value is then transferred from the byte 2 and 3 positions of the A byte assembler directly to the A inputs to ALU2 and ALU3. Byte 3 in the B register having a hexadecimal value of 15 is transferred to both byte positions of the B byte assembler 24 from which it is transferred through the true/complement circuits to the B inputs to ALU2 and ALU3. The hexadecimal values are added in ALU3 and the result which is equal to the hexadecimal value 1C is transferred to all four byte positions of the Z register 30.

All of the operations described above with respect to the control word occur during the first 180 nanoseconds of the cycle. The operations which are performed during the execution of the control word subsequent to 180 time are illustrated within the broken lines at the lower right hand corner of FIG. 29. At 180 time, the hexadecimal value 1C is transferred from byte 3 of the Z register 30 to byte 3 of the A register from which it is transferred to bytes 2 and 3 of the A byte assembler 23 for application to the A inputs of ALU2 and ALU3. The four inputs to the decimal correction controls, bits Z3.0–3, bits Z3.4–7, the high-order carry bit and the low-order carry bit of the first decimal operation, cause the K assembler to apply a correction digit 06 to the B inputs of ALU2 and ALU3. The correction factor is added to the hexadecimal result of the first operation to produce a corrected hexadecimal result 22 which is transferred from the output of ALU3 to the Z register 30. Note from the timing diagram of FIG. 30 that setting of the corrected result into the Z register 30 occurs from 0 time to approximately 45 time of the next succeeding cycle. Shortly thereafter this corrected result is fed into the D register, after which it is returned to byte 3 of the Y register in the A and B local storage units 5 and 6.

Storage Word

Figure 31A:
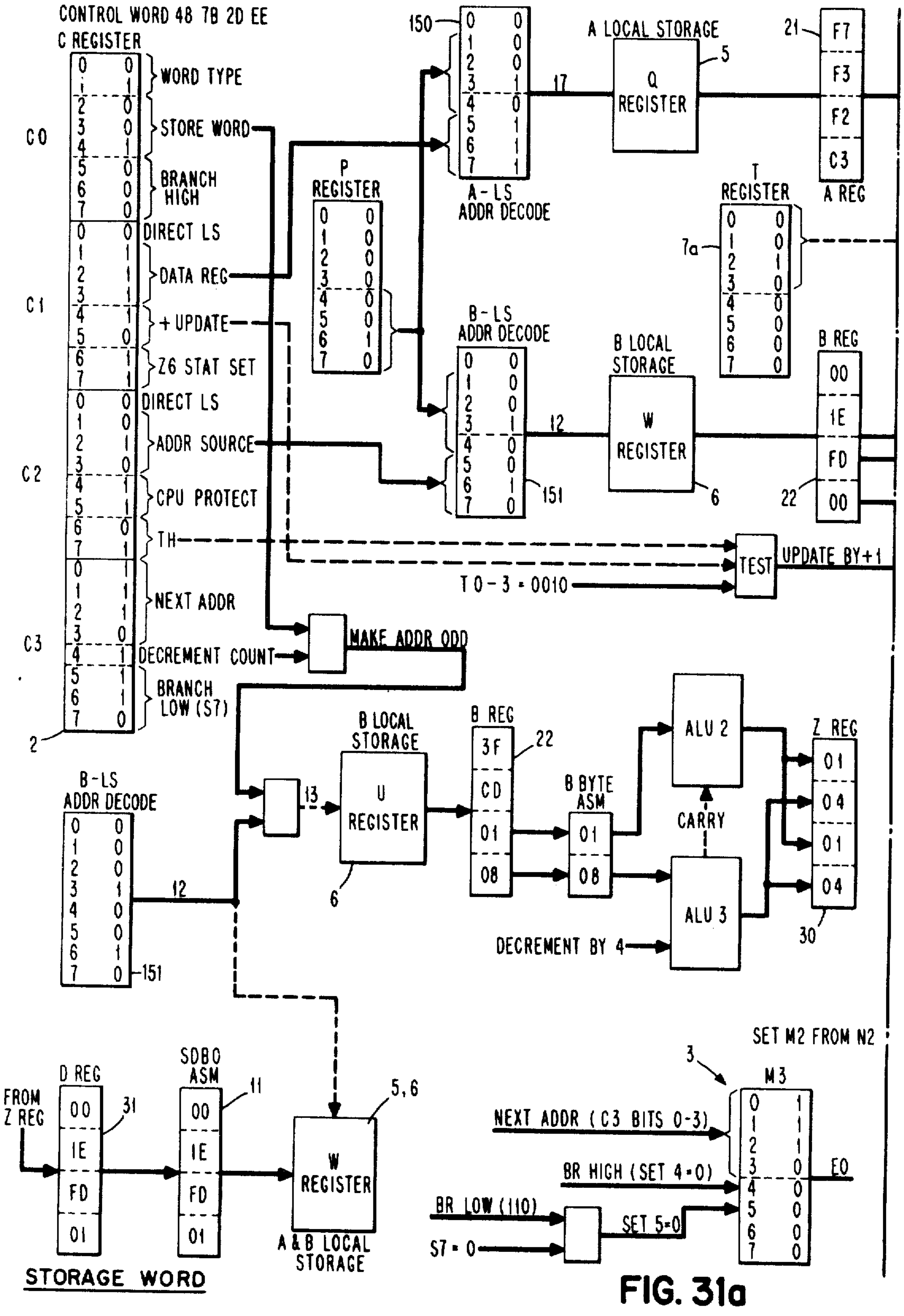
Figure 31B:
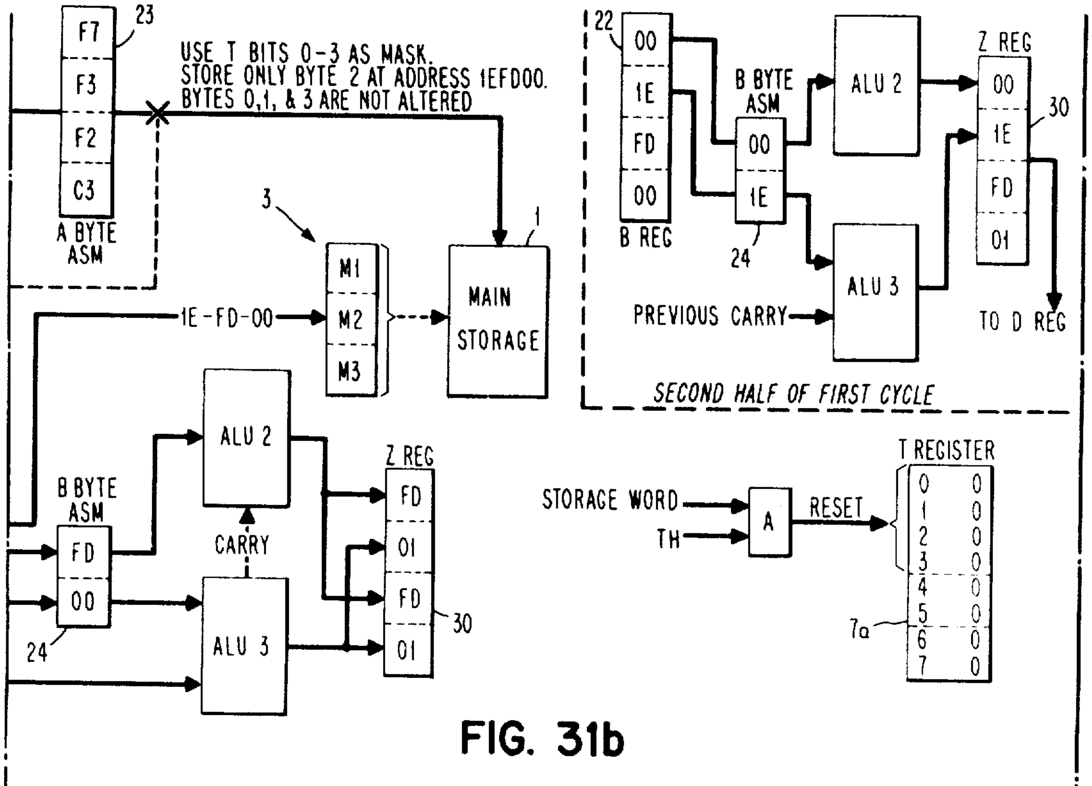
Figure 32A:
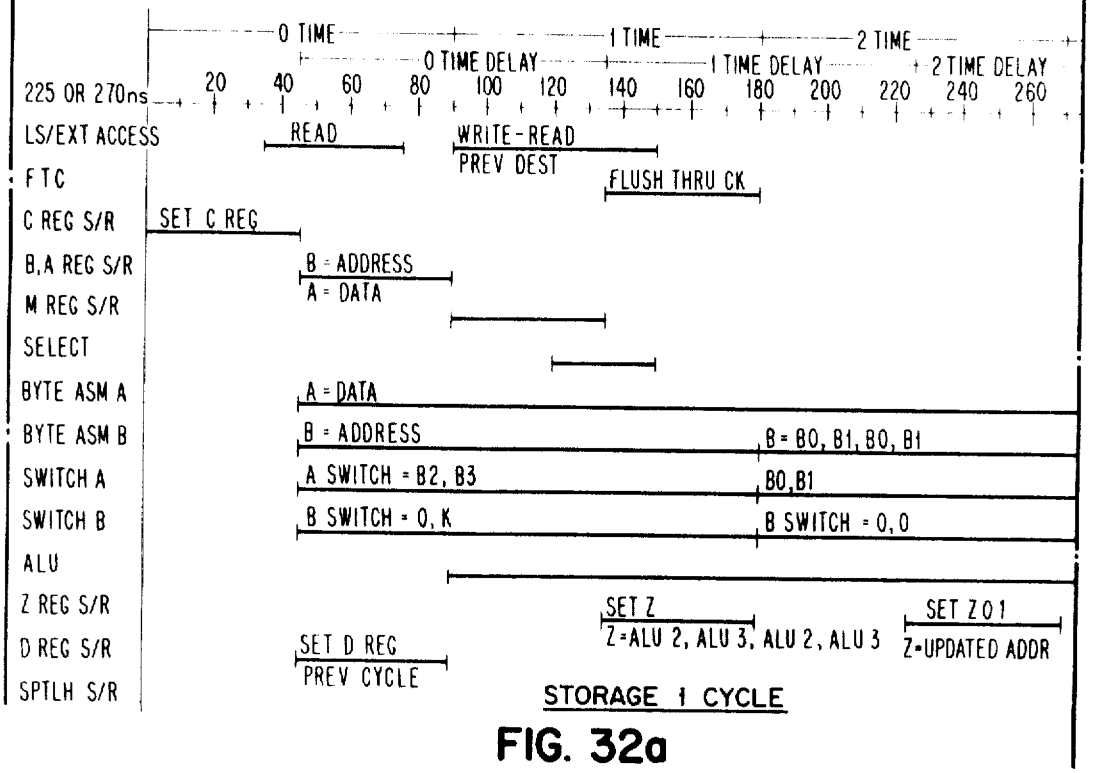

Execution of the storage control word 487B2DEE is illustrated diagrammatically in FIGS. 31*a*, 31*b* and the timing of the various machine operations is illustrated in the timing diagrams of FIGS. 32*a*, 32*b*. It will be seen from the timing diagrams that the execution of the storage word requires two storage cycles referred to as storage 1 cycle and storage 2 cycle each of which requires 270 nanoseconds. The objective of the specific control word 487B2DEE, shown by way of example, is to transfer the data word (or a portion thereof) which is held in the Q registers of the A and B local storage units at the main store address which is held in the W registers of the A and B local storage units. In this specific word, the data is transferred to main store 1*b* using bits 0–3 of the T register as a mask.

The execution of the control word will be described with respect to the various bits making up the control word which are shown stored in the C register 2. The 0 and 1 bits of byte C0, when decoded, indicate a storage word. Bits 2, 3 and 4 of byte C0 indicate the subform of the word, a store type word. Bits 0–3 of byte C1, when decoded, indicate direct accessing of the local storage unit using bits 1, 2 and 3 of byte C1 and bits 4–7 of the P register to access the Q register at address 17 of the A local storage unit. The contents F7F3F2C3 of the Q register are transferred to the A register 21 and then to the A byte assembler 23. Bits 6 and 7 of byte C2 indicate that the data in the A byte assembler 23 should be transferred to the main storage unit 1*b* under the mask determined by the high-order bits 0–3 of the T register. The high-order bits 0010 of the T register cause only byte 2 of the data in the assembler 23 to be transferred into the main storage unit 1*b*.

The address at which this byte of data is stored is determined by bits 0–3 of byte C2 of the control word. The decode of these bits causes direct accessing of the local storage unit 6, bits 1, 2 and 3 of byte C2 and the low order bits 4–7 of the P register being decoded in the circuit 151 to select the W register at address 12. The main store address 001EFD00 in the W register is transferred to the B register 22 and low order bytes 2 and 3 are transferred from the B register 22 into the B byte assembler 24. Byte 2 in the B byte assembler is transferred to ALU2 and is stored in bytes 0 and 2 of the Z register 30. The low-order byte 3 in the assembler 24 is transferred into one input of ALU3. Another input to ALU3 calls for updating of the low-order byte by a value of one. This results in the value one being added to byte 3 of the B byte assembler 24 and the result being stored in bytes 1 and 3 of the Z register 30. The updating of the address is determined by bits 4 and 5 of byte C1 of the control word which indicates that the updating is to be an add function. Bits 6 and 7 of byte C2 of the control word indicate that the value of the updating is to be in accordance with the value of bits 0–3 of the T register. In In this particular case, a decode of the bits in the T register call for updating by a value of one. Depending upon whether the operation is a byte, half word or word operation in terms of the data to be stored, updating will be increments of 1, 2 or 4. In the particular word of the example, only one byte is stored away in main storage and updating is by 1.

At approximately 180 time of storage 1 cycle, bytes 0 and 1 of the B register 22 are transferred to the B byte assembler 24 and thence to bytes 0 and 1 of the Z register 30 by way of ALU2 and ALU3. Subsequent to use of the high-order bits of the T register, to gate data into the main storage unit 1*b*, the decode of bits 2, 3 and 4 of byte CO and bits 6 and 7 of byte C2 result in reset of the high-order bits of the T register.

Storage cycle 2 of the control word execution is illustrated in the lower part of FIG. 31*a*. At the beginning of cycle 2 the decode of bits 2, 3 and 4 of byte CO and the decode of bit 4 of byte C3 cause the address which selected the W register of the B local storage unit 6 during the first cycle to be incremented by 1 from a value of 12 to 13 causing accessing of the U register in the B local storage unit 6. The low-order bytes 2 and 3 of the U register contain a count value equal to the number of bytes which must be transferred from the main storage unit for processing during an arithmetic operation involving up to a maximum of 256 bytes. In the preferred embodiment of the system illustrated, the count value is always stored in the register immediately following the register which is used for addressing data; in this particular case, the W register. Each time that a word or a portion thereof of data is transferred from main store for processing and the result returned to main store, the word count in the U register must be decremented until a value of zero is reached, indicating termination of a particular arithmetic operation. The subform of the particular control word being executed determines the value by which the count is decremented. A byte operation requires decrementing by 1, a half-word operation decrementing by 2, and a full-word operation decrementing by 4. In the present example, the control word bits 2, 3 and 4 of byte C0, when decoded, indicate a store word operation whereby decrementing by 4 is required even though the T register masks out three of the four bytes in the word. Thus, the low-order byte 08 in the B byte assembler 24 is transferred to ALU3 and is decremented by 4 and then stored in bytes 1 and 3 of the Z register 30.

At 45 to 90 time of the storage 2 cycle, the updated word address (001EFD01) which was transferred into the Z register during storage 1 cycle is transferred to the D register 31. During 90 to 150 time of cycle 2 the updated address is transferred from the D register to the W register by way of the SDBO assembler 11.

The next control word to be executed is addressed in part by means of the next address bits 0–3 of byte C3 of the control word being executed. The branch high bits 5, 6 and 7 of byte CO are decoded causing bit 4 of the M3 register to be set equal to zero. The branch low bits 5, 6 and 7 of byte C3, when decoded, cause setting bit 5 of the M3 register to the same value as bit 7 of the S register. In the particular example, bit 7 of the S register is equal to zero whereby bit 5 of the M3 register is also set equal to zero. There is no provision for module switching in the control word illustrated whereby the value of the address bits in the N2 register are set into the M2 register for accessing the desired control word in the same module.

Selector Channel Buffer—FIGS. 37 and 38 *a–i*

Reference is directed in particular to FIG. 2*b* of the system block diagram and to FIGS. 34–42 for a discussion of the buffer selector channel. Selector channel devices are well known in the art (e.g., U.S. Pat. No. 3,411,144) and will be described therefore only briefly. The selector channel operations are implemented by means of selector channel circuits, CPU circuits and microprogram routines. In the preferred embodiment, as illustrated in FIG. 2*b*, there are four selector channels and the same selector channel microprogram routines are used by all four selector channels. For example, a single start I/O microprogram routine is used by all four selector channels. The channel address specified by the start I/O instruction determines the channel to which the routine applies. Similarly, when a data chaining or command chaining function is performed, the channel that requested the function is the one controlled by the chaining microprogram.

Each channel is allocated four words of local storage for the storage of current operating information. This is illustrated in FIG. 12 with respect to selector channel 2 which has the four local storage word registers G2D, G2C, G2M, G2W allocated to it. In addition, channel 1 is allocated one local storage word for link information at location 3F and channels 2, 3 and 4 share a common word at location 3E (not shown) for their link information.

The selector channel link information is held in local storage during a command chaining trap or a data chaining trap. Because channels 2, 3 and 4 share a common word for the link information, only one of these channels can execute one of the traps at a time.

When an I/O interruption operation is requested by a selector channel, the request is sent to the CPU and is honored only at the end of the execution of the current instruction. The order of priority of handling I/O interruptions is channel 1, channel 2, channel 3, then channel 4. The processing of the I/O interruption results in storing of the CSW (channel status word) and loading of the new I/O PSW (program status word).

Selector share cycles are used for data transfer. The function performed during a share cycle are controlled by one of four microprogram control storage words which are set in hardware rather than in control store. A share cycle storage word operation is initiated by a request by the channel that requires service. The JPU honors the request at any time other than during the first cycle of a storage word.

The four selector share cycle storage words provide for the following functions: (1) Skip—the current CCW count is decremented by 1; the address is not changed, and no data is transferred into or from main storage. (2) INPUT Backward—the current CCW count is decremented by the number of bytes that were transferred and the current CCW address is decremented by a value equal to the number of bytes transferred for each input-backward share cycle. The selected number of bytes between one and four is placed into storage at the location specified by the current CCW address before the address update is performed. (3) Input Forward—the current CCW count is decremented and the current CCW address is incremented by a valve corresponding to the number of bytes transferred, and the data bytes are transferred into main storage at the location specified by the current CCW address before the address update is performed. (4) Output—the current CCW count is decremented and the current CCW address incremented by a value corresponding to the number of bytes transferred and the data bytes are transferred from the main storage location specified by the current CCW address before the address update is performed.

The selector channel word buffer feature is provided so that fewer accesses to main storage are required during selector channel data transfer operations. Thus contention for main storage accesses between I/O and CPU operations is decreased. This feature is particularly advantageous in systems where a pair of CPU's have access to the same main storage area. It is, however, very useful in improving the performance of systems having a single CPU.

The basic data flow of the word buffer 267 for channel 1 is illustrated diagrammatically in FIG. 37. During input forward and input backward operations, data is received in the first stage GR (the bus-in register for selector channel 1) a byte at a time from the I/O interface. Bytes so received are moved through the buffer circuits from left to right. When input data has been set up in the buffer circuit 267 such that it can be transferred to main storage via the assembler 268, a selector share cycle occurs.

For example, assume that byte zero (the high-order byte) and bytes one, two and three of a word have been received from the I/O interface and shifted respectively into positions B3–B0 of buffer 267, inclusive. A share cycle is initiated to store this word, the contents B3–B0 are sent to the forward-backward assembler which rearranges the bytes so that the data is presented to the SDBI bus of the storage unit 1 in the correct order. During in-backward share cycles, the data in stages B3–B0 is in the proper order and consequently is not rearranged for presentation to the SDBI lines.

During I/O output operations, data is transferred from main storage 1*b* into buffer positions GR, B7 B6 and B5 by a selector share cycle operation. The data is then shifted to the right (FIG. 37) through the buffer circuits. Each byte which is accepted by the output register GO is transferred to the I/O interface for transmission to the selected peripheral device and a new byte is shifted into Go from stage B0.

The selector channel buffer and its associated control circuits are illustrated diagrammatically in FIG. 37 and are shown in greater detail in FIGS.38*a*–38*j*. Referring first to the diagrammatic illustration of FIG. 37, it will be seen that the buffer 267 associated with channel 1 includes eight stages, the first stage being GR and the succeeding stages being B6–B0, respectively. The last stage B0 has its output connected to the GO register 266 which is associated with selector channel 1 bus out CHIBO. Data received from peripheral devices over the I/O interface bus CHIBI is applied to the input stage GR. The bus is one byte wide and the stage GR (and all other stages) therefore has eight data bits and a parity bit.

The four-byte-wide (one word) forward backward assembler 268 is shown with its inputs connected to stages B3, B2, B1 and B0, respectively. Its output is coupled to the external assembler 25 (of FIG. 2*b*). An input I/O operation therefore results in data being transferred into GR byte by byte, shifted serially through the buffer 267 to stages B3–B0, and then subsequently being transferred in parallel through the assembler 268 to main storage 1*b*.

Output I/O operations result in data being transferred from main storage 1*b* to stages GR, B6, B5 and B4 by way of the external bus-in lines EBI0–EBI3, inclusive. Data is then shifted through subsequent stages of the buffer 267 and finally are transmitted to the I/O interface by way of the one-byte-wide output register GO.

The buffer 267 is unique in the following respects:

1. It is constructed of latches in such a manner that a byte of data can be transferred to the next succeeding stage or, alternatively, to the stage following the next succeeding stage or, alternatively, not transferred at all, depending upon the full or empty conditions of the succeeding stages at the time that the shift or transfer operation is to take place for maximum input and output data rates.

2. With this special design of the shift register, data can be right-justified in the output buffer stages B3, B2, B1 and B0. That is, byte 0 of a four-byte word to be transferred from an I/O device into main memory may be shifted into and held in the buffer position B0; at some subsequent time, byte 1 of this word can be shifted into and held in the suffer stage B1; and at a later time, byte 2 into stage B2; and finally byte 3 into stage B3. Only when all bytes to be transferred during one share cycle are finally collected in the final stages B3 through B0, a selector share cycle will be taken to transfer the word to main memory.

3. The ability of the register to not shift data or, alternatively, to shift data one or two places to the right during a given cycle as described in (1) above, and the ability to right-justify as described in (2) above, provides maximum input data rates.

4. Means are also provided for partitioning the buffer during the data chaining operations to obtain improved efficiency of operation. More particular, during each data chaining operation, when the last byte of data to be received with respect to one channel command word is applied to the input buffer stage GR, control circuits (to be described below) prevent further data bytes from being received by the buffer 267 even though the device connected to the channel is ready to send additional bytes. As soon as the last byte of data for the current channel command word is moved into the proper position in the final stages B3–B0, the buffer 267 is partitioned, i.e., the I/O device which is connected to the channel is again free to transmit data to stages GR–B4, inclusive; but until further action is taken, none of the newly acquired data can be transferred to stages B3–BO, inclusive. This data can be received in stages GR–B4, inclusive, even though the address for the new data is not yet known, whereby improved performance is obtained. This feature was not possible in known channel apparatus having buffers. When all of the data from the first channel command word has been transferred to memory and the next channel control word has been set up and the processor prepared for transferring the new data, the partition is removed and the data in buffer stages GR–B4 can now continue to be shifted into stages B3–B0 for transfer to main storage 1*b*.

Certain of the control circuits associated with buffer 267 will now be described in more detail, reference being directed again to the diagrammatic illustration of FIG. 37. Each of the stages of the buffer GR–B0, inclusive, has associated therewith a respective latch GRF to BFO, inclusive, which indicates whether or not the respective stage is full or empty; that is, whether or not there is data stored in the stage. When a particular stage is full, its respective full latch GRF–BFO will be set to its logical one state.

Associated with each of the full latches GRF–BFO, inclusive, is a second latch GRP–BPO. The BP latches, together with suitable logic circuitry, determine the positions to which data is to be transferred in the buffer and also which full latches are to be set to their logical 1 states.

Store Data gates SD6–SDO are associated with respective full latches BF6–BFO, and are controlled during the set BF time to cause new data to be latched up in the corresponding stage of the buffer 267. This new data will be held only if the corresponding BF latch is switched during BF time to its logical 1 state.

Before explaining in greater detail the shifting of data through the buffer from stage to stage, attention is directed to the fact that polarity hold latches are utilized to store each bit of data in each stage. As indicated earlier, the polarity hold latch has the characteristic that in its hold state the logical 1 or 0 state of the latch is fixed but that in its follow state the latch acts like an amplifier passing data from input to output. Therefore, it we could assume that the stages B6, B5 and B4 were empty, that is, they contain no data, each of the latches utilized to store a bit of data in each of the stages B6 through B4 will be in its follow state acting as an amplifier for passing data from its input to its output. Thus, if the stage GR had data stored therein, this data appearing at its output bus would trickle down the buffer 267 through stages B6, B5 and B4 and therefore also appear at the input to stage B3. If, at any time, a hold pulse were applied to the stage B6, it would latch up stage B6 with the same data as that appearing at the output of stage GR. Similarly, one of the other stages B5, B4 or B3 is set to its hold condition, it would cause data to be stored therein which would be the same as that appearing at the output of the stage GR.

It is this ability of the polarity-hold-type latch utilized in a shift register which permits data to be transferred from a given stage to any succeeding stage (within time limitation) in accordance with a predetermined plan. Thus, maximum shifting of one, two, three, etc., stages during one shift cycle is possible within limitations of the speed of the circuitry and the cycle time allotted to shifting. In the preferred embodiment, a maximum shift of two stages is possible.

It must be remembered, however, that shifting can occur only when the next stage is empty and shifting two stages is possible only when the next two succeeding stages are empty. When the next succeeding stage is full, not shifting is possible. FIGS. 40 and 41 illustrate the movement of data through the buffer 267.

Figure 35:
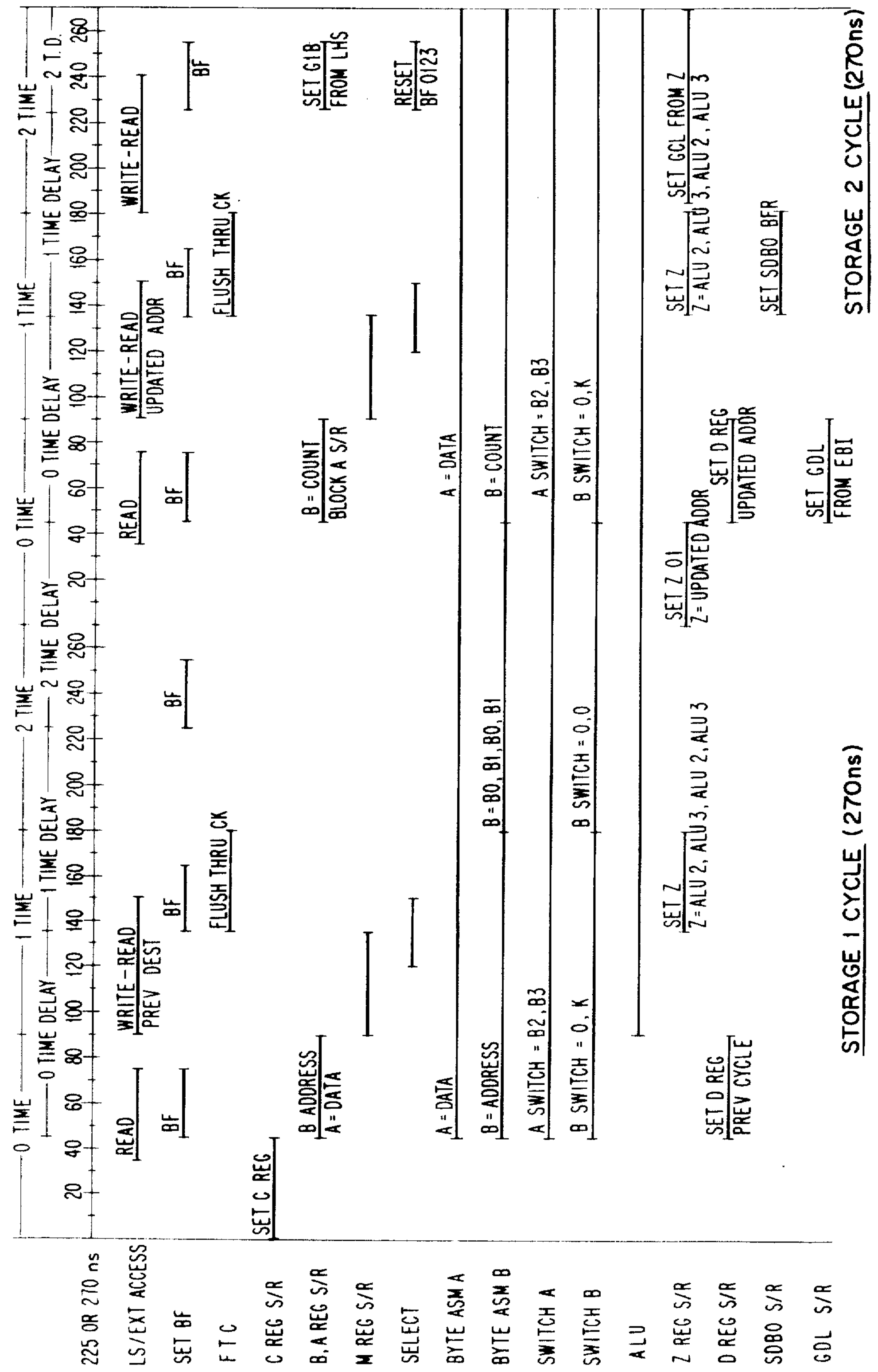

The system oscillator 36 controls logic means for producing BF and BP pulses used to effect the transfer of data between buffer positions, as seen in FIGS. 39 and 35. The shift pulses BF and BP repeat with each 90 nsec. oscillator cycle and the time required to move a byte of data through the eight buffer positions is only four oscillator pulses, as seen in FIG. 40. Starting with the second pulse, more than one byte can be moving as shown in FIG. 41.

The BF bit latches are set during the BF set period. Each BF latch has its follower BP latch that is set to the level of the BF latch at the end of Set BP time just prior to the beginning of BF set period. It is the output of the BP latches that determines the number of stages, if any, which the data is to be shifted. It also determines whether or not the respective BF latches will be set. As will be seen later, an advance of data two stages is permitted if the second position preceding the destination stage has its BP latch set to its logical 1 condition (e.g., its BF latch is on and its buffer stage is full) and both the destination stage and its preceding stage have their BP latches reset (e.g., stages empty). An advance of one stage is made if the preceding and succeeding stage BP latches are set. A BF latch is reset when its respective BP latch is set and the following BP latch is reset indicating that the data had a position to move.

Additional circuits are provided for controlling the logical states of the buffer full latches GRF to BFO, inclusive.

During an output I/O operation the buffer full latches GRF, BF6, BF5 and BF4 are controlled in accordance set flag bits 0–3 from logic circuits 1000 which determine which bytes are being transferred from main storage into the buffer stages GR, B6, B5 and B4.

For an input I/O operation, the buffer full latch GRF is set by a service signal (to be described later) when the input data byte is read into GR. The buffer full latches BF2, BF1 and BF0 are set in accordance with the two low order address bits M3.6,7 of the main storage destination address when less than a full word transfer is to be effected. These two lower-order address bits are forced into an external register GDL by way of EBI3.6,7 and applied to decode circuits 1001, 1002 and 1003. The buffer full latches BF2, BF1 and BF0 are selectively forced to their logical one states by circuits 501, 502 and 503 when it is desired to prevent data bytes from shifting into one or more of the corresponding buffer positions B2, B1 and B0. In addition, the actual transfer of bytes from the low order buffer stages B3–B0 to main storage **1*b* is controlled by flag bits from circuit 1000 even though data has been entered into buffer stages B3–B0. Therefore, the outputs of memory flag logic circuits 1000 are also applied to the byte selection circuits (not shown) of the main storage unit 1*b*** to determine which of the four bytes will be stored during a write operation.

A buffer byte count register GB stores a binary value equal to the number of bytes of data in the buffer stages GR–B4. The buffer count is used only for input operations when the number of bytes in the buffer is a function of a count zero condition; i.e., when the last byte of data to be read into storage utilizing the same channel control word has been entered into the GR stage of buffer 267. Each time that the low-order stages B3–B0 of the buffer 267 have their data transferred to main storage **1*b* by way of the assembler 268, the GRF, BF6, BF5 and BF4 output bits are gated into the GB register whereby the number of bytes of data stored in the corresponding buffer stages GR, B6, B5 and B4 forms the count. Since the data in stages B3–B0 has already been transferred, they do not enter into the count. Subsequent to the entry of this initial count into the GB register, the incrementer circuit 1004** having its input connected to the output of the GB register adds one to the count in the GB register and returns the incremented count to the GB register each time that a byte is entered into the buffer stage GR. In this fashion, the register GB keeps a continuous count on the number of bytes in the buffer stages GR–B0; and when this count equals the CCW byte count, the stage GR is inhibited from accepting additional data.

More particularly, an external register GCL has entered therein (via EBI2,3) the count corresponding to the number of bytes yet to be received during the execution of the I/O operation with the same channel command word, i.e., the CCW byte count. However, since only eight stages are provided in the buffer 267, the highest value which the GCL register need store in the binary value 1000 (decimal 8). The count in the GCL register is compared with the count in the register GB and when a compare circuit 1005 indicates an equal compare the transmission of additional data into the buffer 267 is prevented.

Figure 38C:
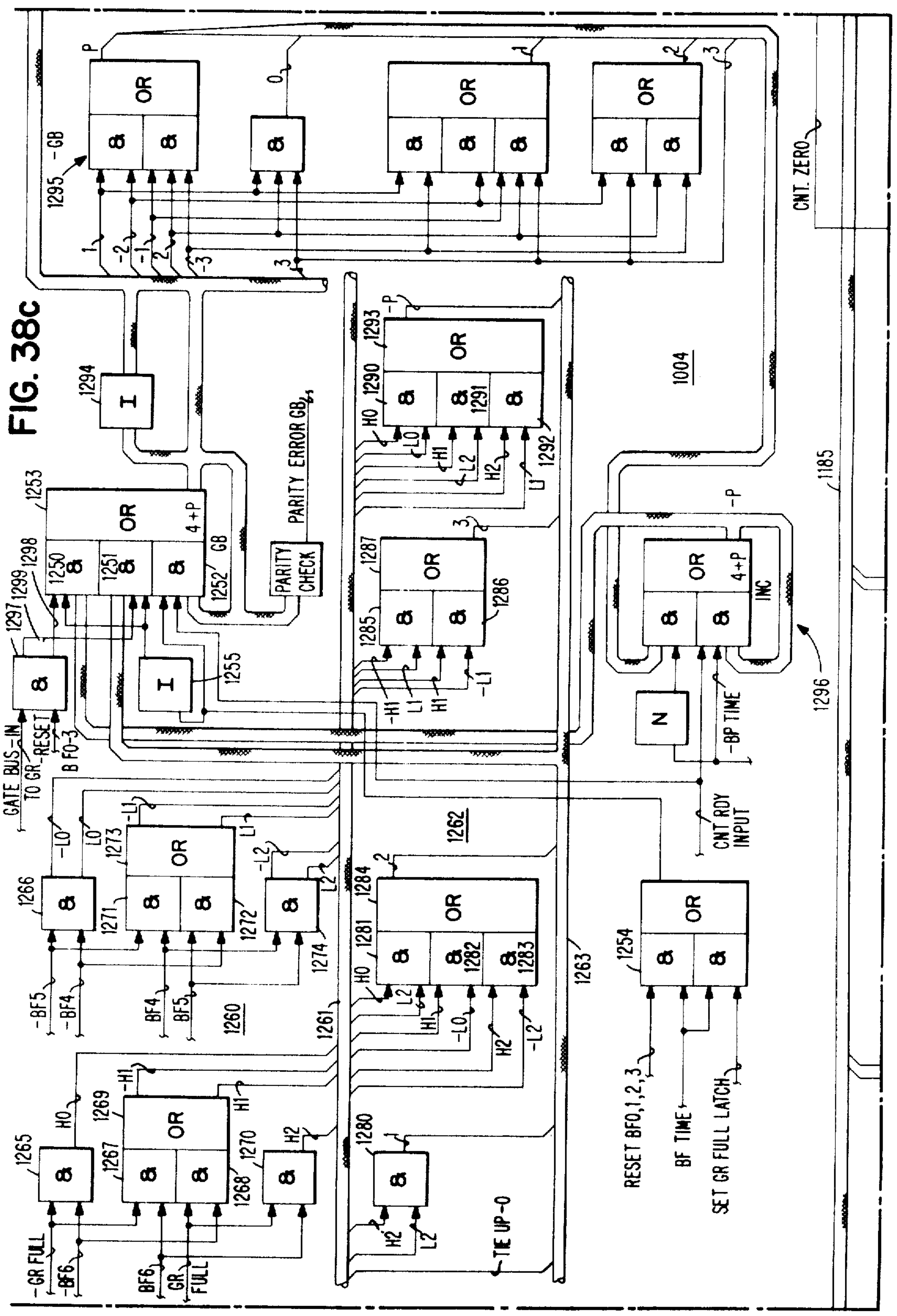
Figure 38D:
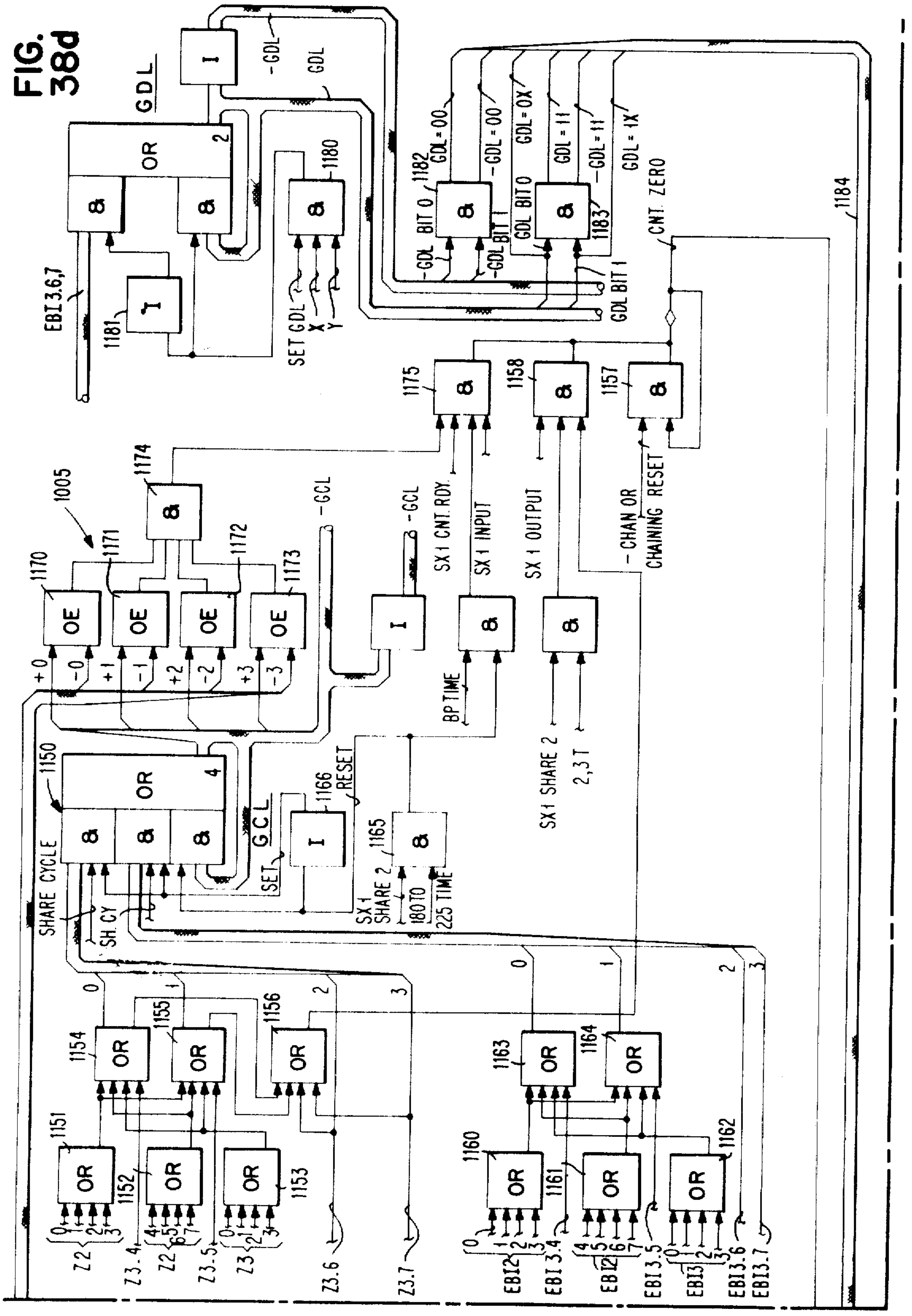

The details of the channel 1 buffer 267 and its related control circuits will now be described in more detail with respect the FIGS. **38*a*–38*j*. FIGS. 38*h* and 38*i* shown the buffer 267, the output register 266 and the forward-backward assembler 268**.

Gating of data from main storage **1*b* into the buffer stages B4, B5, B6 and GR is by way of the external bus-in cables EBIO, EBII, EBI2 and EBI3 AND-circuits 1020– 1023, respectively, and OR-circuits 1024–1027**, respectively.

Data received over channel 1 bus-in CH1BI is applied to a line receiver 1040, the output of which is gated into stage GR by way of an AND-circuit 1030 and an OR-circuit 1027. (Actually, AND-circuit 1023 and other buffer portions represent nine such circuits, one for each data bit and one for the parity bit). Data in the stage GR is gated into stage B6 by AND-circuits 1031. Data from stage B6 and succeeding stages are transferred into their succeeding stages by way of AND-circuits 1032–1037, inclusive.

The stages GR–B0, inclusive, also include AND-circuits 1041–1048, inclusive, which are used for the latchback paths from the output to the input of each stage. These same AND-circuits 1041–1048, inclusive, are also used for resetting of the latches of each stage, Complementary gate signal lines Gate Bus Into GR and –Gate Bus Into Gr are connected respectively to inputs of the AND-circuits 1023 and 1030 for determining which if the two buses CH1BI or EBI3 will be gated into stage GR. Setting and resetting of the stage GR is achieved by means of AND-circuits 1050 and 1051 and an OR-circuit 1052. The inputs to AND-circuits 1050 are the –External Destination Byte 3 line from external destination byte latches (not shown) and the X and Y lines from the external register address circuits **152*a*, *b* of FIGS. 2*a*, 2*b* which select the buffer stage GR for data transfers by way of FBI3. An input, –Set Bus Into GR, to the AND-circuit 1051 also has a signal applied thereto when data is to be transferred from EBI3 to the stage GR. An invert circuit 1053 is connected between the output of the OR-circuit 1052 and the input to the AND-circiuts 1023 for establishing a time delay between the application of the reset pulse from the output of the OR-circuit 1052 to the input of the AND-circuits 1041 and the removal of the set pulse from the output of the invert circuit 1053 to the AND-circuits 1023 and 1030**.

During selector share outputs cycles, the line SX1 Share 2 Out and the 2 Time line are applied to an AND-circuit 1060. One of the output lines of the AND-circuit 1060 is a Read From Memory line which is applied to the inputs to the AND-circuits 1022, 1021 and 1020 for applying gate signals to the AND circuits when the data is ready on the EBI bus in the second cycle of the share cycle operation. In order to set data from EBI2, EBI1 or EBI0 into stages B6, B5 and B4, it is also necessary to apply logical zero signals to the respective lines –Set B6, –Set B5 and –Set B4. These logical zero signals are inverted by invert circuits 1065, 1066 and 1067, respectively, and applied in their logical 1 conditions to the AND-circuits 1031, 1032 and 1033. These logical 1 signals from the invert circuits 1065, 1066 and 1067 are also applied to the AND-circuits 1022, 1021 and 1020 whereby they are utilized to gate data into the buffer stages B6, B5 and B4 alternatively by way of the external bus-in cables EBI2, EBI1 and EBI0 or by serial shifting from stage to stage through the register on data input operations. When data is to be transferred by way of the external bus-in cables EBI2, EBI1, and EBI0, the complementary output Inhibit Shift from the AND-circuit 560 is applied to AND-circuits 1031, 1032, and 1033 to prevent any transfer of data from one stage to the next succeeding stage.

The outputs of stages B0–B3 of the buffer 267 are coupled to the forward-backward assembler 268 by way of cables 1070–1073, respectively. CAble 1070 is connected to AND-circuits 1074 and 1081 of the assembler 268. Cables 1071, 1072, and 1073 are connected respectively to AND-circuits 1076, 1079 and 1077, 1078 and 1075, 1080, respectively. When a forward data transfer is to be effected to memory, a gating signal is applied on the SX1 In Forward line causing cables 1070–1073 to be gated respectively to the SX1 Assembler o–3 cables of the bus 269 by way of AND-circuits 1074, 1076, 1078 and 1080, respectively; and OR-circuits 1082, 1083, 1084, and 1085, respectively. When data is to be transferred to main memory backward, a gating signal is applied to the SX1 In Backward line causing the cables 1070, 1071, 1072 and 1073 to be gated to the SX1 Assembler 3–0 cables of the bus 269 by way of AND-circuits 1081, 1079, 1077 and 1075, respectively; and their corresponding OR-circuits 1085, 1084, 1073 and 1082.

Figure 38E:
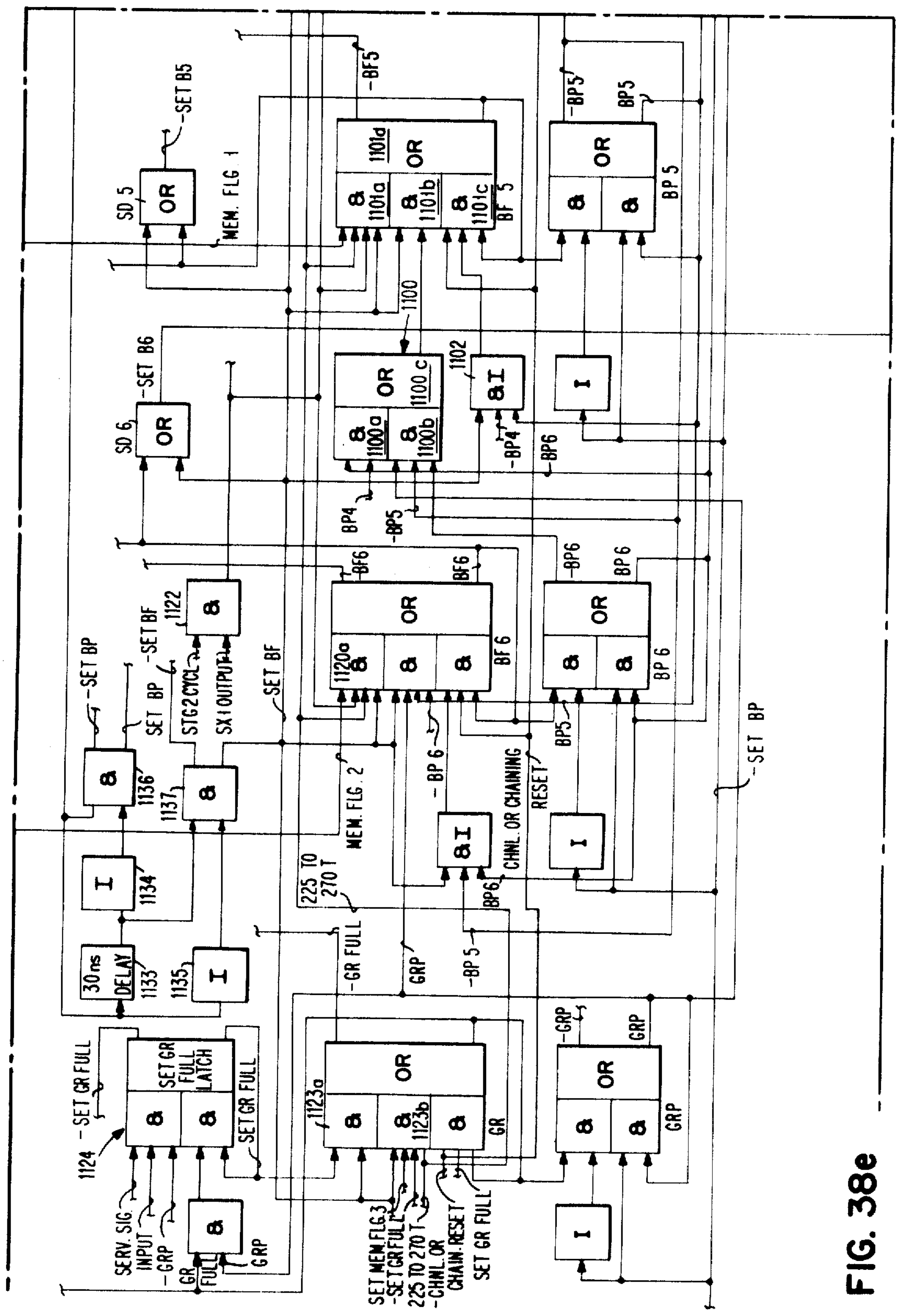
Figure 38F:
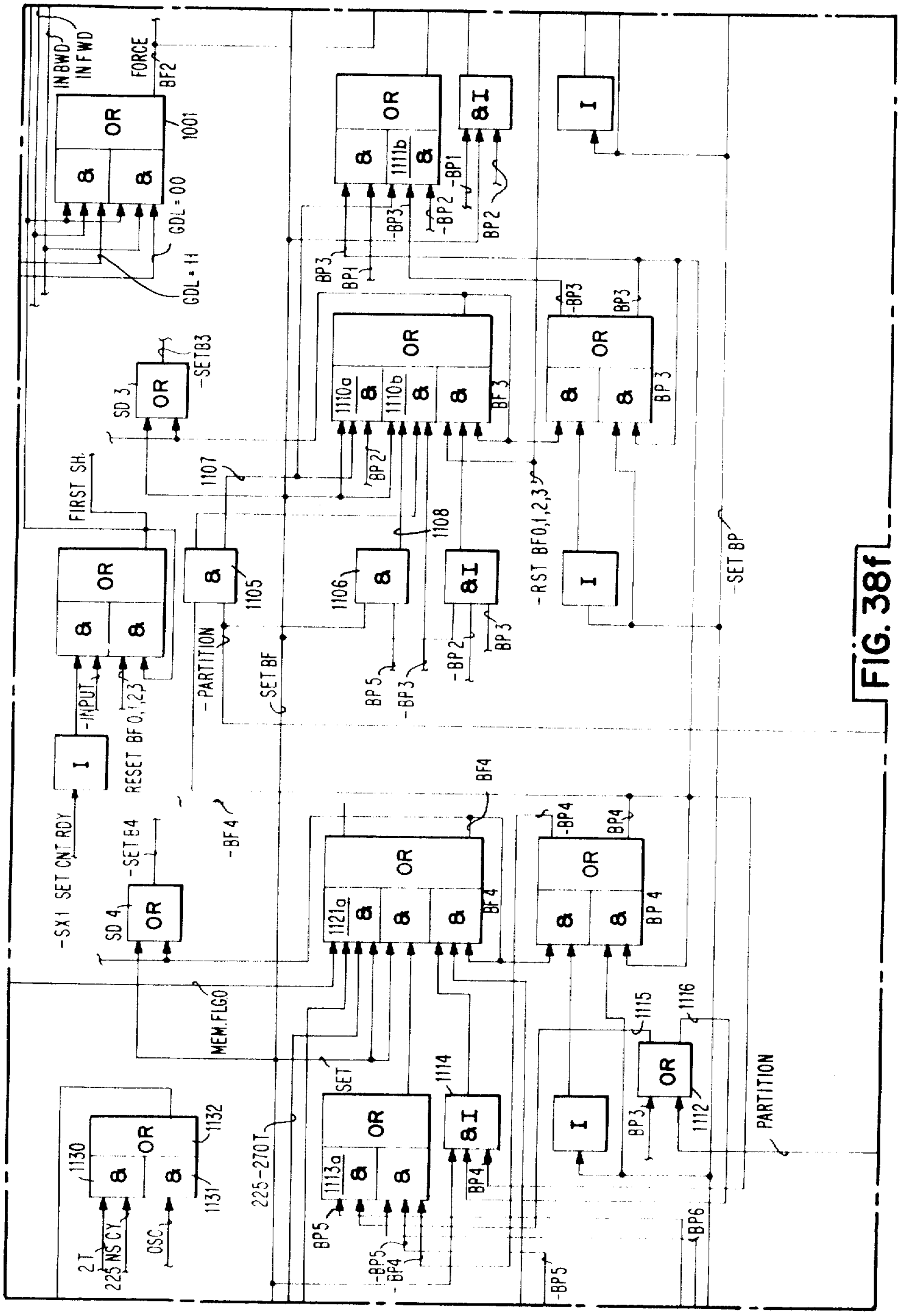
Figure 38G:
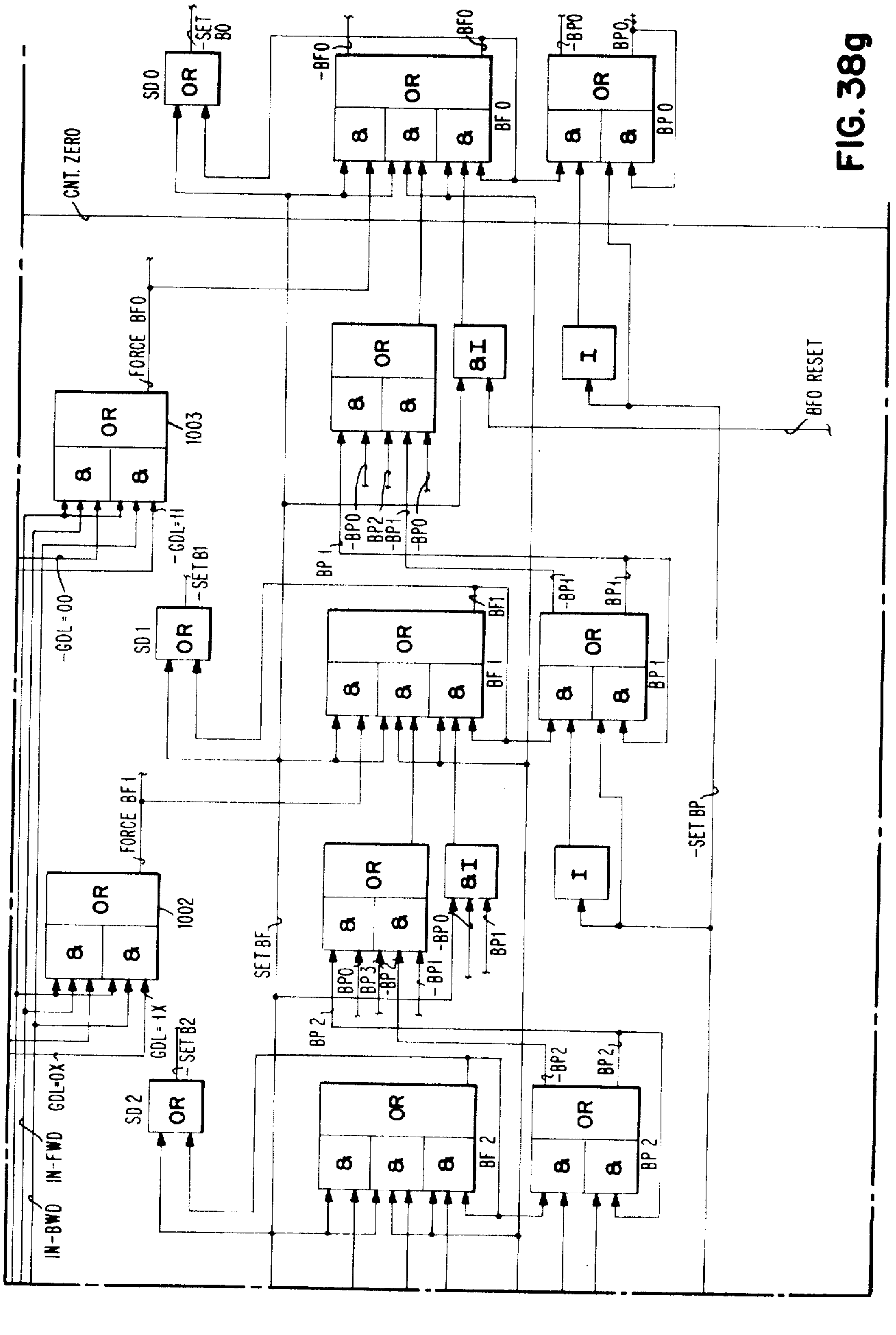
Figure 38H:
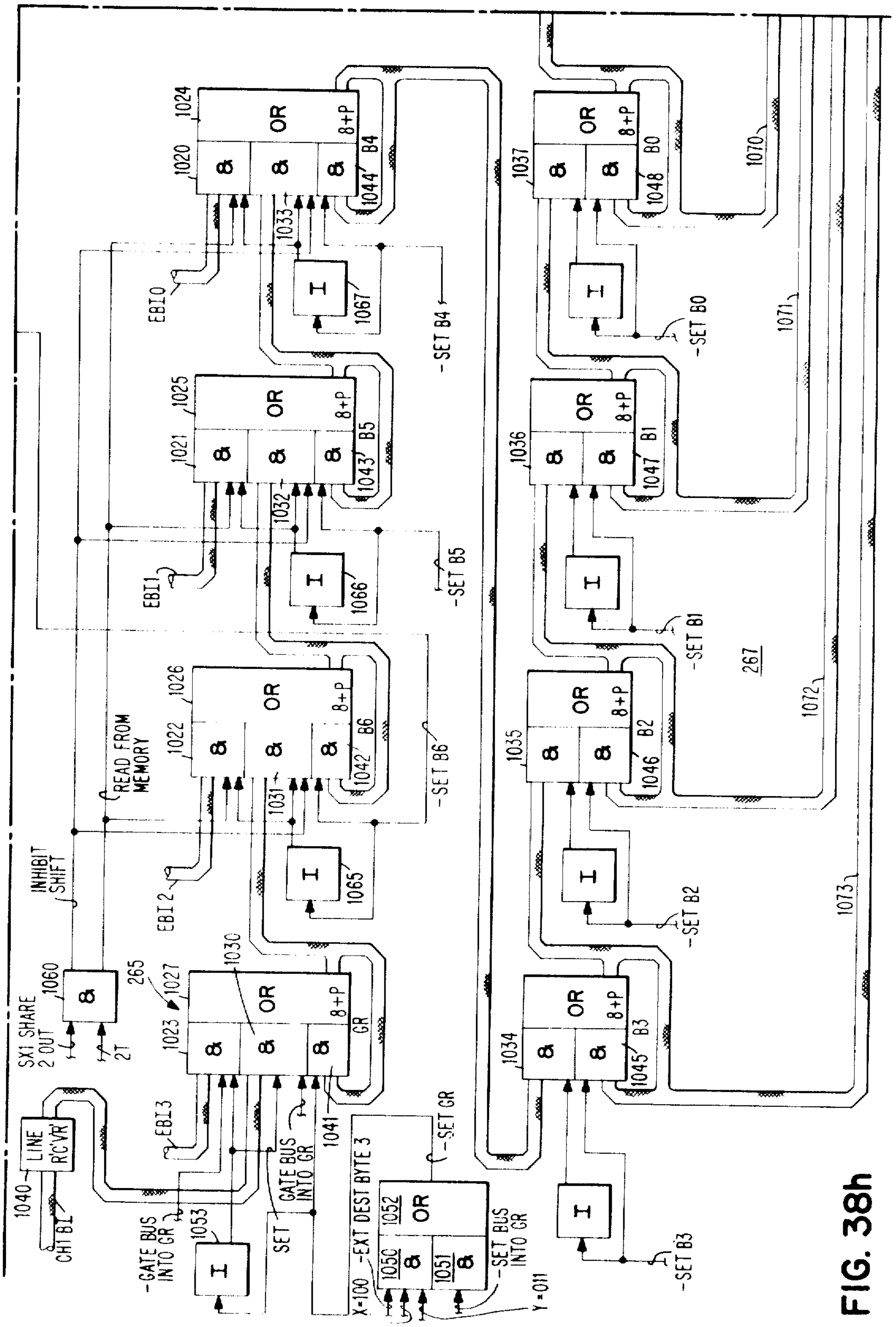
Figure 38I:
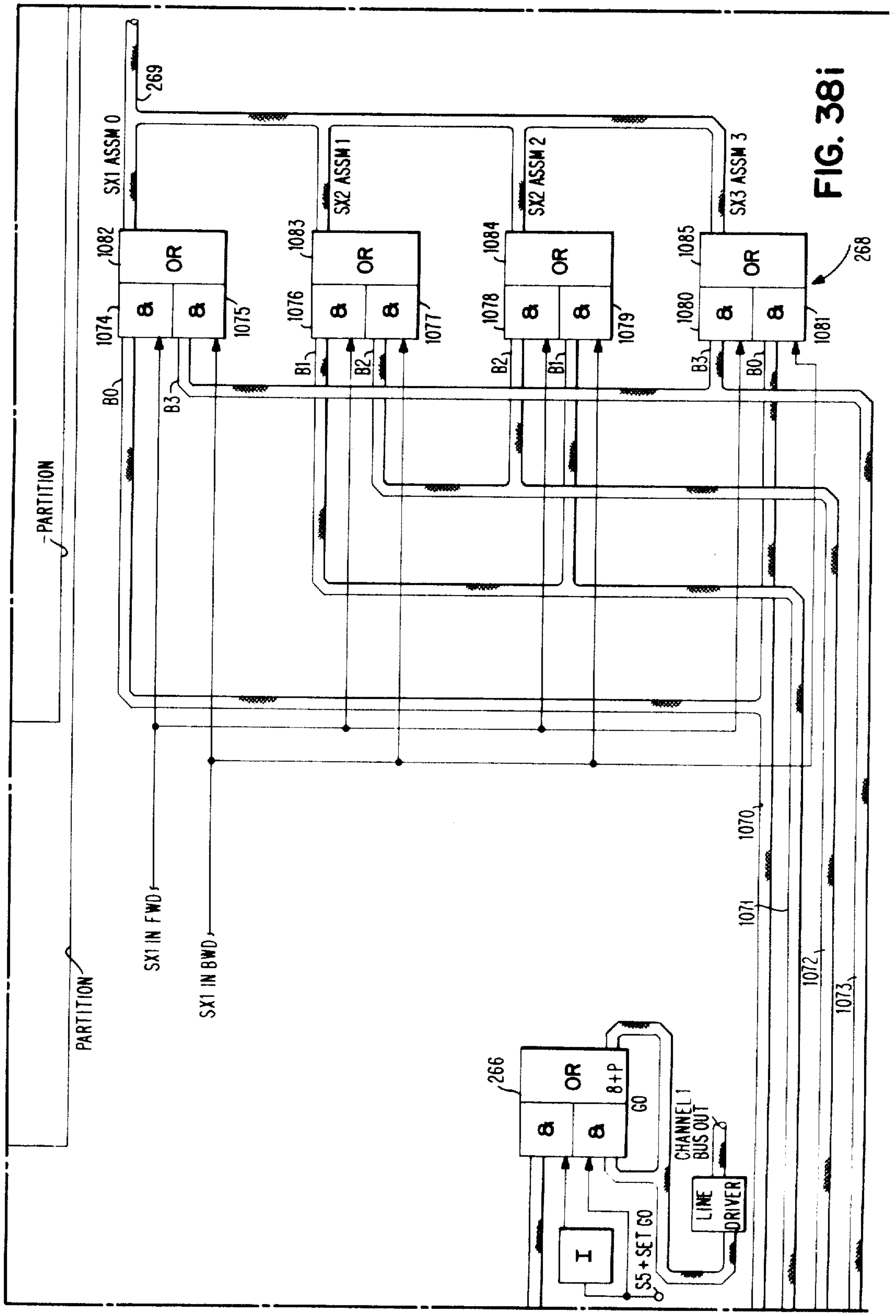

FIGS. 38*e*, 38*f* and 38*g* illustrate in greater detail the full latches GRF and BF6 through BF0 and their related circuitry. EAch of the full latches GRF, BF6, BF5 and BF4 have respective true and complemented output lines which for ease of illustration have been referenced as GR Full, –GR Full, BF6, –BF6, BF5, –BF5, BF4, –BF4. Only the true (or logical 1) outputs are required for latches BF3, BF2, BF1 and BF0, The true outputs of the full buffer latches BF6–BF0, inclusive, are coupled (1) to inputs of their respective OR circuits SD6 to SD0, (2) to their respective latches BP6 to BP0 and to input circuits of the register GB illustrated more fully in FIG. 38*c*. The complementary outputs –BE6, –BF4, –BF4 and –GR Full are also connected to the input circuits of the register GB.

Each of the latches GRP to BPO, inclusive, have true and complementary outputs identified as GRP, –GRP and BP6, –BP6, BPO, –BPO. The true complementary outputs of the latches GRP to BPO, inclusive, are connected to appropriate logic of stages preceding and succeeding the stage with which they are associated to control the setting of their full latches. All of the interconnection lines between the outputs of the latches GRP and BPO have not been connected to their respective logic circuits because it would create an undue complexity. It is merely necessary to refer to the inputs of the various logic circuits to determine from which latches they originate.

A detailed description of one of the stages B5 will be described in detail. It will be appreciated that the remaining stages are essentially the same in operation.

Stage B5 has associated therewith the latches BF5 and BP5 and the OR-circuit SD5. The latch BF5 comprises AND-circuits 1101*a*–1101*c* and OR-circuit 1101*d*. Logic circuits 1100 and 1102 are utilized for setting BF5 to its logical 1 state and resetting it, respectively. The logic circuit 1100 include AND-circuits 1100*a* and 1100*b* and an OR-circuit 1100*c*. The AND-circuit 1100*a* a will be satisfied to set latch BF5 if the preceding stage B6 is full (BP6=1) and the succeeding stage B4 is full (BP4=1) Thus the true outputs (BP4, BP6) of the latches BP4, BP6 are applied to the inputs of AND-circuit 1100*a*. Assuming both conditions are met, OR-circuit 1100*c* applies a signal to one input of the AND-circuit 1101*b*. At the advance pulse time, a signal is applied to the Set BF line which switched the AND-circuit 1101*b* of latch BF5 to its logical 1 state. Similarly, BF5 will be set to its logical 1 state if at the advance pulse time the conditions of AND-circuit 1100*b* are satisfied; that is, stage GR is full (GRP=1), stage B5 is empty (–BP5=) and stage B6 is empty (–BP6=1). These three inputs to the AND-circuit 1100*b* set the latch BF5 to its logical 1 stage when the next advance pulse is applied to the Set BF line.

The latch BF5 is reset by the channel 1 circuits when the logical 1 signal is removed from the –Channel or Chaining Reset Line. The latch BF5 is also reset when the input conditions to AND-circuit 1102 are satisfied; that is, when the advance pulse is applied to the Set BF line, stage B4 is empty (–BF4=) and stage B5 is full (BP5=1). When stage B5 is full and stage B4 empty at a time when the advance pulse is applied, the data is transferred and therefore stage B5 becomes empty.

The other stages B6–B0 are generally similar to stage B5 and need not be discussed in detail. However, stages B4 and B3 require further explanation due to the partitioning feature. The complement line –Partition is effective, when a buffer partition is required, to inhibit setting of latch BF3 by means of AND-circuits 1105 and 1106. It also inhibits setting of latch BF2 when stage B4 is full (BP4=1) and stages B2 and B3 are empty (–BP3=1, –BP2=1) by means of the AND-circuit 1105.

More specifically, the line –Partition = 0 when a partition is called for whereby its input to AND-circuits 1105 and 1106 blocks the AND circuits. The true outputs 1107 and 1108 of AND-circuits 1105 and 1106 are equal to logical 0 thus blocking the input AND-circuits 1110*a*, 1110*b*, of latch BF3. The line 1107 blocks the AND-circuit 1111*b* of input logic circuits to set latch BF2, which AND-circuit 1111*b* is the one which causes setting of the latch BF2 when the inputs BF4 and –Partition to the AND-circuit 1105 are at their logical 1 states and the inputs –BP3 and –BP2 to the AND-circuits 1111*b* are at their logical 1 states.

The true line Partition uses an OR-circuit 1112 and AND-circuit 1113*a* to set latch BF4 when stage B5 is full (BP5=1) even through stage B3 is empty (BP3=0). The line Partition uses the OR-circuit 1112 and AND invert circuit 1114 to reset BF4 only when both stage B3 is empty (BP3=0) and no partition exists. The true output 1115 of the OR-circuit 1112 is an input of the AND-circuit 1113*a* and the complement output 1116 is an input of the AND invert circuit 1114.

Each of the latches BF6–BF4 are also set via AND-circuits 1120*a*, 1101*a* and 1121*a* when data is transferred into stages GR, B6, B5 and B4 if their respective input lines Memory Flag 2, 1 and 0 are at their logical 1 states. The lines Set BF and 225–270 Time form second and third inputs to the AND-circuits 1120*a*, 1101*a* and 1121*a*. A fourth input to the AND-circuits 1120*a*, 1101*a* and 1121*a* is the output of an AND-circuit 1122, the inputs to which are the lines SX1 output and Storage 2 Cycle.

An AND-circuit 1123*b* sets the full latch GRF in a similar manner, its inputs being the lines Set BF Time 225-270 Time, Set Memory Flag 3 and the line –Set GR Full which is the complement output of a latch 1124.

Latch 1124 is set by channel 1 control lines Service Signal and Input and the complement output line –GRP of the latch GRP. When the latch 1124 is set, then it uses AND-circuit 1123*a* to set the full latch GRF and data from the I/O interface (not shown) is latched up in stage GR.

Latch 1124 is reset when latch GRF is reset after data is transferred therefrom.

The pulses Set BF and –Set BP are produced by means including AND-circuits 1130, 1131 and OR-circuit 1132 of FIG. 38*f* and delay circuit 1133 (FIG. 38*c*), inverters 1134 and 1125 and AND-circuits 1136 and 1137.

When the line OSC goes negative, it is inverted by 1135 and until 30 nsec. later, the two positive inputs to circuit 1137 produce a positive output on line –Set BF (FIG. 39) and a negative output on line Set BF.

When the line OSC goes positive, AND-circuit 1136 produces a positive output on line –Set BP (and a negative output on let Set BP) for 30 nsec. at which time the output of circuit 1134 goes negative.

The GCL Register consists of four latches 1150 which are used to represent the four low-order bits of the Channel 1 CCW count value set in their initial storage position 29. The GCL Latches are set to their initial values from the external bus-in lines EBI2.0–7 and EBI3.0–7 when the count value is destined to local store. The GCL latch entry is updated during each share cycle from the Z register bytes 2 and 3. The count valve in the GCL latches is not considered in the operation until its value is less than 9. To insure that the high-order bits of the count have been reduced before sampling of the GCL register, and high-order bit present in the count in local store (or in the Z register during updating) forces a count of 12 into the GCL register.

Thus, as seen in detail in FIG. 38*d*, bits Z2.0–3 are applied to an OR-circuit 1151, the output of which is applied to OR-circuits 1154 and 115, to produce logical 1 signals in the two high-order bits 0 and 1 into the GCL register 1150 when any one input Z2.0–3 is present. bit positions 0 and 1 into the GCL register corresponding to a count value of 12. Bits EBI2.4–7 are applied to an OR-circuit 1161, the output of which is also applied to OR-circuits 1163 and 1164 to cause a count of 12 to be entered into the GCL register. Bits EBI3.0–3 are applied to an OR-circuit 1162, the output of which is applied to the inputs to the OR-circuits 1163 and 1164 to cause a count of 12 to be entered into the GCL register. EBI3 bit 4 is applied to the OR-circuit 1163 to cause a value of 8 to be set into the GCL register when it is in its logical state. EBI3 bit 5 is applied to the OR-circuit 1164 to cause a value of 2 to be entered into the GCL register when it is in its logical '1 stage. EBI3 bits 6 and 7 are applied directly to the inputs to the GCL register to respectively set values of 2 and 1, respectively, into the GCL register when they are in their logical 1 state.

Thus, the GCL register for its initial setting will have a binary value stored therein up to a maximum of 12 which is equal to the binary value of EBI2 bits 0–7 and EBI3 bits 0–7 inclusive. During each subsequent share cycle the GCL register will be updated when the count in the local storage channel control word is updated by way of the Z2 and Z3 buses. The four bit true and complement outputs buses GCL 0–3 and –GCL 0–3 will have a valve (up to a maximum of 12) equal to the binary valve of the Z–2, Z–3 buses when they in face carry the word count.

Set/reset of GCL is provided by AND-circuit 1165 and inverter 1166.

The output of the GCL register in compared with the output of the buffer byte counter GB in a compare circuit 1005 comprising Exclusive OR-circuits 1170–1173, inclusive, the outputs of which are connected to an AND-circuit 1174, During input operations this compare circuit is utilized to determine the actual COunt Zero Condition by producing an output signal from AND-circuit 1175.

The GCL register output bits are gated to the decode logic of the memory flag circuits 1000 (FIGS. **38*a*, 38*b*) on each share cycle. When the two high-order bits are equal to zero, the memory flag bits in part control the bytes of data transferred between the buffer 267 and main storage 1*b*** and also control the count and data address updates.

The GDL register of FIG. **38*d* comprises a pair of latches which represent the two low order bit positions of the Channel 1 CCW data address set into the local storage register at location 28. The GDL latches are set from the external bus-in lines EBI3.6,7 when the data address is destined to local store. The external X, Y decode lines, line Set GDL, AND-circuit 1180 and invert circuit 1181** provide the set/reset function.

After the first share cycle transferring data between the main memory and an I/O, the bits in the GDL register will be set so a word boundary in almost all instances because after the first share cycle, the data being transferred will be on a word boundary address. Thus, during most input forward operations, the value of the GDL register will be 00 (a word boundary), during input backward operations 11 (a word boundary) and for output operations 00 (a word boundary).

The true and complement GDL bits GDL0 GDL1, –GDL0 and –GDL1 are applied to the memory flag circuits 100 (FIG. **38*b*) and are applied to buffer full force logic circuits 1001, 1002, and 1003 (FIGS. 38*f*, 38*g*) via predecode circuits 1183, 1184 and cable 1185. These BDL bits and the In Backward and In FOrward bits cause circuits 1101–1003 to selectively set latches BF2–BFO to their "full" states when less than a full four bytes are to be transferred from the buffer 267 to main storage 1*b***.

During each share cycle the outputs of the GDL register are gated to the decode logic of the memory flag circuits 100. The flag bits are developed to control the bytes transferred and the count and data address updates.

The memory flag circuits 1000 of FIGS. **38*a* and 38*b* includes a register having four polarity hold latches 1200–1203, inclusive. The outputs of the latches 1200–1203 are connected respectively to inputs of the full latches BF4–GRF, inclusive. An AND-circuit 1204 and inverters 1205–1208 provide the set/reset function for the latches 1200–1203. The setting of the latches 1200–1203 is achieved by means of decode circuits 1210–1213**, respectively, to produce flag bit settings as shown in FIG. 42.

Certain of the inputs to the decode circuits 1210–1213 are derived from the output bits of the GCL register via a set of predecode AND-circuits 1215–1218 and assemblers 1220–1222. The assemblers 1220–1222 and the decode circuits 1210–1213 and the latches 1200–1203 are common to all of the selector channels.

The true and complement GCL bits are decoded by AND-circuits 1215–1217 and applied to the inputs of assemblers 1220–1222. The outputs –CNT1, CNT1, –CNT2, CNT2, –CNT3 and CNT3 of the assemblers 1220–1222 are coupled to inputs of the decode circuits 1210–1213 by way of cable 1223.

Inputs to the circuits 1210–1213 are also derived from assemblers 1230–1232 which are common to all of the selector channels and which include from each of the channels the output of the respective GDL register as well as in the In-Backward control line. Thus the assemblers 1230–1232 include inputs GLD0, GLD1, and In-Backward. Their outputs GDL0, –GDL0, GDL1, –GDL1, In-Backward, –In-Backward are coupled to selected inputs of the circuits 1210–1213 by way of the cable 1223.

The memory flag latches 1200–1203 are set to indicate the number of bytes in the particular transfer of data from main store in the buffer 267 or vice versa. One latch represents each byte of the data word being transferred. A single set of latches functions for all four channels as indicated earlier. The control bits associated with the active channel are gated into the decode network described above to s et the latches 1200–1203 for the current share cycle. The flag bits control the buffer full latch settings for an output operation and control the storage entry byte gating for input operations. The flag bits also control the data address and count updates for both input and output operations.

A logic decode of the output of the GDL register containing the two low-order count bits and the GDL register containing the two low-order data address bits determine the flag latches to be set. Normal decode and switching relies upon the fact that these two registers do not have bits set in them at the same time. The exception occurs when the initial CCW count value is less than 4 and is taken care of with special gating (not shown).

The buffer byte counter and register GB together with its related controls is illustrated in FIG. **38*c*. The register GB comprises five latches, one for each of the four data bits and one for the parity bit. Each latch comprises three AND circuits such as 1250–1252 the outputs of which form inputs to an OR-circuit 1253**.

The AND circuits such as 1250 set the register GB in accordance with the updated incremented value. The AND circuits such as 1251 set the register GB in accordance with the initial value derived from the buffer full latches GRF–BF4 each time that data is transferred from the buffer 267 to main storage **1*b*. The AND-circuits 1252** are effective for the latch-up functions.

The set/reset function is performed by a logic circuit 1254, the inputs to which are Reset BF0,1, 2, 3, BF Time, and Set GR Full Latch. The output of the logic circuit 1254 is coupled directly to the AND-circuit 1252 and is coupled to the AND-circuits 1251 by way of the inverter 1255.

The buffer full latch output bits (from FIGS. **38*e–g*) are applied to the AND-circuit 1251 by way of predecode circuits 1260, decode circuits 1262, a cable 1261 interconnecting the circuits 1260 to the circuits 1262, and a cable 1263 connecting the outputs of the decode circuits 1262 to the inputs to the AND-circuit 1251**.

The predecode circuits 1260 include and AND-circuit 1265, the inputs to which are –GR Full and –BF6. An AND-circuit 1266 has inputs –BF5 and –BF4. A pair of AND-circuits 1267 and 1268 have outputs which form inputs of an OR-circuit 1269. The inputs to the AND-circuit 1267 are –GR Full and BF6. The inputs to AND-circuit 1268 are GR Full and –BF6. An AND-circuit 1270 includes inputs BF6 and GR Full. A pair of AND-circuits 1271 and 1272 have their outputs applied as inputs to an OR-circuit 1273. The inputs to the AND-circuit 1271 are –BF5 and BF4. The inputs to the AND-circuits 1272 are BF5 and –BF4. An AND-circuit 1274 has inputs BF4 and BF5. The outputs H0, –H1, H2, –L0 and L0, –L1 and L1, and –L2 and L2 of the circuits 1265, 1269, 1270, 1266, 1273 and 1274 form the cable 1261. These outputs from the circuits 1260 form corresponding inputs to the circuits 1262 as seen in FIG. 38*c*.

The circuits 1262 include an AND-circuit 1280 having inputs H2 and L2 and an output coupled to the cable 1263. AND-circuits 1281, 1282 and 1283 have outputs which form inputs to an OR-circuit 1284, the output of which is connected to the cable 1263. The AND-circuit 1281 has inputs H0 and L2. The AND-circuit 1282 has inputs H1 and –L0. The AND-circuit 1283 has inputs H2 and –L2.

The circuits 1262 also include AND-circuits 1285 and 1286, the outputs of which form inputs to an OR-circuit 1287. The AND-circuit 1285 has inputs –H1 and L1. The AND-circuit 1286 has inputs H1 and –L1.

The circuits 1262 also include AND-circuits 1290, 1291 and 1292 having outputs which form inputs to an OR-circuit 1293. The AND-circuit 1290 has inputs H0 and L0. The AND-circuit 1291 has inputs H1 and L2. The AND-circuit 1292 has inputs H2 and L1. The output of the OR-circuit 1293 forms part of the cable 1263.

The output of the register GB is applied directly and also by way of an inverter 1294 to inputs of the increment-by-one circuit 1004. The circuit 1004 includes a first portion comprised of logic circuits 1295 which are effective to produce at their outputs a value equal to the value in the register GB plus one. The increment-by-one circuit 1004 also includes a register 1296 which stores the incremented value.

Attention is again directed to the logic circuits 1254 which are effective to produce the set/reset function for the register GB. The circuit 1254 provides the set/reset function for both types of operations; that is, whether a value is set in the GB register in accordance with the setting of the buffer full latches or in accordance with the value in the increment-by-one circuits 1004. However, an AND-circuit 1297 is effective for selecting which one of the two values will be gated into the register GB. The AND-circuit 1297 has input lines Gate Bus-In to GR and –Reset BF0–3. The true output 1298 of the AND-circuit 1297 is effective for gating the incremented value from the register 1296 into the register GB by way of the AND-circuit 1250. The complement output 1299 from the AND-circuit 1297 is effective to set the register GB in accordance with the buffer full latch setting by way of AND-circuits 1251.

The operation of the buffer count register GB is as follows. The register GB contains five latches which carry a binary indication of the number of bytes of data in the buffer 267. Four bits are used for the actual count and the fifth bit is the parity bit. The buffer count is used only for input operations when the number of bytes in the buffer is a function of the count zero condition. The five latches have their value incremented by one and set in a second register 1296. When a new byte of data enters the GR stage of the buffer, the plus one value in the incrementer register is set into the buffer byte register GB.

The buffer byte register GB is initially set from a logic decode of the buffer full latch bits. With each transfer of data from the buffer 267 to main storage 1*b*, the four low-order buffer positions and their buffer full bits are cleared. The buffer byte count in the register GB is again initiallized with the logical count of the buffer full latch bits GRF–BF4.

The output of the buffer byte register GB is tested (by means not shown) each shift cycle of the buffer to determine whether or not the count of the bytes in the buffer 267 is greater than the remaining CCW count value. The register GB is also tested for a value greater than the binary value of 1000 which represents a system overrun since the buffer has only eight positions. A buffer count check latch (not shown) is set to indicate this condition.

The circuits for establishing a partition in the buffer 267 are shown in FIG. 38*j*. These circuits include an OR-circuit 1300, the outputs of which, Partition and –Partition, are applied respectively to the OR-circuit 1112 and the AND-circuit 1105 of FIG. 38*f*. An output partition logic block including AND-circuits 1301 and 1302 have outputs which form inputs to an OR-circuit 1303, the output of which forms one input to the OR-circuit 1300. One input to the AND-circuit 1301 is provided by an AND-circuit 1304, the inputs to which are the lines Chain Data, Output Operation, Count Zero (GCL). The first two lines originate in the channel 1 controls 260 of FIG. 2*a*. The count zero lines originate in FIG. 38*d*.

The other input to the AND-circuit 1301 is provided by an AND-circuit 1305, the inputs to which are lines –GR Full, –BF6, –BF5, –BF4. One input to the AND-circuit 1302 is the latch back connection from the output of the OR-circuit 1303. The other input to the AND-circuit 1302 is provided by a pair of AND-circuits 1306 and 1307. The AND-circuit 1306 includes input lines –BF0, –BF1, –BF2, –BF3. The output of the AND-circuit 1306 provides one input of the AND-circuit 1307 and the line BP Time forms the other input to the AND-circuit 1307.

A logic circuit including AND-circuits 1310 and 1311 and an OR-circuit 1312 form a second input to the OR-circuit 1300. The output of the AND-circuit 1305 provides one input to the AND-circuit 1310. The other input to the AND-circuit 1310 is provided by an AND-circuit 1313, the inputs to which are the lines Count Zero (GCL=GB), Chain Data, Input Operation. The latch back connection from the output of the OR-circuit 1312 forms one input of the AND-circuit 1311 and the other input is provided by the line Set Count Ready.

The operation of the partitioning circuits is as follows. The input conditions of the AND-circuit 1301 must be satisfied during output operations to establish a partition and the input conditions to the AND-circuit 1310 must be satisfied to establish a partition during input operations.

In order to establish a partition, it is necessary that all of the data in stages GR, B6, B5 and B4 be empty. Therefore, the AND-circuit 1305 produces an output signal when this condition exists, which output signal is applied to both partitioning circuits 1301 and 1310. During output operations partitioning can exist only after the count in the GCL register has reached zero. Thus, the count zero signal applied to the AND-circuit 1304 renders the AND-circuit 1301 effective. It should also be noted at this time that the only time that partitioning is of value is during data chaining operations. Thus the AND-circuits 1304 and 1313 include inputs Chain Data.

During input operations partitioning can occur only when the value in the GCL register equals the value in the GB register producing a count zero condition. Thus one of the inputs to the AND-circuit 1313 is this count zero condition.

During output operations the partition can be removed as soon as the stages B0–B3 are empty. Thus the AND-circuit 1306 and the AND-circuit 1307 are effective to reset the output partition logic block when stages B0–B3 are empty. Resetting of the input partition logic block is achieved by means of an input line Set Count Ready which originates in the channel controls 260.

FIG. 40 illustrates the receipt of data from the I/O interface and its movement through the stages G0–B01 of buffer 267 preparatory to transfer to main store. Each shift pulse time takes 90 nsec. in the preferred embodiment.

The first byte A is received and latched up in stage GR during shift time 1 and is latched up in stages B5, B3 and B1 at shift times 2, 3 and 4, respectively. Stage B0 has been set with its full latch BF0 on to prevent the entry of data thereto.

Note that, even though four shift times are used to latch up byte A in stage B1, the data byte bits will have trickled down the stages much sooner.

The maximum input data rate is assumed to be one byte every 360 nsec. and, therefore, byte B is received at 5 time and latched up in stage B2 at 8 time. Byte C is received at 9 time and latched up in stage B3 at 11 time. The three bytes A, B and C are now ready for transfer to main storage 1*b* by means of a share cycle.

FIG. 41 illustrates an output operation. At time 1, a share cycle will have transferred bytes A–D into stages GR–4 as shown. Byte A is latched up in stages B2 and B0 at 2 time and 3 time, respectively. During 3 time byte B is latched up in stage B3 and at 4 time is latched up in stage B1.

At 5 time, byte A is transferred to the output stage GO (not shown in FIG. 41) for transmission to an I/O device; byte C is latched up in stage B2 and byte D is latched up in stage 5.

At 6 time, byte D is latched up in stage B3 and the buffer 267 is ready to accept another four bytes of data in stages GR–B4.

It can be seen in FIGS. 40, 41 that the improved buffer 267 assembles data during input operations much faster than the I/O interface can provide it even though the I/O data rates are high (over three million bytes per second). During output operations, the buffer must also wait for the I/O interface to remove data. The buffer 267 can also shift data faster than each share cycle can transfer it.

Figure 34A:
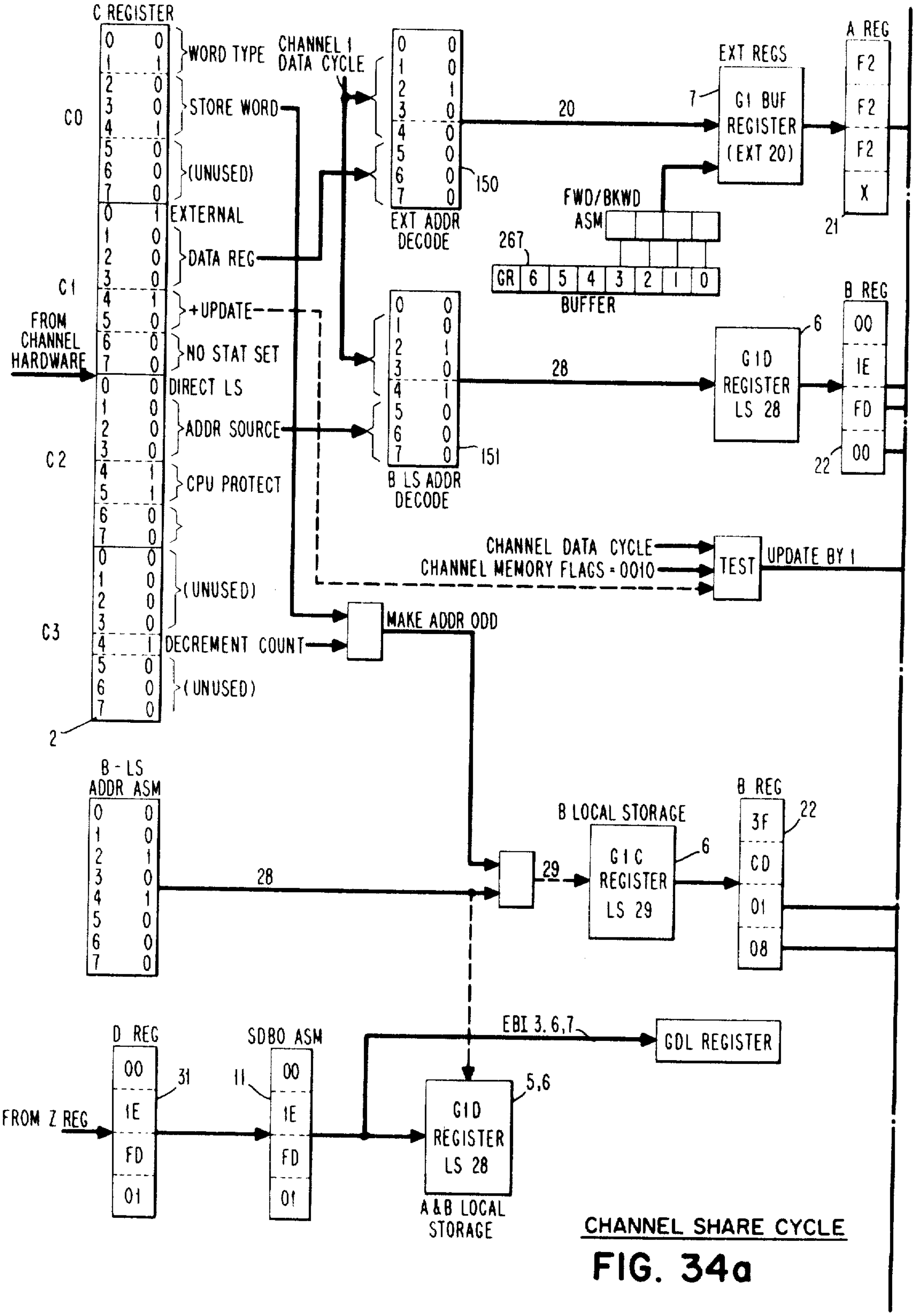
Figure 34B:
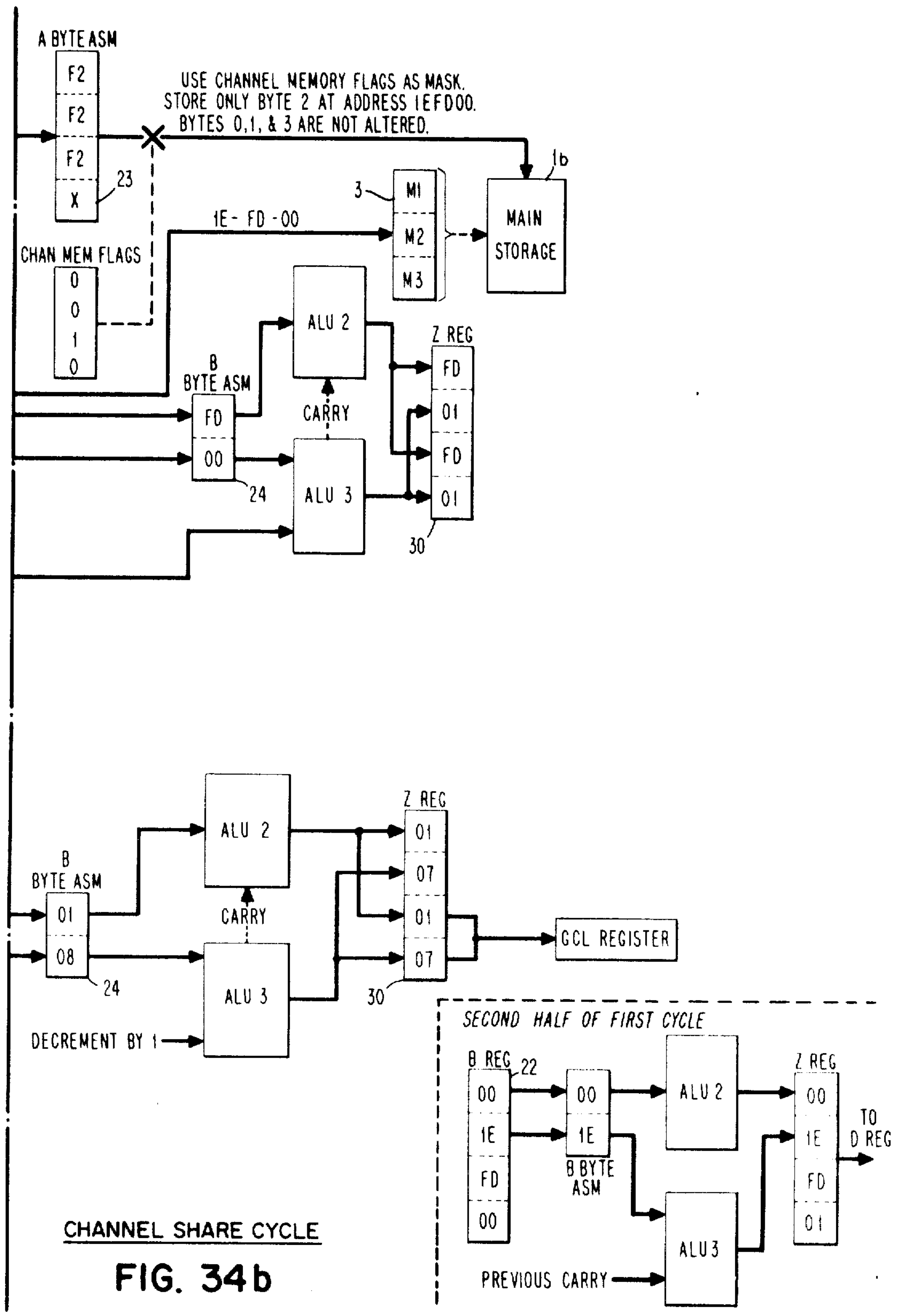

Channel Share Cycle—Data Input Forward—FIGS. 34*a*, 34*b* and 35

The share cycle makes use of a storage control word and is therefore generally similar to that described with respect to FIGS. 31*a*, 31*b*, 32*a*, 32*b*. The word is forced into the C register 2 from hardware in the channel controls 260 (FIG. 2*a*) rather than be accessed from control store 1*a*.

Execution of the share cycle by use of the storage control word 48880C08 is illustrated diagrammatically in FIGS. 34*a*, 34*b* and the timing of the various machine operations is illustrated in the timing diagram of FIG. 35. The execution of the storage word requires two storage cycles referred to as storage 1 cycle and storage 2 cycle each of which requires 270 nanoseconds. The objective of the specific control word 48880C08, shown by way of example, is to transfer byte 2 the data in buffer 267 at the main store address which is held in the G1D registers of the A and B local storage units. In this specific word, the data is transferred to main store 1*b* using bits 0–3 of the Channel Memory Flag latches as a mask.

The execution of the control word will be described with respect to the various bits making up the control word which are shown stored in the C register 2. The 0 and 1 bits of byte C0, when decoded, specify a storage word. Bits 2, 3 and 4 of byte C0 specify the subform store word. Bits 0–3 of byte C1, when decoded, specify accessing of the external register G1BUF (i.e., buffer 267) using bits 1, 2 and 3 of byte C1 and hardware forced bits. The contents F2F2F2xx of the buffer 267 are transferred to the A register 21 and then to the A byte assembler 23.

The address at which this byte of data is stored is determined by bits 0–3 of byte C2 of the control word. The decode of these bits causes accessing of the B local storage unit 6, bits 1, 2 and 3 of byte C2 and hardware forced bits being decoded in the circuit 151 to select the G1D register at address 28. The main store address 001EFD00 in the G1D register is transferred to the B register 22 and low-order bytes 2 and 3 are transferred from the B register 22 into the B byte assembler 24. Byte 2 in the B byte assembler is transferred to ALU2 and is stored in bytes 0 and 2 of the Z register 30. The low-order byte 3 in the assembler 24 is transferred into one input of ALU3. Another input to ALU3 calls for updating of the low-order byte by a value of 1. This results in the value one being added to byte 3 of the B byte assembler 24 and the result being stored in bytes 1 and 3 of the Z register 30. The updating of the address is determined by bits 4 and 5 of byte C1 of the control word which indicates that the updating is to be a true add function. The channel memory flag bits indicate the value of the updating. In this particular case, a decode of the memory flag bits call for updating by a value of one.

At approximately 180 time of storage 1 cycle, bytes 0 and 1 of the B register 22 are transferred to the B byte assembler 24 and thence to bytes 0 and 1 of the Z register 30 by way of ALU2 and ALU3.

At the beginning of storage cycle 2, the decode of bits 2, 3 and 4 of byte C0 and the decode of bit 4 of byte C3 cause the address which selected the G1D register of the B local storage unit 6 during the first cycle to be incremented by 1 from a value of 28 to 29 causing accessing of the G1C register in the B local storage unit 6. The low-order bytes 2 and 3 of the G1C register contain a count value equal to the number of bytes which must be transferred to the main storage unit by the current CCW. In the preferred embodiment of the system illustrated, the count value is always stored in the register immediately following the register which is used for addressing data; in this particular case, the G1D register. Each time that a word or a portion thereof is transferred to main store, the word count in the G1C register must be decremented until a value of zero is reached, indicating termination of a particular operation. The subform of the particular control word being executed determines the value by which the count is decremented. A byte operation requires decrementing by 1, a half-word operation decrementing by 2, and a full-word operation decrementing by 4 . In the present example, a byte is stored whereby decrementing by 1 is required. Thus, the low-order byte 08 in the B byte assembler 24 is transferred to ALU3 and is decremented by 1 and then stored in bytes 1 and 3 of the Z register 30.

At 45 to 90 time of the storage 2 cycle, the updated word address (001EFD01) which was transferred into the Z register during storage 1 cycle is transferred to the D register 31. During 90 to 150 time of cycle 2 the updated address is transferred from the D register to the G1D register by way of the SDBO assembler 11.

The next control word to be executed is accessed by a return word.

At about 180 time of storage 2 cycle, the GCL register is set from the Z register. At about 45 time of storage 2 cycle, the GDL register is set from EBI3.6,7.

FIG. 35 also shows the timing of set register G1B, reset latches BF0–3 and the BF set/reset timing.

While the invention has been particularly shown and described with reference to a preferred embodiment thereof, it will be understood by those skilled in the art that various changes in form and details may be made therein.

What is claimed is:

1. A shift register having an input and an output path comprising

- a plurality of stages intermediate the input and output paths, each stage including a latch of the polarity hold type,
- means for entering data into the register by way of its input path,
- means for transferring data from the register by way of its output path,
- storage means for representing the presence or absence of stored data in each stage, and
- logical circuit means connected to and coacting with said means for representing and effective at selected time intervals to control the shifting of data through succeeding stages within the register, said logical circuit means including
- means for preventing the shifting of data from one stage to any succeeding stage when the stage next succeeding said one stage has data stored therein,
- means for transferring data from one stage to the next succeeding stage when the next succeeding stage is empty and the stage succeeding said next succeeding stage has data stored therein, and
- means for transferring data from one stage through at least the next succeeding stage to a desired stage when the desired stage and all stages intermediate said one stage and said desired stage do not have data stored therein.

2. A shift register having an input and an output comprising a plurality of stages intermediate the input and output paths, each stage including a plurality of latches of the polarity hold type for storing a plurality of data bits, means for entering data into the register by way of its input, means for transferring data from the register by way of its output, a storage means provided for each stage for representing the presence or absence of stored data in the stage, and a logical circuit means provided for each storage means, having its output connected to and coacting with its respective storage means and having its inputs connected to selected outputs of storage means provided for preceding and succeeding stages for controlling at selected intervals the shifting of data through succeeding stages within the register, said logical circuit means including means for preventing the shifting of data from one stage to any succeeding stage when the stage next succeeding said one stage has stored data therein, means for transferring data from one stage to the next succeeding stage when the next succeeding stage is empty and the stage succeeding said next succeeding stage has stored data therein, and means for transferring data from one stage through at least the next succeeding stage to a desired stage when the desired stage and all stages intermediate said one stage and said desired stage to not have stored data therein.

3. A shift register having an input and an output and comprising a plurality of stages connected in series intermediate the input and output, each stage having an input and an output including a plurality of latches of the polarity hold type for storing a plurality of data bits therein, means for entering data into the register by way of its input, means for transferring data from the register by way of its output, a series of full latches, one for each stage, having first and second logical states, means, including one of said full latches, provided for each of at least certain stages and effective when the full latch is set to its first logical state to cause the respective stage to be latched up in accordance with the data input thereto, and effective when the latch is set to its second logical state to cause the respective stage to reproduce at its output data applied to its input, timing means switching each full latch from its second to its first logical state in the event that its next preceding full latch is in said first state and its next succeeding full latch is in said second state and in the event that the next preceding full latch is in said second state and the full latch preceding said next preceding full latch is in said first state, and timing means further including means for switching each full latch from its first to its second state in the event that its next succeeding full latch is in its second state.

4. A data processing system of the type in which the transfer of data between a main storage device and high-speed input/output devices is effected by way of a shift register buffer under control of logical circuits in response to program instructions, and in which the buffer is effective for receiving data from the input/output devices serially by byte and for shifting the data through the buffer serially by byte and is further effective for transferring data from the buffer to the main storage device word by word, wherein the buffer comprises a plurality of stages, each stage including a plurality of polarity hold latches, one for each bit of data in a byte; and control means effective during each data advance cycle of the buffer for causing data stored in each stage other than the last to be transferred alternatively one or more stages or not transferred as a function of the full or empty condition of each said stage and stages preceding and succeeding said stage to right justify data within buffer;

said control means further including means for permitting the transfer of data from certain of the stages during an advance cycle while preventing the transfer of data from other stages during said cycle, said control means further including means for advancing bytes of data through the buffer stages at a significantly higher rate than the maximum rate at which data can be received from and sent to the input/output devices.

5. The processing system of claim 4 further comprising means for controlling the transfer of bytes selectively into those stages of the buffer from which data is transferred on a word basis to the main storage device whereby the transfer involves a selected number of bytes equal to or less than the number of bytes which comprise a word.

6. The data processing system of claim 4 further comprising means for causing the transfer of data from the buffer to the main storage device to be in the forward or backward direction.

7. The data processing system of claim 4 further comprising means for transferring data from the main storage device to the buffer a word or any portion thereof at a time, said control means thereafter effective to transfer the data serially by byte through the buffer to an output stage for transfer to a selected input/output device.

8. A data processing system of the type in which the transfer of data between a main storage device and high-speed input/output devices is effected by way of a shift register buffer under control of logical circuits in response to program instructions, in which means are effective when the last byte of a first group is received in the buffer for preventing the transfer of bytes of a second group to the buffer until a new main storage address is determined, and in which the buffer is effective for receiving data from the input/output devices serially by byte and for shifting the data through the buffer serially by byte and is further effective for transferring data from the buffer to the main storage device word by word, wherein the buffer comprises a plurality of stages, each stage including a plurality of polarity hold latches, one for each bit of data in a byte;

control means effective during each data advance cycle of the buffer for causing data stored in each stage other than the last to be transferred alternatively one or more stages or not transferred as a function of the full or empty condition of each said stage and stages preceding and succeeding said stage to right justify data within buffer;

said control means further including means for permitting the transfer of data from certain of the stages during an advance cycle while preventing the transfer of data from other stages during said cycle, said control means effective for advancing bytes of data through the buffer stages at a significantly higher rate than the maximum rate at which data can be received from and sent to the input/output devices;

means for partitioning the buffer into first and second sections; and means effective when the last byte of said first group has been transferred from the first section to the second section for preventing the transfer of data from the first section to the second section and for permitting the transfer of bytes of said second group to the first section before said new address is determined.

9. A data processing system of the type in which the transfer of data between a main storage device and high-speed input/output devices is effected by way of a shift register buffer having a plurality of stages under control of logical circuits in response to program instructions, in which means are effective when the last byte of a first group is received in the buffer for preventing the transfer of bytes of a second group to the buffer until a new main storage address is determined, and in which the buffer is effective for receiving data from the input/output devices serially by byte and for shifting the data through the buffer serially by byte and is further effective for transferring data from the buffer to the main storage device word by word, wherein the buffer comprises a set of latches of the polarity hold type for each stage, each latch having a first latched state for latching up data therein and a second unlatched state for continuously transferring data from its input to its output, means for indicating the states of each set of latches, a first circuit means responsive to said indicating means at a predetermined time during each data shift cycle for switching the set of latches of each stage which are in their latched states to their unlatched states only in the event that the set of latches of the next succeeding stage are in their unlatched states, a second circuit means responsive to said indicating means at a predetermined time during each data shift cycle for switching the set of latches of each stage which are in their unlatched states to their latched states only in either event (1) that the latches in one of a predetermined number *n* of the preceding stages and the latches of the next succeeding stage are in their latched states, or (2) that the latches in the *n* preceding stages are in their unlatched states and the latches in the $n+1$ preceding stage are in their latched states, where $n+1$ is equal to maximum number of stages that data is to be transferred in any one data shift cycle, said circuit means further including means for advancing bytes of data through the buffer stages at a higher rate than the maximum rate at which data can be received from and sent to the input/output devices, means for partitioning the buffer into first and second sections, and means effective when the last byte of said first group has been transferred from the first section to the second section for preventing the transfer of data from the first section to the second section and for permitting the transfer of bytes of said second group to the first section before said new address is determined.

* * * * *